US012735060B2

(12) United States Patent
Merg et al.

(10) Patent No.: US 12,735,060 B2
(45) Date of Patent: Sep. 15, 2026

(54) METHOD AND SYSTEM FOR DETERMINING A PARAMETER-IDENTIFIER CONDITION OF A PARAMETER-IDENTIFIER TOPIC TO SERVICE A VEHICLE

(71) Applicant: Snap-on Incorporated, Kenosha, WI (US)

(72) Inventors: Patrick S. Merg, Hollister, CA (US); Roy S. Brozovich, Campbell, CA (US); Jacob G. Foreman, Hollister, CA (US); Joseph R. Grammatico, San Jose, CA (US); Brett A. Kelley, San Jose, CA (US); Joshua C. Covington, San Juan Bautista, CA (US); David B. Weiland, Union City, CA (US)

(73) Assignee: Snap-on Incorporated, Kenosha, WI (US)

( * ) Notice: Subject to any disclaimer, the term of this patent is extended or adjusted under 35 U.S.C. 154(b) by 466 days.

(21) Appl. No.: 17/727,682

(22) Filed: Apr. 22, 2022

(65) Prior Publication Data

US 2023/0192112 A1 Jun. 22, 2023

Related U.S. Application Data

(63) Continuation-in-part of application No. 17/667,997, filed on Feb. 9, 2022, and a continuation-in-part of (Continued)

(51) Int. Cl.

| | |
|---|---|
| ***B60W 50/08*** | (2020.01) |
| ***B60W 40/09*** | (2012.01) |
| ***B60W 40/12*** | (2012.01) |

(52) U.S. Cl.

CPC .......... *B60W 50/085* (2013.01); *B60W 40/09* (2013.01); *B60W 40/12* (2013.01);

(Continued)

(58) Field of Classification Search

CPC .................................................. B60W 50/085

See application file for complete search history.

(56) References Cited

U.S. PATENT DOCUMENTS

| | | | |
|---|---|---|---|
| 4,679,808 | A | 7/1987 | Ito et al. |
| 4,831,539 | A | 5/1989 | Hagenbuch |

(Continued)

FOREIGN PATENT DOCUMENTS

| | | | |
|---|---|---|---|
| JP | 4375487 | B2 | 12/2009 |
| JP | 2009282804 | A | 12/2009 |
| KR | 102001900 | B1 | 7/2019 |

OTHER PUBLICATIONS

International Searching Authority; Notification of transmittal of the international search report and the written opinion of the International Searching Authority, or the declaration; the international search report, and the written opinion regarding international patent application No. PCT/US2023/064903; dated Jun. 12, 2023.

(Continued)

*Primary Examiner* — Imran K Mustafa

(74) *Attorney, Agent, or Firm* — McDonnell Boehnen Hulbert & Berghoff LLP

(57) ABSTRACT

A method includes a computer operating in a first state in which a parameter-identifier condition indicator is not displayed. The computer determines a vehicle identifier corresponding to a vehicle. The vehicle includes a component corresponding to a component identifier and system corresponding to a system identifier, and can exhibit a symptom corresponding to a symptom identifier. The computer determines the component identifier, system identifier, and/or symptom identifier, and a corresponding PID topic. The computer switches to a second state. The method includes determining, a parameter-identifier topic corresponding to parameter-identifier(s). In the second state, the computer: receives parameter values automatically requested from the (Continued)

vehicle for parameter-identifiers corresponding to the parameter-identifier topic, determines a parameter-identifier condition for each of the parameter-identifier(s), and displays a descriptor of the parameter-identifier topic and a PID condition indicator corresponding to the parameter-identifier topic.

35 Claims, 59 Drawing Sheets

Related U.S. Application Data application No. 17/557,186, filed on Dec. 21, 2021, now Pat. No. 12,051,285.

(52) U.S. Cl.
CPC ..... *B60W 50/082* (2013.01); *B60W 2540/215* (2020.02); *B60W 2540/30* (2013.01)

(56) References Cited

U.S. PATENT DOCUMENTS

| | | | | |
|---|---|---|---|---|
| 5,032,821 | A | 7/1991 | Domanico et al. | |
| 5,396,427 | A | 3/1995 | Piehl et al. | |
| 5,524,078 | A | 6/1996 | Kolb et al. | |
| 5,764,524 | A | 6/1998 | Andersson et al. | |
| 5,852,789 | A | 12/1998 | Trsar et al. | |
| 5,935,187 | A | 8/1999 | Trsar et al. | |
| 6,092,016 | A | 7/2000 | Sarangapani et al. | |
| 6,459,968 | B1 | 10/2002 | Kochie | |
| 6,484,080 | B2 | 11/2002 | Breed | |
| 7,254,469 | B2 | 8/2007 | Robb et al. | |
| 7,953,530 | B1 | 5/2011 | Pederson et al. | |
| 8,135,508 | B1 | 3/2012 | Thompson et al. | |
| 9,008,854 | B2 | 4/2015 | Breed | |
| 9,043,073 | B2 | 5/2015 | Ricci | |
| 9,342,934 | B2 | 5/2016 | Chen | |
| 10,163,280 | B1* | 12/2018 | Covington | G06Q 50/40 |
| 11,227,452 | B2 | 1/2022 | Rosenbaum | |
| 12,579,851 | B2 | 3/2026 | Gutlein | |
| 2002/0138185 | A1 | 9/2002 | Trsar et al. | |
| 2004/0172177 | A1* | 9/2004 | Nagai | G07C 5/085 701/33.4 |
| 2005/0027403 | A1 | 2/2005 | Nagai | |
| 2006/0030981 | A1 | 2/2006 | Robb et al. | |
| 2008/0256440 | A1 | 10/2008 | Boreham et al. | |
| 2009/0259358 | A1 | 10/2009 | Andreasen | |
| 2011/0035094 | A1 | 2/2011 | Van Den Berg et al. | |
| 2012/0215491 | A1 | 8/2012 | Theriot et al. | |
| 2013/0221973 | A1 | 8/2013 | Whisenand et al. | |
| 2014/0075356 | A1 | 3/2014 | Gray et al. | |
| 2014/0244213 | A1 | 8/2014 | Theriot et al. | |
| 2015/0121275 | A1 | 4/2015 | Marshall et al. | |
| 2015/0371457 | A1* | 12/2015 | Bakfan | G07C 5/0841 701/29.3 |
| 2016/0055686 | A1 | 2/2016 | Ukai et al. | |
| 2016/0124587 | A1 | 5/2016 | Covington et al. | |
| 2016/0124605 | A1 | 5/2016 | Covington et al. | |
| 2016/0124609 | A1 | 5/2016 | Covington et al. | |
| 2016/0124612 | A1 | 5/2016 | Covington et al. | |
| 2016/0124635 | A1 | 5/2016 | Covington et al. | |
| 2017/0039059 | A1 | 2/2017 | Gintz et al. | |
| 2017/0134537 | A1 | 5/2017 | O'Mahony et al. | |
| 2017/0372533 | A1 | 12/2017 | Merg | |
| 2018/0047222 | A1 | 2/2018 | Lewis et al. | |
| 2018/0047223 | A1 | 2/2018 | Lewis et al. | |
| 2018/0201236 | A1 | 7/2018 | Merg et al. | |
| 2018/0314255 | A1 | 11/2018 | Nistler | |
| 2018/0357614 | A1 | 12/2018 | Merg et al. | |
| 2019/0050458 | A1 | 2/2019 | Merg et al. | |
| 2019/0311556 | A1 | 10/2019 | Thron | |
| 2020/0134933 | A1 | 4/2020 | Covington et al. | |
| 2020/0134934 | A1 | 4/2020 | Covington et al. | |
| 2020/0184743 | A1 | 6/2020 | Merg et al. | |
| 2020/0184745 | A1 | 6/2020 | Merg et al. | |
| 2020/0242860 | A1 | 7/2020 | Merg et al. | |
| 2021/0049836 | A1 | 2/2021 | Covington et al. | |
| 2021/0049844 | A1 | 2/2021 | Covington | |
| 2021/0173016 | A1 | 6/2021 | Whisenand et al. | |
| 2021/0264383 | A1 | 8/2021 | Kleinhans et al. | |
| 2021/0279155 | A1 | 9/2021 | Theriot et al. | |
| 2022/0027023 | A1 | 1/2022 | Merg et al. | |
| 2022/0375274 | A1 | 11/2022 | Chen | |
| 2023/0196850 | A1 | 6/2023 | Weiland et al. | |
| 2023/0252824 | A1 | 8/2023 | Merg et al. | |
| 2023/0252830 | A1 | 8/2023 | Merg et al. | |
| 2024/0331464 | A1 | 10/2024 | Weiland et al. | |
| 2025/0239108 | A1 | 7/2025 | Merg | |

OTHER PUBLICATIONS

Snap-On Incorporated; BMW Vehicle Communication Software Manual, EAZ0025B42B Rev. B; Feb. 2013, 132 pages.

Alyssa Walker; JSON Tutorial: Learn with Simple File Format Example; downloaded from world wide web at https://web.archive.org/web/20211122120401/https://www.guru99.com/json-tutorial-example.html; Oct. 8, 2021, 14 pages.

MDN Web Docs; Working with JSON; downloaded from world wide web at https://web.archive.org/web/20220208085926/https://developer.mozilla.org/en-US/docs/Learn/JavaScript/Objects/JSON; Feb. 8, 2022, 11 pages.

W3 Schools; JavaScript if . . . else; downloaded from the world wide web at https://web.archive.org/web/20220204065407/https://www.w3schools.com/jsref/jsref_if.as; Feb. 4, 2022; 9 pages.

json org: JSON Example; downloaded at world wide web at https://web.archive.org/web/20220121030538/https://son.org/example.html; Jan. 21, 2022; 10 pages.

Stack Overflow Community; If . . . THEN . . . ELSE using XML; downloaded from world wide web at https://web.archive.org/web/20170202104131/http://stackoverflow.com/questions/6061470/if-then-else-using-xml; Feb. 2, 2017; 4 pages.

Napa Institute of Automotive Technology; OBDII and Generation Scan Tools; 1998; 144 pages; document provided via 3 PDF files.

W3 Schools; JSON Object Literals; downloaded from the world wide web at https://web.archive.org/web/20220101095825/https://www.w3schools.com/js/js_json_objects.asp; Jan. 1, 2022; 8 pages.

SMOG-Tech-Training; Testing O2 Sensor 2017 Update Class; downloaded from the world wide web at https://www.smog-tech-training.com/TestingO2Sensor.html on Jul. 7, 2021.

mechanics.stackexchange.com; Motor Vehicle Maintenance & Repair, Difference between banks for AFR & O2 sensor values; downloaded from the World Wide Web at https://mechanics.stackexchange.com/questions/67962/difference-between-banks-for-afr-o2-sensor-values on Jul. 7, 2021.

Snap-On Incorporated; Zeus User Manual, ZEEMS342A, Rev. F; Jun. 26, 2018; document provided via 15 PDF files.

Tektronix; XYZs of Oscilloscopes, Primer; Jan. 2016; document provided via 4 PDF files.

Tektronix; User Manual, TDS1000- and TDS2000-Series Digital Storage Oscilloscope 071-1064-00; Feb. 6, 2002, document provided via 6 PDF files.

Australian Patent Office, Examination Report No. 1 for standard patent application No. 2023255598, dated Jun. 2, 2025, 4 pages.

Marinucci, Dan, "Shotgun diagnosis often counterproductive; Tire Business", Sep. 29, 2014; downloaded from the world wide web at https://www.tirebusiness.com/article/20140929/ISSUE/309299980/shotgun-diagnosis-often-counterproductive.

International Searching Authority; Notification of transmittal of the international search report and the written opinion of the International Searching Authority, or the declaration regarding international application No. PCT/US2022/081612, and the international search report and the written opinion; dated Jun. 9, 2023.

International Searching Authority; Invitation to pay additional fees, and where applicable protest fee, along With: (i) Annex to Form

(56) References Cited

OTHER PUBLICATIONS

PCT/ISA/206 with results of the partial international search, and (ii) provisional opinion for PCT application No. PCT/US2022/081612 dated Apr. 12, 2023.

International Searching Authority of Word Intellectual Property Office; Invitation to pay additional fees and, where applicable, protest fee on Form PCT/ISA/206 for corresponding PCT application No. PCT/US2023/062201 dated Jul. 6, 2023.

International Searching Authority of Word Intellectual Property Office; Notification of transmittal of the international search report and the written opinion of the international searching authority, or the declaration; the international search report; and written opinion of the international searching authority; all for international application No. PCT/US2023/062201; mailed Aug. 29, 2023.

* cited by examiner

| PIDS MAPPED TO MOST-PROBABLE COMPONENT BASED ON DTC | PID TOPIC METADATA | |
|---|---|---|
| AIR FLOW CALCULATED (G/S) | MASS AIR FLOW SENSOR | 924 |
| MAF (HZ) | MASS AIR FLOW SENSOR | |
| MAF (G/S) | MASS AIR FLOW SENSOR | |
| MAF PERFORMANCE TEST | MASS AIR FLOW SENSOR | |
| HOS2 B1 S1 (MV) | OXYGEN SENSOR | 925 |
| HOS2 B1 S2 (MV) | OXYGEN SENSOR | |
| HOS2 B2 S1 (MV) | OXYGEN SENSOR | |
| HOS2 B2 S2 (MV) | OXYGEN SENSOR | |
| ENGINE SPEED (RPM) | FUEL TRIM | 926 |
| SHORT TERM FT BANK (%) | FUEL TRIM | |
| ENGINE LOAD (%) | FUEL TRIM | |
| LONG TERM FT BANK 1 (%) | FUEL TRIM | |
| 922 | 923 | |

FIG. 8

| Pin | Wire color | Function | Circuit ID |
|---|---|---|---|
| A | White | Exhaust CMP sensor - Bank-1 - signal | 100 |
| B | Pink | Exhaust CMP sensor - Bank-1 - voltage feed | 167 |
| C | Black | Exhaust CMP sensor - Bank-1 - ground | 218 |

1072

VEHICLE Y/M/M/E: 796
ENGINE COOLING / HVAC DATA 838
ENGINE COOLANT TEMPERATURE SENSOR 797

839:
- RADIATOR COOLANT TEMPERATURE SENSOR 807
  - $07 $DF $02 $01 $E1 $00 $00 $00 $00 $00 808
- START UP ECT 809
  - $07 $DF $02 $01 $D0 $00 $00 $00 $00 $00 810
- ECT SENSOR 812
  - $07 $DF $02 $01 $05 $00 $00 $00 $00 $00 814

ENGINE COOLANT THERMOSTAT 798

840:
- ENGINE COOLANT THERMOSTAT HEATER COMMAND 816
  - $07 $DF $02 $01 $D1 $00 $00 $00 $00 $00 818
- ENGINE COOLANT THERMOSTAT HEATER CONTROL CIRCUIT HIGH 820
  - $07 $DF $02 $01 $D2 $00 $00 $00 $00 $00 822
- ENGINE COOLANT THERMOSTAT HEATER CONTROL CIRCUIT LOW 824
  - $07 $DF $02 $01 $D3 $00 $00 $00 $00 $00 825
- ENGINE COOLANT THERMOSTAT HEATER CONTROL CIRCUIT OPEN 826
  - $07 $DF $02 $01 $D4 $00 $00 $00 $00 $00 827
- ENGINE SPEED 828
  - $07 $DF $02 $01 $0C $00 $00 $00 $00 $00 829

ENGINE COOLING FAN 799

841:
- COOLING FAN RELAY 1 CONTROL CIRCUIT LOW VOLTAGE TEST 830
  - $07 $DF $02 $01 $B1 $00 $00 $00 $00 $00 831
- COOLING FAN RELAY 1 CONTROL CIRCUIT OPEN TEST 832
  - $07 $DF $02 $01 $B2 $00 $00 $00 $00 $00 833
- COOLING FAN RELAY 2 CONTROL CIRCUIT LOW VOLTAGE TEST 834
  - $07 $DF $02 $01 $B3 $00 $00 $00 $00 $00 835
- COOLING FAN RELAY 2 CONTROL CIRCUIT OPEN TEST 836
  - $07 $DF $02 $01 $B4 $00 $00 $00 $00 $00 837

VEHICLE Y/M/M/E: 796
ENGINE COOLING / HVAC DATA 838
$07 $DF $02 $01 $E1 $00 $00 $00 $00 $00 808
$07 $DF $02 $01 $D0 $00 $00 $00 $00 $00 810
$07 $DF $02 $01 $05 $00 $00 $00 $00 $00 814
$07 $DF $02 $01 $D1 $00 $00 $00 $00 $00 818
$07 $DF $02 $01 $D2 $00 $00 $00 $00 $00 822
$07 $DF $02 $01 $D3 $00 $00 $00 $00 $00 825
$07 $DF $02 $01 $D4 $00 $00 $00 $00 $00 827
$07 $DF $02 $01 $0C $00 $00 $00 $00 $00 829
$07 $DF $02 $01 $B1 $00 $00 $00 $00 $00 831
$07 $DF $02 $01 $B2 $00 $00 $00 $00 $00 833
$07 $DF $02 $01 $B3 $00 $00 $00 $00 $00 835
$07 $DF $02 $01 $B4 $00 $00 $00 $00 $00 837

VEHICLE Y/M/M/E: 796
ENGINE COOLING / HVAC DATA 838
808 864
863 <128C3>$07 $DF $02 $01 $E1 $00 $00 $00 $00 $00</128C3> 865
<3D002>$07 $DF $02 $01 $D0 $00 $00 $00 $00 $00</3D002> 866
810 <009B3>$07 $DF $02 $01 $05 $00 $00 $00 $00 $00</009B3> 867
814 <4C800>$07 $DF $02 $01 $D1 $00 $00 $00 $00 $00</4C800> 868
818 <4C802>$07 $DF $02 $01 $D2 $00 $00 $00 $00 $00</4C802> 869
822 <7704F>$07 $DF $02 $01 $D3 $00 $00 $00 $00 $00</7704F> 870
825 <A8A85>$07 $DF $02 $01 $D4 $00 $00 $00 $00 $00</A8A85> 871
<3C831>$07 $DF $02 $01 $0C $00 $00 $00 $00 $00</3C831> 872
<20020>$07 $DF $02 $01 $B1 $00 $00 $00 $00 $00</20020> 873
<98765>$07 $DF $02 $01 $B2 $00 $00 $00 $00 $00</98765> 874
<12354>$07 $DF $02 $01 $B3 $00 $00 $00 $00 $00</12354> 875
<1283D>$07 $DF $02 $01 $B4 $00 $00 $00 $00 $00</1283D> 876
827 829 831 833 835 837

FIG. 24C

```
<?xml version="1.0"?> 241
<response xmlns:i="http://www.w3.org/2001/XMLSchema-instance"> 578
    <pidDataList> 201
        <pidDataListName>Engine Cooling/HVAC Data with Custom PID Topic 01-NOV-
2022</pidDataListName> 579
211 <pidTopic> 204
            <pidTopicName>Engine Coolant Temperature Sensor</pidTopicName> 215
            <pids>
245             <pid>
                    <pidKey>Start Up ECT</pidKey> 219
                </pid>
246             <pid>
                    <pidKey>ECT Sensor</pidKey> 220
                    <rangeTop>241</rangeTop> 221
                    <rangeBottom>172.2</rangeBottom> 222
                </pid>
586             <pid>
                    <pidKey>Low Coolant Level</pidKey> 580 585 599
                    <expectedValue>No</expectedValue> 600
                </pid>
587             <pid>
                    <pidKey>Coolant Level Switch</pidKey> 601
                    <expectedValue>Off</expectedValue> 602
                </pid>
588             <pid>
                    <pidKey>Cooling Fan Motor Commanded</pidKey> 603
                    <expectedValue>On</expectedValue> 604
                </pid>
589             <pid>
                    <pidKey>Calculated Engine Coolant Temperature</pidKey> 605
                    <rangeTop>250</rangeTop> 606
                    <rangeBottom>-40</rangeBottom> 607
                </pid>
            </pids>
287         <dtcs>
                <dtc>P0128</dtc>
            </dtcs>
    </pidTopic> 205
```

| PID THRESHOLDS | | | | | |
|---|---|---|---|---|---|
| PID | CONDITION | RANGE TOP | RANGE BOTTOM | UNITS | EXPECTED VALUE |
| 6 | KEY ON - ENGINE OFF | 0 | 0 | PSI | NULL |
| 6 | KEY ON - ENGINE ON | 85 | 12 | PSI | NULL |
| 31 | KEY ON - ENGINE OFF | 15 | 3 | VOLTS DC | NULL |
| 31 | KEY ON - ENGINE ON | 15 | 3 | VOLTS DC | NULL |
| 32 | KEY ON - ENGINE OFF | NULL | NULL | NULL | OFF |
| 32 | KEY ON - ENGINE ON | NULL | NULL | NULL | ON |
| 33 | KEY ON - ENGINE OFF | NULL | NULL | NULL | NULL |
| 33 | KEY ON - ENGINE ON | NULL | NULL | NULL | NULL |
| 76 | KEY ON - ENGINE OFF | 14.5 | 11.8 | VOLTS DC | NULL |
| 76 | KEY ON - ENGINE ON | 14.8 | 12.0 | VOLTS DC | NULL |

METHOD AND SYSTEM FOR DETERMINING A PARAMETER-IDENTIFIER CONDITION OF A PARAMETER-IDENTIFIER TOPIC TO SERVICE A VEHICLE

REFERENCE TO RELATED APPLICATION

This application is a continuation-in-part application of U.S. patent application Ser. No. 17/557,186, which was filed on Dec. 21, 2021. U.S. patent application Ser. No. 17/557,186 is incorporated herein by reference.

This application is a continuation-in-part application of U.S. patent application Ser. No. 17/667,997, which was filed on Feb. 9, 2022. U.S. patent application Ser. No. 17/667,997 is incorporated herein by reference.

BACKGROUND

Modern vehicles include many computer-controlled electronic control units. The electronic control units (ECUs) within such a vehicle can be operable to communicate with one another as well with an off-board computing system. The off-board computing system can be used while servicing a vehicle. In some instances, the off-board computing system is operable to request and display a parameter value and a corresponding parameter-identifier (PID). The prior off-board computing systems, however, do not provide for determining and displaying parameter values for a PID topic corresponding to one or more parameter-identifiers (PIDs) and a PID condition for each of the one or more PIDs. The prior off-board computing systems also do not provide for automatically rearranging aspects of a PID topic based on the changes to PID conditions.

Overview

In a first implementation, a method is provided. The method includes determining, by a processor while a computing system operates in a first state, a vehicle identifier corresponding to a vehicle operatively connected to the computing system. The computing system includes the processor and a display. The display is powered on, but does not display any PID condition indicator while the computing system operates in the first state. A component identifier corresponds to a component of the vehicle. A system identifier corresponds to a system of the vehicle. A symptom identifier corresponds to a symptom the vehicle can exhibit. The method also includes determining, by the processor while the computing system operates in the first state, the component identifier, the system identifier, and/or the symptom identifier. The method further includes determining, by the processor, a first PID topic corresponding to the component identifier, the system identifier, and/or the symptom identifier. One or more PIDs correspond to the first PID topic. Still further, the method includes switching, by the processor, operation of the computing system from the first state to a second state. The computing system is operable to display a PID condition indicator on the display while operating in the second state. Further still, the method includes receiving, by the processor while the computing system operates in the second state, parameter values automatically requested from the vehicle for the one or more PIDs corresponding to the first PID topic. Furthermore, the method includes determining, by the processor while the computing system operates in the second state, a PID condition associated with each respective PID corresponding to the first PID topic. The PID condition associated with each respective PID corresponding to the first PID topic indicates whether at least one of the received parameter values corresponding to the respective PID has breached a respective PID threshold or whether none of the received parameter values corresponding to the respective PID has breached any respective PID threshold. Furthermore still, the method includes displaying, on the display while the computing system operates in the second state, a descriptor of the first PID topic and a first particular PID condition indicator corresponding to the first PID topic. The first particular PID condition indicator corresponding to the first PID topic indicates a first quantity of PIDs. The first quantity of PIDs indicates how many PIDs corresponding to the first PID topic are associated with the PID condition in which at least one of the received parameter values corresponding to the respective PID has breached a respective PID threshold or how many PIDs corresponding to the first PID topic are associated with the PID condition in which none of the received parameter values corresponding to the respective PID has breached any respective PID threshold.

In a second implementation, a computing system is provided. The computing system comprises a processor, a display, and a non-transitory computer-readable memory. The non-transitory computer-readable memory contains executable instructions. Execution of the executable instructions by the processor causes the computing system to perform functions. The functions include determining, by a processor while a computing system operates in a first state, a vehicle identifier corresponding to a vehicle operatively connected to the computing system. The computing system includes the processor and a display. The display is powered on, but does not display any PID condition indicator while the computing system operates in the first state. A component identifier corresponds to a component of the vehicle. A system identifier corresponds to a system of the vehicle. A symptom identifier corresponds to a symptom the vehicle can exhibit. The functions also includes determining, by the processor while the computing system operates in the first state, the component identifier, the system identifier, and/or the symptom identifier. The functions further include determining, by the processor, a first PID topic corresponding to the component identifier, the system identifier, and/or the symptom identifier. One or more PIDs correspond to the first PID topic. Still further, the functions include switching, by the processor, operation of the computing system from the first state to a second state. The computing system is operable to display a PID condition indicator on the display while operating in the second state. Further still, the functions include receiving, by the processor while the computing system operates in the second state, parameter values automatically requested from the vehicle for the one or more PIDs corresponding to the first PID topic. Furthermore, the functions include determining, by the processor while the computing system operates in the second state, a PID condition associated with each respective PID corresponding to the first PID topic. The PID condition associated with each respective PID corresponding to the first PID topic indicates whether at least one of the received parameter values corresponding to the respective PID has breached a respective PID threshold or whether none of the received parameter values corresponding to the respective PID has breached any respective PID threshold. Furthermore still, the functions includes displaying, on the display while the computing system operates in the second state, a descriptor of the first PID topic and a first particular PID condition indicator corresponding to the first PID topic. The first particular PID condition indicator corresponding to the first PID topic indicates a first quantity of PIDs. The first quantity of PIDs indicates how many PIDs corresponding to the first PID topic are associated with the PID condition in which at least one of the received parameter values corresponding to the respective PID has breached a respective PID threshold or how many PIDs corresponding to the first PID topic are associated with the PID condition in which none of the received parameter values corresponding to the respective PID has breached any respective PID threshold.

In a third implementation, a non-transitory computer-readable memory is provided. The non-transitory computer-readable memory has stored therein instructions executable by a processor to cause a computing system having a display and the processor to perform functions. The functions include determining, by the processor while a computing system operates in a first state, a vehicle identifier corresponding to a vehicle operatively connected to the computing system. The display is powered on, but does not display any PID condition indicator while the computing system operates in the first state. A component identifier corresponds to a component of the vehicle. A system identifier corresponds to a system of the vehicle. A symptom identifier corresponds to a symptom the vehicle can exhibit. The functions also include determining, by the processor while the computing system operates in the first state, the component identifier, the system identifier, and/or the symptom identifier. The functions further include determining, by the processor, a first PID topic corresponding to the component identifier, the system identifier, and/or the symptom identifier. One or more PIDs correspond to the first PID topic. Still further, the functions include switching, by the processor, operation of the computing system from the first state to a second state, the computing system is operable to display a PID condition indicator on the display while operating in the second state. Further still, the functions include receiving, by the processor while the computing system operates in the second state, parameter values automatically requested from the vehicle for the one or more PIDs corresponding to the first PID topic. Furthermore, the functions include determining, by the processor while the computing system operates in the second state, a PID condition associated with each respective PID corresponding to the first PID topic. The PID condition associated with each respective PID corresponding to the first PID topic indicates whether at least one of the received parameter values corresponding to the respective PID has breached a respective PID threshold or whether none of the received parameter values corresponding to the respective PID has breached any respective PID threshold. Furthermore still, the functions include displaying, on the display while the computing system operates in the second state, a descriptor of the first PID topic and a first particular PID condition indicator corresponding to the first PID topic. The first particular PID condition indicator corresponding to the first PID topic indicates a first quantity of PIDs. The first quantity of PIDs indicates how many PIDs corresponding to the first PID topic are associated with the PID condition in which at least one of the received parameter values corresponding to the respective PID has breached a respective PID threshold or how many PIDs corresponding to the first PID topic are associated with the PID condition in which none of the received parameter values corresponding to the respective PID has breached any respective PID threshold.

In a fourth implementation, a computing system having a processing means, a display means, and a data storage means is provided. The computing system includes means for determining, while the computing system operates in a first state, a vehicle identifier corresponding to a vehicle operatively connected to the computing system. The display means is powered on, but does not display any PID condition indicator while the computing system operates in the first state. A component identifier corresponds to a component of the vehicle. A system identifier corresponds to a system of the vehicle. A symptom identifier corresponds to a symptom the vehicle can exhibit. The computing system includes means for determining, while the computing system operates in the first state, the component identifier, the system identifier, and/or the symptom identifier. The computing system includes means for determining a first PID topic corresponding to the component identifier, the system identifier, and/or the symptom identifier. One or more PIDs correspond to the first PID topic. Still further, the computing system includes means for switching operation of the computing system from the first state to a second state. The computing system is operable to display a PID condition indicator on the display while operating in the second state. Further still, the computing system includes means for receiving, while the computing system operates in the second state, parameter values automatically requested from the vehicle for the one or more PIDs corresponding to the first PID topic. Furthermore, the computing system includes means for determining, while the computing system operates in the second state, a PID condition associated with each respective PID corresponding to the first PID topic. The PID condition associated with each respective PID corresponding to the first PID topic indicates whether at least one of the received parameter values corresponding to the respective PID has breached a respective PID threshold or whether none of the received parameter values corresponding to the respective PID has breached any respective PID threshold. Furthermore still, the computing system includes means for displaying, while the computing system operates in the second state, a descriptor of the first PID topic and a first particular PID condition indicator corresponding to the first PID topic. The first particular PID condition indicator corresponding to the first PID topic indicates a first quantity of PIDs. The first quantity of PIDs indicates how many PIDs corresponding to the first PID topic are associated with the PID condition in which at least one of the received parameter values corresponding to the respective PID has breached a respective PID threshold or how many PIDs corresponding to the first PID topic are associated with the PID condition in which none of the received parameter values corresponding to the respective PID has breached any respective PID threshold.

In a fifth implementation, a method is provided. The method includes determining, by a computing system, a vehicle identifier corresponding to a vehicle operatively coupled to the computing system. The method also includes determining, by the computing system, at least one other identifier. The method further includes transmitting, by the computing system over a communication network to a remote server, a request for a PID list. The request includes the vehicle identifier and the at least one other identifier. The method additionally includes receiving, by the computing system from the remote server, a response to the request over the communication network. The response includes the PID list and metadata regarding each PID contained in the PID list. Furthermore, the method includes transmitting, by the computing system to the vehicle for each PID contained in the PID list, a request for a parameter value corresponding to the PID contained in the PID list. Furthermore still, the method includes displaying, by the computing system on a display, a graphical user interface. The graphical user interface includes one or more PID topic descriptors based on the metadata and a representation of one or more PIDs contained in the PID list.

In a sixth implementation, a computing system is provided. The computing system comprises a processor, a display, and a non-transitory computer-readable memory. The non-transitory computer-readable memory contains executable instructions. Execution of the executable instructions by the processor causes the computing system to perform functions. The functions include determining a vehicle identifier corresponding to a vehicle operatively coupled to the computing system. The functions also include determining at least one other identifier. The functions further include transmitting, over a communication network to a remote server, a request for a PID list. The request includes the vehicle identifier and the at least one other identifier. The functions additionally include receiving, from the remote server, a response to the request over the communication network. The response includes the PID list and metadata regarding each PID contained in the PID list. Furthermore, the functions include transmitting, to the vehicle for each PID contained in the PID list, a request for a parameter value corresponding to the PID contained in the PID list. Furthermore still, the functions include displaying, on a display, a graphical user interface. The graphical user interface includes one or more PID topic descriptors based on the metadata and a representation of one or more PIDs contained in the PID list.

In a seventh implementation, a non-transitory computer-readable memory is provided. The non-transitory computer-readable memory has stored therein instructions executable by a processor to cause a computing system having a display and the processor to perform functions. The functions include determining a vehicle identifier corresponding to a vehicle operatively coupled to the computing system. The functions also include determining at least one other identifier. The functions further include transmitting, over a communication network to a remote server, a request for a PID list. The request includes the vehicle identifier and the at least one other identifier. The functions additionally include receiving, from the remote server, a response to the request over the communication network. The response includes the PID list and metadata regarding each PID contained in the PID list. Furthermore, the functions include transmitting, to the vehicle for each PID contained in the PID list, a request for a parameter value corresponding to the PID contained in the PID list. Furthermore still, the functions include displaying, on a display, a graphical user interface. The graphical user interface includes one or more PID topic descriptors based on the metadata and a representation of one or more PIDs contained in the PID list.

In an eighth implementation, a computing system having display means is provided. The computing system includes means for determining a vehicle identifier corresponding to a vehicle operatively coupled to the computing system. The computing system also includes means for determining at least one other identifier. The computing system also includes means for transmitting, over a communication network to a remote server, a request for a PID list. The request includes the vehicle identifier and the at least one other identifier. The computing system also includes means for receiving, from the remote server, a response to the request over the communication network. The response includes the PID list and metadata regarding each PID contained in the PID list. Furthermore, the computing system also includes means for transmitting, to the vehicle for each PID contained in the PID list, a request for a parameter value corresponding to the PID contained in the PID list. Furthermore still, the computing system also includes means for displaying, on a display, a graphical user interface. The graphical user interface includes one or more PID topic descriptors based on the metadata and a representation of one or more PIDs contained in the PID list.

Other implementations will become apparent to those of ordinary skill in the art by reading the following detailed description, with reference where appropriate to the accompanying drawings.

BRIEF DESCRIPTION OF THE DRAWINGS

Example implementations are described herein with reference to the drawings.

FIG. 8 shows a subset of PIDs and metadata in accordance with the example implementations.

FIG. 24A, FIG. 24B, and FIG. 24C show parameter-identifier lists in accordance with the example implementations.

FIG. 46 shows a portion of a parameter-identifier topic file in accordance with the example implementations.

FIG. 61 shows PID thresholds in accordance with the example implementations.

Figure 1:
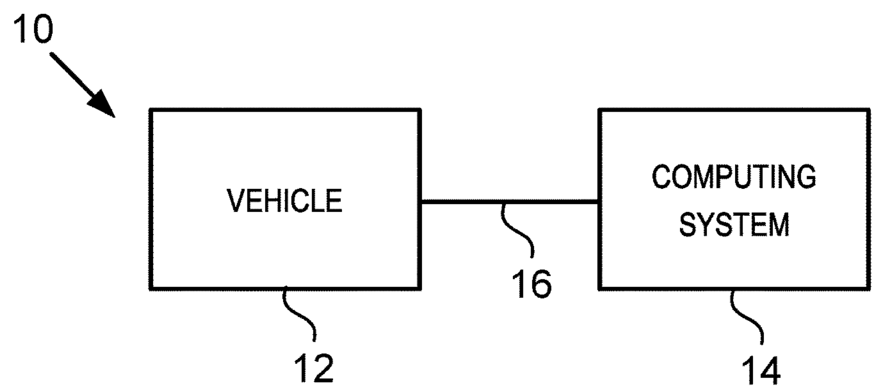
FIG. 1, FIG. 2, and FIG. 3 each show a block diagram of a system in accordance with the example implementations.

All the figures are schematic and not necessarily to scale.

DETAILED DESCRIPTION

I. Introduction

This description describes several example implementations, at least some of which pertain to improved methods and systems for servicing a vehicle. In particular, the description describes example implementations of improved methods and systems for operating a computing system configured for determining a parameter-identifier (PID) condition and displaying an indicator of the PID condition on a display. In these implementations, the computing system operates and/or is operable to operate in different states with respect to displaying a PID condition. In those or in other implementations, the computing system operates and/or is operable to operate to display the PID condition with respect to a particular PID topic file including one or more containers.

A container is an element of a page displayable on a display. A container is associated with content that can be displayed within an area of the page defined for the container. As an example, the content associated with a container can include one or more of a user-selectable control (USC), a graph, an icon, text, an image, a video, a PID, a PID parameter, or a PID topic descriptor. Other examples of content displayable within a container are also possible. The application drawings show at least some of those other examples.

A container can be associated with a default location within a page. In some implementations, the default location within the page to display the container is fixed. In other implementations, a location to display the container can change, such as by moving the container from one location (e.g., a default location) within the page to another location within the page, and/or by increasing or decreasing a size of the container.

A container can correspond to one or more other containers. As an example, two or more containers can be related as defined by a hierarchical relationship in which a first of the two containers is within a second of the two containers, and/or the second of the two containers includes the first container. In accordance with this example, the second container is considered to be a parent container, whereas the first container is considered to be a sub-container (and/or a child container). Although the example hierarchical relationship refers to the first container being within the second container, the hierarchical relationship does not require that displaying the first and second containers includes displaying the first container, wholly or even partly, within a boundary established for the second container. For example, in some implementations, displaying the first container can include displaying at least a portion of the first container beyond the boundary established for the second container.

A sub-container is a container that corresponds to a parent container. In at least some implementations, a container defined within a PID file as being within another container is a sub-container. The container that includes that sub-container is a parent container. A sub-container can be a parent container to one or more other sub-containers.

In at least some implementations, a container or sub-container is arranged as a display card. The containers within the user-interfaces of the example implementations can be displayed using various container properties. As an example, in at least some implementations, a container can have a boundary property. A boundary property could be non-visible, such that no visible boundary is displayed while the container having that boundary property is displayed. A different boundary property could be visible, such that a visible boundary is displayed while the container having that boundary property is displayed. As an example, a visible boundary could specify one or more of a line thickness, a color, or a drop shadow. As another example, a boundary of the container can be a fill (e.g., a filled background) or an outline. Other examples of a container property are also possible.

The computing system is also operable to automatically arrange multiple containers based on PID conditions corresponding to the multiple containers. The arrangement functions can guide a technician using the example computing systems while servicing a vehicle in various ways. For example, the PID topics can pertain to PIDs contextually relevant to a particular system, component and/or symptom suspected to be malfunctioning. As another example, automatically arranging the PID topics can indicate which PID topics are associated with the greatest number of PIDs for which PID parameter values received from a vehicle are outside of a predefined range or not an expected value.

A user-selectable control (USC) is a computing system component. A USC includes a hardware component. The hardware component can include and/or connect to control circuit. The control circuit can connect to a processor input, such as an analog or data bus input of a processor. As an example, the hardware component can include a keyboard key. The keyboard key can include an alpha-numeric character or a symbol, such as an up arrow, a down arrow, a left arrow, or a right arrow representative of a logical input that can be entered into the processor by use of the USC. The alpha-numeric character can include multiple alpha-numeric characters arranged as a word, such as 'YES," "NO," or "ENTER." As another example, the hardware component can include a touch screen display. As yet another example, the hardware component can include a microphone. As still yet another example, the hardware component of the USC can include a switch. Other examples of a hardware component for use as a USC are also possible.

A USC can correspond to a logical input mapped to the USC using computer-readable program instructions or a database entry. As an example, a particular USC can correspond to a logical input indicative of a model year of a vehicle. The particular USC can be displayed on a touch screen display when a graphical user interface including a year selection menu is displayed on a display. The particular USC can be mapped to a particular vehicle model year, such as the model year 2014. A processor can determine the particular USC has been selected and determine that selection of the particular USC means that a user has selected the model year 2014.

A USC can be operable by a user of the computing system to cause an input signal to be provided to a processor and/or to change an input signal being provided to the processor. A USC can be arranged as a virtual USC that is displayed on a touch screen display. A virtual USC is not displayable on the display when the display is powered off. Alternatively, a USC can be arranged as a tangible USC that is visible at the computing system regardless of whether the computing system is powered on. A USC can correspond to a dedicated function. For example, a USC sometimes referred to as an on/off switch can correspond to the function of toggling a power state of the computing system. Alternatively, a USC can correspond to multiple functions. Each of the multiple functions can correspond to one or more particular operating states of the computing system.

II. Example Systems

FIG. 1 is a block diagram of a system 10 in accordance with the example implementations. The system 10 includes a vehicle 12, a computing system 14, and a communication link 16. The communication link 16 operatively couples the vehicle 12 and the computing system 14. In at least some implementations, the communication link 16 includes a wireless communication link, such as a personal area network. Additionally or alternatively, the communication link 16 can include a wired communication link. The communication link 16 can include a wiring harness that connects the vehicle 12 and the computing system 14 together. Details regarding the vehicle 12 and the computing system 14 are described below.

Figure 2:
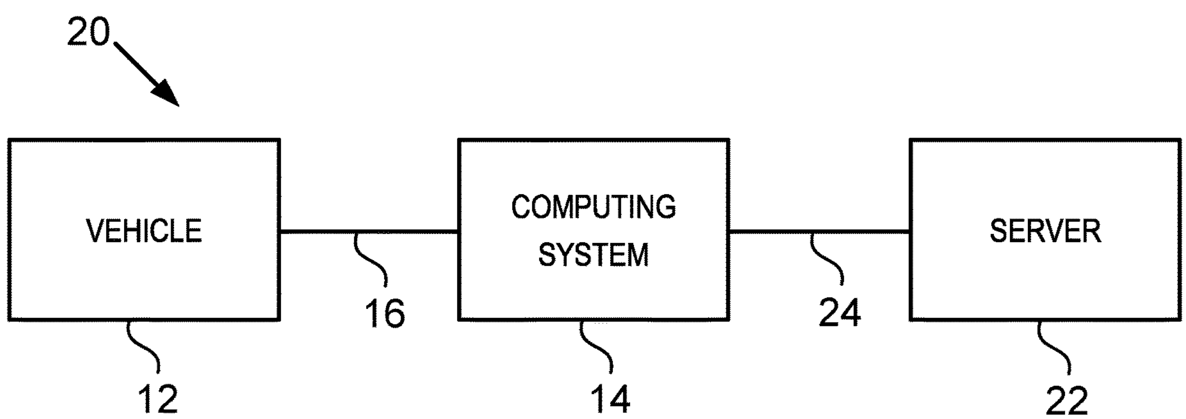

FIG. 2 is a block diagram of a system 20 in accordance with the example implementations. The system 20 includes the vehicle 12, the computing system 14, the communication link 16, a server 22, and a communication link 24. In the system 20, the communication link 24 operatively couples the computing system 14 and the server 22. In at least some implementations, the communication link 24 includes a wireless communication link. Additionally or alternatively, the communication link 24 can include a wired communication link. FIG. 2 represents that the computing system 14 can communicate with the vehicle 12 and the server 22 using different communication links. Details regarding the server 22 are described below.

Figure 3:
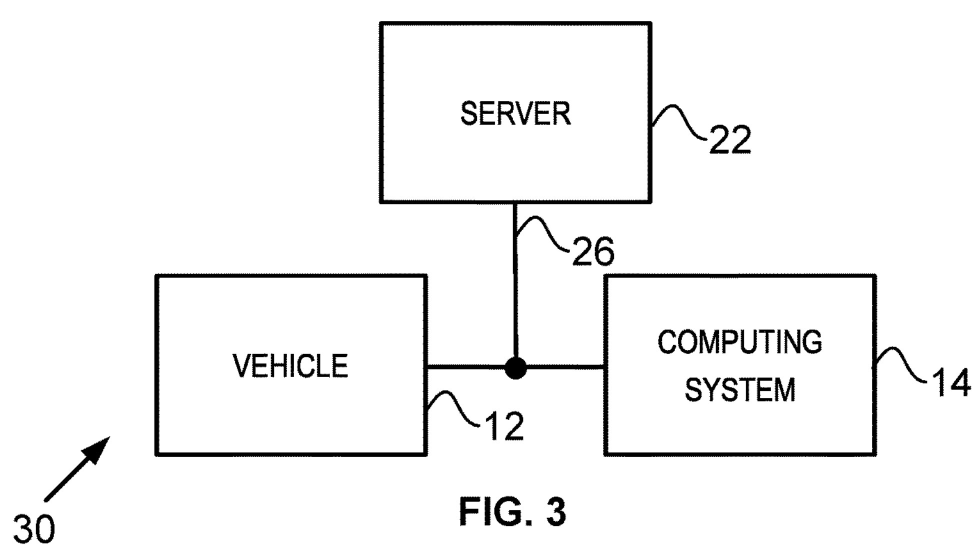

FIG. 3 is a block diagram of a system 30 in accordance with the example implementations. The system 30 includes the vehicle 12, the computing system 14, the server 22, and a communication link 26. In the system 30, the communication link 26 operatively couples the vehicle, 12, the computing system 14, and/or the server 22. The communication link 26 can include a wide area network, such as the Internet. At least a portion of the communication link 26 can operatively couple the vehicle, 12, the computing system 14, and/or the server 22 together using a packet-switched network. In at least some implementations, the communication link 26 includes a wireless communication link. Additionally or alternatively, the communication link 26 can include a wired communication link. FIG. 3 represents that the vehicle 12, the computing system 14, and/or the server 22 can communicate with each other using a common communication link.

Compared to FIG. 2 and FIG. 3, FIG. 1 represents that the computing system 14 can operate without the server 22. In that regard, operating without the server 22 can be temporary, such as when the communication link 24, 26 is unavailable for communicating with the server 22.

Next, FIG. 4, FIG. 5, FIG. 6, and FIG. 7 show data that can be used by a processor, such as a processor within any device or system shown in one or more of the drawings of this disclosure. The data shown in FIG. 4, FIG. 5, FIG. 6, and/or FIG. 7 can be stored in a memory and transmitted over a communication link and/or a bus.

Figure 4:
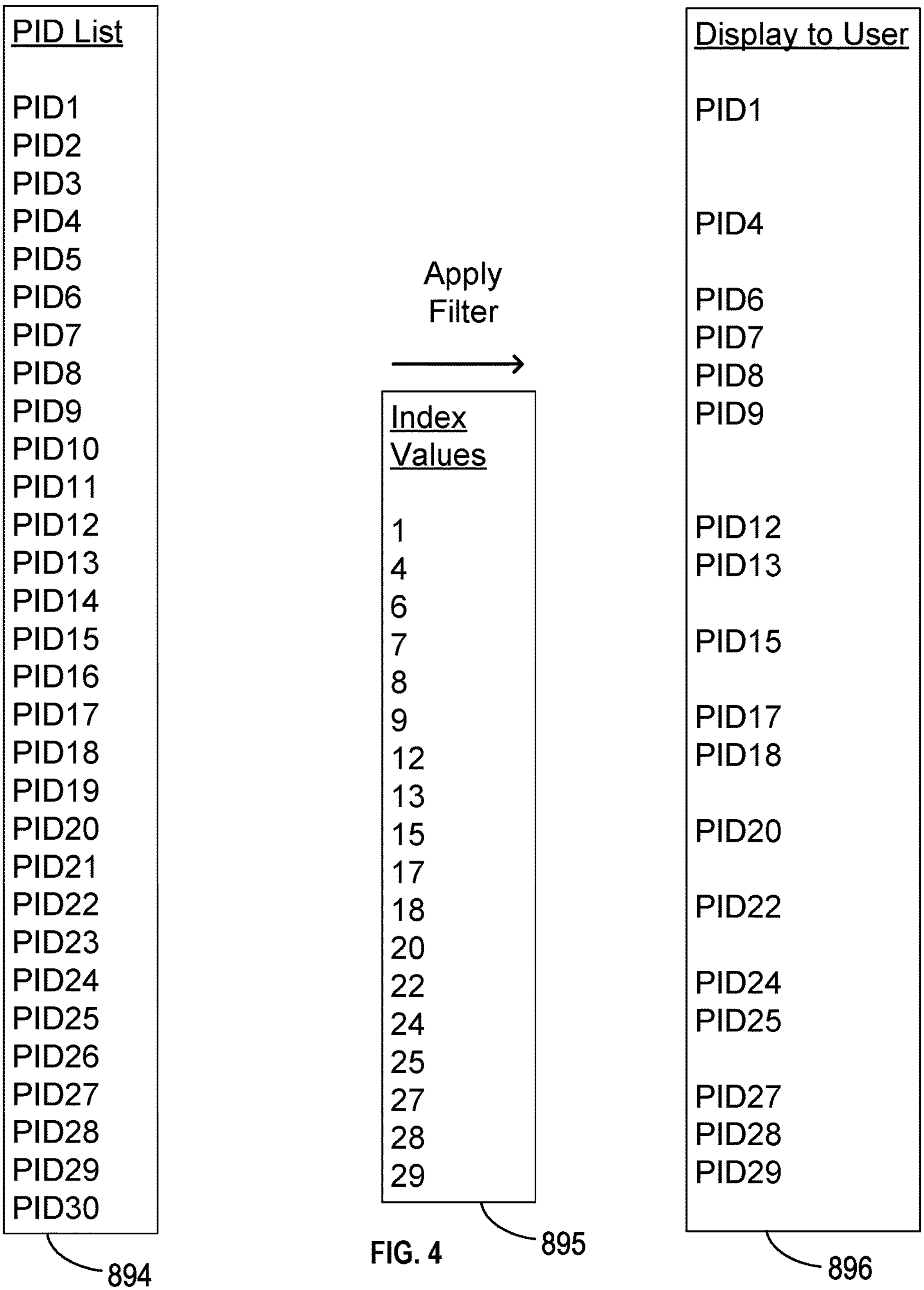
FIG. 4, FIG. 5, FIG. 6, and FIG. 7 show an ordered PID list, index values, and a subset of PIDs in accordance with the example implementations.

In particular, FIG. 4 shows an ordered PID list 894, index values 895 and a subset 896 of PIDs. The index values 895 can be applied to the ordered PID list 894 to obtain the subset 896 of PIDs. The ordered PID list 894 can be stored within memory of the computing system 14. In some examples, the ordered PID list 894 can be a single ordered list of PIDs for all vehicle types. In other examples, the ordered PID list 894 can be determined and/or stored specifically for vehicles sharing certain identifying information. The ordered PID list 894 can be the same as a corresponding ordered list stored at the server 22 in order to facilitate applying a PID filter list (e.g., the index values 895) by the computing system 14 that has been received from the server 22. An ordered PID list can include a different quantity of PIDs than the quantity of PIDs within the ordered lists shown in drawings. A set of index values can include a different quantity of PIDs than the quantity of PIDs within the indices shown in the drawings.

The computing system 14 can receive (from the server 22) the index values 895 that make up a PID filter list. The index values 895 can represent entries from the ordered PID list 894 of PIDs stored within a memory of the computing system 14. The computing system 14 can select PIDs from the ordered PID list 894 that correspond to index values 895 in order to determine the subset 896 of PIDs to display on a display. In this manner, a minimal amount of information can be transmitted over a network connection between the server 22 and the computing system 14. The computing system 14 can store information about individual PIDs as part of ordered PID list 894. For example, this stored information can include full PID descriptors to display on a display. The stored information can also include instructions for requesting parameter values corresponding to a PID from the vehicle 12.

In at least some implementations, an ordered list of functional tests stored on the computing system 14 can be the same as a corresponding ordered list of functional tests stored at the server 22. A functional test filter list received by the computing system 14 from the server 22 can include index values that represent entries from the ordered list of functional tests. The functional test filter list can be applied by the computing system 14 to determine a subset of functional tests for display on a display. The ordered list of functional tests can correspond to one or more vehicle identifiers. The functional test filter list can also be based on a symptom identifier, a component identifier, and/or a system identifier that corresponds to a vehicle identified by a vehicle identifier that corresponds to the ordered list of functional tests. A functional test filter list based on a symptom identifier, a component identifier, or a system identifier can be referred to as a symptom-based functional test filter list, a component-based functional test filter list, or a system-based functional test filter list, respectively. A functional test displayed on a display can be selected to cause the computing system 14 to send the vehicle 12 a VDM with a request to perform the selected functional test.

In at least some implementations, an ordered list of reset procedures stored on the computing system 14 can be the same as a corresponding ordered list of reset procedures stored at the server 22. A reset procedure filter list received by the computing system 14 from the server 22 can include index values that represent entries from the ordered list of reset procedures. The reset procedure filter list can be applied by the computing system 14 to determine a subset of reset procedures for display on a display. The ordered list of reset procedures can correspond to one or more vehicle identifiers. The reset procedure filter list can also be based on a symptom identifier, a component identifier, and/or a system identifier that corresponds to a vehicle identified by a vehicle identifier that corresponds to the ordered list of reset procedures. A reset procedure filter list based on a symptom identifier, a component identifier, or a system identifier can be referred to as a symptom-based reset procedure filter list, a component-based reset procedure filter list, or a system-based reset procedure filter list, respectively. A reset procedure displayed on a display can be selected to cause the computing system 14 to send the vehicle 12 a VDM with a request to perform the selected reset procedure.

In at least some implementations, an ordered list of component tests stored on the computing system 14 can be the same as a corresponding ordered list of component tests stored at the server 22. A component test filter list received by the computing system 14 from the server 22 can include index values that represent entries from the ordered list of component tests. The component test filter list can be applied by the computing system 14 to determine a subset of component tests for display on a display. The ordered list of component tests can correspond to one or more vehicle identifiers. The component test filter list can also be based on a symptom identifier, a component identifier, and/or a system identifier that corresponds to a vehicle identified by a vehicle identifier that corresponds to the ordered list of component tests. A component test filter list based on a symptom identifier, a component identifier, or a system identifier can be referred to as a symptom-based component test filter list, a component-based component test filter list, or a system-based component test filter list, respectively. A component test displayed on a display can be selected to cause the computing system 14 to configure a test device, such as a meter or oscilloscope within the computing system 14 to perform the selected component test.

In at least some implementations, a single ordered list can include multiple types of entries, including any combination of PIDs, functional tests, reset procedures, and/or component tests. A diagnostic filter list sent by the server 22 to the computing system 14 can then include index values for multiple types of entries. For instance, the diagnostic filter list can include index values corresponding to both PIDs and component tests. In that case, the diagnostic filter list can be applied by the computing system 14 to determine both a symptom-based subset of PIDs and a symptom-based subset of component tests for display on a display.

Figure 5:
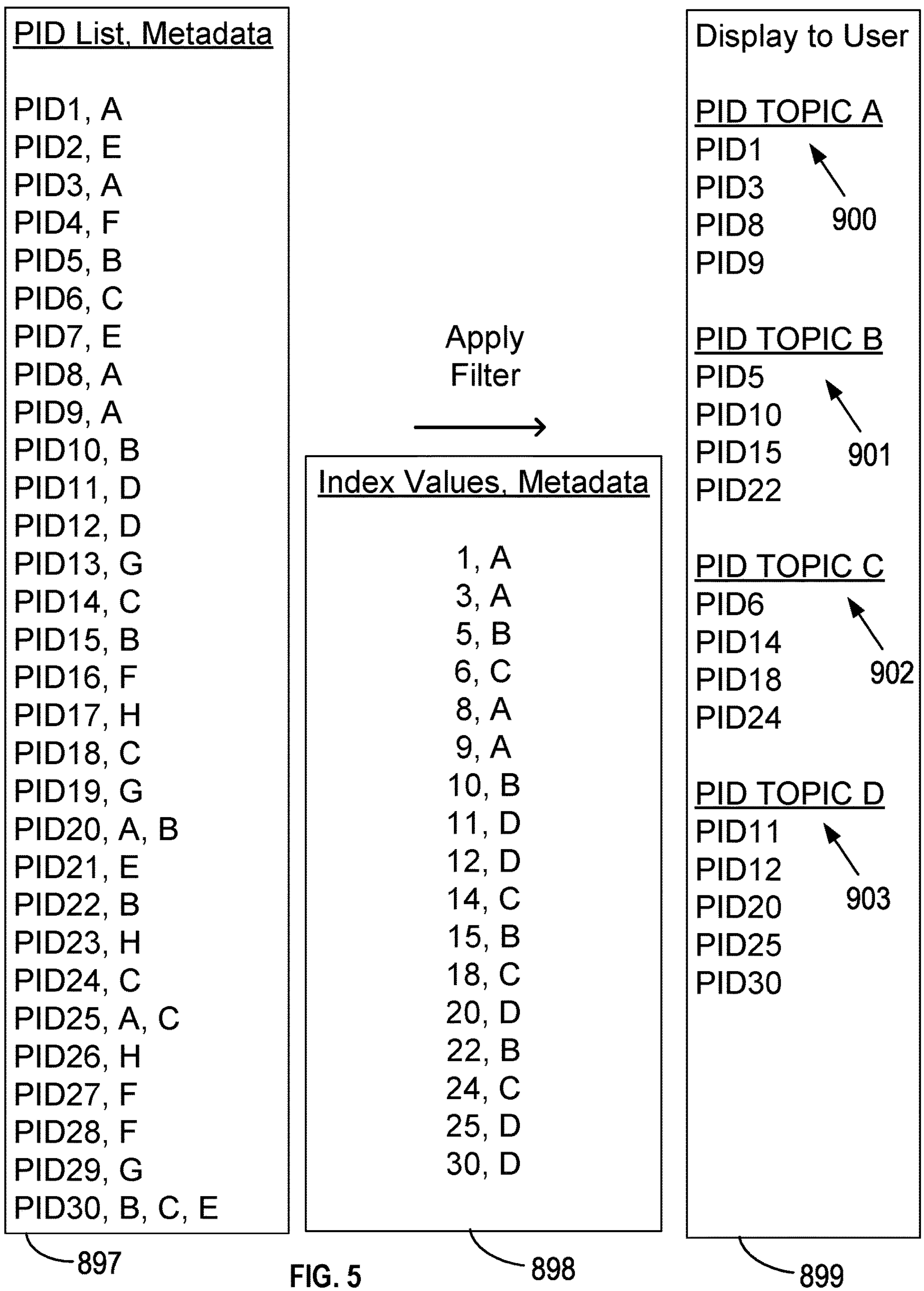

Next, FIG. 5 shows an ordered PID list 897. The PIDs within the ordered PID list 897 correspond to metadata. The metadata indicates one or more PID topics corresponding to each PID in the ordered PID list 897. The metadata representing each PID topic is shown as one or more alphabet letters. The computing system 14 and the server 22 can include data that maps each alphabet letter within the metadata to data about each PID topic, such as, but not limited to a PID topic name, a PID topic file name, or a hierarchical position. In at least some implementation, the server 22 receives one or more identifiers from the computing system 14, such as a vehicle identifier, a symptom identifier, a component identifier, or a system identifier to determine PID values corresponding to the received identifier(s).

The ordered PID list 897 shows that three PIDs (i.e., PID20, PID25, and PID30) are associated with multiple different PID topics, and that the other PIDs in the ordered PID list 897 are associated with just a single PID topic.

The metadata "A" in the ordered PID list 897 indicates that the corresponding PID is associated with a PID topic, shown in FIG. 5 as "PID Topic A." As another example, the metadata "B" in the ordered PID list 897 indicates that the corresponding PID is associated with a PID topic, shown in FIG. 5 as "PID Topic B." As yet another example, the metadata "A" and "C" for the PID25 in the ordered PID list 897 indicates that PID25 is associated with the PID topics, shown in FIG. 5 as "PID Topic A" and "PID Topic C." As still yet another example, the metadata "B", "C", and "E" for the PID30 in the ordered PID list 897 indicates that PID30 is associated with the PID topics, shown in FIG. 5 as "PID Topic B," and "PID Topic C," as well as "PID Topic E."

FIG. 5 also shows index values 898. Unlike the index values 895 shown in FIG. 4, the index values 898 include metadata corresponding to each index value. In FIG. 5, the index values 898 are numeric values and the corresponding metadata are alphabet letters. In at least some implementations, the server 22 can transmit the index values 898 to the computing system 14 with or without the metadata. If the server 22 does not transmit the metadata with the index values to the computing system 14, then the computing system 14 can determine the metadata based on the ordered PID list 897 and the index values 898 (without metadata for this particular example).

As shown in FIG. 5, the index values 898 include seventeen PIDs and each of those PIDs, including PID20, PID25, and PID30, is associated with metadata indicative of a single PID topic. The PID Topic D is a general PID Topic to include PIDs that are associated with multiple PID topics. In the implementation shown in FIG. 5, the PIDs associated with multiple PID topics are not applied into any PID topic associated with the PID except for the general PID topic. In other words, based on the metadata shown with the index values 898, no PID in the index values 898 is included in more than one PID topic.

The computing system 14 can filter the ordered PID list 897 using the index values 898 to determine a subset 899 of PIDs arranged by PID topic. The computing system 14 can use the metadata shown in the index values 898 and the ordered PID list 897 to determine how many and which PID topics are to be displayed as well as which PIDs are to be displayed with each PID topic. As shown in FIG. 5, the subset 899 includes a PID topic 900, 901, 902, 903. The computing system 14 can output a graphical user interface to display the PIDs and corresponding parameter values received from the vehicle 12 arranged by the identified PID topics in accordance with the subset 899.

Figure 6:
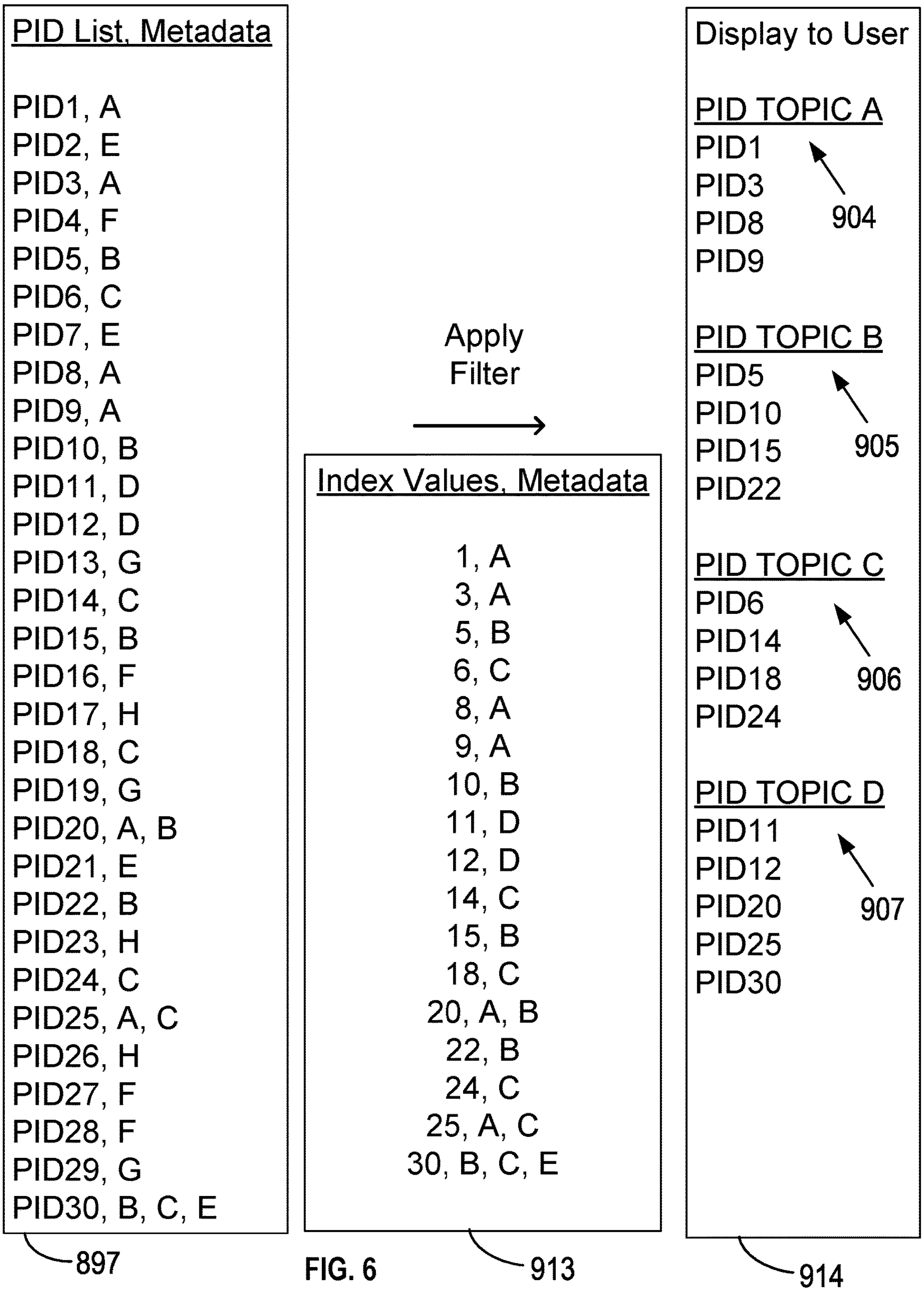

Next, FIG. 6 shows the ordered PID list 897 discussed above with respect to FIG. 5. FIG. 6 also shows index values 913 and a subset 914 of PIDs arranged by PID topic. The server 22 can provide the index values 913 to the computing system 14 in response to receiving one or more identifiers from the computing system 14, such as one or more from among a vehicle identifier, a symptom identifier, a component identifier, or a system identifier. The index values 913 include metadata. In contrast to the metadata within the index values 898 shown in FIG. 5, the metadata in the index values 913 identifies each PID topic associated with a PID without categorizing any PID associated with more than one PID topic into a general PID topic.

The subset 914 includes a PID topic 904, 905, 906, 907. The subset 914 is identical to the subset 899 shown in FIG. 5. In other words, the PID topic 900 and the PID topic 904 includes the same set of PIDs, the PID topic 901 and the PID topic 905 includes the same set of PIDs, the PID topic 902 and the PID topic 906 includes the same set of PIDs, and the PID topic 903 and the PID topic 907 includes the same set of PIDs. For the example shown in FIG. 6, instead of the server 22 classifying PIDs associated with more than one PID topic into a general PID topic, the computing system 14 performs such classification. In other words, after receiving the index values 913, the computing system 14 determines the PID20, PID25, and PID30 are associated with multiple PID topics and generates the subset 914 with the PID20, PID25, and PID30 within the PID topic 907.

Figure 7:
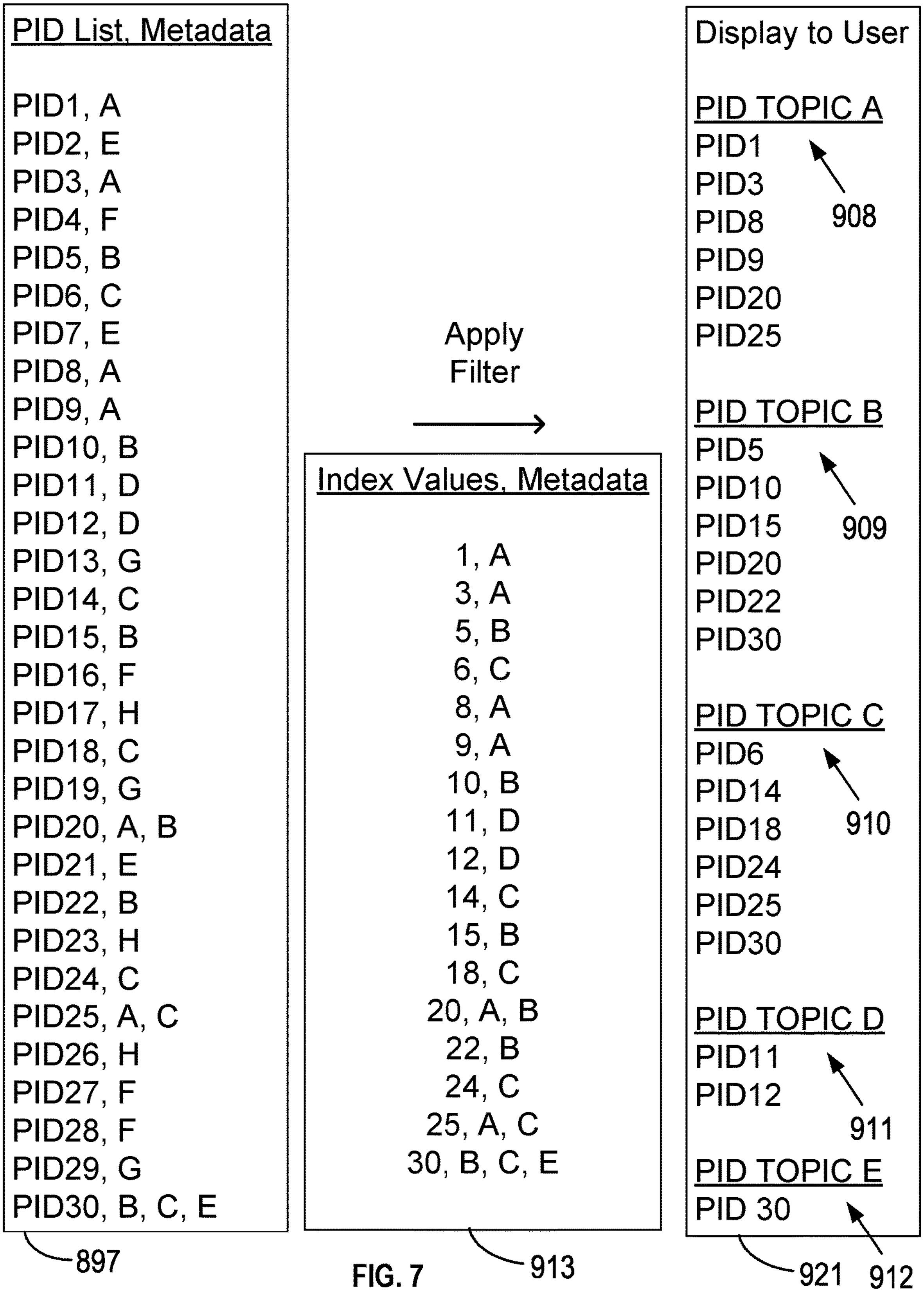

Next, FIG. 7 shows the ordered PID list 897 discussed above with respect to FIG. 5 and the index values 913 discussed above with respect to FIG. 6. FIG. 7 also shows a subset 921 of PIDs arranged by PID topic. The subset 921 includes a PID topic 908, 909, 910, 911, 912. For the example shown in FIG. 7, neither the server 22 nor the computing system 14 classifies PIDs associated with more than one PID topic into a general PID topic. In other words, after receiving the index values 913, the computing system 14 generates the subset 921 so that the PID20 is within the PID topic 908, 909, the PID25 is within the PID topic 908, 909, and the PID30 is within the PID topic 909, 910, 912.

Next, FIG. 8 shows a subset 922 of PIDs and metadata 923 corresponding to the PIDs within the subset 922 of PIDs. In this example, the PIDs are identified using a textual descriptor other than a PID number, as shown in FIG. 4, for example. The subset 922 of PIDs is based on a symptom identifier (e.g., a diagnostic trouble code) for a vehicle, such as the vehicle 12. The server 22 can determine the subset 922 of PIDs from a set of all PIDs for the vehicle 12. Each portion of the metadata 923 is a component name or a component concept. The metadata 923 includes metadata 924, 925, 926. The metadata 924 includes a component name for a first portion of PIDs within the subset 922 of PIDs. The metadata 925 includes a component name for a second portion of PIDs within the subset 922 of PIDs. The metadata 926 includes a component concept identifier for a third portion of PIDs within the subset 922 of PIDs. The metadata 924, 925, 926 can correspond to respective PID topics based on a component of the vehicle 12 or a component concept associated with a component of the vehicle 12.

A component concept can be based on various factors. As an example, a component concept can be defined for parameters calculated by an ECU based on multiple inputs to the ECU rather than on a single input to the ECU. For instance, a component concept “Fuel Trim” can be based, at least in part, on multiple inputs to an engine control module. Additionally or alternatively, the component concept “Fuel Trim” can split into two component concepts known as “Long-term Fuel Trim” and “Short-term Fuel Trim.” As another example, a component concept for engine load of an internal combustion engine calculated by an ECU based on multiple inputs to the ECU can include PIDs related to some or all of the multiple inputs.

As another example, a component concept can be defined for parameter values determined by different ECUs. For instance, a component concept “Passenger Compartment Comfort” can include multiple PIDs from different ECUs regarding conditions in a passenger compartment of the vehicle, such as PIDs regarding temperature, humidity, sun load, and noise level within the passenger compartment.

The computing system 14 and/or the server 22 can generate a GUI based on the subset of PIDs and the metadata 923. A GUI 296 shown in FIG. 26 to FIG. 34 can be based, at least in part, on the subset 922 of PIDs and the metadata 923.

Figure 9:
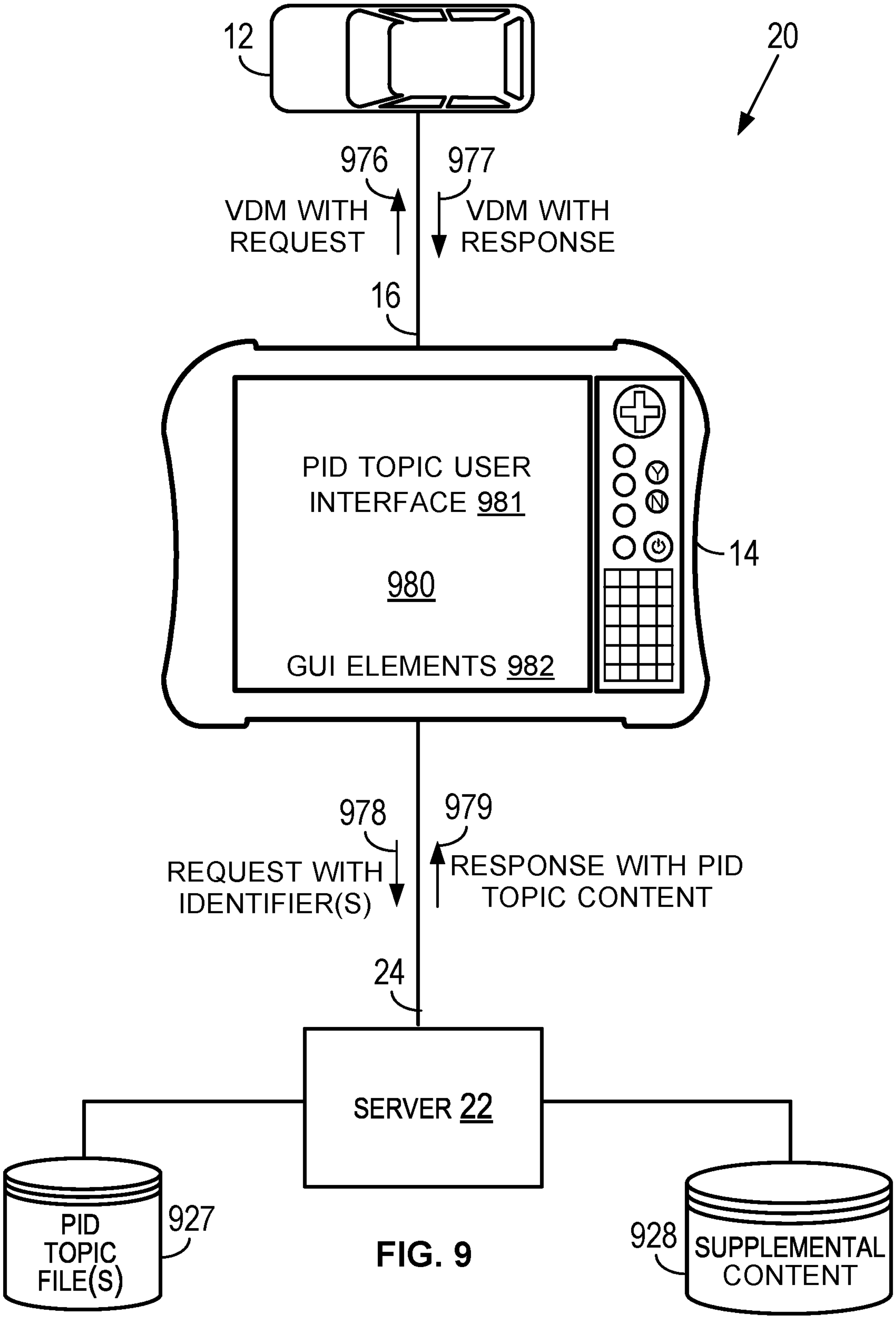
FIG. 9 shows additional details of the system shown in FIG. 2 in accordance with the example implementations.

Next, FIG. 9 shows additional details of the system 20 in accordance with the example implementations. For example, FIG. 9 shows a vehicle data message (VDM) 976 with a request and a VDM 977 with a response. As an example, the request of the VDM 976 can include a PID and the response of the VDM 977 includes a parameter value corresponding to the PID within the VDM 976. As an example, the request of the VDM 976 can include a functional test or reset procedure identifier and the response of the VDM 977 can include an acknowledgement of an ECU receiving and/or performing the functional test or reset procedure corresponding to the identifier contained within the VDM 976. The computing system 14 transmits the VDM 976 to the vehicle 12 over the communication link 16. The vehicle 12 transmits the VDM 977 to the computing system 14 over the communication link 16.

FIG. 9 shows PID topic file(s) 927 and supplemental content 928. The PID topic file(s) 927 and the supplemental content 928 can be stored in a memory within and/or accessible to the server 22. The computing system 14 can transmit a request 978 with identifier(s) to the server 22. The identifier(s) can include one or more from among a component identifier, a system identifier, a symptom identifier, or a vehicle identifier. The server 22 can transmit a response 979 with PID topic content to the computing system 14. The server 22 can determine the PID topic content to include in the response by searching the PID topic file(s) 927 and the supplemental content 928 based on the identifier(s) contained in the request 978.

The computing system 14 can display a GUI 980 on a display. The GUI 980 can include a PID topic user interface 981 and GUI elements 982. The GUI 980 can include content received via the response 979. As an example, the response 979 can include one or more from among: the GUI 980, a PID topic file from the PID topic file(s) 927, supplemental content from the supplemental content 928, or the GUI elements 982. The PID topic user interface 981 can result from displaying the GUI 980 and/or the PID topic file.

The PID topic user interface 981 can include aspects corresponding to one or more PID topics. As an example, those aspects can include one or more from among: a PID topic descriptor, textual PID descriptors, a user-selectable control for expanding or contracting a container or sub-container including PID data, PID parameter values, or an icon that indicates whether a PID parameter value has breached a threshold corresponding to a PID associated with the PID parameter value.

The GUI elements 982 can include aspects that are included in GUIs with or without the PID topic user interface 981. As an example, the GUI elements can include a GUI descriptor, a vehicle identifier, a system identifier, an indicator indicative of network connectivity, or a USC to navigate between different GUI. Other examples of a GUI element 982 are also possible.

Figure 10:
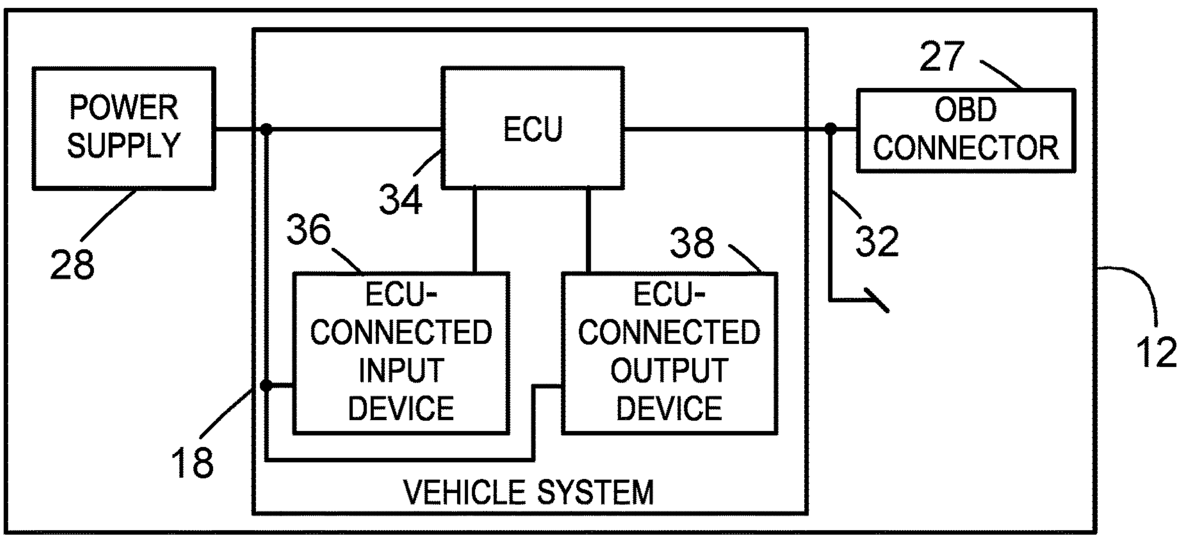
FIG. 10 is a block diagram of a vehicle in accordance with the example implementations.

Next, FIG. 10 is a block diagram showing example details of the vehicle 12 and example details of a vehicle system 18. As shown in FIG. 10, the vehicle 12 includes the vehicle system 18, an on-board diagnostics connector (OBDC) 27, a power supply 28, and a vehicle communication network 32. FIG. 10 also shows that the vehicle system 18 includes an electronic control unit (ECU) 34, an ECU-connected input device 36, and an ECU-connected output device 38. The power supply 28 can include a battery or a battery pack. The computing system 14 is operable to be operatively coupled to the OBDC 27. The computing system 14 is also operable to be operatively uncoupled from the OBDC 27 such that the computing system 14 can be operatively coupled to an OBDC in another vehicle (not shown).

The ECU-connected input device 36 includes one or more input devices. As an example, the ECU-connected input device 36 includes a sensor, a relay, or a switch. The ECU-connected output device 38 includes one or more output devices. As an example, the ECU-connected output device 38 includes a pump, a motor, a solenoid, a valve, a relay, an injector, a horn, a light, a display, or an aural output device (e.g., speaker). Examples of VDM protocols used to communicate on the vehicle communication network 32 are listed in Section VI of this description. Examples of the ECU 34 are shown in FIG. 11 and FIG. 12, and examples of the vehicle system 18 are listed in Section VI of this description.

As another example, the ECU-connected output device 38 can include a haptic feedback component of the vehicle. In at least some implementations, the haptic feedback component of the vehicle includes a component typically in contact with an occupant of the vehicle during a test drive of the vehicle, such as a steering wheel, a seat belt, a seat, a dashboard, or a pedal, such as an accelerator pedal, a clutch pedal, or a brake pedal.

Figure 11:
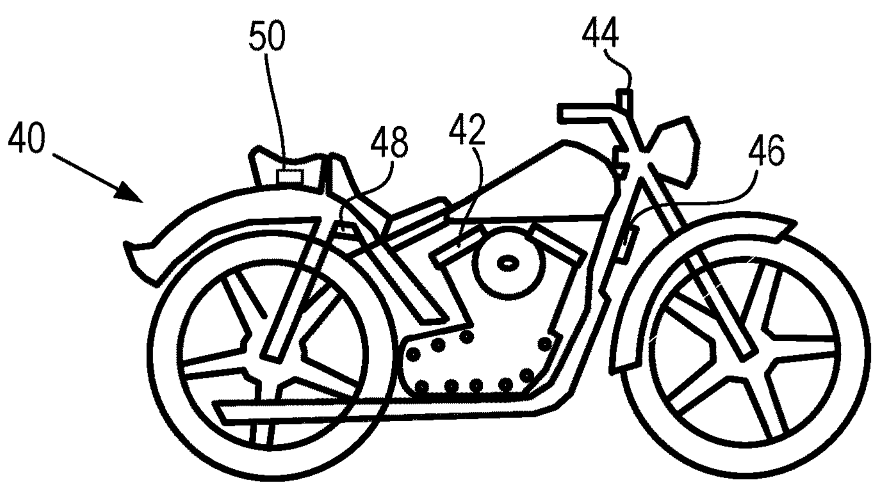
FIG. 11, FIG. 12, FIG. 13, and FIG. 14 show a vehicle in accordance with the example implementations.

Next, FIG. 11 shows a vehicle 40 in accordance with the example implementations. The vehicle 40 can be arranged as a motorcycle that includes a fuel injection ECU 42, an instrument cluster ECU 44, an ABS ECU 46, an ignition ECU 48, and/or an OBDC 50. The ECUs on the vehicle 40 are connected to a power supply (not shown) and can be connected to the OBDC 50 via a vehicle network (not shown). Similar to the ECU 34 shown in FIG. 10, each ECU of the vehicle 40 can be connected to one or more ECU-connected input device 36 and one or more ECU-connected output device 38. The vehicle 12 shown in FIG. 1 to FIG. 3 can be arranged like the vehicle 40.

Figure 12:
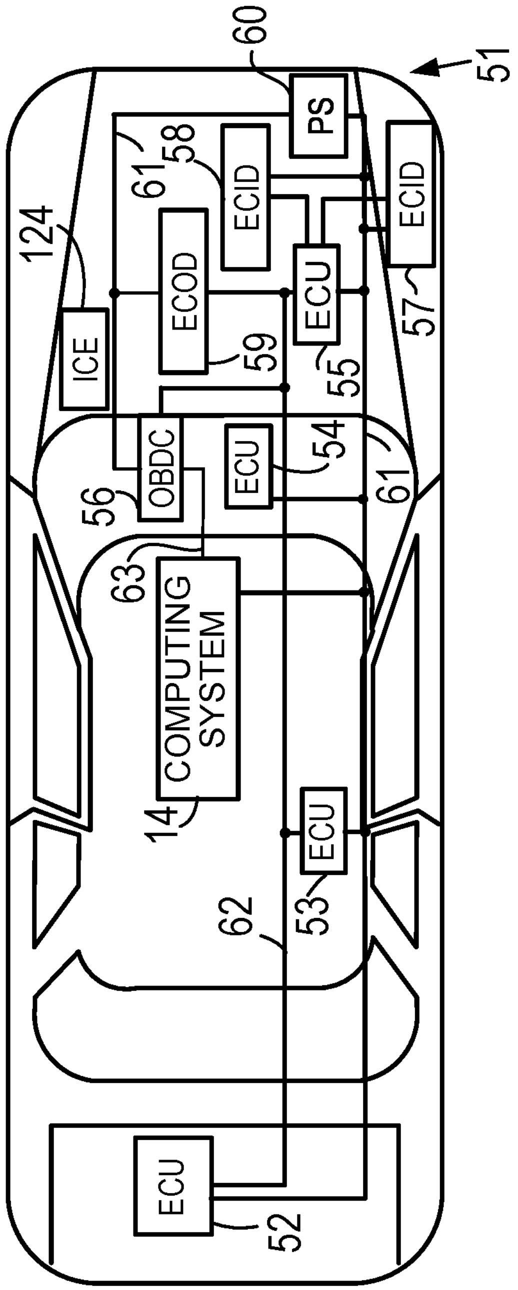

Next, FIG. 12 shows a vehicle 51 (e.g., an automobile having an ECU and an OBDC) in accordance with the example implementations and example placement of the computing system 14 within the vehicle 51. In particular, FIG. 12 shows that the vehicle 51 includes an ECU 52, 53, 54, 55, an OBDC 56, an ECU controlled input device 57, 58, an ECU controlled output device 59, a power supply 60 (such as a battery), a power distribution circuit 61, and an internal combustion engine (ICE) 124. The ECU 52, 53, 54, 55 are shown in FIG. 12 to represent that the ECU 34 shown in FIG. 10 can include multiple ECUs. The ECU 52, 53, 54, 55 are operatively connected to the OBDC 56 via the vehicle network 62 to allow transmission of a VDM between the OBDC 56 and the ECU connected to the vehicle network 62. The ECU 52, 53, 54, 55 can be arranged as one of ECU described in Section VI of this description regarding an example vehicle. The vehicle network 62 can include a wired and/or wireless network.

The OBDC 56 can, for example, be located within a passenger compartment of the vehicle 51, within a powertrain compartment (such as an engine compartment) of the vehicle 51, or within a storage compartment within the vehicle 51 in front of or behind the passenger compartment. The computing system 14 is removably attachable to the OBDC 56. The computing system 14 can connect to vehicle network 62 via the OBDC 56. The computing system 14 can include the communication link 63 (e.g., a harness). The computing system 14 is typically removed after the vehicle 51 has been serviced at a repair shop. In that way, the computing system 14 can be used to diagnose other vehicles after those vehicles arrive at the repair shop.

The power distribution circuit 61 can include one or more electrical circuits. For example, the power distribution circuit 61 can include cable connected to a positive terminal of a battery, a cable connected to a negative terminal of a battery and/or one or more other electrical conductors. FIG. 12 shows the power distribution circuit 61 extending between the power supply 60 and the ECU 52, 53, 54, 55, between the power supply 60 and the OBDC 56, between the power supply 60 and the ECU controlled output device 59, and between the power supply 60 and the ECU controlled input device 57, 58.

The ECU controlled input device 57, 58 is a device that provides a signal to the ECU 55. The signal represents some characteristic of a vehicle the ECU 55 is operable to monitor. As an example, the ECU controlled input device 57, 58 can include one from among: an accelerometer, a camshaft position sensor, a crankshaft position sensor, a current sensor, a fluid level sensor, a fluid pressure sensor, a fluid temperature sensor, a hall effect sensor, an infrared sensor, a knock sensor, a mass air flow sensor, an oil pressure sensor, an oxygen sensor, a photo transistor, a piezoelectric sensor, a position sensor, a pressure sensor, a rain sensor, a refrigerant sensor, a temperature sensor, a thermistor, a throttle position sensor, a tire pressure sensor, a vehicle speed sensor, a voltage sensor, a wheel speed sensor, a yaw rate sensor, or some other type of sensor. An ECU, such as the ECU 55, can generate a PID parameter value based on a signal received from an ECU controlled input device.

The ECU controlled output device 59 is a device controlled by the ECU 55. The ECU 55 can control the ECU controlled output device 59 using an output signal. As an example, the ECU controlled output device 59 can include one from among: a fuel injector, a motor, a pump, a relay, solenoid, a transformer, or a valve. Other examples of the ECU controlled output device 59 are also possible. An ECU, such as the ECU 55, can generate a PID parameter value based on a signal the ECU provides to an ECU controlled input device. Moreover, an ECU, such as the ECU 55, can receive a vehicle data message from the computing system 100 requesting the ECU to activate the ECU controlled output device.

A vehicle, such as the vehicle 12, 51 can include matched components. Matched components can include components that perform similar functions for different portions of the vehicle. In at least some implementations, matched components correspond to different sides of a vehicle, such as left and right sides, or the front and rear sides. In at least some implementations, matched components correspond to different banks of the ICE 124 of the vehicle.

As an example, the ECID 57, 58 can be matched components (e.g., matched sensors). For instance, the ECID 57 can be a sensor of a first bank of the ICE 124, the ECID 58 can be a sensor of a second bank of the ICE 124, and the ECID 57, 58 both output a signal corresponding to a similar vehicle characteristic, but for a different portion of the vehicle. Examples of matched sensors and other matched vehicle components are listed in Table A below.

TABLE A

| First matched component | Second matched component |
| --- | --- |
| Mass air flow sensor-Bank-1 | Mass air flow sensor-Bank-2 |
| Charge air pressure sensor-Bank-1 | Charge air pressure sensor-Bank-2 |
| Camshaft position sensor-Bank-1 | Camshaft position sensor-Bank-2 |
| Intake air temperature sensor-Bank-1 | Intake air temperature sensor-Bank-2 |
| Engine coolant temperature sensor-Bank-1 | Engine coolant temperature sensor-Bank-2 |
| O2 sensor (pre-converter)-Bank-1 | O2 sensor (pre-converter)-Bank-2 |
| O2 sensor (post-converter)-Bank-1 | O2 sensor (post-converter)-Bank-2 |
| Intake manifold pressure sensor-Bank-1 | Intake manifold pressure sensor-Bank-2 |
| Ambient air temperature sensor-Bank-1 | Ambient air temperature sensor-Bank-2 |
| Fuel rail pressure sensor-Bank-1 | Fuel rail pressure sensor-Bank-2 |
| Variable valve timing sensor-intake, Bank-1 | Variable valve timing sensor-intake, Bank-2 |
| Variable valve timing sensor-exhaust, Bank-1 | Variable valve timing sensor-exhaust, Bank-2 |
| Seat cooling fan-left side | Seat cooling fan-right side |
| Seat heating grid-left side | Seat heating grid-right side |
| Power window motor-left front window | Power window motor-right front window |

Figure 13:
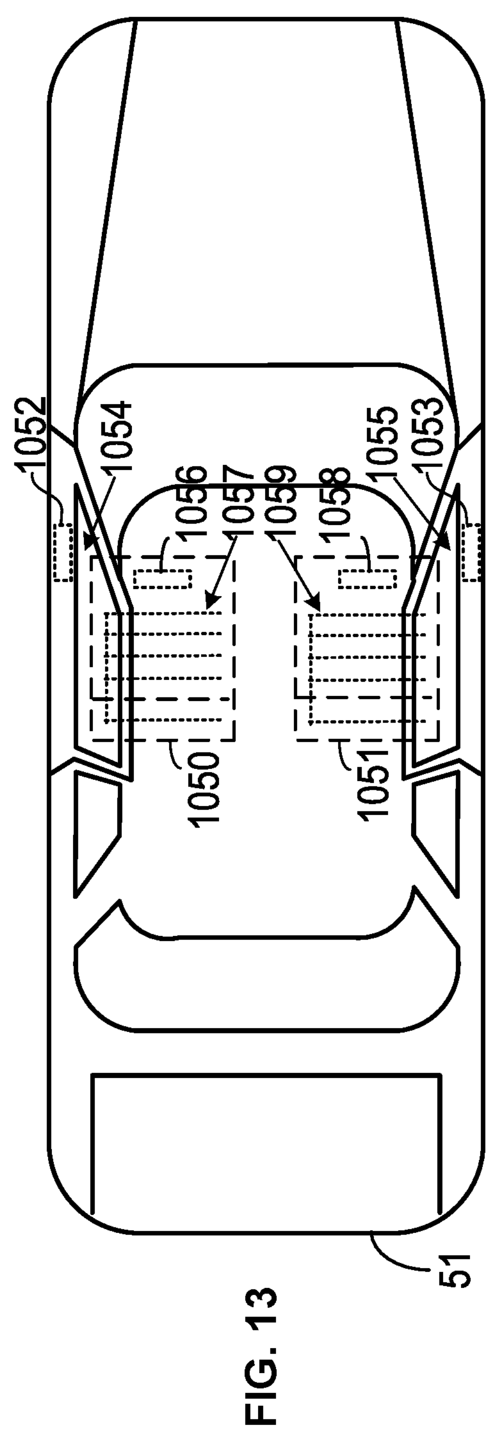

Next, FIG. 13 shows additional details of the vehicle 51. In particular, FIG. 13 shows a seat 1050, 1051, a power window motor 1052, 1053, and a window 1054, 1055. The seat 1050 includes a seat cooling fan 1056 and seat heating grid 1057. The seat 1051 includes a seat cooling fan 1058 and seat heating grid 1059. The power window motor 1052, 1053 are matched components as both power window motors are configured to raise and lower a window (e.g., the window 1054 and the window 1055, respectively). The seat cooling fan 1056, 1058 are matched components as both seat cooling fans are configured to cool a front seat in the vehicle (e.g., the seat 1050 and the seat 1051, respectively). Similarly, the seat heating grid 1057, 1059 are matched components as both seat heating grids are configured to heat a front seat in the vehicle (e.g., the seat 1050 and the seat 1051, respectively).

Testing of some matched components can include waiting for both matched components to reach a certain state, such as a state where a temperature of the matched components is a common ambient temperature. This waiting may occur after control switches for the seat heating grid 1057, 1059 are turned to an off state. As an example, testing of matched components such as the seat heating grid 1057, 1059 can include measuring amounts of time it takes the seat heating grid 1057, 1059 to change from the common ambient temperature to a maximum operating temperature after switching the control switches that turn the seat heating grid 1057, 1059 to common on positions (e.g., low heat position or high heat positions).

Figure 14:
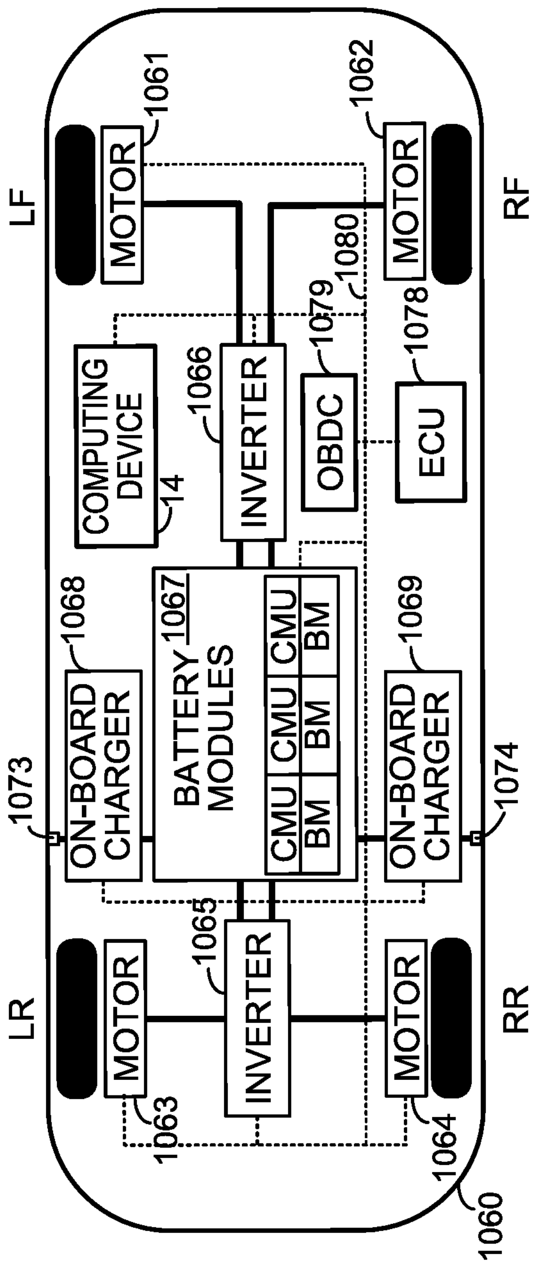

Next, FIG. 14 shows a vehicle 1060 and example placement of the computing system 14 within the vehicle 1060. The vehicle 12 shown in FIG. 1 to FIG. 3 can be arranged like the vehicle 1060. The vehicle 1060 is an electrical vehicle. In at least some implementations, the vehicle 1060 includes an ICE such that the vehicle 1060 is a hybrid vehicle.

As shown in FIG. 14, the vehicle 1060 includes a motor 1061 at a left front location of the vehicle 1060, a motor 1062 at a right front location of the vehicle 1060, a motor 1063 at a left rear location of the vehicle 1060, and a motor 1064 at a right rear location of the vehicle 1060. The vehicle 1060 also includes an inverter 1065, 1066, an on-board charger 1068, 1069, a charge port 1073, 1074, an ECU 1078, an on-board diagnostic connector 1079, and a vehicle network 1080. As an example, the charge port 1073 can include an AC voltage charge port and the charge port 1074 can include a DC voltage charge port. The vehicle 1060 can further include battery modules 1067 including multiple battery modules (BM) and multiple cell monitoring units (CMU). The CMU can determine parameters regarding the battery modules, such as a battery voltage, a battery temperature, or a battery internal resistance.

Figure 15:
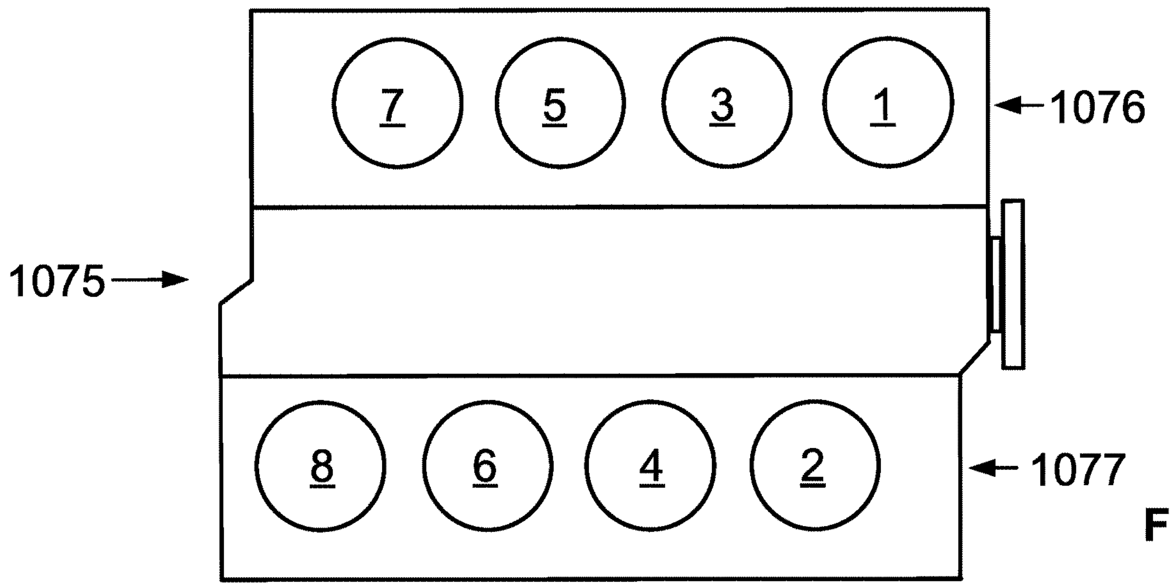
FIG. 15 shows a cylinder block of an internal combustion engine in accordance with the example implementations.

Next, FIG. 15 shows a cylinder block of an ICE 1075 having two banks and eight cylinders. For example, the ICE 1075 has a cylinder 1, 2, 3, 4, 5, 6, 7, 8, wherein the cylinder 1, 3, 5, 7 are on a bank 1076 and the cylinder 2, 4, 6, 8 are on a bank 1077. The ICE 1075 can have a v-configuration. The ICE 124 in the vehicle 51 can have a v-configuration. In other implementations, however, the ICE 124 in the vehicle 51 can have a different ICE configuration, such as an inline configuration or a w-configuration, and/or a different quantity of cylinders. For example, a six cylinder, inline configuration ICE can have two banks where three cylinders referred to as cylinders one, two, and three are part of a first bank, and three cylinders referred to as cylinders four, five, and six are part of a second bank. As an alternative, cylinders one, three, and five can be part of the first bank, and cylinders two, four, and six can be part of the second bank. Other examples of banks within an ICE are possible.

Figure 16:
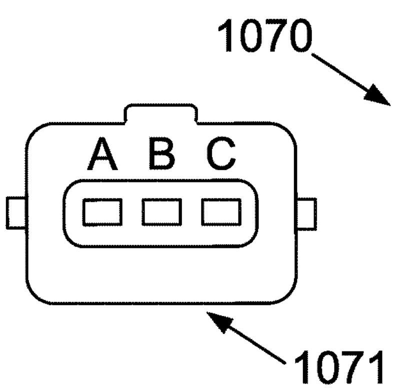
FIG. 16 shows a connector description in accordance with the example implementations.

FIG. 16 shows a connector description in accordance with the example implementations. Further details regarding FIG. 16 are described below.

Figure 17:
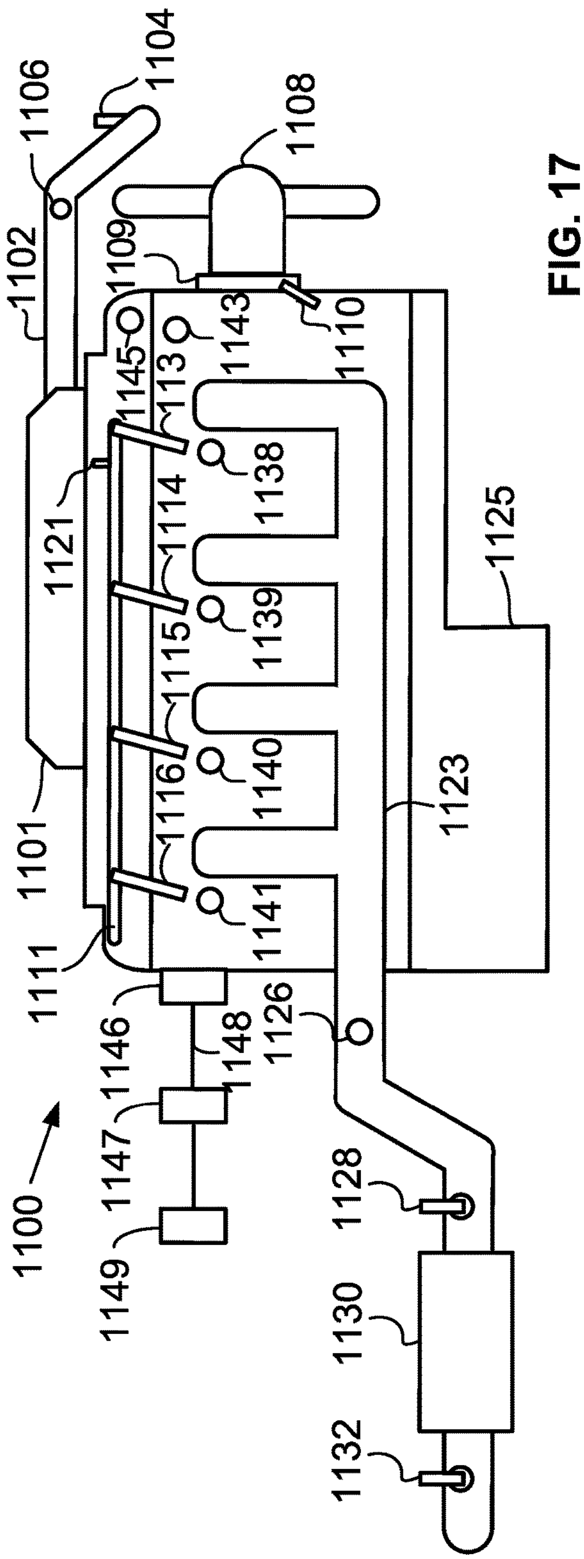
FIG. 17 and FIG. 18 are elevation views of an engine system in accordance with the example implementations.
Figure 18:
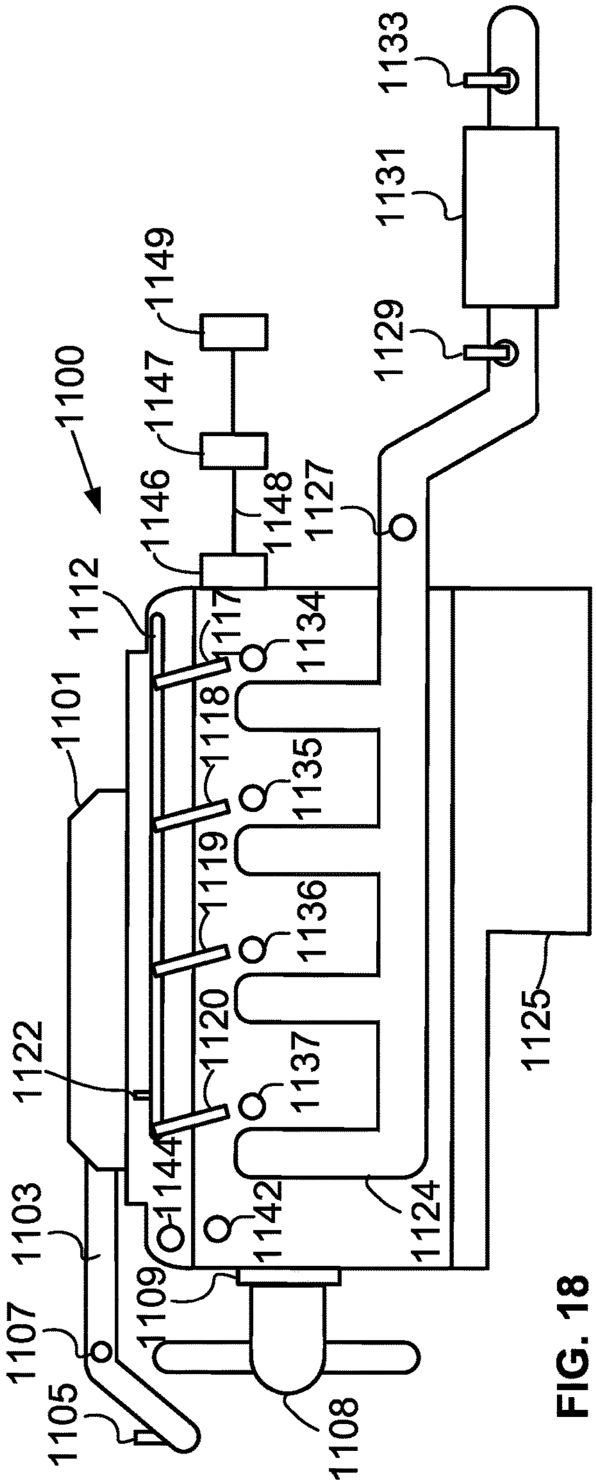
Figure 19:
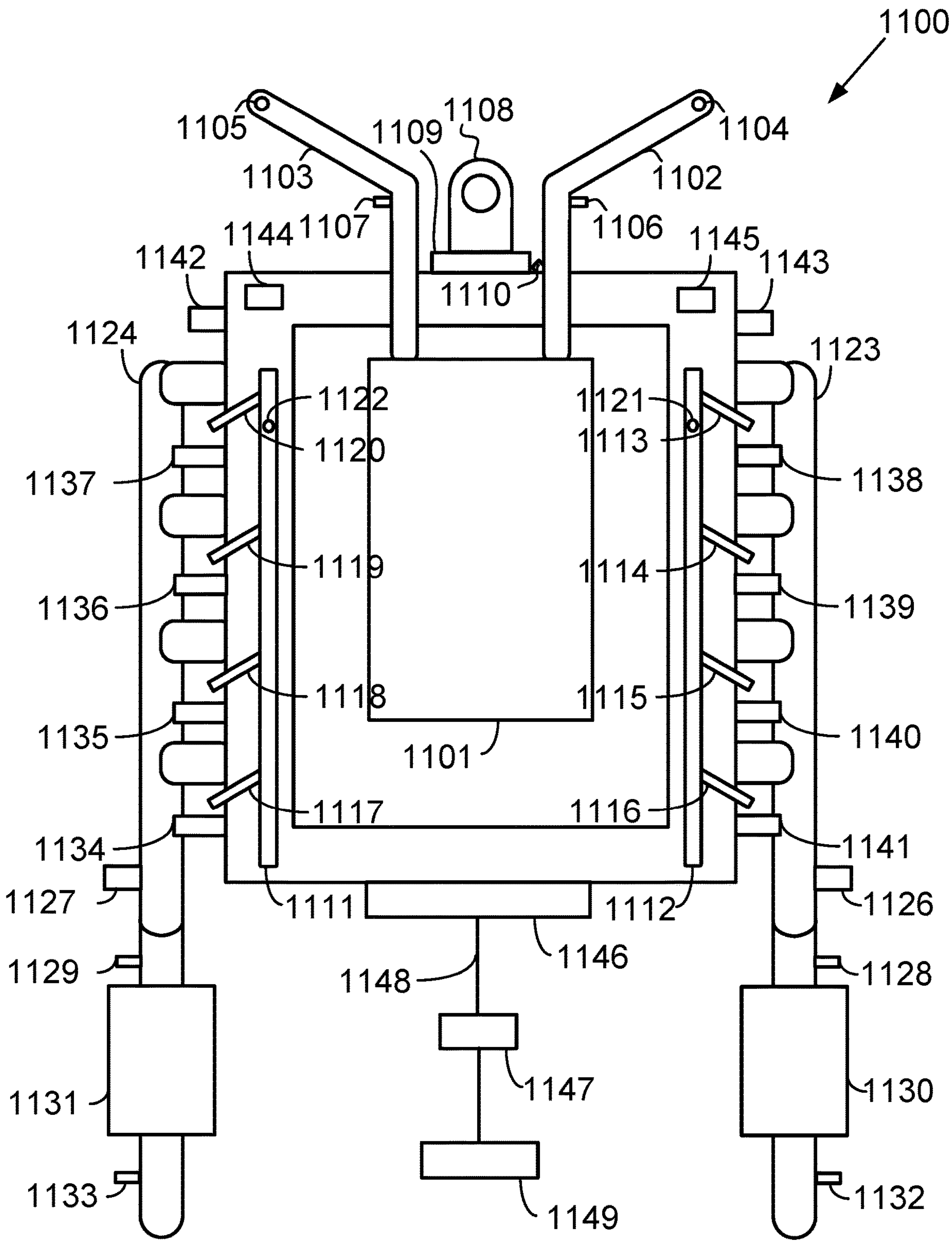
FIG. 19 is a plan view of the engine system shown in FIG. 17 and FIG. 18 in accordance with the example implementations.

FIG. 17 and FIG. 18 are elevation views of an engine system 1100. FIG. 19 is a plan view of the engine system 1100. As shown in those figures, the engine system 1100 includes an intake manifold 1101, an air intake hose 1102, 1103, a mass air flow sensor 1104, 1105, an intake air temperature sensor 1106, 1107, a cooling fan 1108, a crankshaft pulley 1109, a crankshaft position sensor 1110, a fuel rail 1111, 1112, a fuel injector 1113, 1114, 1115, 1116, 1117, 1118, 1119, 1120, a fuel rail pressure sensor 1121, 1122, an exhaust manifold 1123, 1124, an oil pan 1125, an exhaust air temperature sensor 1126, 1127, a pre-converter oxygen sensor 1128, 1129, a catalytic converter 1130, 1131, a post-converter oxygen sensor 1132, 1133, a spark plug 1134, 1135, 1136, 1137, 1138, 1139, 1140, 1141, an engine coolant temperature sensor 1142, 1143, a cam shaft position sensor 1144, 1145, an engine control module 1146, an on-board diagnostic connector 1147, and a vehicle data bus 1148. The engine system 1100 is arranged with an ICE. The engine control module 1146 is an ECU. FIG. 17, FIG. 18, and FIG. 19 also show a computing device 1149. The computing device 1149 can be arranged like the computing system 14 shown in FIG. 1 to FIG. 3 and/or the computing system 100 shown in FIG. 21. Although only FIG. 17 to FIG. 19 show a single crankshaft position sensor, the engine system 1100 can include multiple crankshaft position sensors.

Figure 20:
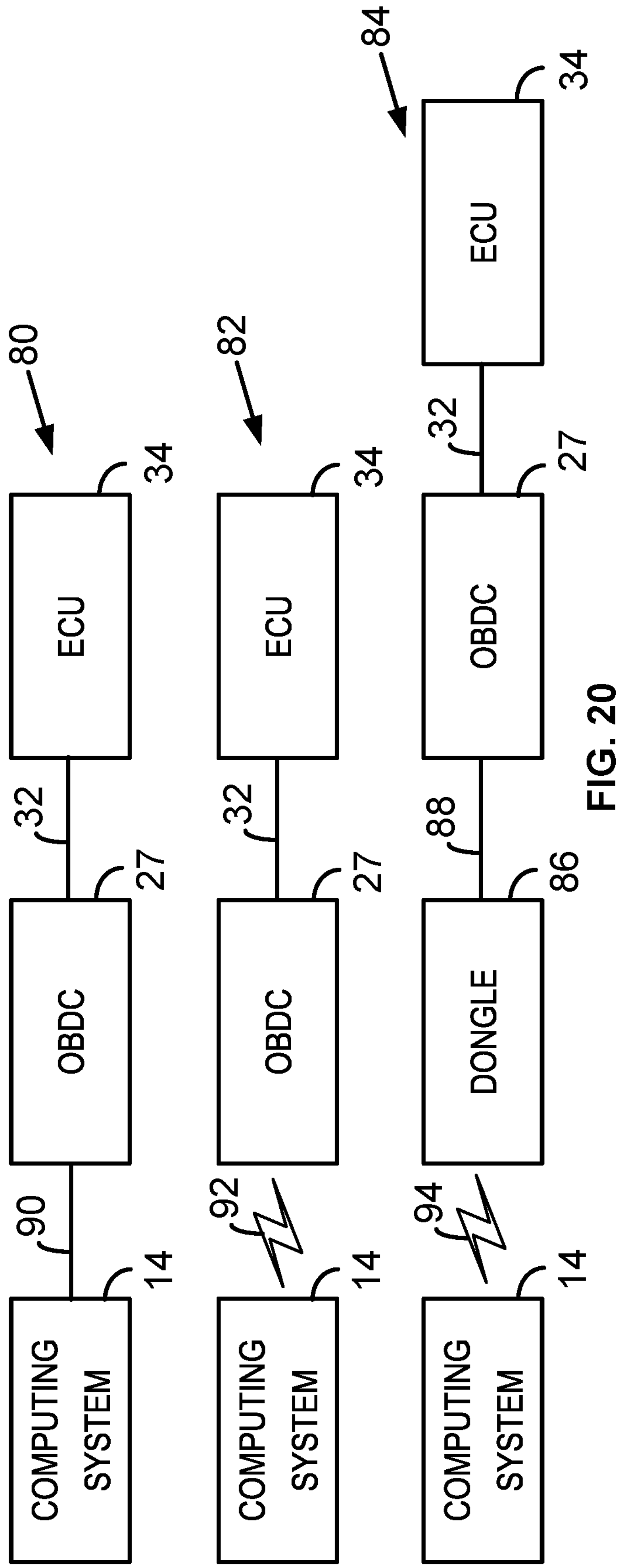
FIG. 20 shows arrangements for operatively connecting a computing system to a vehicle in accordance with the example implementations.

Turning to FIG. 20, an arrangement 80, 82, 84 for operatively connecting the computing system 14 to the vehicle 12 via the vehicle communication network 32 represented in FIG. 10 is shown. In the arrangement 80, 82, 84, the OBDC 27 is operatively connected to the ECU 34 within the vehicle 12 using the vehicle communication network 32. In FIG. 20, the ECU 34 represents one or more ECUs, such as the ECU 52, 53, 54, 55 of the vehicle 51 shown in FIG. 12.

In the arrangement 80, the computing system 14 is directly connected to the OBDC 27 using a wired network 90. As an example, the wired network 90 can be contained within a harness with multiple wires, at least one of which is operable to carry a VDM between the computing system 14 and the OBDC 27. The harness can include a connector removably attachable to the OBDC 27. The wired network 90 can include one or more wires.

In the arrangement 82, the computing system 14 is directly connected to the OBDC 27 using a wireless network 92. The wireless network 92 can include an air interface established to carry a VDM between the computing system 14 and the OBDC 27. The wireless network 92 and the air interface can be configured in accordance with a wireless communication standard or protocol, such as any wireless communication standard or protocol described in this description.

In the arrangement 84, the computing system 14 is indirectly connected to the OBDC 27 using a wireless network 94 and a dongle 86. The dongle 86 includes a connector 88 removably attachable to the OBDC 27 and a wireless transceiver and a wired transceiver. The wireless network 94 can include an air interface established to carry a VDM between the computing system 14 and the dongle 86. The wireless network 94 and the air interface can be configured in accordance with a wireless communication standard or protocol, such as any wireless communication standard or protocol described in this description. The wired transceiver of the dongle 86 can receive a VDM transmitted to the OBDC 27 over the vehicle communication network 32 from an ECU and can transmit a VDM onto the vehicle communication network 32 for transmission to an ECU in the vehicle 12. A computing system 100 shown in FIG. 21 can be used in place of the computing system 14 shown in the arrangement 80, 82, 84 within FIG. 20.

A. Computing System

Figure 21:
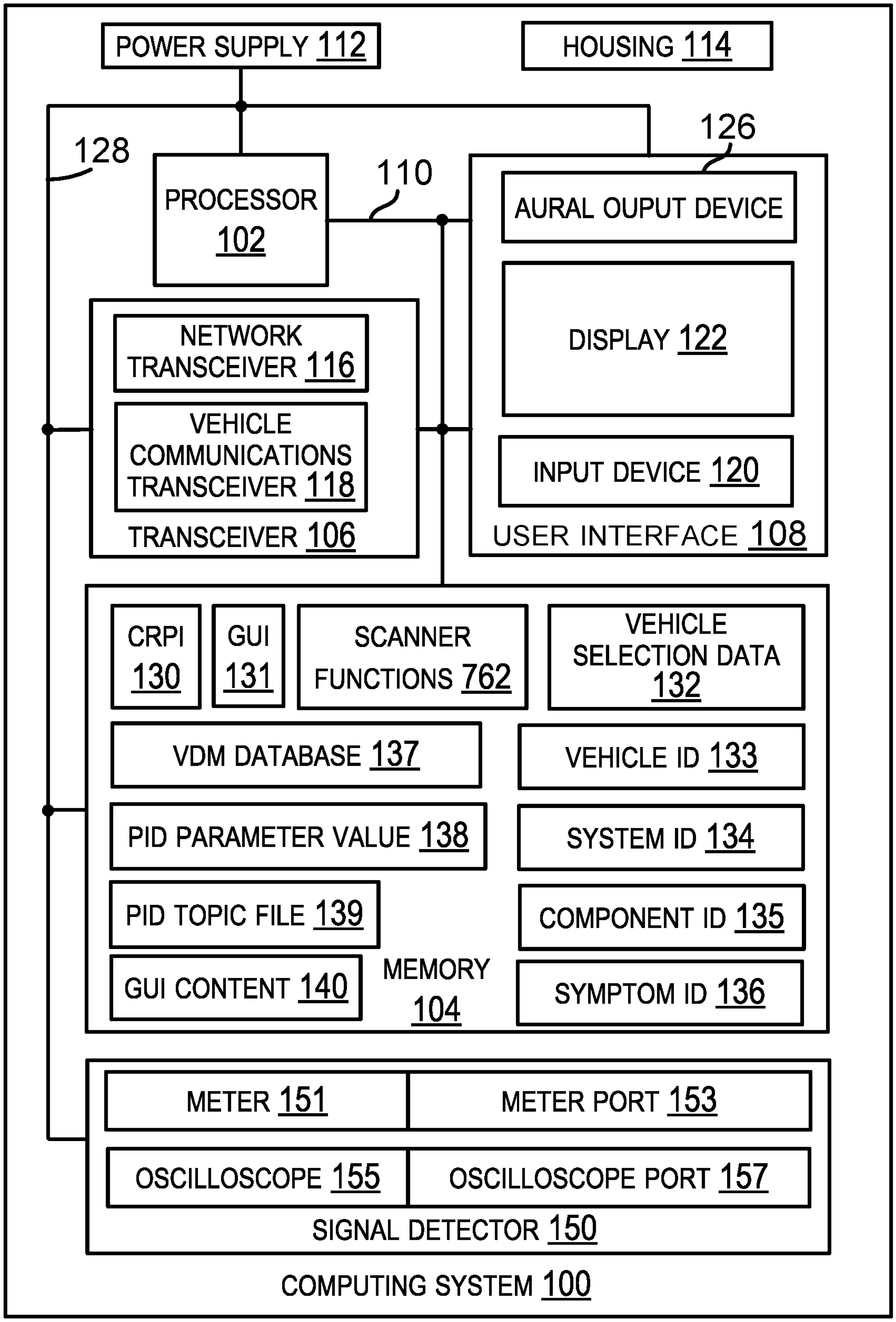
FIG. 21 is a block diagram of a computing system in accordance with the example implementations.

Next, FIG. 21 is a block diagram of a computing system 100. The computing system 100 includes a processor 102, a memory 104, a transceiver 106, a user interface 108, a signal detector 150, and a data bus 110. The data bus 110 operatively connects the processor 102, the memory 104, the transceiver 106, the user interface 108 and/or the signal detector 150 to one another. In other words, the data bus 110 provides an operative connection between two or more of the processor 102, the memory 104, the transceiver 106, the user interface 108, and/or the signal detector 150. An operative connection allows for the operatively connected devices to communicate with one another. In at least some implementations, the computing system 100 also includes one or more from among a power supply 112 or a housing 114.

With the operative connection provided by the data bus 110, the processor 102 is operable to request and receive data from the memory 104. In other words, the processor 102 is operable to read data written into the memory 104. With the operative connection provided by the data bus 110, the processor 102 is operable to provide and store data within the memory 104. In other words, the processor 102 is operable to write data into the memory 104. With the operative connection provided by the data bus 110, the processor 102 is operable to receive data input using the user interface 108 and to output data to the user interface 108 for outputting by the user interface 108. With the operative connection provided by the data bus 110, the processor 102 is operable to receive data received by the transceiver 106 and to provide the transceiver 106 with data that is to be transmitted by the transceiver 106. With the operative connection provided by the data bus 110, the processor 102 is operable to receive data generated by the signal detector 150 and to provide the signal detector 150 with data to configure the signal detector 150. Other examples of functionality available via the operative connection provided by the data bus 110 are also possible.

The computing system 14 shown in FIG. 1, FIG. 2 and FIG. 3 can be arranged like the computing system 100. The computing system 100 is operational within the system 10, 20, 30 in place of or in addition to the computing system 14.

1. Processor

A processor, such as the processor 102 or any other processor discussed in this description, can include one or more processors. Any processor discussed in this description can thus be referred to as "at least one processor" and/or "one or more processors." Furthermore, any processor discussed in this description can include a general purpose processor (e.g., an INTEL® single core microprocessor or an INTEL® multicore microprocessor), and/or a special purpose processor (e.g., a digital signal processor, a graphics processor, an embedded processor, or an application specific integrated circuit (ASIC) processor). Furthermore still, any processor discussed in this description can include or be operatively connected to a memory controller that controls a flow of data going to and from a memory, such as the memory 104.

Any processor discussed in this description can be operable to execute computer-readable program instructions (CRPI). Any CRPI discussed in this description can, for example, include assembler instructions, machine instructions, machine dependent instructions, microcode, firmware instructions, state-setting data, and/or either source code or object code written in one or any combination of two or more programming languages. As an example, a programming language can include an object oriented programming language such as Java, Python, or C++, or a procedural programming language, such as the "C" programming language. Any processor discussed in this description can be operable to execute hard-coded functionality in addition to or as an alternative to software-coded functionality (e.g., via CRPI). In at least some implementations of the computing system 100, the processor 102 is a specific processor that is programmed to perform any function(s) described in this description as being performed by the computing system 14, 100.

An embedded processor refers to a processor with a dedicated function or functions within a larger electronic, mechanical, pneumatic, and/or hydraulic device, and is contrasted with a general purpose computer. The embedded processor can include a central processing unit chip used in a system that is not a general-purpose workstation, laptop, or desktop computer. In some implementations, the embedded processor can execute an operating system, such as a real-time operating system (RTOS). As an example, the RTOS can include the SMX® RTOS developed by Micro Digital, Inc., such that the embedded processor can include (a) an advanced RISC (reduced instruction set computer) machine (ARM) processor (e.g., an AT91SAM4E ARM processor provided by the Atmel Corporation, San Jose, California), or (b) a COLDFIRE® processor (e.g., a 52259 processor) provided by NXP Semiconductors N.V., Eindhoven, Netherlands. A general purpose processor, a special purpose processor, and/or an embedded processor can perform analog signal processing and/or digital signal processing.

2. Memory

A memory, such as the memory 104 or any other memory discussed in this description, can include one or more memories. Any memory discussed in this description can thus be referred to as "at least one memory" and/or "one or more memories." A memory can include a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

A non-transitory memory can include a tangible, volatile or non-volatile, storage component, such as an optical, magnetic, organic or other memory or disc storage component. Additionally or alternatively, a non-transitory memory can include or be operable as a random-access memory (RAM), a read-only memory (ROM), a programmable read-only memory (PROM), an erasable programmable read-only memory (EPROM), a flash memory, an electrically erasable programmable read-only memory (EEPROM), or a compact disk read-only memory (CD-ROM). The RAM can include static RAM or dynamic RAM. A non-transitory memory can be operable as a removable storage device, a non-removable storage device, or a combination thereof. A removable storage and/or a non-removable storage device can include a magnetic disk device such as a flexible disk drive or a hard-disk drive (HDD), an optical disk drive such as a compact disc (CD) drive and/or a digital versatile disk (DVD) drive, a solid state drive (SSD), or a tape drive.

A transitory memory can include, for example, CRPI provided over a communication link, such as the communication link 16, 24, 26, or a data bus, such as the data bus 110.

A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," or "one or more computer-readable mediums." Any of those alternative terms can be preceded by the prefix "transitory" if the memory is transitory or "non-transitory" if the memory is non-transitory. For a memory including multiple memories, two or more of the multiple memories can be the same type of memory or different types of memories.

3. Transceiver

A transceiver, such as the transceiver 106 or any other transceiver discussed in this description, can include one or more transceivers. Each transceiver includes one or more transmitters operable to transmit data onto a data bus within the computing system (e.g., the computing system 100 or the server 22) including the transceiver. Each transceiver includes one or more receivers operable to receive data or a communication carried over a data bus within computing system (e.g., the computing system 100 or the server 22) including the transceiver. Unless stated differently, any data described as being transmitted to a device or system is considered to be received by that device or system. Similarly, unless stated differently, any data described as being received from a device or system is considered to be transmitted by that device or system directly or indirectly to the receiving device or system. For some implementations, a transceiver can include a transmitter and a receiver in a single semiconductor chip. In at least some of those implementations, the semiconductor chip can include a processor.

For purposes of this description and with respect to a particular vehicle (e.g., the vehicle 12, 40, 51, 1060), a network can be operable as a vehicle network, a non-vehicle network, or a multi-purpose network. The vehicle network is at least partly on-board the particular vehicle and has an OBDC and one or more electronic controls units interconnected to the OBDC and/or to each other. In at least some implementations, the computing system 14, 100 includes a harness that operatively connects to the OBDC in the particular vehicle and allows the computing system 14, 100 to be disposed outside of the particular vehicle. In those or in other implementations, the computing system 14, 100 is operable to communicate with the OBDC and can be disposed within or outside of the particular vehicle. The non-vehicle network is off-board of the particular vehicle and includes one or more network nodes outside of the particular vehicle. The multi-purpose network is contained at least partly within the particular vehicle and at least partly off-board the particular vehicle. The multi-purpose network can include a vehicle network and a non-vehicle network.

In at least some of the example implementations, a transmitter, such as a transmitter within any transceiver described in this description, transmits radio signals carrying data, and a receiver, such as a receiver within any transceiver described in this description, receives radio signals carrying data. A transceiver with a radio transmitter and radio receiver can include one or more antennas and can be referred to as a "radio transceiver," an "RF transceiver," or a "wireless transceiver." "RF" represents "radio frequency."

A radio signal transmitted or received by a radio transceiver can be arranged in accordance with one or more wireless communication standards or protocols such as an Institute of Electrical and Electronics Engineers (IEEE®) standard, such as (i) an IEEE® 802.11 standard for wireless local area networks (wireless LAN) (which is sometimes referred to as a WI-FI® standard) (e.g., 802.11a, 802.11b, 802.11g, or 802.11n), (ii) an IEEE® 802.15 standard (e.g., 802.15.1, 802.15,3, 802.15.4 (ZIGBEE®), or 802.15.5) for wireless personal area networks (PANs), (iii) a BLUETOOTH® version 4.1 or 4.2 standard developed by the Bluetooth Special Interest Group (SIG) of Kirkland, Washington, (iv) a cellular wireless communication standard such as a long term evolution (LTE) standard, (v) a code division multiple access (CDMA) standard, (vi) an integrated digital enhanced network (IDEN) standard, (vii) a global system for mobile communications (GSM) standard, (viii) a general packet radio service (GPRS) standard, (ix) a universal mobile telecommunications system (UMTS) standard, (x) an enhanced data rates for GSM evolution (EDGE) standard, (xi) a multichannel multipoint distribution service (MMDS) standard, (xii) an International Telecommunication Union (ITU) standard, such as the ITU-T G.9959 standard referred to as the Z-Wave standard, (xiii) a 6LoWPAN standard, (xiv) a Thread networking protocol, (xv) an International Organization for Standardization (ISO/International Electrotechnical Commission (IEC) standard such as the ISO/IEC 18000-3 standard for Near Field Communication (NFC), (xvi) the Sigfox communication standard, (xvii) the Neul communication standard, (xviii) the LoRaWAN communication standard, or (xix) a 5G new radio (5G NR) communication standard by the 3$^{rd}$ Generation Partnership Project (3GPP) standards organization, such as the 5G NR, phase one or 5G NR, phase two communication standard. Other examples of the wireless communication standards or protocols are possible.

In at least some of the implementations, a transmitter, such as a transmitter within any transceiver described in this description, can be operable to transmit a signal (e.g., one or more signals or one or more electrical waves) carrying or representing data onto an electrical circuit (e.g., one or more electrical circuits). Similarly, a receiver, such as a receiver within any transceiver described in this description, can be operable to receive via an electrical circuit a signal carrying or representing data over the electrical circuit. The electrical circuit can be part of a non-vehicle network, a vehicle network, or a multi-purpose network. The signal carried over an electrical circuit can be arranged in accordance with a wired communication standard such as a Transmission Control Protocol/Internet Protocol (TCP/IP), an IEEE® 802.3 Ethernet communication standard for a LAN, a data over cable service interface specification (DOCSIS standard), such as DOCSIS 3.1, a universal serial bus (USB) specification, a vehicle data message (VDM) protocol, or some other wired communication standard or protocol. Examples of a VDM protocol are listed in Section VI of this description. An electrical circuit can include a wire, a printed circuit on a circuit board, and/or a network cable (e.g., a single wire, a twisted pair of wires, a fiber optic cable, a coaxial cable, a wiring harness, a power line, a printed circuit, a CAT5 cable, and/or CAT6 cable). The wire can be referred to as a "conductor". Transmission of data over the conductor can occur electrically and/or optically.

In accordance with at least some implementations, the transceiver 106 includes a network transceiver 116 and/or a vehicle communications transceiver 118. The network transceiver 116 is operable to communicate over a non-vehicle network and/or a multi-purpose network. The vehicle communications transceiver 118 is operable to communicate over a vehicle network and/or a multi-purpose network. The transceiver 106 can be operable as a gateway to communicate over a multi-purpose network. The transceiver 106 is also operable to communicate over the data bus 110.

In at least some implementations, the network transceiver 116 includes a modem, a network interface card, a local area network (LAN) on motherboard (LOM), and/or a chip mountable on a circuit board. As an example, the chip can include a CC3100 Wi-Fi® network processor available from Texas Instruments, Dallas, Texas, a CC256MODx Bluetooth® Host Controller Interface (HCl) module available from Texas instruments, or a different chip for communicating via Wi-Fi®, Bluetooth® or another communication protocol.

A network node that is within and/or coupled to a non-vehicle network and/or that communicates via a non-vehicle network or a multi-purpose network using a packet-switched technology can be locally configured for a next 'hop' in the network (e.g., a device or address where to send data to, and where to expect data from). As an example, a device (e.g., a transceiver) operable for communicating using an IEEE® 802.11 standard can be configured with a network name, a network security type, and a password. Some devices autonegotiate this information through a discovery mechanism (e.g., a cellular phone technology).

The network transceiver 116 can be arranged to transmit a request and/or receive a response using a transfer protocol, such a hypertext transfer protocol (i.e., HTTP), an HTTP over a secure socket link (SSL) or transport layer security (TLS) (i.e., HTTPS), a file transfer protocol (i.e., FTP), or a simple mail transfer protocol (SMTP). The network transceiver 116 can be arranged to transmit an SMS message using a short message peer-to-peer protocol or using some other protocol.

The data transmitted by the transceiver 106 can include a destination identifier or address of a computing system to which the data is to be transmitted. The data or communication transmitted by the transceiver 106 can include a source identifier or address of the computing system 100. The source identifier or address can be used to send a response to the computing system 100. This described data can include a PID request, a PID parameter value, a graphical user interface (GUI), a PID topic file, or other data instead or as well.

4. User Interface

In at least some implementations, the user interface 108 includes an input device 120 and a display 122. In at least some of those implementations, the user interface 108 also includes an aural output device 126.

The display 122 can include one or more displays. As an example, each display of the one or more displays includes a capacitive touch screen display, a resistive touch screen display, a plasma display, a light emitting diode (LED) display, a cathode ray tube display, an organic light-emitting diode (OLED) display (such as an active-matrix OLED or a passive-matrix OLED), a liquid crystal display (LCD) device (such as include a backlit, color LCD device), a touch screen display with the LCD device, a capacitive touch screen display, or a resistive touch screen display. The display 122 can include a different type of display as well or instead. Each display can include one or more display screens.

In at least some implementations, the display 122 is affixed (e.g., removably affixed) to a substrate of the housing 114 and/or to the housing 114. In those or in other implementations, the display 122 is worn and/or within a wearable device, such as a pair of glasses or goggles, a head-mountable display, or a wrist display, such as a wristwatch (e.g., a smartwatch).

The display 122 is operable to display displayable content. Examples of displayable content are provided throughout this application by describing objects displayed by the display 122. The display 122 displaying content includes displaying the content. As an example, the display 122 is operable to display a GUI, a USC of a GUI and/or the user interface 108, a PID topic, an indicator of a PID topic, an indicator of a PID condition, a sub-container, a container, a PID, a parameter value, or a PID condition.

The display 122 can also be operable to display a still image (such as a visible light image, a thermal image, and/or a blended image based on a visible light image and a thermal image), a video, a text file (such as a text file with a PDF file extension or an XML file extension), a hypertext markup language file, a web page (such as a web page including a search bar and/or a cursor), and/or a GUI. In at least some implementations, the display 122 is operable to display a horizontal scroll bar and/or a vertical scroll bar. The horizontal scroll bar and the vertical scroll bar can be used to cause the display 122 to display content not currently displayed on the display 122. A web page displayable on the display 122 can include any content shown in or described with respect to any one or more of FIG. 26 to FIG. 35, FIG. 37 to FIG. 45, FIG. 53 to FIG. 58. Other examples of content displayable on the display 122 are also possible.

The input device 120 is operable to receive user inputs from a user of the computing system 100. As an example, the input device 120 includes a keyboard or keypad including one or more keys operable to be pressed or otherwise manipulated by the user. As another example, the input device 120 includes a microphone operable to receive sound waves, such as sound waves produced by the user speaking words in a vocabulary of the computing system 100. In the implementations in which the display 122 is operable as a touch screen display, the display 122 can receive user inputs from a user of the computing system 100. Accordingly, the input device 120 can include the display 122 when operable as a touch screen display.

In the implementations that include the aural output device 126, the aural output device 126 includes one or more speakers operable to convert electrical signals to audible sounds. In those or in other implementations, the aural output device 126 includes wired headphones and/or wireless headphones. The wired headphones can connect to an audio plug operatively connectable to an audio jack. The wireless headphones can include in-ear headphones, such as the AIRPODS PRO® in-ear headphones by Apple Inc.

5. Signal Detector

The signal detector 150 can include one or more of the following: a meter 151, a meter port 153, an oscilloscope 155, and/or an oscilloscope port 157. The meter 151 can include a digital volt-ohm meter (DVOM). Additionally or alternatively, the meter 151 can include a current meter. The meter 151 includes and/or is operatively coupled to the meter port 153. The meter port 153 includes one or more ports for receiving an end of a meter lead. An opposite end of the meter lead is connectable to a component on a vehicle. The oscilloscope 155 can include one or more channels. The oscilloscope port 157 includes a port for each channel of the oscilloscope. Each port of the oscilloscope port 157 is operable to receive an end of an oscilloscope test lead. An opposite end of the oscilloscope test lead is connectable to a component on a vehicle.

Additionally, the signal detector 150 can include one or more of the following: a signal generator, and/or an analog-to-digital converter (ADC). The signal generator can output a signal onto a meter lead connected to the meter port 153 and/or onto an oscilloscope test lead connected to the oscilloscope port 157. The output signal can be used to measure a signal. For instance, the signal generator can output a voltage differential across two meter leads connected to the meter port 153 (e.g., a red meter lead and a black meter lead) and onto a circuit for use in measuring a resistance of the circuit. The ADC can be operable to convert an analog signal received via a meter lead or an oscilloscope test lead into a digital signal. A digital signal representing a signal detected by the signal detector can be output onto the electrical bus 128 for transmission to the processor 102.

6. Additional Components

A power supply, such as the power supply 112 or any other power supply discussed in this description, can be arranged in any of a variety of configurations. As an example, the power supply can be operable to include circuitry to receive AC current from an AC electrical supply (e.g., electrical circuits operatively connected to an electrical wall outlet) and convert the AC current to a DC current for supplying to one or more from among the components connected to the power supply 112. As another example, the power supply can be operable to include a battery or be battery operated. As yet another example, the power supply can be operable to include a solar cell or be solar operated. Moreover, a power supply can be operable to include and/or connect to a power distribution circuit to distribute electrical current throughout the device or system including that power supply. In at least some implementations of the computing system 100, the power distribution circuit includes an electrical bus 128 that connects to the processor 102, the memory 104, the transceiver 106, and the user interface 108. Other examples of a power supply, such as the power supply 112, are also possible.

In at least some implementations, the computing system 100 includes a housing 114. The housing 114 surrounds at least a portion of the following: the processor 102, the memory 104, the transceiver 106, the user interface 108, the data bus 110, and/or the power supply 112. The housing 114 can support a substrate. In at least some example implementations, at least a portion of the following: the processor 102, the memory 104, the transceiver 106, the user interface 108, the data bus 110, and/or the power supply 112 is/are mounted on and/or connected to a substrate of the housing 114. The housing 114 can be made from various materials. For example, the housing 114 can be made from a plastic material (e.g., acrylonitrile butadiene styrene (ABS)) and a thermoplastic elastomer used to form a grip on the housing 114.

7. Memory Content

Figure 36:
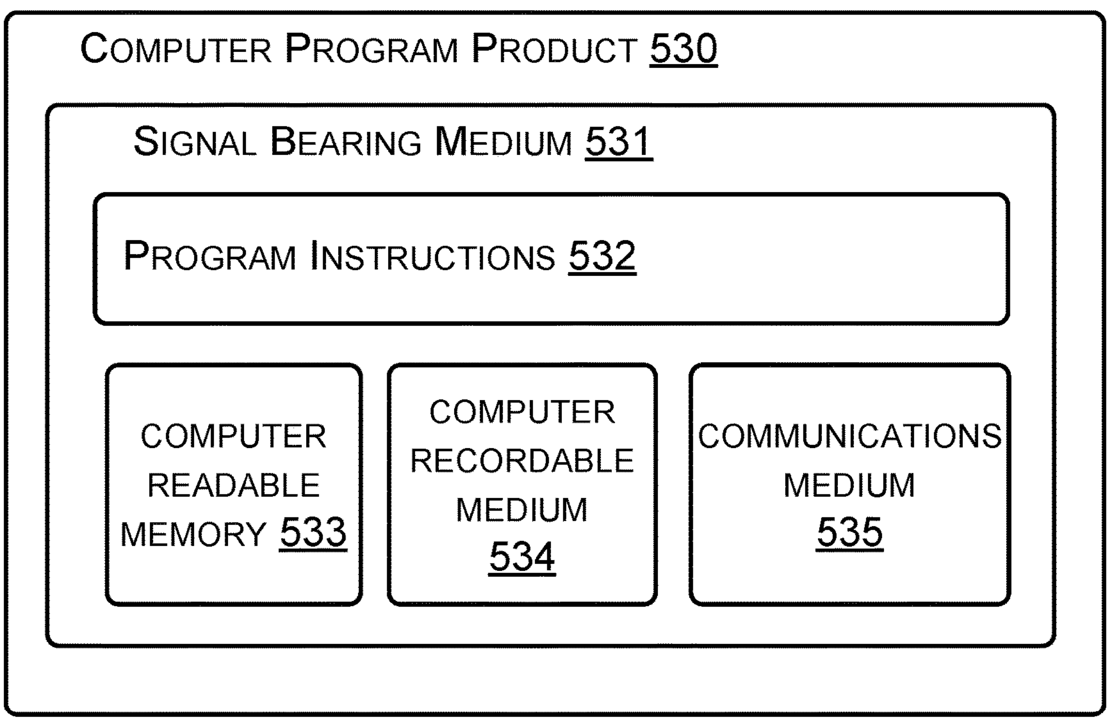
FIG. 36 is a schematic illustrating a conceptual partial view of a computer program product for executing a computer process on a computing system in accordance with accordance with the example implementations.

The example implementations can determine, generate, store, transmit, receive, and/or otherwise use a variety of computer-readable data. At least some of the computer-readable data can be stored in a memory, such as the memory 104 and/or a memory 162 shown in FIG. 22. As an example, the memory 104 contains one or more from among: computer-readable programming instructions (CRPI) 130, a GUI 131, vehicle selection data 132, a vehicle identifier 133, a system identifier 134, a component identifier 135, a symptom identifier 136, a vehicle data message database 137, a PID parameter value 138, a PID topic file 139, GUI content 140, and/or scanner functions 762. Additionally, the memory 104 can contain any of the content within the system memory 504 shown in FIG. 62 and/or within the computer program product 530 shown in FIG. 36.

The CRPI 130 include program instructions executable by a processor, such as the processor 102. As an example, the CRPI 130 can include program instructions that are executable to cause the computing system 100 to perform any function described as being performed by the computing system 100, by the processor 102, and/or by some other component of the computing system 100. For purposes of this description, the program instructions discussed in this paragraph are referred to as PI-1.

Figure 23A:
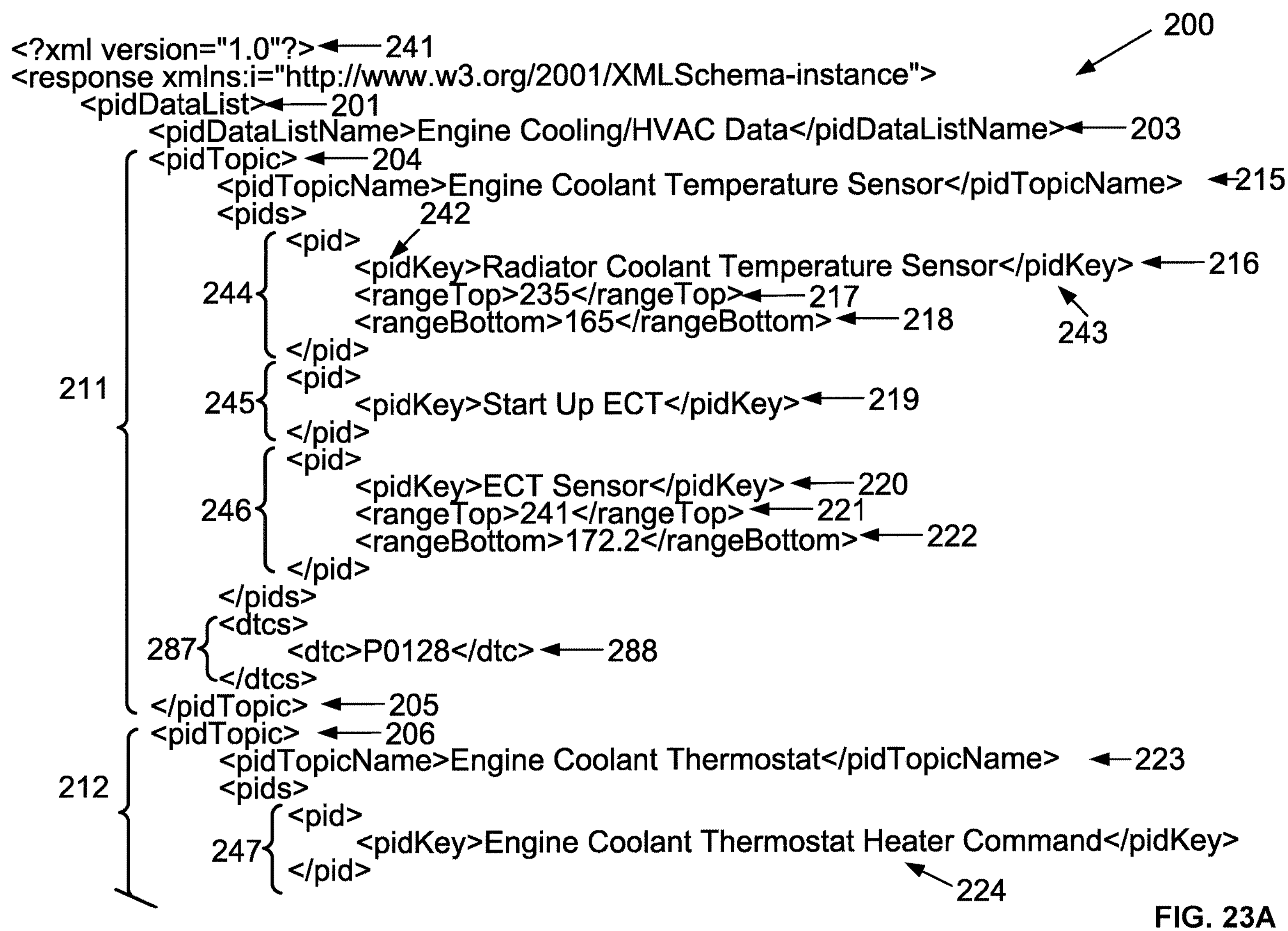
FIG. 23A, FIG. 23B, and FIG. 23C show a parameter-identifier topic file in accordance with the example implementations.
Figure 23B:
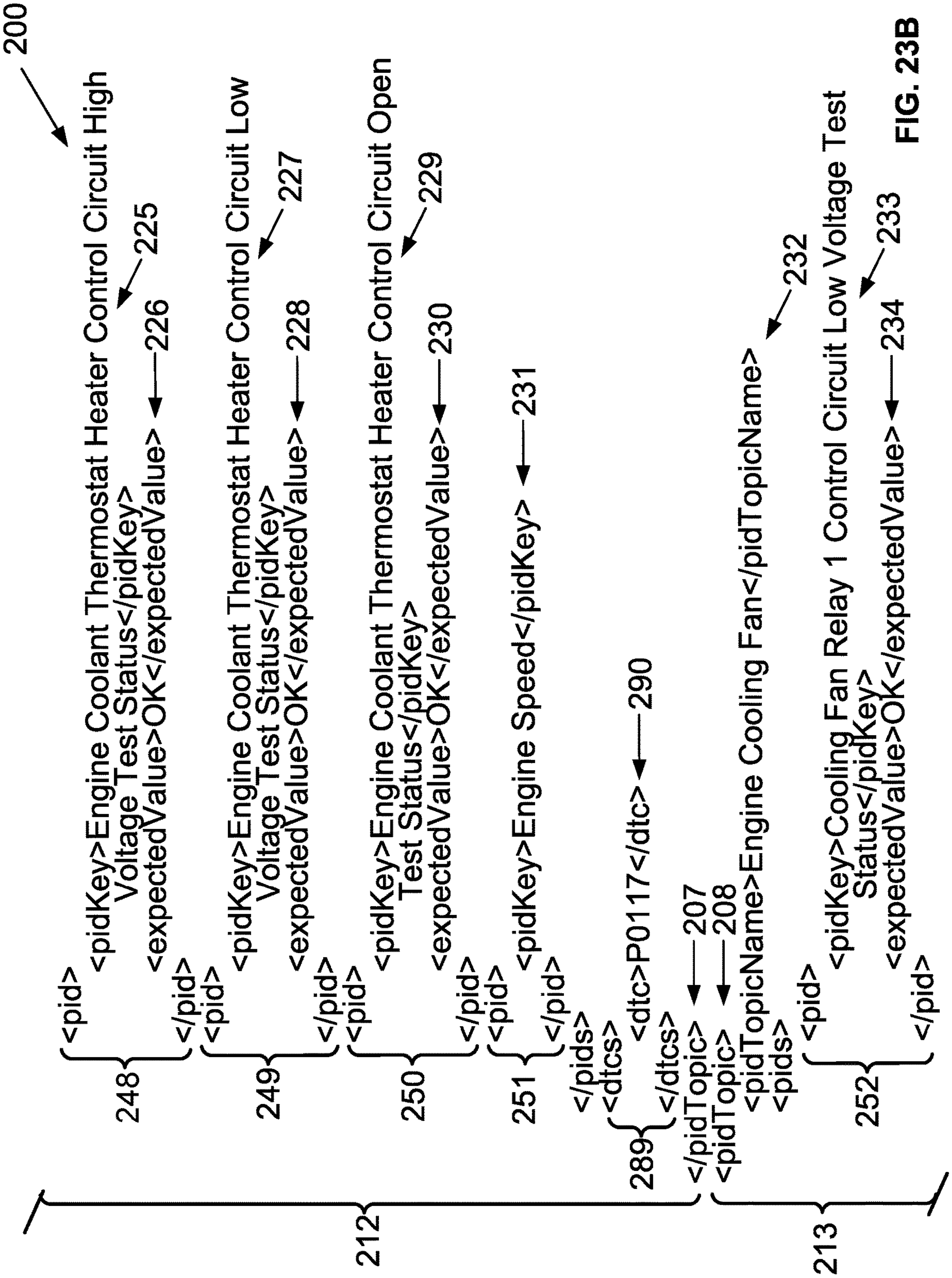
Figure 23C:
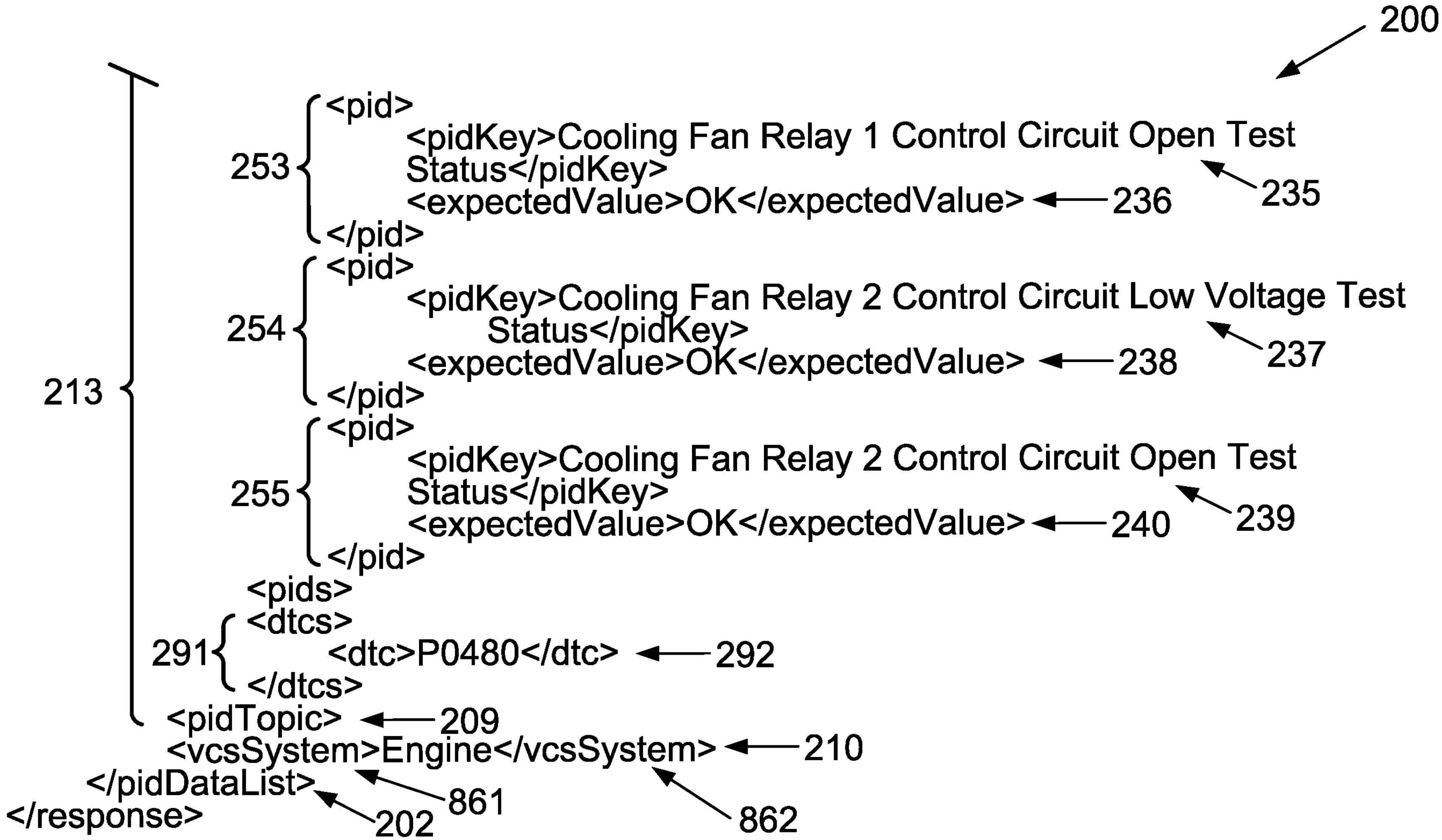

As another example, the CRPI 130 can include program instructions executable by a processor, such as the processor 102, to parse a PID topic file, such as the PID topic file 139, the PID topic file 200 shown in FIG. 23A, FIG. 23B, FIG. 23C, or a PID topic file including a PID topic file portion 852, 859, 739, 846, 860, 578, 638, 673 shown in FIG. 23D, FIG. 23E, FIG. 25A, FIG. 25B, FIG. 25C, FIG. 46, FIG. 47, FIG. 52 respectively, to determine a PID topic, a PID within the PID topic, an expected value corresponding to the PID, and/or a range corresponding to the PID. The PID topic can be determined from a PID topic element within a PID topic file. The PID can be determined from a PID element within a PID topic file. The expected value can be determined from an expected value element within a PID topic file. The range can be determined from a range element within a PID topic file. Parsing a file can include parsing metadata that accompanies and/or is contained with the file. For purposes of this description, the program instructions discussed in this paragraph are referred to as PI-2.

As another example, the CRPI 130 can include program instructions executable by a processor, such as the processor 102, to populate a GUI with the PID topic. Populating the GUI with the PID topic can include populating the GUI with a container corresponding to a PID topic element of a PID topic file. Moreover, populating the GUI with that container can include populating that container with one or more sub-containers corresponding to one or more PID(s) elements of the PID topic file. Furthermore, populating the GUI with the one or more sub-containers can include populating those one or more sub-containers with a respective PID descriptor and an icon corresponding to a PID condition determined by the processor. For purposes of this description, the program instructions discussed in this paragraph are referred to as PI-3.

As another example, the CRPI 130 can include program instructions executable by a processor, such as the processor 102, to compare PID parameter values obtained from a vehicle to an expected value within a PID topic file to determine whether or not a PID parameter value obtained from the vehicle matches the expected value. For purposes of this description, the program instructions discussed in this paragraph are referred to as PI-4.

As another example, the CRPI 130 can include program instructions executable by a processor, such as the processor 102, to compare PID parameter values obtained from a vehicle to a range within a PID topic file to determine whether a PID parameter value obtained from the vehicle in within or outside of the range. For purposes of this description, the program instructions discussed in this paragraph are referred to as PI-5.

As another example, the CRPI 130 can include program instructions executable by a processor, such as the processor 102, to modify an order of multiple PIDs within a container. Various benefits can arise from modifying the order of the multiple PIDs within a container. One such benefit is that the processor 102 can output a GUI showing the multiple PIDs within the container using the modified order. As a result, the GUI can show a PID and corresponding parameter value that were not displayed at a time the modified order was determined. An additional or alternative result of using the modified order is that the GUI can display PID(s) (with parameters outside of a respective, defined range of parameter or not matching an expected value) at a certain portion of the GUI, such as at or near a top of the container including the PID. In other words, the modified order can include a prioritized order of PIDs. Modifying the order of PIDs within a container can result in one or more PIDs no longer being displayed due to other PIDs deemed to have a higher priority. Modifying the order of PIDs within a container can include modifying an order of sub-containers within a container including those PIDs. For purposes of this description, the program instructions discussed in this paragraph are referred to as PI-6.

As another example, the CRPI 130 can include program instructions executable by a processor, such as the processor 102, to modify an order of multiple PID topics. Modifying the order of the multiple PID topics is beneficial for at least the reason that the processor 102 can output a GUI showing the multiple PID topics using the modified order to the display 122. Outputting the multiple PID topics using the modified order can result in displaying a PID topic that was not being displayed when the modified order was determined. Additionally or alternatively, outputting the multiple PID topics using the modified order can result in a PID topics having the most PIDs with parameter values outside of a respective, defined range of parameter values or not matching an expected value being displayed at a certain portion of the display, such as at or near a top of the display. For purposes of this description, the program instructions discussed in this paragraph are referred to as PI-7.

Table B, Table C, Table D, Table E, and Table F below show example orders of PID topics A, B, C. The PID topic A has six PIDs, the PID topic B has eight PIDs, and the PID topic C has four PIDs. In one respect, Table B represents an example default order of PID topics. The default order of PID topics can be used when the computing system 100 has not received any out-of-range parameter values and/or any unexpected parameter values corresponding to the PIDs of the PID topics A, B, C. In at least some implementations, the default order of PID topics can be used if the most-recent parameter value for each PID of the PID topics A, B, C is within its respective range, if any, or is its expected value, if any. In another respect, Table B represents an example alpha-numeric order of PID topics. For purposes of this description, an alpha-numeric order can include a reverse alpha-numeric order.

TABLE B

| Order | PID Topic | No. of PIDs | PID parameter values out of range or an unexpected value |
|---|---|---|---|
| 1 | A | 6 | 0 |
| 2 | B | 8 | 0 |
| 3 | C | 4 | 0 |

Figure 26:
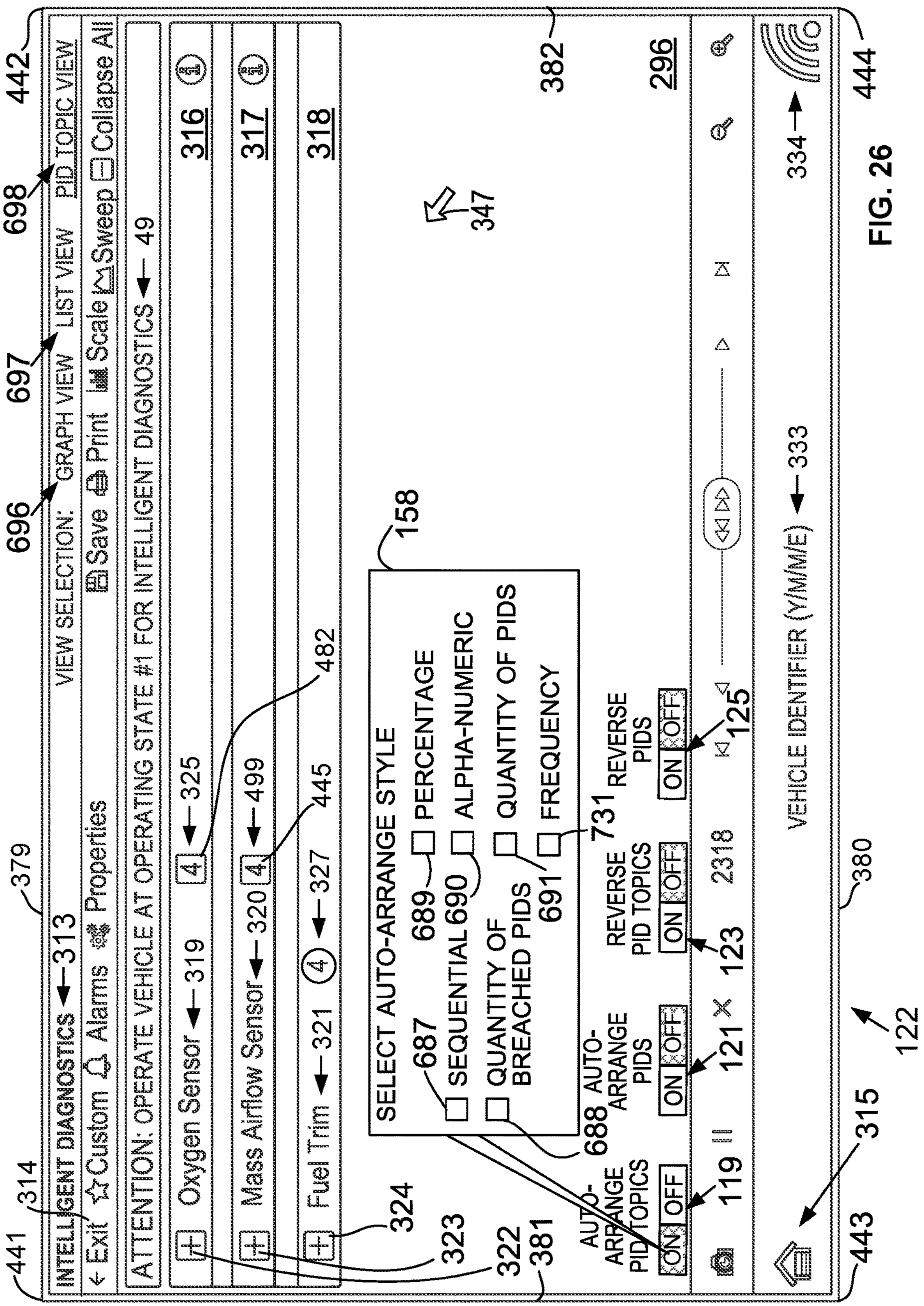
FIG. 26, FIG. 27, FIG. 28, FIG. 29, FIG. 30, FIG. 31, FIG. 32, FIG. 33, FIG. 34, and FIG. 35 depict a graphical user interface in accordance with the example implementations.

Each PID topic identified in a Table of this description by a single letter, such as A, B, C, D, E, F, G, H, I can correspond to a PID topic descriptor, such as a PID topic descriptor represented by a PID topic name element 215 shown in FIG. 23A or a PID topic descriptor 319 shown in FIG. 26.

Table C represents (with respect to at least to an order shown in Table B) a modified order of PID topics based on a quantity of PIDs for which the computing system 100 has received out-of-range parameter values and/or unexpected parameter values, from a greatest quantity to a least quantity, and then based on the default order of PID topics (e.g., PID topics A and C) that do not have any PID for which an out-of-range or unexpected PID parameter value was received.

TABLE C

| Order | PID Topic | No. of PIDs | PID parameter values out of range or an unexpected value |
|---|---|---|---|
| 1 | B | 8 | 1 |
| 2 | A | 6 | 0 |
| 3 | C | 4 | 0 |

Table D represents (with respect to at least to an order shown in Table B) a modified order of PID topics based on a quantity of PIDs for which the computing system 100 has received out-of-range parameter values and/or unexpected parameter values, from a greatest quantity to a least quantity.

TABLE D

| Order | PID Topic | No. of PIDs | PID parameter values out of range or an unexpected value |
|---|---|---|---|
| 1 | B | 8 | 4 |
| 2 | C | 4 | 3 |
| 3 | A | 6 | 1 |

Table E represents (with respect to at least to an order shown in Table B) a modified order of PID topics based on a percentage of PIDs for which the computing system 100 has received out-of-range parameter values and/or unexpected parameter values, from a greatest percentage to a lowest percentage.

TABLE E

| Order | PID Topic | No. of PIDs | PID parameter values out of range or an unexpected value |
|---|---|---|---|
| 1 | C | 4 | 3 |
| 2 | B | 8 | 4 |
| 3 | A | 6 | 1 |

Table F represents (with respect to at least to an order shown in Table B) a modified order of PID topics based on a user selection. As an example, the modified order shown in Table F can occur as a resulting of selecting PID topic A or PID topic C while displayed in the default order shown in Table B and dragging the selected PID topic across the display 122 onto the other of the PID topic A or PID topic C displayed on the display 122. Modifying an order of PID topics based on a user selection can occur even if the PID parameter values for a PID in one or more of the PID topics is out of range or an unexpected value.

TABLE F

| Order | PID Topic | No. of PIDs | PID parameter values out of range or an unexpected value |
|---|---|---|---|
| 1 | C | 4 | 0 |
| 2 | B | 8 | 0 |
| 3 | A | 6 | 0 |

As another example, the CRPI 130 can include program instructions executable by the processor 102 to establish a connection with a communication link and/or a device connected to the communication link. The processor 102 can read data from the memory 104 for establishing the connection, such as a password or key (e.g., a wired equivalent privacy (WEP) key). The processor 102 can send the data for establishing the connection to a device on the communication link requesting the data. For purposes of this description, the program instructions discussed in this paragraph are referred to as PI-8.

As another example, the CRPI 130 can include program instructions executable by a processor, such as the processor 102, to request performance of a scanner function among the scanner functions 762. As an example, a scanner function can include a functional test or a reset function the vehicle 12 can perform. Requesting the performance can include the processor 102 and/or the transceiver 106 transmitting to the vehicle 12 a vehicle data message including an indication of the functional test or the reset function to be performed. The vehicle data message can include an identifier of an electronic control unit within the vehicle. Requesting the performance of the functional test or the reset function can occur in response to the processor 102 detecting that a USC corresponding to the functional test or reset function has been selected from the display 122. In at least some implementations, the USC corresponding to the functional test or reset function can be displayed on the display in response to a USC 405 or USC 406, respectively (shown in FIG. 34) being selected. For purposes of this description, the program instructions discussed in the previous paragraph and this paragraph are referred to as PI-9.

As another example, a scanner function can include a guided component test. A guided component test can be performed, at least in part, by the signal detector 150. Performing a guided test can include measuring a signal received at the meter port 153 or the oscilloscope port 157. The processor 102 can configure the meter 151 or the oscilloscope 155, as discussed below. For purposes of this description, the program instructions discussed in the previous paragraph and this paragraph are referred to as PI-10.

As another example, the CRPI 130 can include program instructions executable by the processor, such as the processor 102, to expand a size of a container when the container is displayed on the display 122 in a contracted/diminished size. In accordance with the example implementations, the processor 102 can expand a size of a container in response to determining a container resizing USC (such as a container resizing USC 413 shown in FIG. 40) is selected while the container including the container resizing USC is displayed on the display 122 in the contracted/diminished size. For purposes of this description, the program instructions discussed in this paragraph are referred to as PI-11.

As another example, the CRPI 130 can include program instructions executable by the processor 102 to contract/diminish a size of a container when the container is displayed on the display 122 in an expanded size. In accordance with the example implementations, the processor 102 can contract/diminish a size of a container in response to determining a container resizing USC (such as a container resizing USC 413 shown in FIG. 41) is selected while the container including the container resizing USC is displayed on the display 122 in the expanded size. For purposes of this description, the program instructions discussed in this paragraph are referred to as PI-12.

As yet another example, the CRPI 130 can include program instructions executable by the processor 102 and in accordance with the Society of Automotive Engineers (SAE) J1978-2002 or International Organization for Standardization (ISO)/draft international standard (DIS) 15031-4 for an on-board diagnostic (OBD) scan tool. The processor 102 can accordingly exercise a diagnostic service within an electronic control unit (ECU) within a vehicle that conforms to the SAE J1979_201202 and/or ISO 15031-5 standards for E/E diagnostic test modes. Exercising the diagnostic service can occur in response to the processor 102 transmitting to the vehicle 12 a vehicle data message arranged according to one of the aforementioned standards or another standard used by the vehicle 12. For purposes of this description, the program instructions discussed in this paragraph are referred to as PI-13.

As yet another example, the CRPI 130 can include program instructions executable by the processor 102 to generate a message for the server and to send that message to the server 160. The message for the server can include data received from a vehicle and/or data based on data received from a vehicle, such as a PID parameter value or a converted PID parameter value based on a formula for converting a PID parameter value. Additionally or alternatively, the message for the server can include data received using the user interface 108 and/or a GUI. Examples of data received using the user interface 108 are described throughout this description. For purposes of this description, the program instructions discussed in this paragraph are referred to as PI-14.

As still yet another example, the CRPI 130 can include program instructions executable by a processor, such as the processor 102, to configure the signal detector 150 for performing a component test. Examples of configuring the meter 151 and configuring the oscilloscope 155 are discussed below. For purposes of this description, the program instructions discussed in this paragraph are referred to as PI-15.

As still yet another example, the CRPI 130 can include program instructions executable by a processor, such as the processor 102, to generate and transmit to a server a message to request a PID topic file. Those or other program instructions can also be executable to receive from the server a message including a PID topic file, such as the PID topic file 200 or a PID topic file including the PID topic file portion 852, 859, 739, 846, 860, 578, 638, 673 shown in FIG. 23D, FIG. 23E, FIG. 25A, FIG. 25B, FIG. 25C, FIG. 46, FIG. 47, FIG. 52. As an example, the message to request a PID topic file can include a vehicle identifier, and one or more of a component identifier, a system identifier, or a symptom identifier. Examples of those identifiers are described throughout this description. For purposes of this description, the program instructions discussed in this paragraph are referred to as PI-16.

As still yet another example, the CRPI 130 can include program instructions executable by a processor, such as the processor 102, to generate and transmit to a server a message to request supplemental information to display in a container corresponding to a PID topic. Those or other program instructions can also be executable to receive from the server a message including a PID topic file, such as the PID topic file 200 or a PID topic file including the PID topic file portion 852, 859, 739, 846, 860, 578, 638, 673. As an example, the message to request a PID topic file can include a vehicle identifier, and one or more of a component identifier, a system identifier, or a symptom identifier. Examples of those identifiers are described throughout this description. Providing the supplemental information in response to a request using a USC within a PID topic rather than providing the supplemental information with a PID topic file used to generate the PID topic is beneficial for at least the reason that the server doesn't need to transmit the supplemental information to the computing system 100 if the computing system 100 never transmits the request and a communication link (e.g. the communication link 24, 26) isn't burdened with carrying the supplemental information if the supplemental information is not requested by the computing system 100. For purposes of this description, the program instructions discussed in this paragraph are referred to as PI-17.

Figure 59:
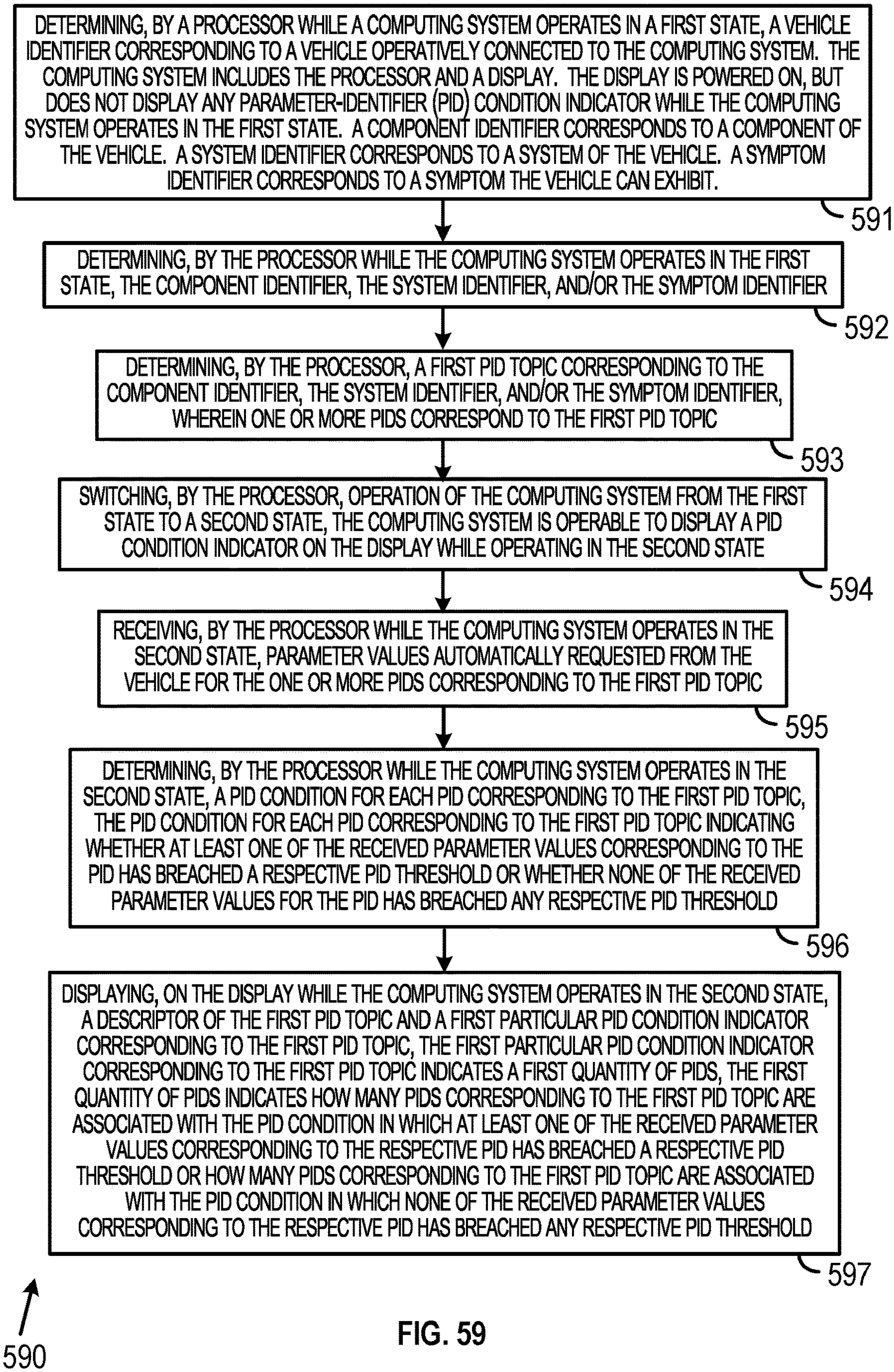
FIG. 59 shows a flow chart showing a method in accordance with the example implementations.
Figure 60:
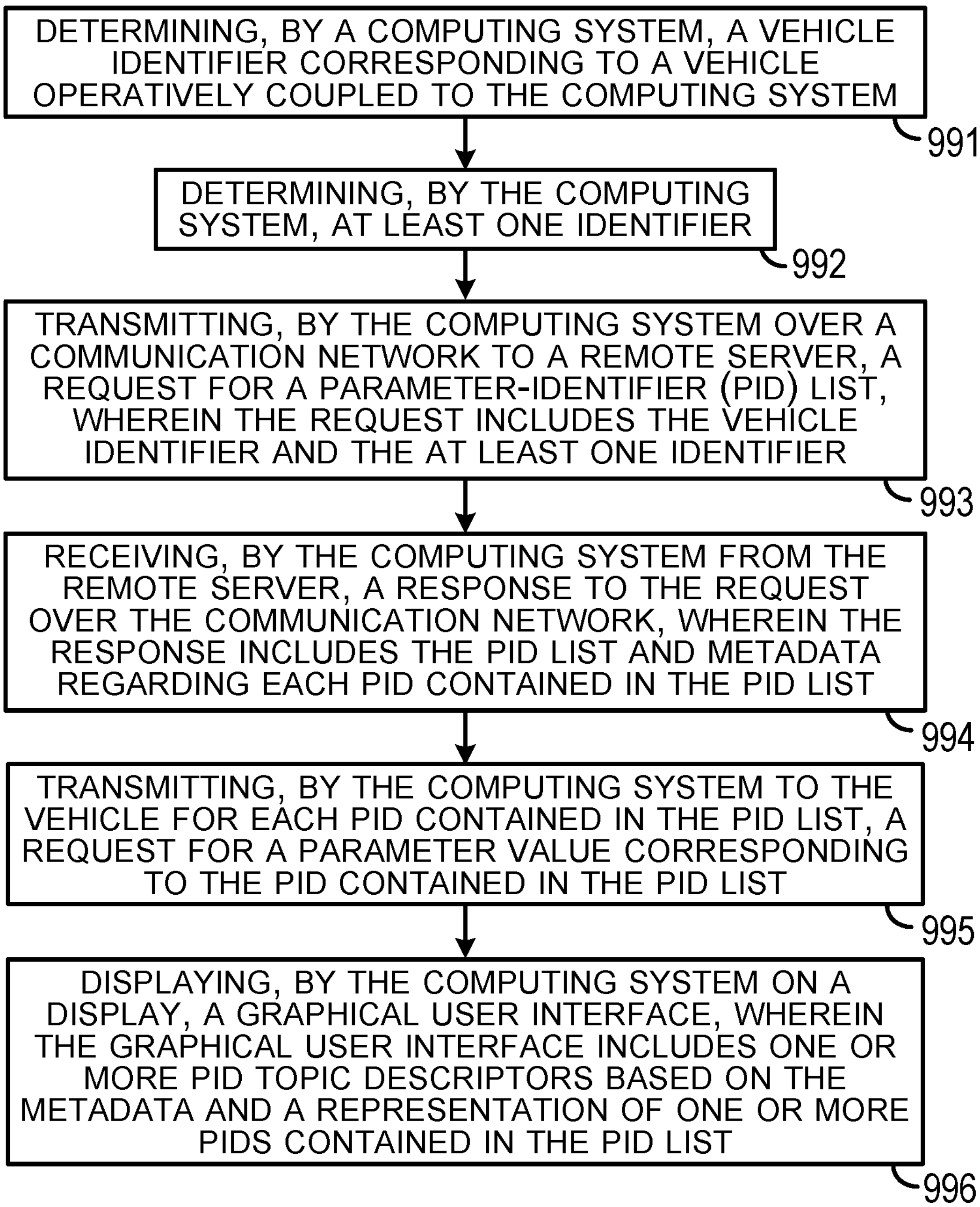
FIG. 60 shows a flow chart showing a method in accordance with the example implementations.

As still yet another example, the CRPI 130 can include program instructions executable by a processor, such as the processor 102, to perform any one or more or all of the functions in the set 590 of functions shown in FIG. 59 and/or in the set 990 of functions shown in FIG. 60. For purposes of this description, the program instructions discussed in this paragraph are referred to as PI-18.

And as yet another example, the CRPI 130 can include program instructions executable by a processor, such as the processor 102, to receive a set of index values, and apply the set of index values against a list to determine a filtered list. As an example, the list can consist of PIDs, functional tests, reset procedures, and/or component tests. The listed items can be associated with metadata that indicates a particular topic, such as a PID topic, a functional test topic, a reset procedure topic, or a component topic. The processor can execute the program instructions to generate a GUI that includes one or more containers, each container including the items within the filtered list that correspond to a common, particular topic. For example, the processor can execute the program instructions to generate a GUI that includes multiple containers, each of those containers corresponding to a PID topic indicated by the metadata, and each container including a respective sub-container for each PID in the filtered list that corresponds to the PID topic associated with that container. For purposes of this description, the program instructions discussed in this paragraph are referred to as PI-19.

The GUI 131 includes a GUI that the processor 102 is operable to output to the display 122 and that is operable to be displayed on the display 122. In at least some implementations, the computing system 100 receives the GUI 131 from the server 160. In at least some implementations, the GUI 131 includes a template that the processor 102 uses to generate a GUI for outputting to the display 122. The processor 102 can select the template from among multiple templates that are configured for generating a GUI with a particular number of container(s), such as one, two, three, four, five, six, seven, eight, nine, ten, eleven or twelve container(s). Other examples of a template with a different quantity of container(s) are also possible. In addition to selecting a template with a particular number of container(s), the processor 102 can further select a template from among multiple templates that are configured for generating a GUI with a particular number of sub-containers within each container defined for the template. As an example, the quantity of sub-containers in a container can include one, two, three, four, five, six, seven, eight, nine, ten, eleven, twelve or some other number of sub-containers. The GUI 131 can include a GUI shown in any of the drawings, a GUI that includes any aspects shown in one or more of the drawings, and/or some other GUI The vehicle selection data 132 includes data for determining the vehicle identifier 133. In at least some implementations, the vehicle selection data 132 includes data to identify a vehicle based on selections entered using a GUI, such as the selections that can be made using the GUI 185 shown in FIG. 37. In at least some implementations, the vehicle selection data 132 includes data for determining the vehicle identifier 133 by decoding a vehicle identification number (VIN) entered via a VIN USC 364 shown in the GUI 185, or an image of a code representing a VIN, such as the image of the code shown in the GUI 185. In at least some implementations, the vehicle selection data 132 includes data for determining the vehicle identifier 133 based on a license plate number (associated with a vehicle) entered via a USC 293 or determined from an image capture using the vehicle selector USC 365 and a camera or scanner.

The vehicle identifier 133 includes an identifier of a vehicle, such as the vehicle 12, 40, 51, 1060. In some implementations, the vehicle identifier 133 is obtained from the vehicle 12, 40, 51, 1060. In some implementations, the vehicle identifier 133 is obtained from the server 160. In still other implementations, the vehicle identifier 133 is entered using the GUI 131. In accordance with those latter implementations, the GUI 131 can include a GUI arranged like the GUI 185 shown in FIG. 37. The examples of a vehicle identifier discussed in Section VI of this description are applicable to the vehicle identifier 133.

The system identifier 134 includes an identifier of a system within a vehicle, such as the vehicle 12, 40, 51, 1060. In at least some implementations, the system identifier 134 indicates a system within a vehicle corresponding to the vehicle identifier 133. In some implementations, the system identifier 134 is obtained from the vehicle 12, 40, 51, 1060. In some implementations, the system identifier 134 is obtained from the server 160. In still other implementations, the system identifier 134 is entered using the GUI 131. In accordance with those latter implementations, the GUI 131 can include a GUI arranged like the GUI 181 shown in FIG. 38. In at least some implementations, the system identifier 134 is configured as a hexadecimal number used to identify a system within a vehicle data message. As an example, the system identifier 134 can include an identifier of an adaptive driver assistance system (ADAS), an audio system, a brake system, a chassis system, a coolant system, a vehicle body system, an electrical system, an engine system, an exhaust system, a fuel system, a navigation system, a powertrain system, a steering system, or a suspension system. Other examples of a system identified by the system identifier 134 are also possible.

The component identifier 135 includes an identifier of a component within a vehicle, such as the vehicle 12, 40, 51, 1060. In at least some implementations, the component identifier 135 indicates a component within a vehicle corresponding to the vehicle identifier 133 and/or within a system corresponding to the system identifier 134. In some implementations, the component identifier 135 is obtained from the vehicle 12, 40, 51, 1060. In some implementations, the component identifier 135 is obtained from the server 160. In still other implementations, the component identifier 135 is entered using the GUI 131. In accordance with those latter implementations, the GUI 131 can include a GUI arranged like the GUI 181 shown in FIG. 38. In at least some implementations, the component identifier 135 is configured as a hexadecimal number used to identify a component within a vehicle data message. As an example, the component identifier 135 can include an identifier of an ECU, an ECU-connected input device, an ECU-connected output device, or a sensor. Other examples of a component identified by the component identifier 135 are also possible.

The symptom identifier 136 includes an identifier of a symptom exhibited by or that can be exhibited by a vehicle, such as the vehicle 12, 40, 51, 1060. As an example, the symptom identifier 136 can include an identifier that indicates a malfunction indicator lamp within the vehicle is on steady or flashing. As another example, the symptom identifier 136 can include an identifier that indicates a diagnostic trouble code (DTC) set within the vehicle. In accordance with at least some implementations, a symptom identifier that indicates the DTC also indicates a status of the DTC, such as currently set active status or a currently inactive but previously active status. As yet another example, the symptom identifier 136 can include a textual description of a customer complaint, such as a customer complaint that can be entered using a complaint USC 373 shown in the GUI 181 shown in FIG. 38.

The vehicle data message database 137 includes data for generating a vehicle data message to request a PID parameter value from a vehicle. In at least some implementations, the vehicle data message database 137 includes a vehicle data message with a PID request that is configured according to the SAE J1979_201202 and/or ISO 15031-5 standards for E/E diagnostic test modes. As an example, PID request within a vehicle data message can include a service request, a PID, and an ECU identifier. In at least some implementations, the service request includes a mode $01 to request a current PID parameter value or a mode $02 to request a freeze frame PID parameter value.

In at least some implementations, a vehicle data message including a PID request can include a PID request that corresponds to a respective PID key element within a PID topic file. As an example, a vehicle data message with a PID request can be arranged as $07 $DF $02 $01 $05 $00 $00 $00 $00 $00. In that example vehicle data message, the fifth byte is the PID. FIG. 23A shows a PID key element 220 (e.g., <pidKey>ECT Sensor</pidKEY>), which corresponds to the aforementioned example PID request. In response to the processor 102 determining that a PID topic file includes PID key element 220, the processor 102 can refer to the vehicle data message database 137 to determine that the vehicle data message $07 $DF $02 $01 $05 $00 $00 $00 $00 $00 is to be transmitted to the vehicle 12 in order to request PID parameter values corresponding the ECT sensor PID. By including a vehicle data message including a PID request that corresponds to a PID key in the vehicle data message database 137, a PID topic sent to the computing system 100 does not need to include the data indicative of the PID request(s) or vehicle data messages that are to be sent to the vehicle 12.

A vehicle data message within the vehicle data message database 137, 177 can be contained in a PID list. A particular vehicle data message can be contained in multiple different PID lists. A PID list can include one or more PID list identifiers to distinguish that PID list from other PID lists stored in the vehicle data message database 137, 177. As an example, a PID list identifier can include a name of a PID list, such as a name shown between tags of a PID list name element 203 shown in FIG. 23A. As another example, a PID list identifier can include a vehicle identifier, such as a YMME for a particular type of vehicle. As yet another example, a PID list identifier can include a system identifier, such as such as a system identifier within a system element 210 shown in FIG. 23C. As still yet another example, a PID list identifier can include a component identifier, such as a name of a vehicle component.

Table G shows example PIDs, PID descriptions, and ECUs that provide PID parameter values in response to receiving a VDM including a PID. A PID in a PID list and/or an index value corresponding to a PID in the PID list can represent a PID, and PID description, and/or an identifier of an ECU using hexadecimal data.

TABLE G

| PID | PID description | ECU |
|---|---|---|
| 1 | Fuel system status | Powertrain control module |
| 2 | Calculated engine load | Powertrain control module |
| 3 | Engine coolant temperature | Powertrain control module |
| 4 | Short term fuel trim-bank 1 | Powertrain control module |
| 5 | Long term fuel trim-bank 1 | Powertrain control module |
| 6 | Fuel pump pressure | Powertrain control module |
| 7 | Intake manifold absolute pressure | Powertrain control module |
| 8 | Engine RPM | Powertrain control module |
| 9 | Vehicle speed | Powertrain control module |
| 10 | Timing advance | Powertrain control module |
| 11 | Intake air temperature | Powertrain control module |
| 12 | MAF air flow rate | Powertrain control module |
| 13 | Commanded EGR | Powertrain control module |
| 14 | EGR error | Powertrain control module |
| 15 | Fuel tank level input | Powertrain control module |
| 16 | Relative throttle position | Powertrain control module |
| 17 | Fuel type | Powertrain control module |
| 18 | Evaporator system vapor pressure | Powertrain control module |
| 19 | Mass air flow sensor | Powertrain control module |
| 20 | Intake manifold air temperature | Powertrain control module |
| 21 | Fuel injection timing | Powertrain control module |
| 22 | Engine oil temperature | Powertrain control module |
| 23 | Boost pressure control | Powertrain control module |
| 24 | Exhaust gas recirculation temperature | Powertrain control module |
| 25 | Turbocharger RPM | Powertrain control module |
| 26 | Wastegate control | Powertrain control module |
| 27 | Engine run time | Powertrain control module |
| 28 | Fuel pressure control system | Powertrain control module |
| 29 | Engine percent torque data | Powertrain control module |
| 30 | Injection pressure control system | Powertrain control module |
| 31 | Fuel pump voltage | Powertrain control module |

TABLE G-continued

| PID | PID description | ECU |
|---|---|---|
| 32 | Fuel pump relay | Powertrain control module |
| 33 | Short term fuel pump trim | Powertrain control module |
| 34 | Air conditioning compressor state | Powertrain control module |
| 35 | Air conditioning high side pressure | Powertrain control module |
| 36 | Air conditioning low side pressure | Powertrain control module |
| 37 | Engine control ECU DTC | Powertrain control module |
| 38 | Anti-lock brake ECU DTC | Anti-lock brake control module |
| 39 | Traction control ECU DTC | Traction control system module |
| 40 | Airbag system ECU DTC | Supplemental inflatable restraint control mod. |
| 41 | Powertrain control ECU DTC | Powertrain control module |
| 42 | Oil change life | Powertrain control module |
| 43 | Engine control ECU calibration number | Powertrain control module |
| 44 | Anti-lock brake ECU calibration number | Anti-lock brake control module |
| 45 | Traction control ECU calibration number | Traction control system module |
| 46 | Airbag system ECU calibration number | Supplemental inflatable restraint control mod. |
| 47 | Powertrain control ECU calibration number | Powertrain control module |
| 48 | Air conditioning switch voltage | HVAC control module |
| 49 | Fuel rail pressure | Powertrain control module |
| 50 | HVAC actuator direction | HVAC control module |
| 51 | HVAC fan motor switch | HVAC control module |
| 52 | HVAC motor speed percentage | HVAC control module |
| 53 | HVAC interior ambient air temperature | HVAC control module |
| 54 | Fuel pump state | |
| 55 | HVAC exterior ambient air temperature | HVAC control module |
| 56 | HVAC sun load sensor | HVAC control module |
| 57 | Fan speed indicated | HVAC control module |
| 58 | Air conditioning compressor status | HVAC control module |
| 59 | Fan speed demanded | HVAC control module |
| 60 | Evaporator temperature | HVAC control module |
| 61 | Rear cabin interior ambient temperature | HVAC control module |
| 62 | Misfire counts | Powertrain control module |
| 63 | O2 sensor-bank 1-sensor 1 | Powertrain control module |
| 64 | O2 sensor-bank 1-sensor 2 | Powertrain control module |
| 65 | O2 sensor-bank 2-sensor 1 | Powertrain control module |
| 66 | O2 sensor-bank 2-sensor 2 | Powertrain control module |
| 67 | Fan speed indicated | HVAC control module |
| 68 | Audio volume | Radio control module |
| 69 | Speaker fade setting | Radio control module |
| 70 | Speaker balance setting | Radio control module |
| 71 | Horn input | Body control module |
| 72 | Left front door lock switch status | Body control module |
| 73 | Right front door lock switch status | Body control module |
| 74 | Left rear door lock switch status | Body control module |
| 75 | Left rear door lock switch status | Body control module |
| 76 | Battery voltage | Powertrain control module |
| 77 | Brake pad wear sensors | Anti-lock brake control module |

A component test can include computer-readable program instructions (e.g., a component test module) executable to perform the component test. Execution of a component test module can include configuring the meter 151 or the oscilloscope 155 for performing the component test for the component and/or vehicle to be tested. Table H1 includes example index values/identifiers and component tests. The index values/identifiers can be used within computer-readable program instructions and/or communications (e.g., a communication from the server 22 including a portion of the index values/identifiers shown in Table H1) to identify a component test that is to be executed. A test set and/or a test set file can include an index value corresponding to a component test.

TABLE H1

| Index Value/ Identifier | Component Test |
|---|---|
| CT1 | Frequency test |
| CT2 | Signature test |
| CT3 | Out of range no signal test |
| CT4 | DC Voltage test |
| CT5 | Current test |
| CT6 | Resistance test |
| CT7 | Capacitance test |
| CT8 | Temperature test |
| CT9 | Pressure test |
| CT10 | Tail pipe emission test |
| CT11 | Continuity test |
| CT12 | Fuel pump voltage test |
| CT13 | HVAC actuator voltage test |
| CT14 | Fuel pump signature test |
| CT15 | HVAC actuator temperature test |
| CT16 | Exhaust gas cylinder balance test |
| CT17 | Air conditioning pressure test |
| CT18 | Air conditioning test during recycle and recharge |
| CT19 | Crankshaft position sensor |
| CT20 | Camshaft position sensor |
| CT21 | Throttle position sensor |
| CT22 | AC Voltage test |

A functional test in the computing system 100 can include computer-readable program instructions (e.g., a functional test module) executable to request performance of a functional test at the vehicle 12, 40, 51, 1060. Execution of a functional test module can include configuring the processor 102 and/or the vehicle communications transceiver 118 for transmitting a VDM to the vehicle for requesting performance of the functional test. Table H2 includes example index values/identifiers and functional tests. The index values/identifiers can be used within computer-readable program instructions and/or communications (e.g., a communication from the server 22 including a portion of the index values/identifiers shown in Table H2) to identify a functional test that is to be requested to be performed. A test set and/or a test set file can include an index value corresponding to a functional test.

TABLE H2

| Index Value/ Identifier | Functional Test |
|---|---|
| FT1 | Fuel pump engagement |
| FT2 | Close evaporator canister vent |
| FT3 | Engine cooling fan high |
| FT4 | Engine cooling fan low |
| FT5 | Fuel injector #1 on |
| FT6 | Fuel injector #2 on |
| FT7 | Fuel injector #3 on |
| FT8 | Fuel injector #4 on |
| FT9 | Fuel injector #5 on |
| FT10 | Fuel injector #6 on |
| FT11 | Fuel injector #7 on |
| FT12 | Fuel injector #8 on |
| FT13 | EGR valve open |
| FT14 | EGR valve closed |
| FT15 | Lock driver door |
| FT16 | Spark plug coil #3 off |
| FT17 | A/C switch on |
| FT18 | Unlock driver door |
| FT19 | Throttle position |

A reset procedure in the computing system 100 can include computer-readable program instructions (e.g., a reset procedure test module) executable to request performance of a reset procedure at the vehicle 12, 40, 51, 1060. Execution of a reset procedure module can include configuring the processor 102 and/or the vehicle communications transceiver 118 for transmitting a VDM to the vehicle for requesting performance of the reset procedure. Table H3 includes example index values/identifiers and reset procedures. The index values/identifiers can be used within computer-readable program instructions and/or communications (e.g., a communication from the server 22 including a portion of the index values/identifiers shown in Table H3) to identify a reset procedure that is to be requested to be performed. A test set and/or a test set file can include an index value corresponding to a reset procedure.

TABLE H3

| Index Value/ Identifier | Reset Procedure |
|---|---|
| RP1 | Oil change interval reset |
| RP2 | Vehicle theft deterrent reset |
| RP3 | Ignition key identifier reset |
| RP4 | VIN learn reset |
| RP5 | Calibrate engine control ECU |
| RP6 | Calibrate anti-lock brake ECU |
| RP7 | Calibrate traction control ECU |
| RP8 | Calibrate airbag system ECU |
| RP9 | Calibrate powertrain control ECU |
| RP10 | Clear engine control ECU DTC |
| RP11 | Clear antilock brake ECU DTC |
| RP12 | Clear traction control ECU DTC |
| RP13 | Clear airbag system ECU DTC |
| RP14 | Clear powertrain control ECU DTC |
| RP15 | Reserved |
| RP16 | Reserved |
| RP17 | MAP sensor reset |

The PID parameter value 138 includes data that the computing system receives from a vehicle in response to transmission of a vehicle data message including a PID request. The vehicle data message database 137, the PID parameter value 138, or some other portion of memory 104 can include a formula for converting a PID parameter value received from a vehicle. After converting the PID parameter value, the PID parameter value can be displayed on the display 122. In at least some implementations, an original equipment manufacturer (OEM) of a vehicle defines the formula for converting a PID parameter value received from a vehicle. In at least some implementations, a PID parameter value received from a vehicle indicates a state of a component or system with binary states, such as on/off or engaged or un-engaged.

The PID topic file 139 can include data to display any aspect of a PID topic or PID topic file described in this description. As an example, the PID topic file 139 can include the type of data described with respect to any table (e.g., Table A to Table Y) in this description. The processor 102 can use the PID topic file 139 and one or more from among the vehicle identifier 133, the system identifier 134, the component identifier 135, or the symptom identifier 136 to determine content of to display in a GUI showing a PID topic.

In some implementations, a PID topic stored within the PID topic file 139 includes a computer-readable file arranged as an XML, file. As an example and as represented by FIG. 23A to FIG. 23C and by FIG. 25A to FIG. 25C, a PID topic can include an XML file. As another example, a PID topic file can include a computer-readable file arranged as a JavaScript Object Notation (JSON) file having a JSON file extension. As yet another example, a PID topic file can include a computer-readable flat file, such as a comma separated variable (CSV) file or some other type of computer-readable flat file. As still yet another example, a PID topic file can include a hyper-text transfer protocol (HTML) file, such as an HTML file the server 160 provides to the computing system 100.

In at least some implementations, the computing system 100 receives a PID topic file from the server 160 by downloading the PID topic file over a communication link. The processor 102 can cause that downloaded PID topic file to be stored within the PID topic file 139. In accordance with these implementations, the computing system 100 can generate a custom PID topic file and store the custom PID topic file within the PID topic file 139. In at least some of those implementations, the custom PID topic file is not transferred away from the computing system 100. In other implementations, the computing system 100 transmits the custom PID topic file to the server 160 for storage within the PID topic file 179. Afterwards, the server 160 can transfer the custom PID topic file generated using the computing system 100 to a computing system operable to display a PID topic other than the computing system 100.

Figure 50:
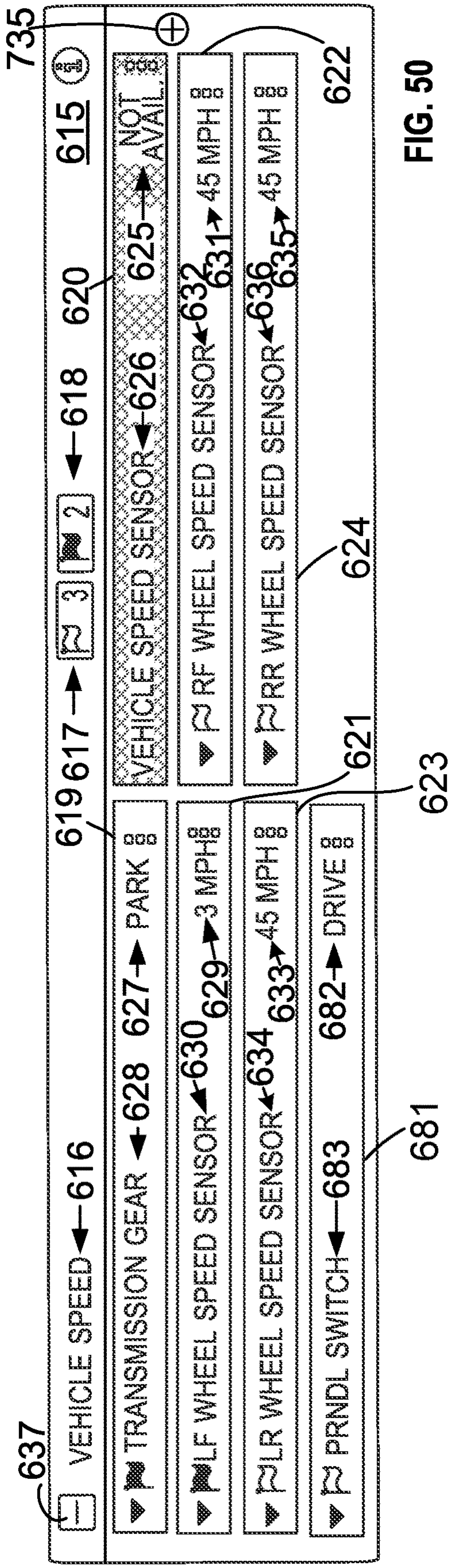
Figure 51:
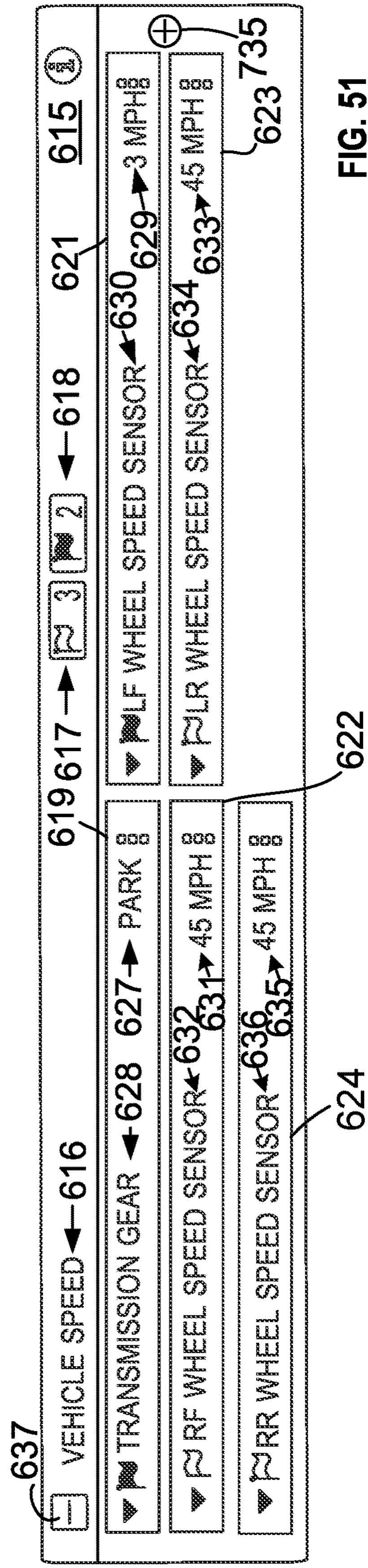

A PID topic file can be specific to one or more vehicle models. A PID topic file is specific to one or more vehicle models if the PID topic file corresponds to the one or more vehicle models and all of the PIDs corresponding to the PID topic file are supported by each vehicle model of the one or more vehicle models. Alternatively, a PID topic file can be generic to one or more vehicle models. A PID topic file is generic to one or more vehicle models if the computing system 100 and/or the server 160 use the PID topic file with respect to a vehicle model that does not support one or more PIDs corresponding to the PID topic file. FIG. 50 shows a container that includes a sub-container providing an indication that a PID corresponding to the sub-container is not supported by a vehicle. FIG. 51 shows a container in which a sub-container for the unsupported PID has been omitted.

A custom PID topic file based on the first PID topic file can be displayed at a time after a threshold value, such as a minimum or maximum threshold value corresponding to a PID within the first PID topic file has been modified. The processor 102 can compare the threshold values corresponding to the custom PID topic file to the threshold values of the first PID topic file. If the processor 102 determines a difference between the minimum threshold values of the custom and first PID topic files, the processor 102 can (when outputting the custom PID topic file on the display) output an indication that the minimum threshold value has changed since the custom PID topic file was generated. Similarly, if the processor 102 determines a difference between the maximum threshold values of the custom and first PID topic files, the processor 102 can (when outputting the custom PID topic file on the display) output an indication that the maximum threshold value has changed since the custom PID topic file was generated.

The GUI content 140 includes content configured for populating into the GUI 131. The GUI 131 can include the GUI content 140. The computing system 100 can receive the GUI content 140 from the server 160. The processor 102 can execute the CRPI 130 to populate the GUI 131 with the GUI content 140. As an example, the GUI content 140 can include any or all of the supplemental information shown in one or more of a sub-container 400, 401, 402, 403, 404 shown in FIG. 34. The GUI content 140 can be associated with one or more from among the vehicle identifier 133, the system identifier 134, the component identifier 135, symptom identifier 136, or the PID topic file 139. Additionally or alternatively, the GUI content 140 can include content obtained from the vehicle 12, 40, 51, 1060.

B. Server

Figure 22:
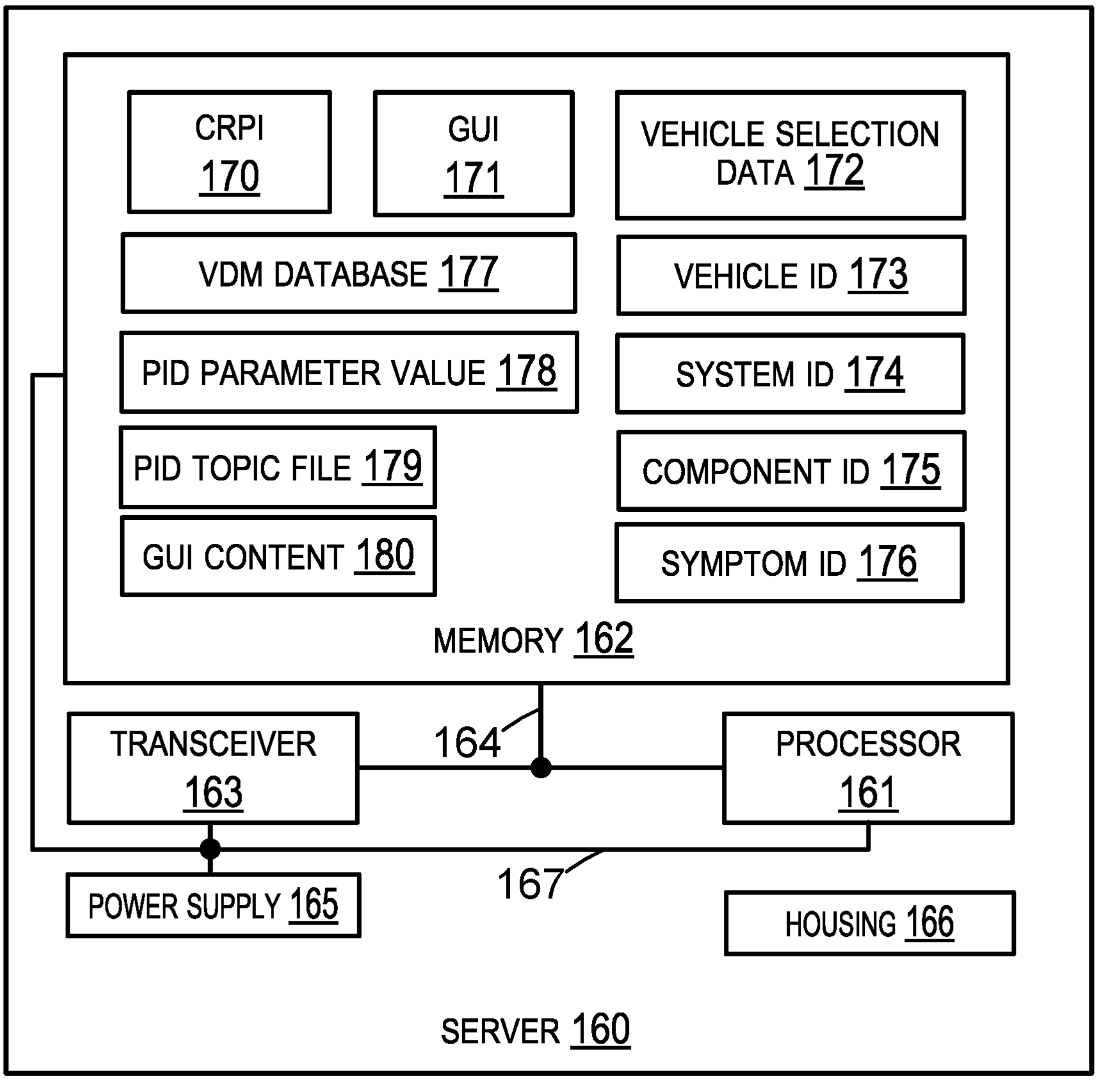
FIG. 22 is a block diagram of a server in accordance with the example implementations.

FIG. 22 is a block diagram of a server 160 in accordance with one or more example implementations. The server 160 includes a processor 161, a memory 162, a transceiver 163, and a data bus 164. The data bus 164 operatively connects the processor 161, the memory 162, and the transceiver 163 to one another. In other words, the data bus 164 provides an operative connection between two or more of the processor 161, the memory 162, and/or the transceiver 163. The server 22 shown in FIG. 2 and FIG. 3 can be arranged like the server 160. The server 160 can be operational within the system 20, 30 in place of or in addition to the server 22.

With the operative connection provided by the data bus 164, the processor 161 is operable to request and receive data from the memory 162. In other words, the processor 161 is operable to read data written into the memory 162. With the operative connection provided by the data bus 164, the processor 161 is operable to provide and store data within the memory 162. In other words, the processor 161 is operable to write data into the memory 162. With the operative connection provided by the data bus 164, the processor 161 is operable to receive data received by the transceiver 163 and to provide the transceiver 163 with data that is to be transmitted by the transceiver 163. Other examples of functionality available via the operative connection provided by the data bus 164 are also possible.

The description of a processor above refers to "any other processor discussed in this description. The processor 161 is such a processor and thus the aforementioned description pertains to the processor 161. Moreover, for the implementations in which the processor 161 is arranged like the INTEL® multicore microprocessor, the processor 161 can include one or more INTEL® XEON® processors having between four and twenty-eight cores. In at least some implementations of the server 160, the processor 161 can be programmed to perform any function(s) described in this description as being performed by the server 22, 160.

The description of a transceiver above refers to "any other transceiver discussed in this description. The transceiver 163 is such a transceiver and thus the aforementioned description pertains to the transceiver 163.

The description of a memory above refers to "any other memory discussed in this description. The memory 162 is such a memory and thus the aforementioned description pertains to the memory 162.

In at least some implementations, the server 160 includes a power supply 165. The description of a power supply above refers to "any other power supply discussed in this description. The power supply 165 is such a power supply and thus the aforementioned description pertains to the power supply 165. In at least some implementations of the server 160, a power distribution circuit(s) within and/or connected to the power supply include an electrical bus 167 that connects to the processor 161, the memory 162, and the transceiver 163.

In at least some implementations, the server 160 includes a housing 166. The housing 166 surrounds at least a portion of the following: the processor 161, the memory 162, the transceiver 163, the data bus 164, and/or the power supply 165. The housing 166 can support a substrate. In at least some example implementations, at least a portion of the following: the processor 161, the memory 162, the transceiver 163, the data bus 164, and/or the power supply 165 is/are mounted on and/or connected to a substrate of the housing 166. In at least some implementations, the housing 166 includes a rack and/or cabinet having one or more shelves.

In accordance with the example implementations, the server 160 can determine, generate, store, transmit, receive, and/or otherwise use a variety of computer-readable data. At least some of the computer-readable data can be stored in the memory 162. As an example, the memory 162 contains one or more from among: computer-readable programming instructions (CRPI) 170, a GUI 171, vehicle selection data 172, a vehicle identifier 173, a system identifier 174, a component identifier 175, a symptom identifier 176, a vehicle data message database 177, a PID parameter value 178, a PID topic file 179, and GUI content 180. Additionally, the memory 162 can contain any of the content within the system memory 504 shown in FIG. 62 and/or within the computer program product 530 shown in FIG. 36.

The CRPI 170 include program instructions executable by a processor, such as the processor 161. As an example, the CRPI 170 can include program instructions that are executable to cause the server 160 to perform any function described as being performed by the server 22, 160, by the processor 161, and/or by some other component of the server 160.

As an example, the CRPI 170 can include one or more from among the PI-2, PI-3, PI-4, PI-5, PI-6, PI-7, PI-8, PI-9, PI-10, PI-11 or PI-12. When executing the PI-10, the server 160 can request the computing system 100 to execute the PI-10 stored in the memory 104 in order to request performance of a functional test or a reset function on a vehicle.

As yet another example, the CRPI 170 can include program instructions executable by the processor 161 to generate a message for the computing system and to send the message for the computing system to the computing system 100. The message for the computing system can include a response based on data received from the computing system 100 (e.g., data indicative of a USC selected from the display 122), and/or data the computing system 100 received from a vehicle (e.g., such as a PID parameter value). As an example, the response can include a PID topic file, a GUI, or any other data described herein as being transmitted from a server to the computing system 14, 100. For purposes of this description, the program instructions discussed in this paragraph are referred to as PI-20.

The GUI 171 includes a GUI that the processor 161 is operable to output to the computing system 100 for displaying on the display 122. In at least some implementations, the GUI 171 includes a template that the processor 161 uses to generate a GUI for outputting to the computing system 100. The processor 161 can select the template from among multiple templates that are configured for generating a GUI with a particular number of container(s), such as one, two, three, four, five, six, seven, eight, nine, ten, eleven or twelve container(s). Other examples of a template with a different quantity of container(s) are also possible. In addition to selecting a template a particular number of container(s), the processor 161 can further select a template from among multiple templates that are configured for generating a GUI with a particular number of sub-containers within each container defined for the template. As an example, the quantity of sub-containers in a container can include one, two, three, four, five, six, seven, eight, nine, ten, eleven, twelve or some other number of sub-containers. The GUI 171 can include a GUI shown in any of the drawings, a GUI that includes any aspects shown in one or more of the drawings, and/or some other GUI.

The vehicle selection data 172 includes data for determining the vehicle identifier 173. In at least some implementations, the vehicle selection data 172 includes data to identify a vehicle based on selections entered using a GUI, such as the selections that can be made using the GUI 185 shown in FIG. 37. In at least some implementations, the vehicle selection data 172 includes data for determining the vehicle identifier 173 by decoding a vehicle identification number (VIN) entered via a VIN USC 364 shown in the GUI 185, or an image of a code representing a VIN, such as the image of the code shown in the GUI 185.

The vehicle identifier 173 includes an identifier of a vehicle, such as the vehicle 12, 40, 51, 1060. In some implementations, the vehicle identifier 173 is obtained indirectly from the vehicle 12, 40, 51, 1060 via the computing system 100. In some implementations, the server 160 receives from the computing system 100 a vehicle identifier entered using the GUI 131. The examples of a vehicle identifier discussed in Section VI of this description are applicable to the vehicle identifier 173.

The system identifier 174 includes an identifier of a system within a vehicle, such as the vehicle 12, 40, 51, 1060. In at least some implementations, the system identifier 174 indicates a system within a vehicle corresponding to the vehicle identifier 173. In some implementations, the system identifier 174 is obtained indirectly from the vehicle 12, 40, 51, 1060 via the computing system 100. In other implementations, the server 160 receives from the computing system 100 a system identifier entered using the GUI 131. In at least some implementations, the system identifier 174 is configured as a hexadecimal number used to identify a system within a vehicle data message. As an example, the system identifier 174 can include an identifier of an adaptive driver assistance system (ADAS), an audio system, a brake system, a chassis system, a coolant system, a vehicle body system, an electrical system, an engine system, an exhaust system, a fuel system, a navigation system, a powertrain system, a steering system, or a suspension system. Other examples of a system identified by the system identifier 174 are also possible.

The component identifier 175 includes an identifier of a component within a vehicle, such as the vehicle 12, 40, 51, 1060. In at least some implementations, the component identifier 175 indicates a component within a vehicle corresponding to the vehicle identifier 173 and/or within a system corresponding to the system identifier 174. In some implementations, the component identifier 175 is obtained from the vehicle 12, 40, 51, 1060. In some implementations, the component identifier 175 is obtained from the computing system 100 after a component identifier is entered using the GUI 171. In accordance with those latter implementations, the GUI 171 can include a GUI arranged like the GUI 181 shown in FIG. 38. In at least some implementations, the component identifier 175 is configured as a hexadecimal number used to identify a component within a vehicle data message. As an example, the component identifier 175 can include an identifier of an ECU, an ECU-connected input device, an ECU-connected output device, or a sensor. Other examples of a component identified by the component identifier 175 are also possible.

The symptom identifier 176 includes an identifier of a symptom exhibited by or that can be exhibited by a vehicle, such as the vehicle 12, 40, 51, 1060. As an example, the symptom identifier 176 can include an identifier that indicates a malfunction indicator lamp within the vehicle is on steady or flashing. As another example, the symptom identifier 176 can include an identifier that indicates a diagnostic trouble code (DTC) is set within the vehicle. In accordance with at least some implementations, a symptom identifier that indicates the DTC also indicates a status of the DTC, such as currently set active status or a currently inactive but previously active status. As yet another example, the symptom identifier 176 can include a textual description of a customer complaint, such as a customer complaint that can be entered using a complaint USC 373 shown in the GUI 181 shown in FIG. 38.

The vehicle data message database 177 includes data for generating a vehicle data message. In at least some implementations, at least a portion of the vehicle data message database 177 is configured according to the SAE J1979_201202 and/or ISO 15031-5 standards for E/E diagnostic test modes. The data within the vehicle data message database 177 can include data for generating a vehicle data message to request a PID parameter value from a vehicle. As an example, a vehicle data message can include a service request, a PID, and an ECU identifier. In at least some implementations, the service request includes a mode $01 to request a current PID parameter value or a mode $02 to request a freeze frame PID parameter value. The server 160 can transmit the vehicle data message to the computing system 100 so that the computing system 100 can request PID parameter values from a vehicle and to populate into a GUI.

The PID parameter value 178 can include data that the server 160 receives from the computing system 100. The vehicle data message database 177, the PID parameter value 178, or some other portion of memory 104 can include a formula for converting a PID parameter value received from the computing system 100. After converting the PID parameter value, the PID parameter value can be output to the computing system 100 for displaying on the display 122.

The PID topic file 179 can include data to display any aspect of a PID topic described in this description. As an example, the PID topic file 179 can include the type of data described with respect to Table A to Table Y in this description. The processor 161 can use the PID topic file 179 and one or more from among the vehicle identifier 173, the system identifier 174, the component identifier 175, or the symptom identifier 176 to determine content to display in a GUI showing a PID topic.

The GUI content 180 includes content configured for populating into the GUI 171. The GUI 171 can include the GUI content 180. The server 160 can transmit the GUI content 180 to the computing system 100. The processor 161 can execute the CRPI 170 to populate the GUI 171 with the GUI content 180. As an example, the GUI content 180 can include any or all of the supplemental information shown in one or more of a sub-container 400, 401, 402, 403, 404 shown in FIG. 34. Other examples of supplemental information corresponding to a PID topic other than the PID topic shown in the GUI 296 are also possible. The GUI content 180 can be associated with one or more from among the vehicle identifier 173, the system identifier 174, the component identifier 175, symptom identifier 176, or the PID topic file 179.

III. Example Operation

A. First Flowchart

FIG. 59 shows a flow chart depicting a set 590 of functions of a method in accordance with the example implementations. Two or more functions and/or portions of two or more functions of the set 590 of functions can be performed at the same time. The functions of the set 590 of functions can be performed by the computing system 14, 100. The computing system 14, 100 can perform other function(s) and/or operate in other operating state(s) than those shown in FIG. 59. One or more of functions within the set 590 can be performed by the server 22, 160.

Block 591 includes determining, by a processor while a computing system operates in a first state, a vehicle identifier corresponding to a vehicle operatively connected to the computing system. The computing system includes the processor and a display. The display is powered on, but does not display any PID condition indicator while the computing system operates in the first state. A component identifier corresponds to a component of the vehicle. A system identifier corresponds to a system of the vehicle. A symptom identifier corresponds to a symptom the vehicle can exhibit.

The processor discussed in the set 590 of functions can include the processor 102. The display discussed in the set 590 of functions can include the display 122. The vehicle discussed in the set 590 of functions can include the vehicle 12, 40, 51, 1060. The memory 104 can include system data that indicates an operating state of the computing system 100. The processor 102 can execute the CRPI 130 to track an operating state using a state diagram stored in the system data. The processor 102 can execute the CRPI 130 to modify the state diagram based on various aspects, such an input entered via the user interface 108 and/or a communication received or transmitted via the transceiver 106. Additionally or alternatively, the state diagram can indicate data shown in Table A to Table Y. Furthermore, the processor 161 can perform one or more of the functions of the set 590.

Next, block 592 includes determining, by the processor while the computing system operates in the first state, the component identifier, the system identifier, and/or the symptom identifier. In at least some implementations, the determination at block 592 is based on content of a vehicle data message received from a vehicle. As an example, the determination can be based on a source identifier of an ECU that transmitted the vehicle data message. In at least some implementations, the determination at block 592 is based on inputs made via the user interface 108 and a GUI, such as the GUI 181 shown in FIG. 38.

Next, block 593 includes determining, by the processor, a first PID topic corresponding to the component identifier, the system identifier, and/or the symptom identifier. One or more PIDs correspond to the first PID topic. In at least some implementations, the first PID topic further corresponds to the vehicle identifier.

In at least some implementations, determining the first PID topic includes determining a PID topic file that the processor can use to output the first PID topic on the display 122. Determining the PID topic file can include searching the PID topic file 139, 179. The processor 102 can search the PID topic file 139, 179 based on the component identifier, the system identifier, and/or the symptom identifier, and in at least some implementations, the vehicle identifier. To search the PID topic file 179, the processor 161 can receive, from the computing system 100, a request including the component identifier, the system identifier, and/or the symptom identifier. That request can also include the vehicle identifier.

Searching for the PID topic file within the PID topic file 139, 179 can include performing a text search of a set of PID topic files and/or performing a metadata search of metadata associated with PID topic files within the set of PID topic files.

In at least some implementations, determining the first PID topic includes the processor 102 reading a PID topic file provided to the computing system 100 from the server 160. In at least some implementations, determining the first PID topic includes the processor 102 reading a PID topic file that the processor 102 found during a search of the PID topic file 139.

In at least some implementations, determining the first PID topic can include the processor reading a PID topic file generated by aggregating aspects of multiple PID topic files. Generating the PID topic file can occur in response to the processor 102, 161 determining that the component identifier, the system identifier, and/or the symptom identifier correspond to multiple PID topic files. In at least some implementations, the component identifier, the system identifier and/or the symptom identifier include multiple identifiers that correspond to multiple PID topic files. A PID topic I in Table I below can result from aggregating PID topic G and PID topic H shown in Table I.

In at least some implementations, a PID topic file corresponding to a symptom includes more PIDs than a PID topic file corresponding to a component, because the PID topic file corresponding to the symptom includes PIDs corresponding to multiple components. For example, a PID topic file corresponding to a symptom referred to as "no start" (meaning the engine does not start) can include PIDs corresponding to multiple components of a vehicle, such as an ignition switch, a fuel pump, a starter motor, and an anti-theft module. A PID topic file corresponding to just one of those components would include PIDs for that one component, but not PIDs for those other components unless they are a PID common to multiple components.

In accordance with at least some implementations, a PID topic can be selected from a list of PID topics output on the display 122. In accordance with at least some of those implementations, a PID topic can be selected from the list without the processor having determined a component, system, or symptom for a vehicle connected to the computing system 14.

Next, block 594 includes switching, by the processor, operation of the computing system from the first state to a second state. The computing system is operable to display a PID condition indicator on the display while operating in the second state. Switching operation of the computing system can include the processor 102 modifying the state diagram discussed above to indicate that the computing system 100 is operating in the second state instead of the first state. In at least some implementations, the second state includes a state in which PIDs corresponding to a PID condition are related to one or more thresholds for comparing to PID parameter values. The second state can be referred to as an intelligent diagnostic state (or mode). Examples of GUIs pertaining to the intelligent diagnostics state are shown throughout the drawings.

Next, block 595 includes receiving, by the processor while the computing system operates in the second state, parameter values automatically requested from the vehicle for the one or more PIDs corresponding to the first PID topic.

Next, block 596 includes determining, by the processor while the computing system operates in the second state, a PID condition associated with each respective PID corresponding to the first PID topic. The PID condition associated with each respective PID corresponding to the first PID topic indicates whether at least one of the received parameter values corresponding to the respective PID has breached a respective PID threshold or whether none of the received parameter values corresponding to the respective PID has breached any respective PID threshold.

Next, block 597 includes displaying, on the display while the computing system operates in the second state, a descriptor of the first PID topic and a first particular PID condition indicator corresponding to the first PID topic. The first particular PID condition indicator corresponding to the first PID topic indicates a first quantity of PIDs. The first quantity of PIDs indicates how many PIDs corresponding to the first PID topic are associated with the PID condition in which at least one of the received parameter values corresponding to the respective PID has breached a respective PID threshold or how many PIDs corresponding to the first PID topic are associated with the PID condition in which none of the received parameter values corresponding to the respective PID has breached any respective PID threshold.

In at least some implementations of a method including the set 590 of functions, the method further includes displaying, on the display while the computing system operates in the first state and after determining the vehicle identifier and the component identifier, the system identifier, and/or the symptom identifier, a first user-selectable control. Switching operation of the computing system from the first state to the second state occurs in response to a selection of the first user-selectable control.

In at least some implementations of a method including the set 590 of functions, switching operation of the computing system from the first state to the second state occurs in response to determining the first PID topic.

In at least some implementations of a method including the set 590 of functions, the method further includes receiving, by the processor 102, vehicle data transmitted by the vehicle. The vehicle data is indicative of a diagnostic trouble code set active within the vehicle. Determining the component identifier, the system identifier, and/or the symptom identifier is based on the diagnostic trouble code. In at least some of those implementations, the diagnostic trouble code set active within the vehicle includes a diagnostic trouble code set active by the component or by an electronic control unit that is within the vehicle that is: (i) operatively connected to the component, (ii) part of the system, and/or (iii) operatively connected to the component and part of the system. Transmission of the vehicle data to the processor 102 can include transmission of one or more vehicle data messages containing the vehicle data.

In at least some implementations of a method including the set 590 of functions, determining the component identifier, the system identifier, and/or the symptom identifier includes determining at least a first identifier and a second identifier. Moreover, determining the first PID topic includes aggregating a PID topic corresponding to the first identifier and a PID topic corresponding to the second identifier. The method according to these implementations can further include determining the one or more PIDs corresponding to the first PID topic by aggregating PIDs corresponding to the PID topic corresponding to the first identifier, and PIDs corresponding to the PID topic corresponding to the second identifier. The first identifier includes a first component identifier and the second identifier includes a second component identifier, a first system identifier, or a first symptom identifier. Alternatively, the first identifier includes the first system identifier and the second identifier includes the first component identifier, a second system identifier, and/or the first symptom identifier. Alternatively, the first identifier includes the first symptom identifier and the second identifier includes the first component identifier, the first system identifier, or a second symptom identifier.

In at least some of the implementations described in the preceding paragraph, aggregating the PIDs corresponding to the PID topic corresponding to the first identifier and the PIDs corresponding to the PID topic corresponding to the second identifier includes omitting a particular PID corresponding to the PID topic corresponding to the second identifier because the particular PID is duplicative of a PID corresponding to the PID topic corresponding to the first identifier.

In at least some implementations of a method including the set 590 of functions, the method further includes determining, by the processor 102, a second PID topic corresponding to the component identifier, the system identifier, and/or the symptom identifier. The one or more PIDs correspond to the second PID topic. The method further includes receiving, by the processor 102 while the computing system operates in the second state, parameter values automatically requested from the vehicle for the one or more PIDs corresponding to the second PID topic. Additionally, the method includes determining, by the processor 102 while the computing system operates in the second state, a PID condition associated with each respective PID corresponding to the second PID topic. The PID condition associated with each respective PID corresponding to the second PID topic indicates whether at least one of the received parameter values corresponding to the respective PID has breached a respective PID threshold or whether none of the received parameter values corresponding to the respective PID has breached any respective PID threshold. Furthermore, the method includes displaying, on the display while the computing system operates in the second state, a descriptor of the second PID topic and a second particular PID condition indicator corresponding to the second PID topic. The second particular PID condition indicator corresponding to the second PID topic indicates a second quantity of PIDs. The second quantity of PIDs indicates how many PIDs corresponding to the second PID topic are associated with the PID condition in which at least one of the received parameter values corresponding to the respective PID has breached a respective PID threshold or how many PIDs corresponding to the second PID topic are associated with the PID condition in which none of the received parameter values corresponding to the respective PID has breached any respective PID threshold.

In at least some of the implementations described in the preceding paragraph, the descriptor of the first PID topic and the indicator of the PID condition for each of the one or more PIDs corresponding to the first PID topic are displayed together within a first container. Additionally, the descriptor of the second PID topic and the indicator of the PID condition for each of the one or more PIDs corresponding to the second PID topic are displayed together as a second container separate from the first container. Furthermore, the first container and the second container are initially displayed in a first order. Furthermore still, the method of these implementations includes determining a user-selection to change an order or a change in the PID condition for each of the one or more PIDs corresponding to the first PID topic and the PID condition for each of the one or more PIDs corresponding to the second PID topic. Finally, the method of these implementations further include displaying the first container and the second container in a second order different than the first order based on the user-selection to change the order or the change in the PID condition for each of the one or more PIDs corresponding to the first PID topic and the PID condition for each of the one or more PIDs corresponding to the second PID topic.

In at least some of the implementations described in the preceding paragraph, the first order is: an alpha-numeric order, a reverse-alpha-numeric order, an order based on quantities of PIDs for which the computing system has received out-of-range parameter values and/or unexpected parameter values, from a greatest quantity to a least quantity, an order based on quantities of PIDs for which the computing system has received out-of-range parameter values and/or unexpected parameter values, from a greatest quantity to a least quantity, an order based on quantities of PIDs for which the computing system has received out-of-range parameter values and/or unexpected parameter values, from a greatest percentage to a lowest percentage, an order based on quantities of PIDs for which the computing system has received out-of-range parameter values and/or unexpected parameter values, from the lowest percentage to the greatest percentage, or a user-selected order. Moreover, the second order is a different one of: the alpha-numeric order, the reverse-alpha-numeric order, the order based on quantities of PIDs for which the computing system has received out-of-range parameter values and/or unexpected parameter values, from the greatest quantity to the least quantity, the order based on quantities of PIDs for which the computing system has received out-of-range parameter values and/or unexpected parameter values, from the least quantity to the greatest quantity, the order based on quantities of PIDs for which the computing system has received out-of-range parameter values and/or unexpected parameter values, from the greatest percentage to the lowest percentage, the order based on quantities of PIDs for which the computing system has received out-of-range parameter values and/or unexpected parameter values, from the lowest percentage to the greatest percentage, or the user-selected order.

In at least some implementations of a method including the set 590 of functions, displaying the descriptor of the first PID topic and the first particular PID condition indicator corresponding to the first PID topic includes displaying a container including: (i) the descriptor of the first PID topic, (ii) the first particular PID condition indicator corresponding to the first PID topic, and (iii) one or more sub-containers. Additionally, each of the one or more sub-containers includes an alpha-numeric indicator of a particular PID and a parameter value descriptor associated with the particular PID.

As an example, a parameter value descriptor associated with the particular PID includes a numerical value, such as 0, 0.0, 100.5, or 2,550. As another example, a parameter value descriptor associated with the particular PID includes a unit descriptor, such as pounds per square inch (PSI), kilopascals (kPa), revolutions per minute (RPM) or volts.

As another example, a parameter value descriptor associated with the particular PID includes a textual word, acronym, or abbreviation, such as (on, off), (engaged, disabled), (active, inactive), (lock, unlock), (up, down), (mute, unmute), (up-shift, down-shift), (left, right), (front, rear), or (park, reverse, neutral, drive, low). Each set of textual words, acronyms, or abbreviations within a pair of round brackets above are examples of alternative expected values that can be represented by a PID parameter value. Examples of PIDs that can have expected values of on or off, engaged or disabled, or active or inactive include a solenoid status, a motor status, or a switch status. Examples of PIDs that can have expected values of lock or unlock include door lock position or torque converter clutch status. Examples of PIDs that can have expected values of up or down include window motor switch status or transmission shift request indicator. Examples of PIDs that can have expected values of mute or unmute include audio speaker status. Examples of PIDs that can have expected values of up-shift or down-shift include transmission shift request indicator. Examples of PIDs that can have expected values of left or right include turn signal switch status or audio balance settings. Examples of PIDs that can have expected values of front or rear include audio fade settings. Examples of PIDs that can have expected values of park, reverse, neutral, drive, or low include transmission gear selection status. Other examples of PID that can have expected values listed in the rounded brackets above are also possible.

In at least some of the implementations described three paragraphs above, the one or more sub-containers includes multiple sub-containers, and the multiple sub-containers are initially arranged in a first order of sub-containers within the container. In these implementations, the method also includes displaying the multiple sub-containers in a second order of sub-containers different than the first order of sub-containers. The second order is based on a PID condition for at least one of the one or more PIDs corresponding to the first PID topic changing.

In at least some of the implementations described four paragraphs above, the one or more sub-containers include multiple sub-containers, and the multiple sub-containers are initially arranged in a first order of sub-containers within the container. In these implementations, the method also includes displaying, on the display while the computing system operates in the second state, a second USC, and displaying the multiple sub-containers in a second order of sub-containers in response to a selection of the second USC. Displaying the multiple sub-containers in the second order includes displaying two or more sub-containers initially arranged in the first order in a reverse order.

In at least some of the implementations described five paragraphs above, an additional PID corresponds to the first PID topic. In these implementations, the method further comprises determining, by the processor, that no PID parameter value is received in response to requesting parameter values from the vehicle for the additional PID. The method also includes: displaying, on the display within the container, a sub-container for the additional PID. The sub-container for the additional PID includes an alpha-numeric indicator of the additional PID and an indication that PID parameter values are unavailable from the vehicle for the additional PID. Alternatively, the method also includes displaying, on the display, the container without displaying within the container a sub-container for the additional PID.

In at least some of the implementations described six paragraphs above, the one or more sub-containers include multiple sub-containers and the multiple sub-containers are initially arranged in a first order of sub-containers within the container. In these implementations, the method further comprises determining a user-selection to change an order of sub-containers or a change in a PID condition for one or more PIDs corresponding to each sub-container of the multiple sub-containers. Moreover, the method includes displaying the multiple sub-containers in a second order of sub-containers different than the first order of sub-containers based on the user-selection to change the order of sub-containers or the change in the PID condition for one or more PIDs corresponding to each sub-container of the multiple sub-containers.

In at least some of the implementations described in the preceding paragraph, the first order is: an alpha-numeric order, a reverse-alpha-numeric order, an order based on quantities of PIDs for which the computing system has received out-of-range parameter values and/or unexpected parameter values, from a greatest quantity to a least quantity, an order based on quantities of PIDs for which the computing system has received out-of-range parameter values and/or unexpected parameter values, from the least quantity to the greatest quantity, an order based on quantities of PIDs for which the computing system has received out-of-range parameter values and/or unexpected parameter values, from a greatest percentage to a lowest percentage, an order based on quantities of PIDs for which the computing system has received out-of-range parameter values and/or unexpected parameter values, from the lowest percentage to the greatest percentage, or a user-selected order. Moreover, the second order is a different one of: the alpha-numeric order, the reverse-alpha-numeric order, the order based on quantities of PIDs for which the computing system has received out-of-range parameter values and/or unexpected parameter values, from the greatest quantity to the least quantity, the order based on quantities of PIDs for which the computing system has received out-of-range parameter values and/or unexpected parameter values, from the least quantity to the greatest quantity, the order based on quantities of PIDs for which the computing system has received out-of-range parameter values and/or unexpected parameter values, from the greatest percentage to the lowest percentage, the order based on quantities of PIDs for which the computing system has received out-of-range parameter values and/or unexpected parameter values, from the lowest percentage to the greatest percentage, or the user-selected order.

In at least some implementations of a method including the set 590 of functions, the method further includes displaying, on the display, a second USC while the computing system operates in the second state. The method also includes in response to determining the second USC is selected, (i) changing the display from displaying a container using a first display mode to displaying the container using a second display mode or (ii) changing the display from displaying the container using the second display mode to displaying container using the first display mode. Furthermore, displaying the container using the first display mode includes displaying both the descriptor of the first PID topic and the indicator of the PID condition for each of the one or more PIDs associated with the PID topic without displaying in the container a sub-container including an alpha-numeric indicator of a particular PID and a parameter value descriptor associated with the particular PID. Furthermore still, displaying the container using the second display mode includes displaying: (i) the descriptor of the first PID topic, (ii) the indicator of the PID condition for each of the one or more PIDs associated with the PID topic, and (iii) the sub-container including an alpha-numeric indicator of the particular PID and the parameter value descriptor associated with the particular PID.

In at least some of the implementations described in the preceding paragraph, displaying the container using the second display mode includes generating the container and the sub-container based on position data and size data defined for the container and the sub-container. The position data and size data defined for the container and the sub-container is specified using pixel coordinates or display percentages.

In at least some implementations of a method including the set 590 of functions, the first quantity of PIDs indicates how many PIDs corresponding to the first PID topic are associated with the PID condition in which at least one of the received parameter values corresponding to the respective PID has breached a respective PID threshold. Moreover, the method further includes displaying, on the display while the computing system operates in the second state, a second particular PID condition indicator corresponding to the first PID topic, the second particular PID condition indicator corresponding to the first PID topic indicates a second quantity of PIDs, the second quantity of PIDs indicates how many PIDs corresponding to the first PID topic are associated with the PID condition in which none of the received parameter values corresponding to the respective PID has breached any respective PID threshold.

In at least some of the implementations described in the preceding paragraph, the processor determines a specific parameter value for a specific PID corresponding to the first PID topic that breaches a PID threshold corresponding to the specific PID if the specific parameter value does not match an expected value corresponding to the specific parameter value.

In at least some implementations of a method including the set 590 of functions, the method further includes determining, by the processor, the vehicle is operating in a first operating condition. The method also includes determining, by the processor, the vehicle changing from operating in the first operating condition to operating in a second operating condition. The one or more PIDs corresponding to the first PID topic includes a particular PID. A respective PID threshold associated with the particular PID includes a first PID threshold and a second PID threshold different than the first PID threshold. Additionally, determining a PID condition for the particular PID while the vehicle operates in the first operating condition includes comparing parameter values received while the vehicle operates in the first operating condition and corresponding to the particular PID to the first PID threshold. Moreover, determining a PID condition for the particular PID while the vehicle operates in the second operating condition includes comparing parameter values received while the vehicle operates in the second operating condition and corresponding to the particular PID to the second PID threshold.

In at least some of the implementations described in the preceding paragraph, the first operating condition includes a first temperature and the second operating condition includes a second temperature different than the first temperature.

In at least some implementations of a method including the set 590 of functions, one or more additional PIDs correspond to the first PID topic. Moreover, the method includes receiving, by the processor, parameter values automatically requested from the vehicle for the one or more additional PIDs. Additionally, the method includes displaying, on the display, at least some of the parameter values automatically requested from the vehicle for the one or more additional PIDs without displaying any indicator of a PID condition corresponding to the one or more additional PIDs.

In at least some implementations of a method including the set 590 of functions, the method further includes receiving, by the processor, a request to generate a custom PID topic based on the first PID topic. This method also includes displaying, on the display in response to the request, a GUI including one or more sub-container selectors. At least one sub-container selector of the one or more sub-container selectors corresponds to a sub-container that is not contained within the first PID topic. The method further includes determining, by the processor, a selection of one or more sub-container selector. Furthermore, the method includes generating the custom PID topic based on the selection of one or more sub-container selectors. Generating the first PID topic includes generating a custom PID topic different than the first PID topic. Generating a PID topic can include generating a PID topic file, such that generating the first PID topic includes generating a first PID topic file. Generating the custom PID topic can include renaming the first PID topic file and changing the renamed PID topic file. Alternatively, generating the custom PID topic file can include generating a copy of the first PID topic file, assigning a name to the copied PID topic file and changing some element of the copied PID topic file.

In at least some of the implementations described in the preceding paragraph, at least one additional sub-container selector of the one or more sub-container selectors corresponds to a respective sub-container that is contained within the first PID topic file. Moreover, generating the custom PID topic based, at least in part on a selection of the at least one additional sub-container selector, includes excluding from the custom PID topic file the respective sub-container that is contained within the first PID topic. Additionally or alternatively, generating the custom PID topic can include selecting one or more PIDs from a list of PIDs, and adding the one or more selected PIDs to the custom PID topic. Furthermore, generating the custom PID topic can include determining a selection of one or more PIDs contained within the first PID topic and removing the one or more selected PIDs from the first PID topic or from a copy of the first PID topic.

In at least some implementations of a method including the set 590 of functions, the method further includes determining, by the processor, one or more additional PID topics corresponding to the component identifier, the system identifier, and/or the symptom identifier. One or more PIDs correspond to the one or more additional PID topics. This method also includes displaying, on the display while the computing system operates in the second state, multiple containers in a first order. The multiple containers include a respective container for the first PID topic and the one or more additional PID topics. This method further includes displaying, on the display while the computing system operates in the second state, a USC. Furthermore, the method includes displaying, on the display while the computing system operates in the second state, the multiple containers in a second order in response to a selection of the USC. Displaying the multiple containers in the second order includes displaying two or more containers displayed according to the first order in a reverse order.

In at least some implementations of a method including the set 590 of functions, the method further includes determining, by the processor, a second PID topic mapped to the component identifier, the system identifier, and/or the symptom identifier. Multiple similar PIDs correspond to the second PID topic and each similar PID of the multiple similar PIDs corresponds to a respective common vehicle component on the vehicle. The method also includes receiving, by the processor while the computing system operates in the second state, parameter values automatically requested from the vehicle for each of the multiple similar PIDs corresponding to the second PID topic. Furthermore, the method includes determining, by the processor while the computing system operates in the second state, a PID condition for each of the multiple PIDs corresponding to the second PID topic, at least in part, by determining whether a difference between a respective parameter value for each the one or more PIDs corresponding to the second PID topic exceeds a variance threshold value. Furthermore still, the method includes displaying, on the display while the computing system operates in the second state, a descriptor of the second PID topic and an indicator of the PID condition for each of the multiple similar PIDs corresponding to the second PID topic.

In at least some implementations of a method including the set 590 of functions, the method further includes transmitting, by the processor to a server, a request including the vehicle identifier and the component identifier, the system identifier, and/or the symptom identifier. The method also includes receiving, in response to the transmitting the request, a response including a PID topic file corresponding to the first PID topic.

In at least some of the implementations described in the preceding paragraph, the PID topic file includes a list identifier that corresponds to a PID list stored within a non-transitory computer-readable memory readable by the processor. Additionally, the PID list includes data the processor uses to generate a vehicle data message for requesting parameter values for a PID corresponding to the first PID topic.

In at least some of the implementations described in the preceding paragraph, the PID topic file and the PID list include a common reference that the processor uses to determine the data the processor uses to generate the vehicle data message for requesting parameter values for the PID corresponding to the first PID topic.

In at least some implementations of a method including the set 590 of functions, the descriptor of the first PID topic and the first particular PID condition indicator corresponding to the first PID topic are displayed together on the display within a first container of a first graphical user interface. The method also includes displaying a first USC corresponding to the first USC, a user interface element including supplemental information and/or a second USC. The user interface element includes an expanded portion of the first container or a second graphical user interface displayed in place of the first graphical user interface.

In at least some of the implementations described in the preceding paragraph, the second USC corresponds to a component test that the computing system is programmed to perform, a functional test that the computing system is programmed to request performance of by sending a first particular vehicle data message to the vehicle, or a reset function that the computing system is programmed to request performance of by sending a second particular vehicle data message to the vehicle.

In at least some of the implementations of a method including the set 590 of functions, the method further includes transmitting, by the processor to the vehicle, a request for parameter values from the vehicle, the request including a set of PIDs, the set of PIDs including multiple PIDs corresponding to a particular ECU in the vehicle. The method additionally includes determining, by the processor, a subset of PIDs, the subset of PIDs including some, but not all PIDs of the set of PIDs. Determining each particular PID to include in the subset of PIDs includes determining that one or more parameter values for the particular PID, received from the vehicle in response to transmitting the request, has breached a threshold corresponding to the particular PID. Determining the component identifier, the system identifier, and/or the symptom identifier includes determining the symptom identifier. The symptom identifier includes each determined particular PID to include in the subset of PIDs. Determining the first PID topic includes generating a PID topic including the subset of PIDs.

In at least some of the implementations described in the preceding paragraph, the set of PIDs includes all PIDs corresponding to the particular ECU.

In at least some implementations of a method including the set 590 of functions, the method further includes determining, by the processor 102, a selection made on the display. The selection indicates the component identifier, the system identifier, and/or the symptom identifier. Determining the component identifier, the system identifier, and/or the symptom identifier is based on the selection. A benefit of making a determination based on the selection is that the selection can indicate a component identifier, system identifier, or symptom identifier or a detail thereof that the vehicle is not operable to identify to the processor. As an example, the component identifier entered via a selection can identify a vehicle component other than an electronic control unit on the vehicle, such as a spark plug. As another example, the symptom identifier entered via a selection can identify a sound made via the vehicle or a spatial location on the vehicle from which the symptom is perceived.

In at least some implementations of a method including the set 590 of functions, determining the component identifier, the system identifier, and/or the symptom identifier includes determining one or more of: multiple component identifiers, multiple system identifiers, multiple symptom identifiers, at least one component identifier and at least one system identifier, at least one component identifier and at least one symptom identifier, at least one symptom identifier and at least one symptom identifier, or at least one component identifier, at least one symptom identifier, and at least one symptom identifier.

A possible benefit of determining identifiers of multiple components, systems, or symptoms as compared to determining just an identifier of just a component, system, or symptom is that the first PID topic can be based on an aggregation of multiple PID topics corresponding to the identifiers of multiple components, systems, or symptoms. The processor 102, 161 can aggregate PID elements from two or more PID topic files such that the aggregated PID elements do not include duplicate PIDs. Table I shows that a PID topic I is mapped to identifiers of component, system, or symptom 3, 4 and corresponds to PIDs L, M, N without any duplicate PIDs. Table I shows that a PID topic G and a PID topic H are mapped to one component, system, or symptom (e.g., 3 and 4, respectively). The PID topic G corresponds to PIDs M and N. The PID topic H corresponds to PIDs L and M.

Another possible benefit of determining the identifiers of multiple components, systems, or symptoms as compared to determining an identifier of a single component, system, or symptom is that the first PID topic can include a set of PIDs comprising a PID that is not contained within a PID topics corresponding to the multiple components, systems, or symptoms individually. For example, Table I shows that a PID topic F that corresponds to identifiers 1 and 2 includes a PID V, which is not included within either of the PID topic D that corresponds to identifier 1 or the PID topic E that corresponds to the identifier 2.

Figure 29:
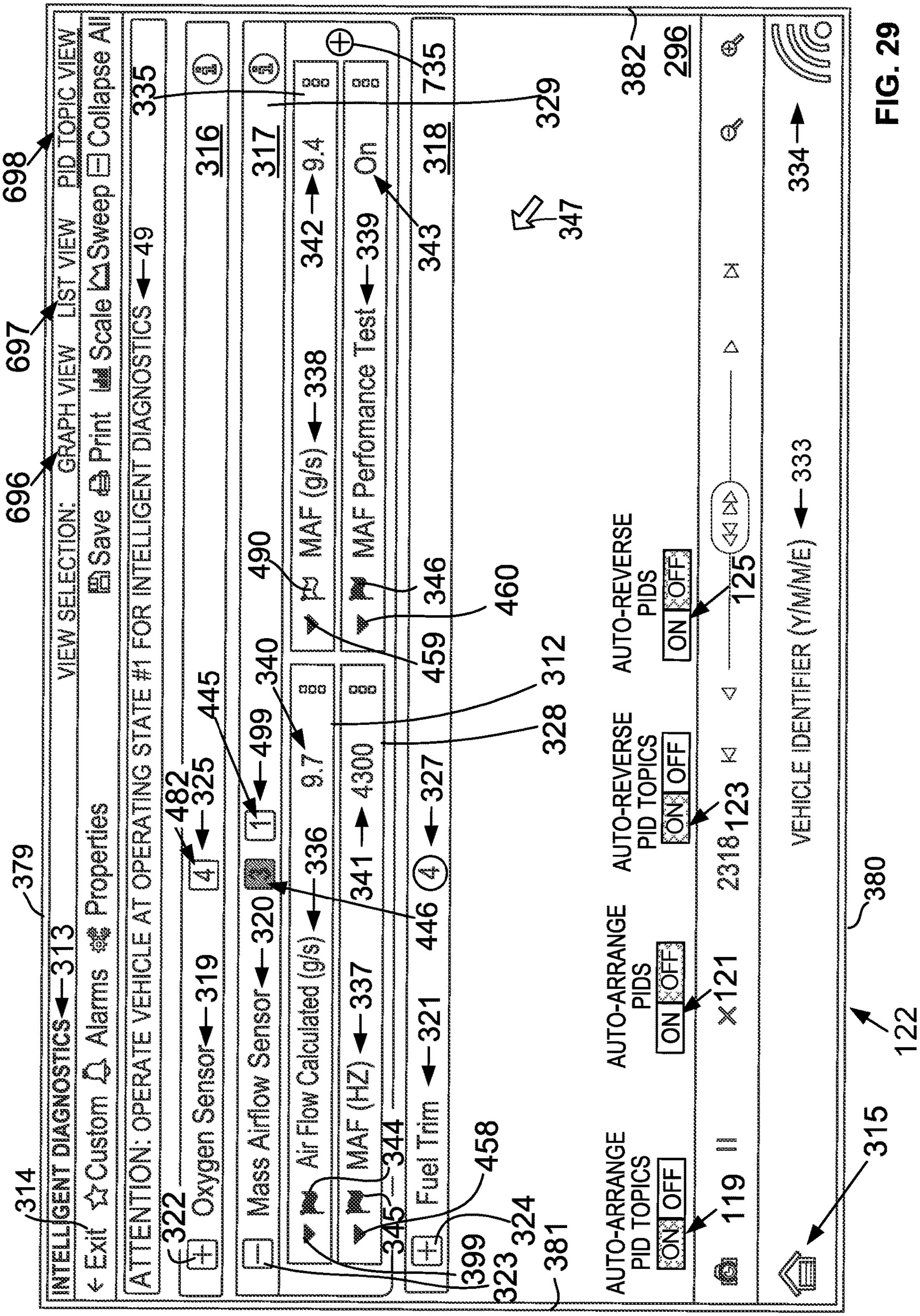

Each PID represented in a Table of this description by a single letter, such as L, M, N, V, W, X, Y, Z can correspond to a PID, such as a PID represented by a PID key element (e.g., the PID key element 220 shown in FIG. 23A), or a byte of a vehicle data message (e.g., the fifth byte of a vehicle data message 808 shown in FIG. 24A, FIG. 24B and FIG. 24C), or a textual PID descriptor (e.g., the PID descriptor 336 shown in FIG. 29).

TABLE I

| PID Topic | PID TOPIC MAPPING-Identifier of Component, System, or Symptom | PIDs |
|---|---|---|
| D | 1 | X, Y, Z |
| E | 2 | W, X, Y |
| F | 1, 2 | V, W, X, Y, Z |
| G | 3 | M, N |
| H | 4 | L, M |
| I | 3, 4 | L, M, N |

In at least some implementations of a method including the set 590 of functions, the method further includes determining, by the processor for each of the one or more PIDs corresponding to the first PID topic, whether any of the parameters has breached the respective PID threshold. Moreover, displaying the PID condition for each of the one or more PIDs corresponding to the first PID topic includes: (i) displaying a first condition indicator to indicate that at least one parameter value for at least one PID of the one or more PIDs corresponding to the first PID topic has breached a respective PID threshold, (ii) displaying a second condition indicator to indicate that no parameter value for all PIDs of the one or more PIDs corresponding to the first PID topic has breached a respective PID threshold, or (iii) both the first condition indicator and the second condition indicator.

In at least some of the implementations described in the preceding paragraph, the first condition indicator includes a number indicating how many PIDs of the one or more PIDs is associated with at least one of the parameter values determined to have breached the respective PID threshold or determined to not match an expected value. Moreover, the second condition indicator includes a number indicating how many PIDs of the one or more PIDs is a particular PID for which no parameter value received for the particular PID has breached a PID threshold for the particular PID or for which no parameter value received for the particular PID does not match an expected value.

B. Second Flowchart

Next, FIG. 60 shows a flow chart depicting a set 990 of functions of a method in accordance with the example implementations. The flow chart includes a block 991, 992, 993, 994, 995, 996 that recites a function. Two or more functions and/or portions of two or more functions of the set 990 of functions can be performed at the same time. The functions of the set 990 of functions can be performed by the computing system 14, 100. The computing system 14, 100 can perform other function(s) and/or operate in other operating state(s) than those discussed with respect to FIG. 60. The server 22 can perform one or more of functions of the set 990.

Block 991 includes determining, by a computing system, a vehicle identifier corresponding to a vehicle operatively coupled to the computing system.

Next, block 992 includes determining, by the computing system, at least one other identifier.

Next, block 993 incudes transmitting, by the computing system over a communication network to a remote server, a request for a PID list. The request includes the vehicle identifier and the at least one other identifier.

Next, block 994 includes receiving, by the computing system from the remote server, a response to the request over the communication network. The response includes the PID list and metadata regarding each PID contained in the PID list.

Next, block 995 includes transmitting, by the computing system to the vehicle for each PID contained in the PID list, a request for a parameter value corresponding to the PID contained in the PID list.

Next, block 996 includes displaying, by the computing system on a display, a graphical user interface, wherein the graphical user interface includes one or more PID topic descriptors based on the metadata and a representation of one or more PIDs contained in the PID list.

In at least some implementations of a method including the set 990 of functions, the at least one other identifier includes one or more of a component identifier, a system identifier, or a symptom identifier. The component identifier corresponds to a component of the vehicle. The system identifier corresponds to a system of the vehicle. The symptom identifier corresponds to a symptom the vehicle can exhibit. As an example, the at least one identifier can include a first symptom identifier including a first DTC, and a second symptom identifier including a second DTC. As another example, the at least one identifier can include a component identifier, such as an identifier of a coolant temperature sensor, a system identifier, such as an identifier of a powertrain system, and a DTC, such as DTC pertaining to the coolant temperature sensor.

In at least some implementations of a method including the set 990 of functions, the request for the corresponding PID value includes a vehicle data message including a particular PID that corresponds to the PID value.

In at least some implementations of a method including the set 990 of functions, the computing system includes a display operatively coupled to the display. The computing system includes a dongle operatively coupled to the vehicle and to the display. Transmitting the request for the corresponding PID value includes transmitting, from the display to the dongle, data for the dongle to generate the vehicle data message.

In at least some implementations of a method including the set 990 of functions, the computing system includes a computer-readable memory storing an ordered list of PIDs. The PID list includes at least one index value into the ordered list of PIDs.

In at least some implementations of a method including the set 990 of functions, the one or more PID topic descriptors include a particular PID topic descriptor for a first PID topic. The response further includes a respective parameter range or expected value for at least some PIDs contained in the PID list. The representation of one or more PIDs includes a condition icon including a first numeral. In some cases, the numeral indicates a quantity of PIDs of the first PID topic for which all parameter values received for a corresponding PID within the first PID topic are within a predefined range or match an expected value for the corresponding PID. In other cases, a quantity of PIDs of the first PID topic for which at least one received parameter value corresponding to a PID within the first PID topic is outside of a predefined range or not matching an expected value for the corresponding PID.

In at least some implementations of a method including the set 990 of functions, the one or more PID topics include a first PID topic and a second PID topic. Displaying the graphical user interface includes displaying a first container and a second container. The first container includes a first PID topic descriptor corresponding to the first PID topic. The first container includes one or more first sub-containers, each first sub-container corresponds to a respective first PID that the metadata indicates is associated with the first PID topic, and each first sub-container includes a representation of the respective PID corresponding to the first sub-container. The second container includes a second PID topic descriptor corresponding to the second PID topic. The second container includes one or more second sub-containers, each second sub-container corresponds to a respective second PID that the metadata indicates is associated with the second PID topic, and each second sub-container includes a representation of the respective PID corresponding to the second sub-container.

In at least some implementations of a method including the set 990 of functions, the response includes a PID topic file.

In at least some of the implementations described in the preceding paragraph, the PID topic file includes a file arranged as a hyper-text transfer protocol (HTTP) file, an extensible mark-up language (XML) file, or a java script object notation (JSON) file.

In at least some implementations of a method including the set 990 of functions, the at least one other identifier corresponds to an internal combustion engine within the vehicle, a component of the internal combustion engine, or a symptom the internal combustion engine or the component of the internal combustion engine can exhibit. The one or more PID topic descriptors includes a first PID topic descriptor. The first PID topic descriptor based on metadata corresponding to a group of PIDs associated with a speed of the internal combustion engine.

In at least some implementations of a method including the set 990 of functions, the group of PIDs include one or more from among: a PID corresponding to engine revolutions per minute, a PID corresponding to a crankshaft position sensor, a PID corresponding to a camshaft position sensor, or a PID corresponding to an amount of load applied to the internal combustion engine.

In at least some implementations of a method including the set 990 of functions, the computing system includes a computer-readable memory storing an ordered list of PID topic descriptors. The metadata includes at least one index value into the ordered list of PID descriptors.

IV. Example Parameter-Identifier Topic and Parameter-Identifier List

Next, FIG. 23A, FIG. 23B, and FIG. 23C, in combination, show a PID topic file 200 in accordance with the example implementations. In FIG. 23A, FIG. 23B, and FIG. 23C, the PID topic file 200 is arranged as an extensible markup language (XML) file. In accordance with the example implementations and as discussed above, a PID topic file, such as the PID topic file 200, or a PID topic file including the PID topic file portion 852, 859, 739, 846, 860, 578, 638, 673, can be arranged in other formats instead of or in additional to an XML file.

The PID topic file 200 includes multiple elements that begin with a start tag and end with an end tag. In FIG. 23A, FIG. 23B, and FIG. 23C, the start tags include two angle brackets < > and include an element name in between the angle brackets, such as the element name "pidDataList" within a start tag 201. The end tag that corresponds to a start tag also include two angle brackets < > and the same element name, but also include a backwards slash "/" after the first angle bracket of the end tag. The end tag 202 in FIG. 23C corresponds to the start tag 201. The alpha-numeric characters within the start and end tags shown in the drawings are examples. Other forms of the start and end tags for an element within a PID topic file are also possible.

A PID topic file can include one or more PID topic elements. As an example, the PID topic file 200 includes a PID topic element 211 that starts with a start tag 204 and ends with an end tag 205, a PID topic element 212 that starts with a start tag 206 and ends with an end tag 207, and a PID topic element 213 that starts with a start tag 208 and ends with an end tag 209.

A PID topic element can include a PID topic name. In the PID topic file 200 (and other PID topic files or portions thereof shown in the drawings), PID topic names are identified within elements that begin with a start tag "<pidTopicName>" and that end with an end tag "</pidTopicName>". The content between those tags represents a PID topic name. The PID topic element 211 includes a PID topic name element 215 to represent a PID topic name "Engine Coolant Temperature Sensor." The PID topic element 212 includes a PID topic name element 223. The PID topic element 213 includes a PID topic name element 232. A processor, such as the processor 102, 161, can populate a container within a GUI with a PID topic name. As an example, the GUI 295 shown in FIG. 40 includes a PID topic container 330, 331, 332 populated with a PID topic name from within the PID topic name element 215, 223, 232, respectively.

A PID topic element includes one or more PID elements. A PID element can include data indicative of PID, a range corresponding to a PID, and/or an expected value corresponding to a PID. The data corresponding to a PID within the PID topic file 200 (and other PID topic files or portions thereof shown in the drawings) is between a start tag in the form "<pid>" and an end tag in the form "</pid>". The data corresponding to a diagnostic trouble code within the PID topic file 200 (and other PID topic files or portions thereof shown in the drawings) is between a start tag in the form "<dtc>" and an end tag in the form "</dtc>". Accordingly, the PID topic element 211 includes data corresponding to a PID element 244, 245, 246 and a DTC element 287; the PID topic element 212 includes a PID element 247, 248, 249, 250, 251, and a DTC element 289; and the PID topic element 213 includes a PID element 252, 253, 254, 255 and a DTC element 291. Other examples of data within a PID element are also possible.

As an example, the data indicative of a PID within the PID topic element 211, the PID topic element 212, and the PID topic element 213 is within a PID key element having alpha-numeric textual data. In particular, the PID topic element 211 includes a PID key element 216 that includes the textual data "Radiator Coolant Temperature Sensor" between a start tag 242 and an end tag 243. As another example, a PID topic can include a PID key element having numeric data indicative of a PID. The numeric data can include a hexadecimal number equal to a hexadecimal number a vehicle uses to represent a PID.

In the PID topic file 200 (and other PID topic files or portions thereof shown in the drawings), the PID key elements include a start tag in the form "<pidKey>" and an end tag in the form "</pidKey>". Based on that definition, the data indicative of a PID within the PID topic file 200 includes a PID key element 216, 219, 220, 224, 225, 227, 229, 231, 233, 235, 237, 239. A person skilled in the art will understand that a start tag and/or an end tag for a PID key element can be arranged in different formats.

The PID element 244 includes a range top element 217 and a range bottom element 218. The content between the start and end tags of the range top element 217 includes data indicative of a maximum threshold value, whereas the content between the start and end tags of the range bottom element 218 includes data indicative of a minimum threshold value. A processor, such as the processor 102, 161, can determine whether a PID parameter value is within or outside a range defined by the range top element 217 and the range bottom element 218. The processor 102, 161 can responsively output a condition indicator based on that determination.

The PID element 246 includes a range top element 221 and a range bottom element 222. The content between the start and end tags of the range top element 221 includes data indicative of a maximum threshold value, whereas the content between the start and end tags of the range bottom element 222 includes data indicative of a minimum threshold value. A processor, such as the processor 102, 161, can determine whether a PID parameter value is within or outside a range defined by the range top element 221 and the range bottom element 222. The processor 102, 161 can responsively output a condition indicator based on that determination.

The PID element 248, 249, 250, 252, 253, 254, 255 includes an expected value element 226, 228, 230, 234, 236, 238, 240, respectively. A processor, such as the processor 102, 161, can determine whether or not a PID parameter value matches an expected value define by an expected value element. The processor 102, 161 can responsively output a condition indicator based on that determination.

In accordance with the example implementations in which a PID topic file is arranged as an XML, file, the PID topic file can include a declaration, such as the declaration 241 in the PID topic file 200. The PID topic file 200 also includes a PID list name element 203 and a system element 210 indicative of a system within a vehicle.

The PID list name element 203 is indicative of PID list at the computing system 100. As an example, the PID list can be stored within the vehicle data message database 137. The processor 102 can determine the PID list name element 203 from the PID topic file 200 and then read from within the vehicle data message database 137 the PID list, corresponding to the PID list name element 203, to determine a vehicle data message to be sent to the vehicle 12 to request a PID.

The system element 210 includes a start tag 861 in the form "<vcsSystem>" and an end tag 862 in the form "</vcsSystem>". The content between those tags represents an identifier of a system within a vehicle. The processor 102 can use the system element 210 to locate a PID list within the vehicle data message database 137. In at least some implementations, a tag, such as the start tag 861, includes one or more indicators that indicate how to access a PID list. As an example, the start tag 861 includes the letters "vsc" to indicate that the PID list corresponding to the PID topic file 200 and the letters "System" to further indicate that the PID list corresponding to the PID topic file 200 is among PID lists for a particular application on the computing system 100 and for a particular system on a vehicle.

Furthermore, in at least some implementations a PID topic file can include additional tags and/or data between tags or otherwise to further indicate to a processor how to locate a PID list that corresponds to a PID topic file. As an example, a PID topic file can include a start tag, such as <vcsVehicle>, and an end tag, such as </vcsVehicle>, and content between those two tags, such as a particular YMME, to further indicate a particular PID list within the vehicle data message database 137. As yet another example, a PID topic file can include a start tag, such as <vcsComponent>, and an end tag, such as </vcsComponent>, and content between those two tags, such as a particular vehicle component identifier, to further indicate a particular PID list within the vehicle data message database 137.

As an example, the data corresponding to the DTC element 287 includes a DTC identifier element 288 corresponding to a DTC that pertains to coolant temperature below thermostat regulating temperature. As another example, the data corresponding to the DTC element 289 includes a DTC identifier element 290 corresponding to a DTC that pertains to engine coolant temperature sensor circuit low voltage. As yet another example, the data corresponding to the DTC element 291 includes a DTC identifier element 292 corresponding to a DTC that pertains to fan one control circuit.

None of the PID elements in the PID topic element 211, 212, 213 is included in any other of the PID topic element 211, 212, 213. In other implementations, two or more PID topic elements within a PID topic file can include a common PID element.

Figure 23D:
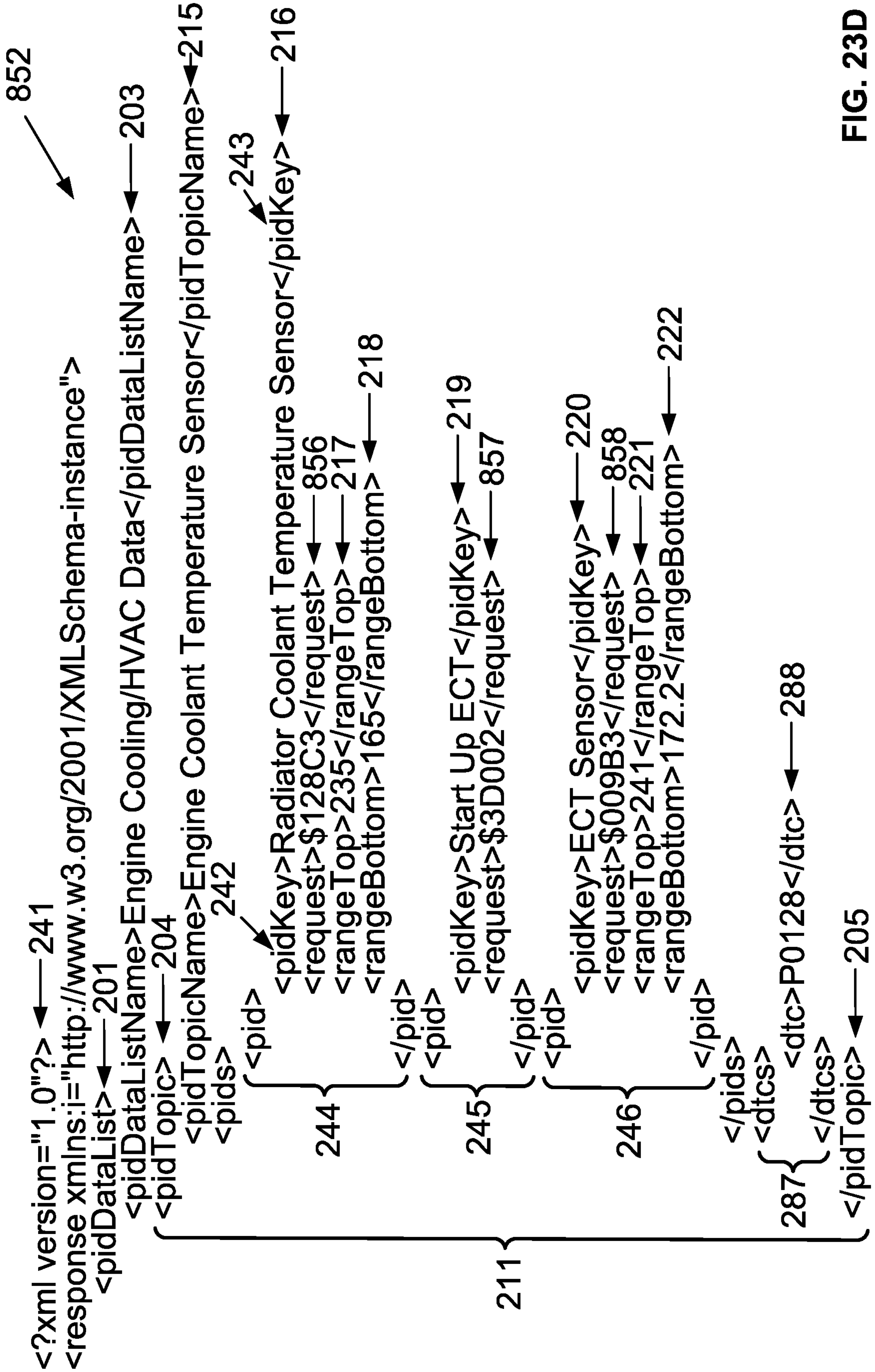
FIG. 23D and FIG. 23E show alternative arrangement of aspects of a parameter-identifier topic file in accordance with the example implementations.

Next, FIG. 23D shows a portion of a PID topic file portion 852. The portion of a PID topic file portion 852 shows an alternative way to arrange the PID topic element 211 (also shown in FIG. 23A). More particularly, the portion of a PID topic file portion 852 shows an alternative way to arrange the PID element 244, 245, 246. As shown in FIG. 23D, the PID element 244, 245, 246 includes a PID request element 856, 857, 858, respectively. The other aspects shown in FIG. 23D are also shown in and described with respect to FIG. 23A.

The PID request element 856 includes an identifier (e.g., a hexadecimal identifier $128C3) that the processor 102 can use to determine a vehicle data message to send to the vehicle 12 in order to request PID parameter values corresponding to the PID that corresponds to the PID key element 216.

Similarly, the PID request element 857 includes an identifier (e.g., a hexadecimal identifier $3D002) that the processor 102 can use to determine a vehicle data message to send to the vehicle 12 in order to request PID parameter values corresponding to the PID that corresponds to the PID key element 219.

Likewise, the PID request element 858 includes an identifier (e.g., a hexadecimal identifier $009B3) that the processor 102 can use to determine a vehicle data message to send to the vehicle 12 in order to request PID parameter values corresponding to the PID that corresponds to the PID key element 220. The processor 102 can use the aforementioned identifiers within the PID request element 856, 857, 858 to determine a corresponding vehicle data message by referring to a PID list, such as the PID list 851 shown in FIG. 24C.

In accordance with the implementation shown in FIG. 23D, the PID topic file portion 852 can further include the PID topic element 212, 213 as shown in FIG. 23A, FIG. 23B, and FIG. 23C except that in these implementations the PID topic element 212, 213 also includes a respective PID request element for the PID element 247, 248, 249, 250, 251, 252, 253, 254, 255. Those PID request elements can include the respective PID request element shown in FIG. 24C for the vehicle data message 818, 822, 825, 827, 829, 831, 833, 835, 837.

Figure 23E:
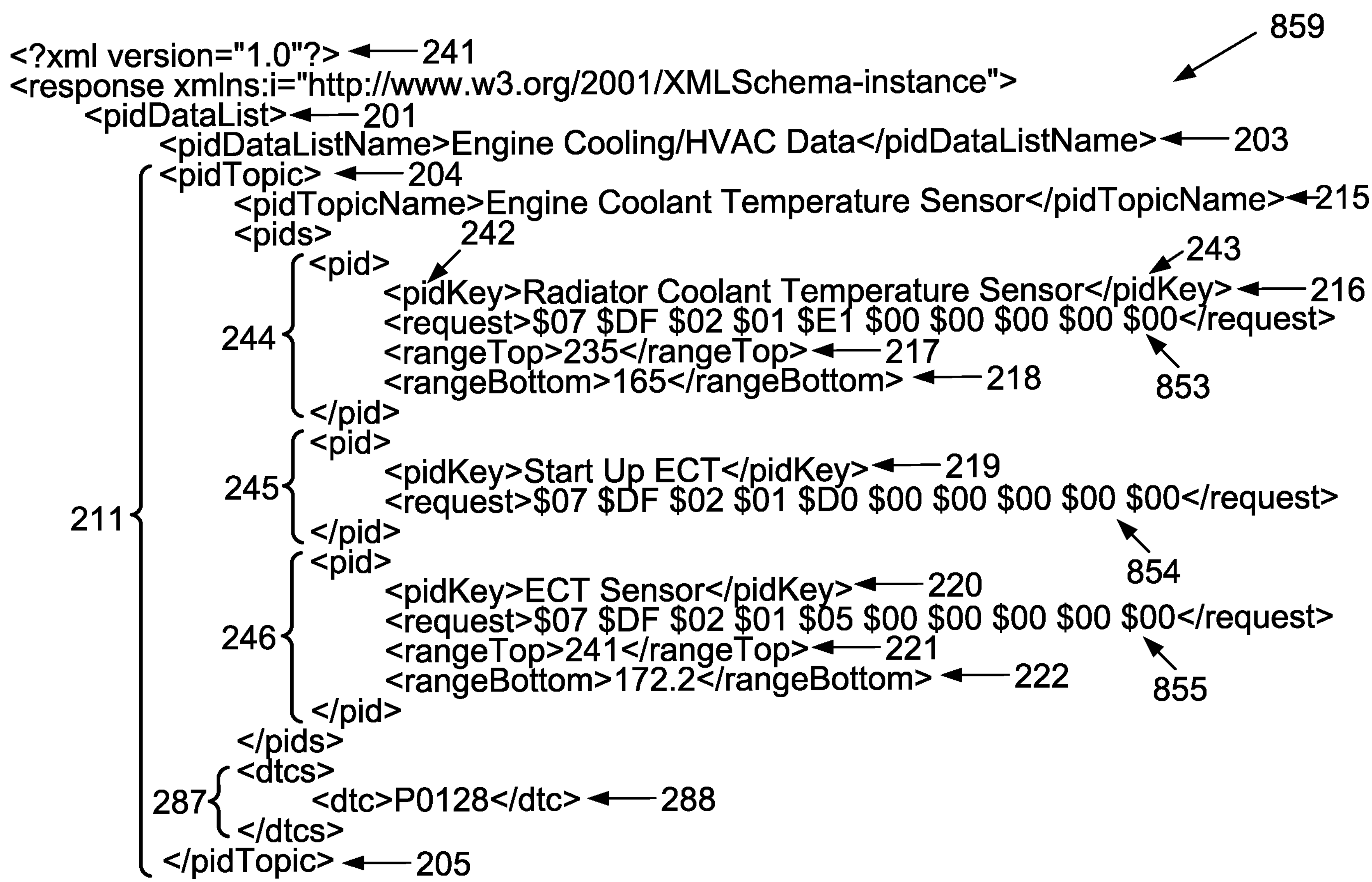

Next, FIG. 23E shows a PID topic file portion 859. The PID topic file portion 859 shows another alternative way to arrange the PID topic element 211 (also shown in FIG. 23A). More particularly, the PID topic file portion 859 shows another alternative way to arrange the PID element 244, 245, 246. As shown in FIG. 23E, the PID element 244, 245, 246 includes a PID request element 853, 854, 855, respectively. The other aspects shown in FIG. 23E are also shown in and described with respect to FIG. 23A.

The PID request element 853 includes a vehicle data message that the processor 102 can send to the vehicle 12 in order to request a PID parameter value corresponding to the PID contained within the PID key element 216. Similarly, the PID request element 854 includes a vehicle data message that the processor 102 can send to the vehicle 12 in order to request a PID parameter value corresponding to the PID contained within the PID key element 219. Likewise, the PID request element 855 includes a vehicle data message that the processor 102 can send to the vehicle 12 in order to request a PID parameter value corresponding to the PID contained within the PID key element 220.

A benefit of including vehicle data messages in a PID topic file is that the processor 102 does not need to refer to a local PID list to determine a vehicle data message that corresponds to a PID element within the PID topic file.

Next, FIG. 24A, FIG. 24B, and FIG. 24C show a PID list 849, 850, 851, respectively. The PID list 849, 850, 851 can be contained within the vehicle data message database 137, 177. The processor 102 can read the PID list 849, 850, 851 after receiving a PID topic file and determining that the PID topic file corresponds to a selected vehicle, such as a vehicle selected using a GUI 185 shown in FIG. 37. In at least some implementations, the processor 102 can translate certain data (other than a vehicle data message) within a PID topic file into a vehicle data message. In accordance with those implementations, with the processor 102 being operable to perform such translation, the PID topic file need not include the vehicle date message.

The PID list 849, 850, 851 includes a vehicle identifier 796. The vehicle identifier 796 can include one vehicle identifier or multiple different vehicle identifiers. For example, the vehicle identifier 796 can include two different vehicle identifiers representing different model years of the same vehicle make, model and engine. As another example, the vehicle identifier 796 can include two different engine identifiers yet the same vehicle year, make, model. Other examples of where the vehicle identifier 796 includes multiple different vehicle identifiers where one or more of the year, make, model or engine identifiers are different are also possible. A vehicle identifier in a PID list can include an identifier other than a YMME identifier, such as a YMM identifier.

The PID list 849, 850, 851 corresponds to the vehicles identified by the vehicle identifier 796. The vehicle data message database 137, 177 can include one or more other PID lists that include the vehicle identifier 796. Those one or more other PID lists pertain to a PID topic file other than the PID topic file 200. The vehicle data message database 137, 177 can also include one or more other PID lists that correspond to vehicles that are associated with a vehicle identifier different than the vehicle identifier 796. The processor 102 can read those other PID lists to determine a PID list that includes a vehicle identifier that matches a vehicle identifier in a different PID topic file.

The PID list 849, 850, 851 includes a PID list identifier 838. The processor 102 can determine that the PID list 849, 850, 851 corresponds to the PID topic file 200 or to a PID topic file including the PID topic file portion 852, 859, respectively, at least in part, by determining that the PID list identifier 838 matches the PID list name element 203 in the PID topic file 200 or to a PID topic file including the PID topic file portion 852, 859, respectively.

Since the PID topic file 200 does not include numeric (e.g., hexadecimal) request identifiers nor vehicle data messages, the processor 102 can refer to the PID list 849, 850 to determine a vehicle data message corresponding to each PID in the PID topic file 200. The processor 102 can translate the textual data within a PID topic element of the PID topic file 200 to a vehicle data message within the PID list 849 based on that textual data within a PID topic element of the PID topic file 200 matching a PID textual identifier within the PID list 849. For example, upon receiving the PID topic file 200, the processor 102 can determine that the vehicle data message 808 is to be sent to request PID parameter values for populating a container corresponding to the PID element 244 because the textual data of the PID key element 216 matches the PID textual identifier 807 within the PID list 849.

Since the PID topic file portion 852 (shown in FIG. 23D) includes numeric (e.g., hexadecimal) request identifiers without including a corresponding vehicle data message, the processor 102 can refer to the PID list 851 to determine a vehicle data message corresponding to each PID element in the PID topic file portion 852 based on the numeric request identifiers contained in the PID topic file portion 852. Since the PID topic file portion 859 (shown in FIG. 23E) includes the vehicle data message to be transmitted to request each PID parameter for a PID in the PID topic file portion 859, the processor 102 need not refer to a VDM database to determine a vehicle data message corresponding to each PID in the PID topic file portion 859.

Returning to FIG. 24A, the PID list 849 includes a PID topic name 797, 798, 799 that corresponds to the PID topic name element 215, 223, 232 in the PID topic file 200. The PID list 849 can be arranged to have a set 839 of PID textual identifiers and vehicle data messages that correspond to the PID topic name 797, a set 840 of PID textual identifiers and vehicle data messages that correspond to the PID topic name 798, and a set 841 of PID textual identifiers and vehicle data messages that correspond to the PID topic name 799.

The set 839 includes a PID textual identifier 807, 809, 812 that corresponds to the PID key element 216, 219, 220, respectively. The set 839 also includes a vehicle data message 808, 810, 814 that corresponds to the PID textual identifier 807, 809, 812, respectively, and in turn, to PID key element 216, 219, 220, respectively. The processor 102 can populate a container corresponding to the PID key element 216, 219, 220 with a PID parameter value received in response to sending the vehicle data message 808, 810, 814, respectively. In at least some implementations, the fifth hexadecimal number from the left in the vehicle data message 808, 810, 814 is a numeric representation of the PID textual identifier 807, 809, 812, respectively.

The set 840 includes a PID textual identifier 816, 820, 824, 826, 828 that corresponds to the PID key element 224, 225, 227, 229, 233, respectively. The set 840 also includes a vehicle data message 818, 822, 825, 827, 829 that corresponds to the PID textual identifier 816, 820, 824, 826, 828, respectively, and in turn, to PID key element 224, 225, 227, 229, 233, respectively. The processor 102 can populate a container corresponding to the PID key element 224, 225, 227, 229, 233 with a PID parameter value received in response to sending the vehicle data message 818, 822, 825, 827, 829, respectively. In at least some implementations, the fifth hexadecimal number from the left in the vehicle data message 818, 822, 825, 827, 829 is a numeric representation of the PID textual identifier 816, 820, 824, 826, 828, respectively.

The set 841 includes a PID textual identifier 830, 832, 834, 836 that corresponds to the PID key element 233, 235, 237, 239, respectively. The set 841 also includes a vehicle data message 831, 833, 835, 837 that corresponds to the PID textual identifier 830, 832, 834, 836, respectively, and in turn, to PID key element 233, 235, 237, 239, respectively. The processor 102 can populate a container corresponding to the PID key element 233, 235, 237, 239 with a PID parameter value received in response to sending the vehicle data message 831, 833, 835, 837, respectively. In at least some implementations, the fifth hexadecimal number from the left in the vehicle data message 831, 833, 835, 837 is a numeric representation of the PID textual identifier 830, 832, 834, 836, respectively.

By storing vehicle data messages corresponding to PIDs contained in a PID topic file within the vehicle data message database 137, the server 160 does not need to send to the computing system 100 the vehicle data messages that are to be sent to the vehicle 12 in order to request PID parameter values to populate containers in a GUI corresponding to the PID topic file.

Returning to FIG. 24B, the PID list 850 also includes the vehicle data message 808, 810, 814, 818, 822, 825, 827, 829, 831, 833, 835, 837 in an order corresponding to an order of the PID key element 216, 219, 220, 224, 225, 227, 229, 231, 233, 235, 237, 239, respectively, as shown in FIG. 23A, FIG. 23B, and FIG. 23C. After receiving the PID topic file 200 (e.g., a PID topic file without a vehicle data message or a PID request element for each PID element), the processor 102 can populate containers with PID descriptors indicated by PID key elements within the PID topic file 200 and with a PID parameter value received in response to transmitting a vehicle data message in the PID list 850 that corresponds to a respective PID key element within the PID topic file 200. The processor 102 can populate those containers with PID descriptor and with PID parameter values received in response to transmitting a vehicle data message in the PID list 850 that corresponds to each respective PID key element within the PID topic file 200 based on an order of the vehicle data message 808, 810, 814, 818, 822, 825, 827, 829, 831, 833, 835, 837 and on an order of the PID key elements within the PID topic file 200.

Returning to FIG. 24C, the PID list 851 also includes vehicle data message elements 865, 866, 867, 868, 869, 870, 871, 872, 873, 874, 875, 876 including the vehicle data message 808, 810, 814, 818, 822, 825, 827, 829, 831, 833, 835, 837, respectively, and, for each of those messages, a start tag and an end including a respective PID request element. As an example, the vehicle data message element 865 includes a start tag 863 and an end tag 864 that include and correspond to the PID request element 856 shown in FIG. 23D. After receiving a PID topic file arranged like a PID topic file including the PID topic file portion 852, the processor 102 can populate containers with PID descriptors indicated by PID key elements within the PID topic file including the PID topic file portion 852 and with a PID parameter values received in response to transmitting a vehicle data message in the PID list 851 that corresponds to a respective PID key element within the PID topic file including the PID topic file portion 852.

After receiving a vehicle data message that includes a PID and a PID parameter value, the processor 102 can parse the vehicle data message to recover the PID and the PID parameter value. The processor 102 can convert the PID parameter value to a form for displaying in a container corresponding to the PID. As an example, in response to sending the vehicle data message 808 (shown in FIG. 24A, FIG. 24B, and FIG. 24C), the processor 102 can receive the following vehicle data message from the vehicle 12: $07 $DF $03 $41 $E1 $C5 $00 $00 $00 $00. The fourth byte in that vehicle data message indicates the vehicle data message is a response to a request for a current parameter value, the fifth byte is the PID (also referred to textually as the radiator coolant temperature sensor in the drawings) and the sixth byte is the PID parameter value. As an example, the processor 102 can convert the hexadecimal value C5 into the decimal value 197 and display in a sub-container 455 (shown in FIG. 41) that pertains to the radiator coolant temperature sensor. That decimal number represents a temperature parameter value in degrees Fahrenheit.

Figure 25A:
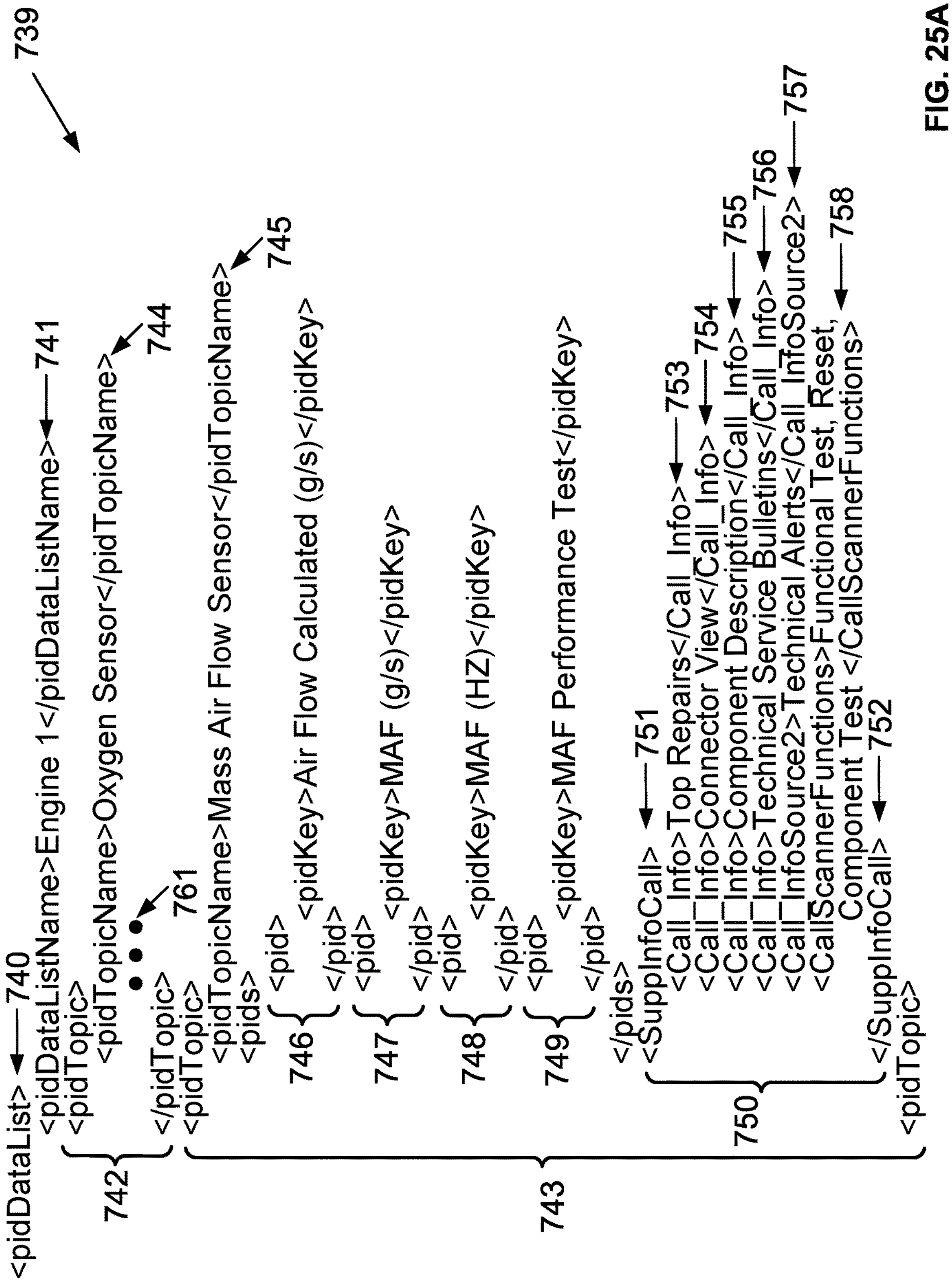
FIG. 25A, FIG. 25B, and FIG. 25C show a portion of a parameter-identifier topic file in accordance with the example implementations.

Next, FIG. 25A shows a PID topic file portion 739 in accordance with the example implementations. The PID topic file portion 739 corresponds to a GUI 296 shown in FIG. 26 to FIG. 34. In particular, FIG. 25A is provided to show aspects pertaining to supplemental information and USC shown in FIG. 34. A PID topic file including PID topic file portion 739 includes elements not shown in FIG. 25A, some of which are discussed below.

In FIG. 25A, the PID topic file portion 739 is arranged to be within an XML, file. The content of the PID topic file portion 739 can be contained in a different type of file. Examples of these other types of files are discussed above with respect to the PID topic file 200. Similar to the PID topic file 200, the PID topic file portion 739 includes multiple elements that begin with a start tag and end with an end tag. The PID topic file portion 739 can include a declaration (similar to the declaration 241 shown in FIG. 23A or otherwise) and/or a system element indicative of a system within a vehicle (similar to the system element 210 shown in FIG. 23C or otherwise).

The PID topic file portion 739 includes a PID data list element that starts with a start tag 740, and a PID list name element 741. The PID topic file portion 739 includes a PID topic element 742, 743. The PID topic element 742, 743 correspond to a PID topic container 316, 317 (shown in FIG. 26), respectively. A file including the PID topic file portion 739 also includes and a PID topic element named "Fuel Trim" (not shown in FIG. 25A). The PID topic element named "Fuel Trim" corresponds to a PID topic container 318 shown in FIG. 26 and includes a PID element for each of the sub-container 470, 471, 472, 473 shown in FIG. 30.

The PID topic element 742 includes a PID topic name element 744 that corresponds to the PID topic descriptor 319 shown in FIG. 26. The three dots 761 shown in FIG. 25A represent PID elements corresponding to the PID descriptor 383, 384, 385, 386 shown in FIG. 30. Each of those PID elements in the PID topic file portion 739 can begin with a start tag <pid>, end with an end tag </pid> and include a PID key element including a start tag <pidKey> and an end tag </pidKey>, and elements to specify a range, condition or expected value corresponding to a PID. Examples of how to specify those elements are shown in FIG. 23A to FIG. 23C.

The PID topic element 743 includes a PID topic name element 745 that corresponds to the PID topic descriptor 320 shown in FIG. 26. The PID topic element 743 includes a PID element 746, 747, 748, 749 corresponding to the PID descriptor 336, 337, 338, 339 shown in FIG. 34. Each of those PID elements in the PID topic element 743 begin with a start tag <pid>, end with an end tag </pid> and include a PID key element including a start tag <pidKey> and an end tag </pidKey>. Each of the PID elements in the PID topic element 743 can include elements to specify a range, condition or expected value corresponding to a PID. Examples of how to specify those elements are shown in FIG. 23A to FIG. 23C.

FIG. 25A also shows multiple element types that are not shown in the PID topic file 200. In particular, the PID topic file portion 739 includes a call supplemental information element 750 between a start tag 751 and an end tag 752. The processor 102, 161 can cause the GUI 296 to display supplemental information and USCs corresponding to the call supplemental information element 750. That supplemental information and USCs can be requested and/or displayed in response to selection of a container resizing USC 735 shown in the PID topic container 317 shown in FIG. 28, FIG. 29 and FIG. 31 to FIG. 33.

Figure 34:
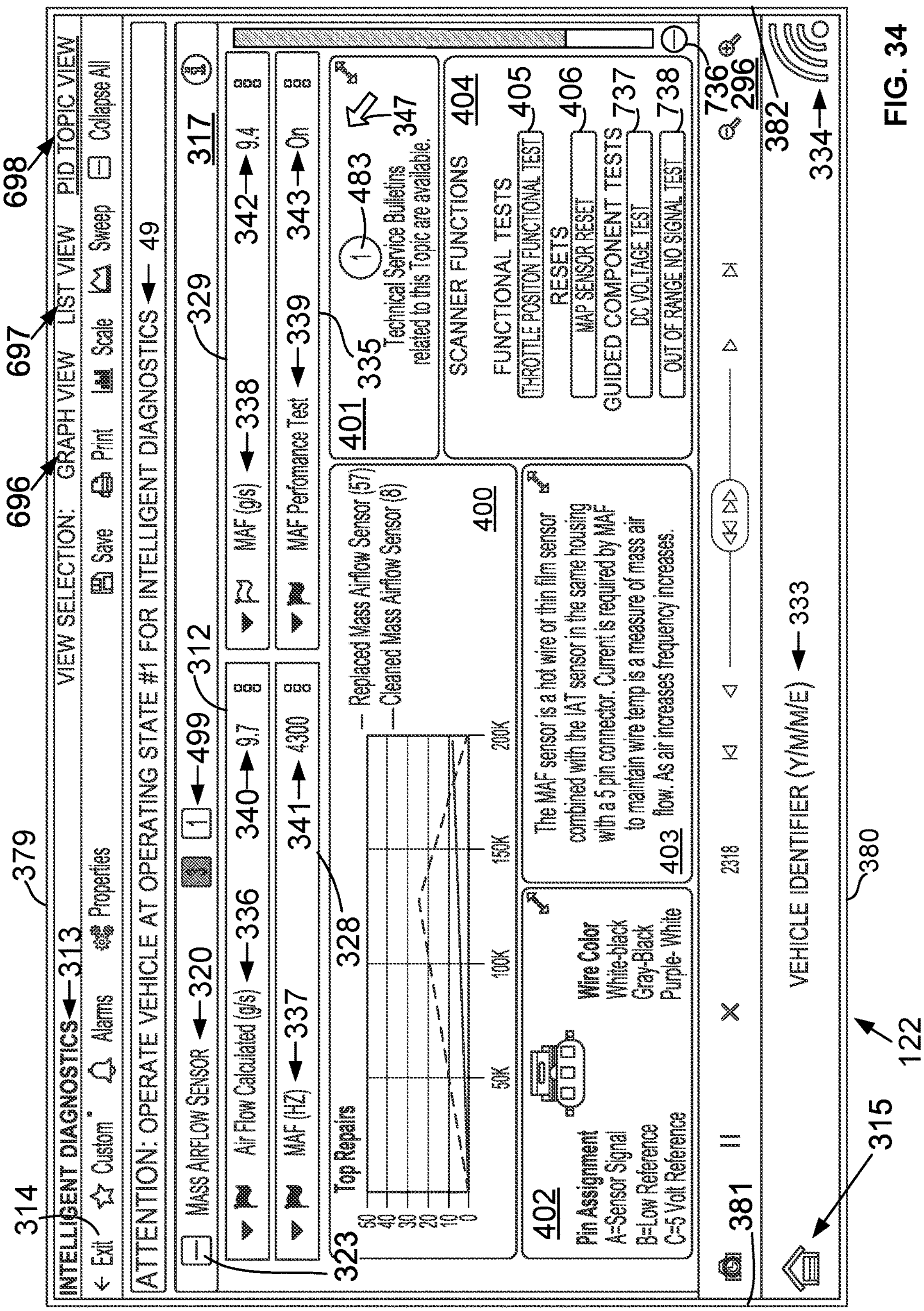

The call supplemental information element 750 includes a call information element 753, 754, 755, 756, 757, and a call scanner functions element 758. These elements correspond to additional containers that are displayed in the PID topic container 317 in response to selection of the container resizing USC 735. An example of those additional containers is shown in FIG. 34. The call information element 753, 754, 755 corresponds to sub-containers 400, 402, 403, respectively, shown in FIG. 34. The call information element 756, 757 corresponds to the sub-container 401.

An element within a call supplemental information element can include an identifier of a source of information (e.g., supplemental information or a USC identifier). In some implementation, the source of information can be implied (e.g., a default source of information). In those or in other implementations, the source of information can be specified in a start tag and/or end tag, or between a start tag and end tag. The identifier of the source of information can include a uniform resource locator, an internet protocol address, or some other type of identifier. As an example, a start tag for the call information element 753, 754, 755, 756 can indicate a first, default source of information (e.g., a first memory of the memory 162 or a first uniform resource indicator), and a start tag for the call information element 757 can indicate a second source of information (e.g., a second memory of the memory 162 or a second uniform resource indicator). One reason that multiple call information elements might be specified for retrieving information to populate a container or containers with supplemental information is that multiple sources that contain that supplemental information use different search terms to locate the supplemental information. As an example, the first memory can use the term "technical service bulletins" to classify supplemental information for the sub-container 401, whereas the second memory can use the term 'technical alerts" to classify supplemental information for the sub-container 401.

A call information element for requesting information from the second source may include identifiers that are different than identifiers for other elements in a PID topic file. For example, the call information element 755 for component description can be "Air Flow Sensor" whereas the component identified by the PID topic name element 745 is "Mass Air Flow Sensor."

Figure 25B:
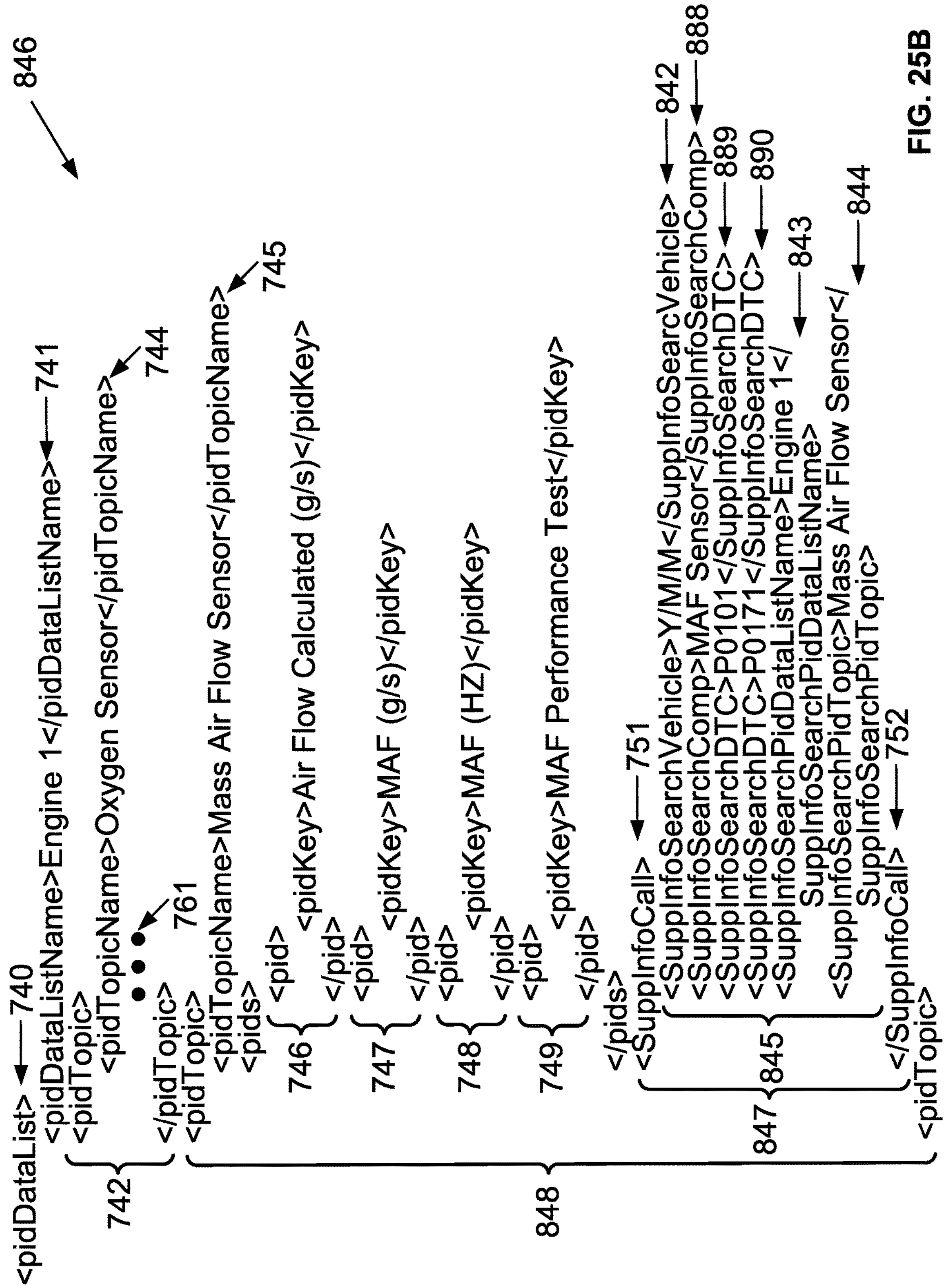
Figure 25C:
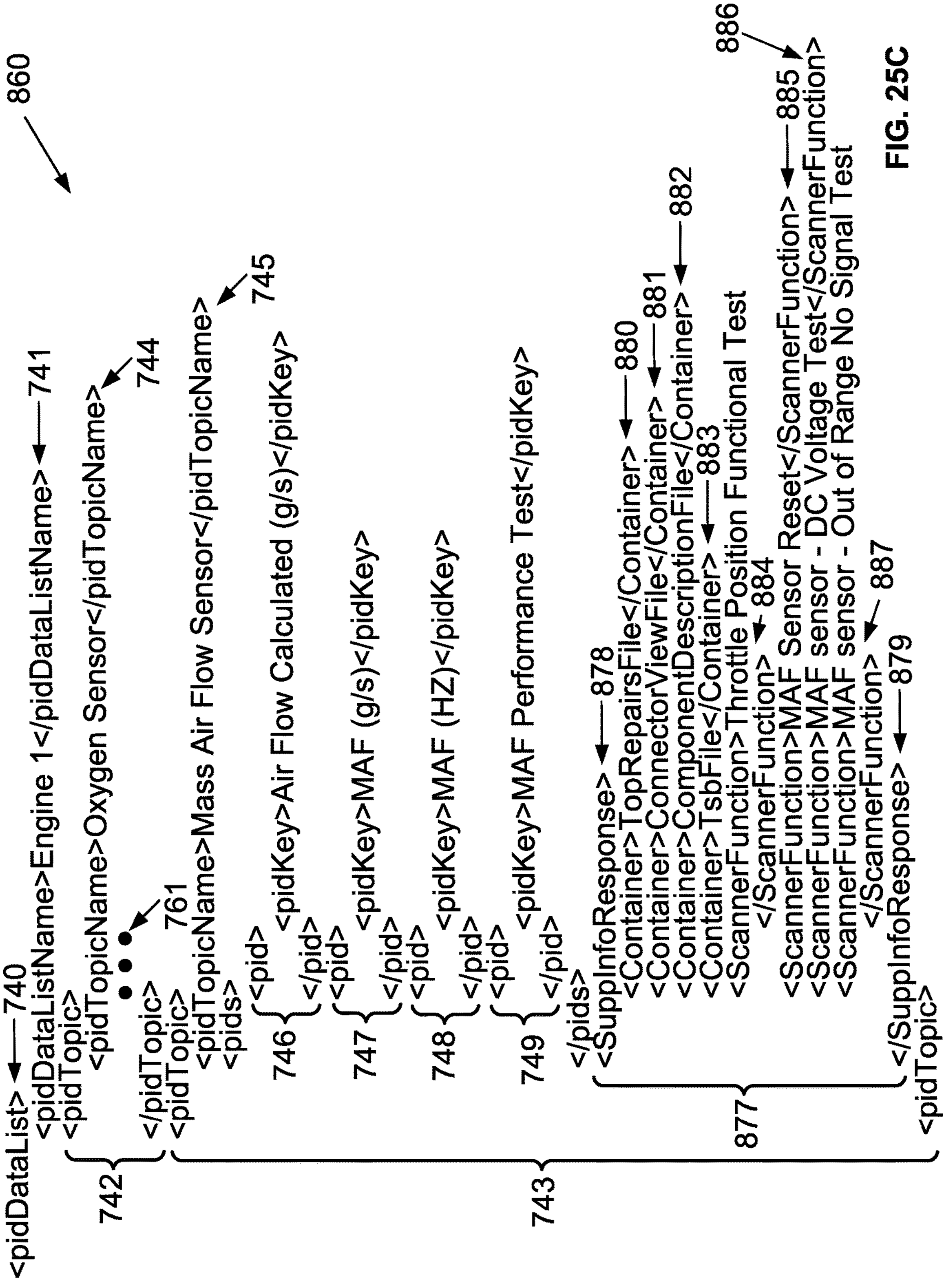

The call information element 753 corresponds to a container element 880 shown in FIG. 25C and the sub-container 400 shown in FIG. 34. The call information element 754 corresponds to a container element 881 shown in FIG. 25C and the sub-container 402 shown in FIG. 34. The call information element 755 corresponds to a container element 882 shown in FIG. 25C and the sub-container 403 shown in FIG. 34. The call information element 756, 757 corresponds to a container element 883 shown in FIG. 25C and the sub-container 401 shown in FIG. 34. The call scanner functions element 758 corresponds to a scanner function element 884, 885, 886, 887 shown in FIG. 25C and the sub-container 404 shown in FIG. 34.

Next, FIG. 25B shows aspects of a PID topic file portion 846 in accordance with the example implementations. The PID topic file portion 846 corresponds to a GUI 296 shown in FIG. 26 to FIG. 34. Like FIG. 25A, FIG. 25B is provided to show aspects pertaining to supplemental information and USC shown in FIG. 34. A PID topic file including PID topic file portion 846 includes elements not shown in FIG. 25A, some of which are discussed below.

Some of the content of the PID topic file portion 846 is identical to content in the PID topic file portion 739. The PID topic file portion 846, however, includes a PID topic element 848 that has some content that is similar and some content that is different than the content of the PID topic element 743 shown in FIG. 25A. Unlike the PID topic element 743 that includes the call supplemental information element 750, the PID topic element 848 includes the call supplemental information element 847.

As shown in FIG. 25B, the call supplemental information element 847 includes a set of search criteria elements 845. A set of search criteria elements can include one or more search term elements. As an example, the set of search criteria elements 845 can include one or more from among: a vehicle search term element 842, a component search term element 888, a symptom search term element 889, 890, a PID data list search term element 843, or a PID topic search term element 844. Other examples of a search term element for the set of search criteria elements 845 are also possible.

In at least some implementations, in response to a selection of the container resizing USC 735, the processor 102 can transmit to the server 160 a request containing search criteria corresponding to the PID topic that corresponds to the PID topic container that includes the selected container resizing USC 735. In accordance with the implementations shown in the drawings, the set of search criteria elements 845 corresponds to the PID topic corresponding to the PID topic descriptor 320 and the PID topic container 317. A benefit of including the search criteria in the request to the server 160 is that the server 160 can tailor a response to the request based on the search criteria rather than limiting the search to content for a predetermined set of sub-containers, such as a set of sub-containers including the sub-container 400, 401, 402, 403, 404.

Next, FIG. 25 C shows a PID topic file portion 860 in accordance with the example implementations. The PID topic file portion 860 represents an example of how supplemental information and USC information can be provided to the computing system 100 to output a GUI including the supplemental information and further USC. The PID topic file portion 860 corresponds to the GUI 296 shown in FIG. 26 to FIG. 34. In particular, FIG. 25C is provided to show aspects pertaining to supplemental information and USC shown in FIG. 34.

In FIG. 25C, the PID topic file portion 860 is arranged as an XML, file. The content of the PID topic file portion 860 can be contained in different types of files, such as a different file type discussed with respect to the PID topic file 200. Similar to the PID topic file 200, the PID topic file portion 860 includes multiple elements that begin with a start tag and end with an end tag.

The PID topic file portion 860 and the PID topic file portion 739 (shown in FIG. 25A) include several elements in common. Those common elements include the start tag 740, the PID list name element 741, the PID topic element 742, 743 the PID topic name element 745, and the PID element 746, 747, 748, 749. The common elements were described in more detail above.

The PID topic file portion 860 differs from the PID topic file portion 739 in that the PID topic element 743 within the PID topic file portion 860 includes a supplemental information response element 877 instead of the supplemental information element 750. The supplemental information response element 877 includes a start tag 878 and an end tag 879, a container element 880, 881, 882, 883, and the scanner function element 884, 885, 886, 887.

A container element can include data for populating within a container and/or a reference to data to populate within the container. As an example, the container element 880 includes can include data that refers to a file pertaining to "top repairs." That data can include a file name of a file that the computing device can obtain from the server 160 or another source where the file is stored. In some implementations, a file referenced in a container element is transmitted to the computing system along with the PID topic file including the container element. A sub-container 400 shown in FIG. 34 can be populated based on the container element 880.

As another example, the container element 881 includes can include data that refers to a file pertaining to "connector view." That data can include a file name of a file that the computing device can obtain from the server 160 or another source where the file is stored. A sub-container 402 shown in FIG. 34 can be populated based on the container element 881.

As another example, the container element 882 includes can include data that refers to a file pertaining to "component description." That data can include a file name of a file that the computing device can obtain from the server 160 or another source where the file is stored. A sub-container 403 shown in FIG. 34 can be populated based on the container element 882.

As another example, the container element 883 includes can include data that refers to a file pertaining to "technical service bulletins." That data can include a file name of a file that the computing device can obtain from the server 160 or another source where the file is stored. A sub-container 401 shown in FIG. 34 can be populated based on the container element 883.

A scan function element can include data and/or a reference to data for populating within a container or a USC. The reference to data can refer to a scan tool function stored in the scanner functions 762. As an example, the scanner function element 884 can include data indicative of a functional test stored in the scanner functions 762 and data indicating the functional test pertains to a particular functional test (e.g., a throttle position functional test). In some implementations, that data can be used to populate a USC, such as the USC 405 shown in FIG. 34. In some implementations, the data referring to a particular functional test can include a software pointer and/or memory address of a software module for performing the functional test specified by the scanner function element 884. Additionally or alternatively, the scanner function element 884 can include data needed to generate a vehicle data message to request performance of the functional test that corresponds to the functional test indicated by the scanner function element 884 without having to refer to the scanner functions 762.

As another example, the scanner function element 885 can include data indicative of a reset procedure stored in the scanner functions 762 and data indicating the reset procedure pertains to a particular reset procedure (e.g., a MAF sensor reset procedure). In some implementations, that data can be used to populate a USC, such as the USC 406 shown in FIG. 34. In some implementations, the data referring to a particular reset procedure can include a software pointer and/or memory address of a software module for performing the reset procedure specified by the scanner function element 885.

As another example, the scanner function element 886 can include data indicative of a guided component test stored in the scanner functions 762 and data indicating the guide component test pertains to a particular guided component test (e.g., a MAF sensor-DC voltage test). In some implementations, that data can be used to populate a USC, such as the USC 737 shown in FIG. 34.

As another example, the scanner function element 887 can include data indicative of a guided component test stored in the scanner functions 762 and data indicating the guide component test pertains to a particular guided component test (e.g., a MAF sensor-out of range no signal test). In some implementations, that data can be used to populate a USC, such as the USC 738 shown in FIG. 34. In some implementations, the data referring to a particular guided component test can include a software pointer and/or memory address of a software module for performing the guided component test specified by the scanner function element 886, 887.

V. Example Graphical User Interfaces

Next, FIG. 26 to FIG. 35, FIG. 37 to FIG. 45, FIG. 53, FIG. 54, FIG. 57, and FIG. 58 show one or more views of graphical user interfaces (GUIs) displayed on the display 122. The display 122 in those figures is shown to have a side 379, 380, 381, 382. As an example, the side 379 can be referred to as a top side, the side 380 can be referred to as a bottom side, the side 381 can be referred to as a left side, and the side 382 can be referred to as a right side. The side 379 and the side 380 are opposite each other. Similarly, the side 381 and the side 382 are opposite each other.

One or more of the GUIs shown in FIG. 26 to FIG. 35, FIG. 37 to FIG. 45, FIG. 53, FIG. 54, FIG. 57, and FIG. 58 can include a natural user interface (NUI) that includes one or more user interface elements that operate, in combination with another user interface component and a processor, using voice recognition, motion detection, gesture detection, and/or aural outputs. Additionally or alternatively, one or more of the GUIs shown in the figures can include a graphical user interface (GUI).

In one respect, the processor 102 is operable to output a GUI, such as a GUI shown in FIG. 26 to FIG. 35, FIG. 37 to FIG. 45, FIG. 53, FIG. 54, FIG. 57, and FIG. 58, to the display 122. The display 122 is operable to display a GUI, such as a GUI shown in FIG. 26 to FIG. 35, FIG. 37 to FIG. 45, FIG. 53, and FIG. 54. A GUI, such as a GUI shown in FIG. 26 to FIG. 35, FIG. 37 to FIG. 45, FIG. 53, FIG. 54, FIG. 57, and FIG. 58, can include a USC. The processor 102 is operable to detect selection of a USC and to cause one or more functions to be performed in response to determining the USC has been selected. Selection of a USC can occur using the input device 120. For instance, a USC can be selected using a push button key of the input device 120 or by touching the display 122 configured as a touch screen display. In another respect, the processor 161 is operable to output a GUI, such as a GUI shown in FIG. 26 to FIG. 35, FIG. 37 to FIG. 45, FIG. 53, FIG. 54, FIG. 57, and FIG. 58, to the communication link 26 for transmission in turn to a computing system, such as the computing system 100.

In accordance with the example implementations, a GUI such as a GUI shown in FIG. 26 to FIG. 35, FIG. 37 to FIG. 45, FIG. 53, FIG. 54, FIG. 57, and FIG. 58 can include a GUI description 313. The GUI description 313 can include an indication of a theme of a GUI. In at least some implementations, a theme of a GUI indicates an operating mode of the computing system 100. Examples of a GUI theme are described in the discussion of the individual GUIs shown in the drawings. Other examples of the GUI description 313 for any GUI shown in FIG. 26 to FIG. 35, FIG. 37 to FIG. 45, FIG. 53, FIG. 54, FIG. 57, and FIG. 58 can be used.

In accordance with the example implementations, a GUI such as a GUI shown in FIG. 26 to FIG. 35, FIG. 37 to FIG. 45, FIG. 53, and FIG. 54 can include an operating state identifier 49. The operating state identifier 49 shown in the GUI shown in FIG. 26 to FIG. 35, FIG. 37 to FIG. 42, FIG. 45, and FIG. 54 indicates a first operating state (e.g., operating state #1), and FIG. 53 indicates a second operating state (e.g., operating state #2). As an example, the operating state #1 can be an operating state in which an engine of the vehicle 12 is idling at operating temperature with no load present. As an example, the operating state #2 can be an operating state in which the vehicle is operating at a posted highway speed above forty miles per hour. Other examples of operating states associated with a PID topic file are also possible.

Figure 35:
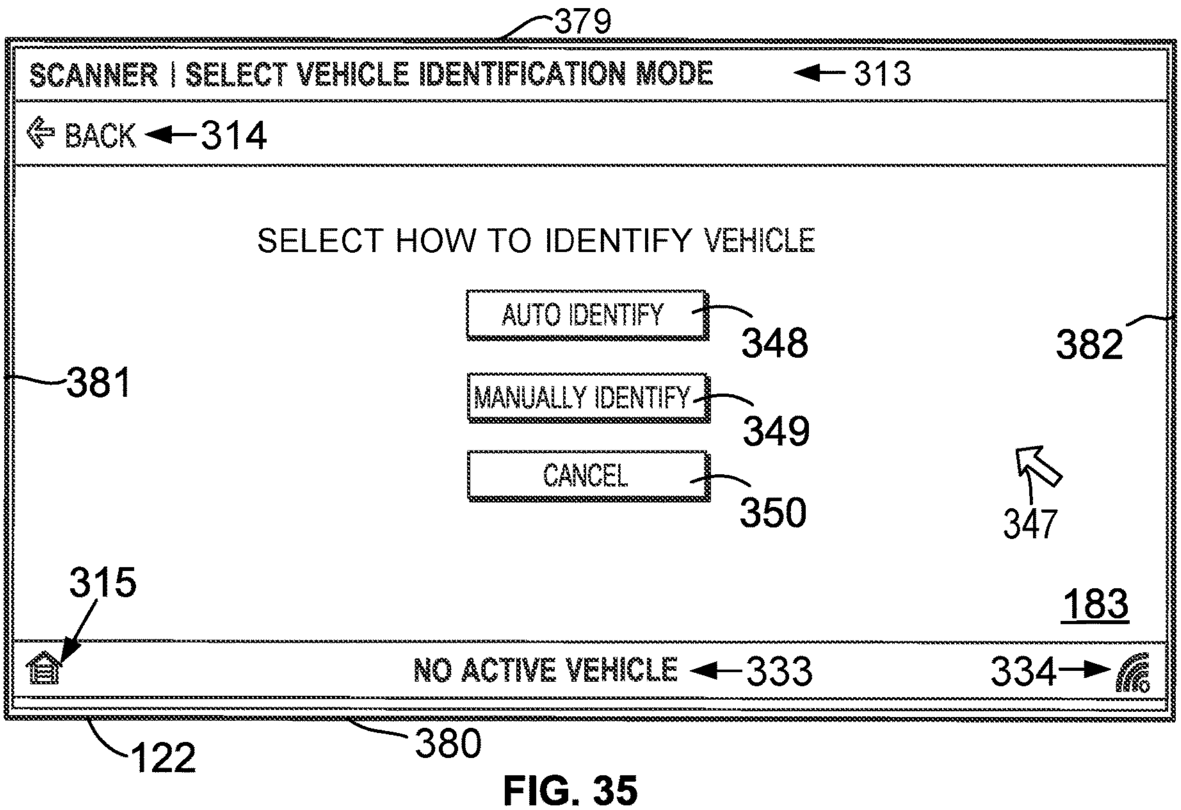
Figure 37:
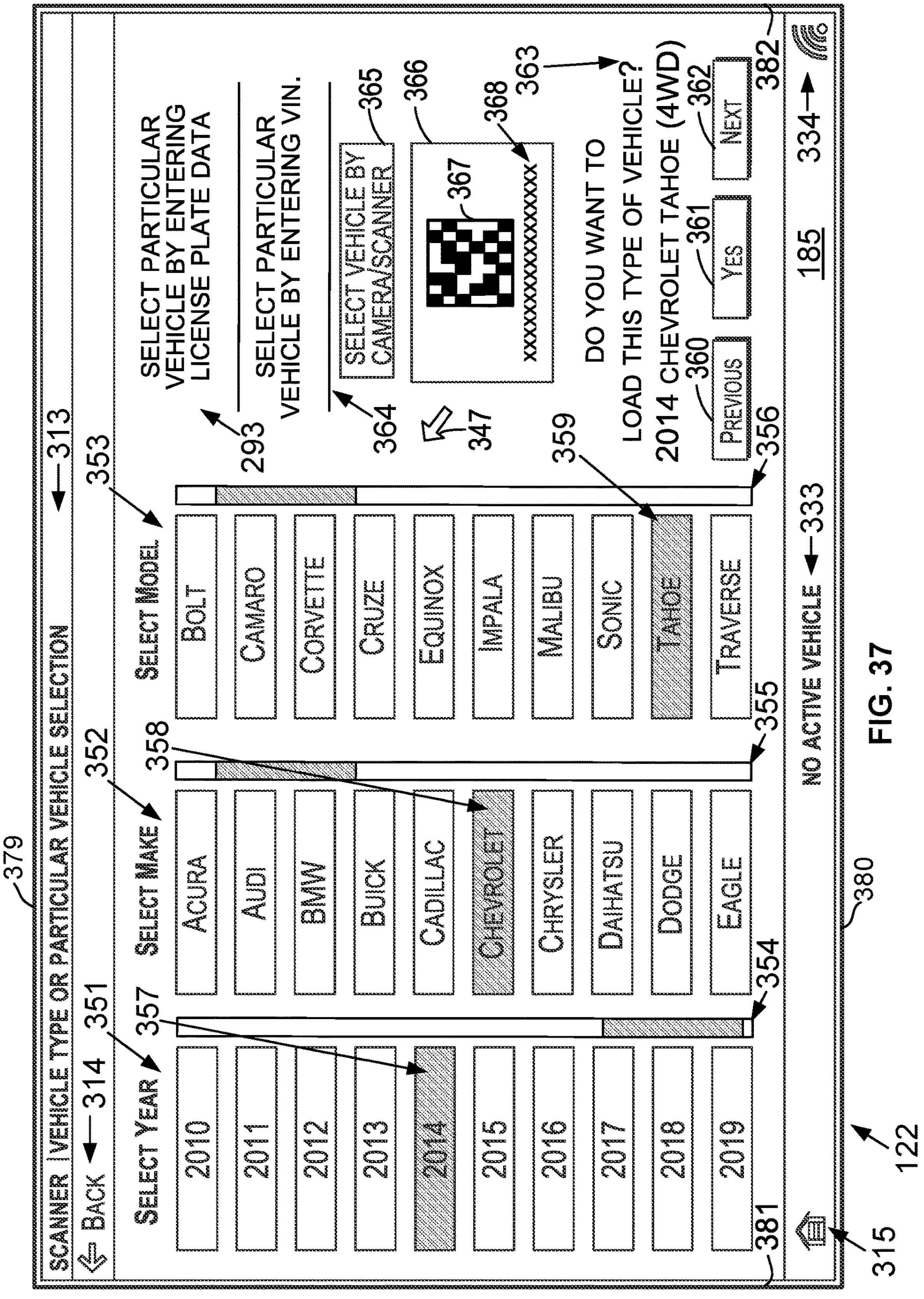
FIG. 37, FIG. 38, FIG. 39, FIG. 40, FIG. 41, FIG. 42, FIG. 43, FIG. 44, and FIG. 45 each show a graphical user interface in accordance with the example implementations.

In accordance with the example implementations, a GUI such as a GUI shown in FIG. 26 to FIG. 35, FIG. 37 to FIG. 45, FIG. 53, FIG. 54, FIG. 57, and FIG. 58 can include a vehicle identifier. As shown in FIG. 35 and FIG. 37, a vehicle identifier 333 uses the text "No Active Vehicle" to indicate that neither a vehicle identifier nor a particular vehicle has been selected. Other text or symbols could be used to make the same indication. As shown in FIG. 26 to FIG. 34, FIG. 38 to FIG. 45, FIG. 53, FIG. 54, FIG. 57, and FIG. 58, the vehicle identifier 333 indicates a vehicle identifier (corresponding to a vehicle selected for servicing using the computing system 100) by the term Y/M/M/E, which is described in detail in Section VI of this description. In at least some implementations, the vehicle identifier 333 can indicate a particular vehicle of the type of vehicle selected for servicing using the computing system 100.

In accordance with the example implementations, a GUI such as a GUI shown in FIG. 26 to FIG. 35, FIG. 37 to FIG. 45, FIG. 53, FIG. 54, FIG. 57, and FIG. 58 can include an indicator 334 to indicate a hardware status pertaining to the computing system 100. As an example, the indicator 334 can indicate whether or not the transceiver 106 is connected to a wireless communication network, such as a wireless vehicle network or a wireless non-vehicle network. As another example, the indicator 334 can indicate whether or not the transceiver 106 is connected to a wired communication network, such as a wired vehicle network or a wired non-vehicle network.

The GUIs shown within FIG. 26 to FIG. 35, FIG. 37 to FIG. 45, FIG. 53, FIG. 54, FIG. 57, and FIG. 58 include some common GUI USCs. Those common USCs include a back USC 314. In response to determining that the back USC 314 is selected, the processor 102 can cause the display 122 to display a GUI that was displayed immediately prior to displaying the GUI which contained the back USC 314 that was selected. The back USC 314 can include an indicator indicative of the function performed upon and/or in response to selection of the back USC 314. As an example, the indicator can include text, such as "Back" or "Exit", and/or a symbol such as an arrow.

The common GUI USCs also include a home-screen USC 315. In response to determining that the home-screen USC 315 is selected, the processor 102 can cause the display 122 to display a home-screen GUI instead of displaying the GUI which contained the home-screen USC 315 that was selected.

In accordance with the example implementations, a GUI such as a GUI shown in FIG. 26 to FIG. 35, FIG. 37 to FIG. 45, FIG. 53, FIG. 54, FIG. 57, and FIG. 58 can include a cursor 347 movable to point to a USC or another item of the GUI. The processor 102 can detect the USC or the other item of the GUI is selected when the cursor 347 is disposed on or in proximity to the USC or the other item of the GUI. For implementations in which the display 122 includes a touch screen display, a selectable aspect (such as a USC) in the GUIs shown in FIG. 26 to FIG. 35, FIG. 37 to FIG. 45, FIG. 53, FIG. 54, FIG. 57, and FIG. 58 can be selected using the touch screen display regardless of whether the cursor 347 is provided on the GUI.

The views of the GUI 296 shown in FIG. 26 to FIG. 34 show different views of intelligent diagnostics data. The GUI 296 includes a PID topic container 316, 317, 318. One or more of the PID topic container 316, 317, 318 is shown in each of FIG. 26 to FIG. 34. The PID topic container 316 includes a PID topic descriptor 319, a container resizing USC 322, and a condition icon 325 that includes an unshaded geometric shape 482. The PID topic container 317 includes a PID topic descriptor 320, a container resizing USC 323, and a condition icon 499 that includes an unshaded geometric shape 445. The PID topic container 318 includes a PID topic descriptor 321, a container resizing USC 324, and a condition icon 327.

A PID topic descriptor describes a context corresponding to a PID topic element within a PID topic and/or a PID topic file. As an example, the context of a PID topic element can be a component, a system, a service procedure, a symptom (e.g., a DTC), an automated vehicle adjustment, a fluid status, an indirect module calculation, or revision data. As an example, an indirect module calculation can be based on one or more sensor inputs received by an ECU over time. For instances, an indirection module calculation such as "misfire counts" can be based on sensor inputs received over a period of time greater that it takes to sample a signal one time to obtain a single input value from a sensor. Other examples of indirect module calculations include "smooth running engine" calculation, a fuel range calculation, a used-oil life or a remaining oil life value. Component concepts for a PID topic can be based on an indirect module calculation and sensor signals used to make the indirect module calculation.

A PID topic pertaining to an automated vehicle adjustment can include a PID topic pertaining to a fuel trim adjustment. The fuel trim adjustment is performed by a powertrain ECU within the vehicle 12. A PID topic pertaining to fuel trim adjustment can include PID elements corresponding to a long term fuel trim parameter value and a to a short term fuel trim parameter value. Another example of a PID topic based on an automated vehicle adjustment is passenger compartment temperature. This PID topic can include a PID topic file with PID identifiers corresponding to HVAC controls, an air conditioning system, and a body control system. The vehicle's ability or inability to establish a steady temperature in the passenger compartment equal to a requested temperature setting can be diagnosed, at least in part, on parameter values for PIDs defined for the PID topic.

A PID topic pertaining to fluid status can be used to indicate conditions of fluids in the vehicle 12. As an example, a fluid condition can indicate whether a fluid level, such as a level of engine oil, transmission fluid, or engine coolant is below an acceptable range, within an acceptable range, or above an acceptable range. As another example, a fluid condition can indicate whether a fluid pressure, such as an engine oil pressure, a transmission fluid pressure, or an air pressure in a tire is below an acceptable range, within an acceptable range, or above an acceptable range. As yet another example, a fluid condition can indicate an fluid quality condition, such as a fluid quality condition indicated by an output of an oil sensor. As still yet another example, a fluid condition can indicate a fluid life, such as remaining engine oil life.

A PID topic pertaining to revision data can include provide PID elements pertaining to calibration identifiers corresponding to a calibration program or data programmed within an ECU. In at least some implementations, the revision data can include verification numbers along with the calibration identifiers. As another example, the revision data can include identifiers of a hardware version of an ECU and/or identifiers of non-calibration software programmed into an ECU.

A condition icon within a container can represent various aspects regarding PIDs that correspond to the container containing that condition icon. As an example, the condition icon 325, 499, 327 each include a numeral indicating a quantity of PIDs. As another example, the condition icon 325, 499, 327 each include a geometric shape representing whether the numeral indicates a quantity of PIDs that correspond to a parameter range or expected value defined for the PID topic. In the figures, a rectangular condition icon indicates that the numeral corresponds to a quantity of PIDs corresponding to a parameter range or an expected value, whereas a circular condition icon indicates that the numeral corresponds to a quantity of PIDs that do not correspond to a parameter range or an expected value defined for the PID topic. As yet another example, a shaded geometric shape within the condition icon can indicate that the numeral within the geometric shape represents a quantity of PIDs that correspond to received parameters outside of a predefined range or not matching an expected value for the PID corresponding to the parameters. In contrast, an unshaded geometric shape within the condition icon can indicate that the numeral within the geometric shape represents a quantity of PIDs for which all of the received parameters corresponding to the PIDs are within a predefined range or match an expected value for the PID corresponding to the parameters. In other words, none of the received parameters for the quantity of PIDs indicated by the numeral within the unshaded geometric shape within the condition icon is outside of a corresponding predefined range or an unexpected value. A condition icon can be contained within a USC for removing and/or adding sub-containers within a GUI including a PID topic including those sub-containers.

In accordance with at least some example implementations, a container resizing USC has a setting represented by a "+" symbol in the drawings that indicates a size of the PID topic will increase if the container resizing USC is selected, and a setting represented by a "−" in the drawings that indicates a size of the PID topic well decrease if the container resizing USC is selected.

In response to selection of a container resizing USC including the "+" symbol or some other indicator that indicates selection of the container resizing USC will result in increasing a size of the container, the processor 102 can increase a size of the container and move (e.g., downward) a container below the increased sized container or remove the container below the increased sized container from the display 122.

In response to selection of a container resizing USC including the "−" symbol or some other indicator that indicates selection of the container resizing USC will result in decreasing a size of the container, the processor 102 can decrease a size of the container and move (e.g., upward) a container below the decreased sized container or add a container below the decreased sized container onto the display 122.

A GUI including two or more PID topics can display those PID topics according to a particular order. The processor 102 can initially output the PID topics according to a default order. In at least some implementations, the server 160 provides the GUI to the computing system 100 arranged for displaying the PID topics according to the default order. The processor 102 can determine a different order for displaying the PID topics in the GUI and modify the GUI so that the PID topics are displayed according to the different order.

In accordance with at least some implementations, a criterion for modifying a GUI to show PID topics in a different order is a quantity of PID topics corresponding to received parameters outside of a predetermined parameter range or not matching an expected value.

As shown in FIG. 26, the PID topic container 316, the PID topic container 317, and the PID topic container 318 are arranged in a particular order in a direction from the side 379 towards the side 380. In an alternative implementation, the direction for the particular order is from the side 381 towards the side 382 or from the side 382 towards the side 381. In yet another alternative implementation, multiple PID topic containers can be arranged in a list view of multiple columns of multiple PID topic containers or a list view of multiple rows of multiple PID topic containers.

Table J through Table Y includes example data that can be stored as part of the PID topic file 139. Table J, as well as Table K, Table N, Table O, Table Q, Table S, and Table W, show example data for GUIs that include three containers. The PID topic file 139 can include data for GUIs having a different number of containers, such as one, two, four, five, six, seven or some other quantity of containers. The data could include the same types of data shown in the first row of Table J. A description of those types of data follows hereafter.

Table J, as well as Table K, Table N, Table O, Table Q, Table S, and Table W include order data for the containers including the PID topic descriptor 319, 320, 321, data indicating a number of PIDs corresponding to each PID topic element, data indicating a quantity of PIDs corresponding to a parameter range or expected range, data indicating a quantity of PIDs corresponding to received parameters outside of the parameter range or not matching an expected value, data indicating a position of each container or some portion thereof, data indicating a size of each container, and data indicating a status of a container resizing USC.

Various parameters can be used to define a container size or container position. As an example, a container size can be specified using quantities of pixel columns and rows. For example, a container size can be specified as 1,900 pixel columns and 100 pixel rows. As another example, a container size can be specified using percentages. For example, a container size can be specified to have a width of 95% of the display 122 and a height of 13 and ⅓% of the display 122. In some implementations, a container size specified using a quantity of pixel columns and rows or using percentages can be associated with a display position, such as an upper left corner position. The display position can be specified in various ways, such as a pixel coordinate (e.g., pixel coordinate 50, 200) or a display percentage (e.g., 2.5% from the side 381 and 10% from the side 379).

FIG. 26 shows a corner position 441, 442, 443, 444 of the display 122. In at least some implementations, the corner position 441, 442, 443, 444 represents a pixel coordinate of the display 122. For the purpose of describing the use of the corner position 441, 442, 443, 444, it is assumed that the display 122 is arranged as a 2000×1500 pixel display. In accordance with this example, the display 122, while held in a landscape orientation, has 2000 columns of pixels and 1500 rows of pixels. The corner position 441 can therefore correspond to a pixel coordinate 0, 0, the corner position 442 can correspond to a pixel coordinate 0, 1500, the corner position 443 can correspond to a pixel coordinate 2000, 0, and the corner position 444 can correspond to a pixel coordinate 2000, 1500. A person skilled in the art will understand that the display 122 in the example implementations can have a different number of pixel columns and pixel rows than the example listed above. That person will also understand that the display 122 may not include any corner position.

The position data in Table J and Table N through Table Y includes example position data based on the example 2000×1500 pixel display and the aforementioned examples of the corner position 441, 442, 443, 444. The size data in Table J and Table N through Table Y includes example size data based on the display 122 being in the landscape orientation and based on a quantity of pixels of the display 122.

In at least some implementations, the PID topic file 139 can include data for one or more different default display arrangements of containers for displaying a respective number of PID topics. The processor 102 can populate a GUI based on the number of PID topics contained in a PID topic file received at the computing system 100 and on a display arrangement corresponding to that same number of PID topics. The default display arrangements can be created based on a particular size of the display 122, especially when the display arrangements are based on quantities of pixel columns and rows.

In at least some implementations, the PID topic file 139 can include data for one or more different default display arrangements of sub-containers for displaying data regarding a respective number of PIDs within a parent container containing those sub-containers. The processor 102 can populate a GUI based on the number of PIDs corresponding to a container for a PID topic file received at the computing system 100 and on a display arrangement corresponding to that same number of PIDs. The default display arrangements of sub-containers can be created based on a particular size of the display 122, especially when the display arrangements are based on quantities of pixel columns and rows.

The data for the default display arrangement of containers corresponding to PID topics can be used by the processor 102, 161 under circumstances in which none of the PID parameter values (corresponding to PID elements defined for a PID topic file) that correspond to a predefined range are out of range and all of the PID parameter values (corresponding to PID elements defined for a PID topic file) that correspond to an expected value match the expected value. Table J and Table K show that none of the parameters are out of range and none of parameters are unexpected values as the fifth column includes a zero for each PID topic descriptor. The position and size data shown in Table J is specified with respect to pixels can be part of a display arrangement of containers corresponding to PID topic file that includes three PID topics. The position and size data shown in Table K is specified with respect to percentages of the display can be part of a display arrangement of containers corresponding to PID topic file that includes three PID topics.

TABLE J

| Order | PID Topic Descriptor | No. of PIDs | PIDs w/ Range or expected value | Out of range parameter values or unexpected value | Position (pixel coordinates) | Size (pixel columns × pixel rows) | Container resizing USC |
|---|---|---|---|---|---|---|---|
| 1 | 319 | 4 | 4 | 0 | 50/250 | 1900 × 100 | + |
| 2 | 320 | 4 | 4 | 0 | 50/350 | 1900 × 100 | + |
| 3 | 321 | 4 | 0 | 0 | 50/450 | 1900 × 100 | + |

TABLE K

| Order | PID Topic Descriptor | No. of PIDs | PIDs w/ Range or expected value | Out of range parameter values or unexpected value | Position (%) | Size (%) | Container resizing USC |
|---|---|---|---|---|---|---|---|
| 1 | 319 | 4 | 4 | 0 | 2.5/16⅔ | 95 × 6⅔ | + |
| 2 | 320 | 4 | 4 | 0 | 2.5/23⅓ | 95 × 6⅔ | + |
| 3 | 321 | 4 | 0 | 0 | 2.5/30 | 95 × 6⅔ | + |

The views of the GUI 296 shown in FIG. 26 to FIG. 33 are alternative views of the GUI 296 after and/or before use of one or more of the container resizing USC 322, 323, 324, and after some number of parameter values corresponding to parameter-identifies corresponding to the PID topic container 316, 317, 318 have been determined to be outside of a range for a PID or have been determined to not match some expected value for a PID.

In accordance with at least some implementations, the GUI 296 can include a USC 119, 121, 123, 125. Some of the figures showing containers do not show the USC 119, 121, 123, 125 for clarity of the figures, but the GUI shown in those figures can include the USC 119, 121, 123, 125. Each of the USC 119, 121, 123, 125 includes an on position and an off position. In the figures, cross-hatching lines are used within the USC 119, 121, 123, 125 to indicate that the on position or off position of the USC 119, 121, 123, 125 is selected.

The USC 119 is operable to cause the processor 102, 161 to automatically arrange an order of multiple containers corresponding to a PID topic. In at least some implementations of a GUI including the USC 119, the on position of the USC 119 corresponds to a single, non-default automatic arrangement style. The single, non-default automatic arrangement style can be any one of the multiple, automatic arrangement styles discussed below or some other automatic arrangement style. In accordance with these implementations, the off position of the USC 119 corresponds to a default arrangement style. The default arrangement style can be any other one of the multiple, automatic arrangement styles discussed below or some other automatic arrangement style.

In other implementations of a GUI including the USC 119, the on position of the USC 119 corresponds to one of multiple automatic arrangement styles selectable using a USC 687, 688, 689, 690, 691, 731. In at least some implementations, the USC 687, 688, 689, 690, 691, 731 can be contained within a container 158 that is displayed anytime the GUI including the USC 687, 688, 689, 690, 691, 731 is displayed or in response to a selection of the USC 119.

The USC 687 is operable to select a sequential automatic arrangement style based on occurrence of the PID topics within the GUI having a PID that is associated with a received PID parameter value being out-of-range or an unexpected value. The USC 688 is operable to select an automatic arrangement style based on a respective quantity of PIDs (for each PID topic) associated with a received PID parameter value being out-of-range or an unexpected value. The USC 689 is operable to select an automatic arrangement style based on a percentage of PIDs (for each PID topic) being associated with a received PID parameter value that is out-of-range or an unexpected value. The USC 690 is operable to select an automatic arrangement style based on an alpha-numeric order of the PID topics within the GUI. The USC 691 is operable to select an automatic arrangement style based on a respective quantity of PIDs for each PID topic within the GUI.

The USC 731 is operable to select an automatic arrangement style based on a frequency of the computing system 100 receiving PID parameter values that are outside of a predefined range or an unexpected value for a PID within a container as compared to a frequency of the computing system 100 receiving PID parameter values that are outside of a predefined range or an unexpected value for a PID within the other container(s) within a parameter-identified topic.

The processor 102, 161 is programmed to automatically arrange the PID topics within a GUI based on an automatic arrangement style selected using the USC 687, 688, 689, 690, 691, 731 and/or to a default arrangement style. In accordance with at least some implementations, an automatic arrangement style based on a frequency is further conditioned on a frequency on which the PID parameter values that are outside of a predefined range or an unexpected value follow a most-recently received PID parameter value for the same PID that was within the predefined range or was an expected value.

In at least some implementations, the automatic arrangement of PID topics occurs only once in response to selection of an automatic arrangement style not currently being used. A benefit of these implementations is that the PID topics will not arrange automatically while a user is trying to read content of the PID topics without a user having just selected a different automatic arrangement style for the displayed PID topics.

In at least some other implementations, the automatic arrangement of PID topics can occur multiple times in response to selection of an automatic arrangement style not currently being used. The automatic arrangement styles that can change multiple times include the sequential arrangement style, the quantity of breached PIDs arrangement style, and the percentage arrangement style. A benefit of these implementations is that changing trends in PID parameter values can be observed without having to re-select the USC 687, 688, 689, 690, 691, 731.

The USC 123 is operable to cause the processor 102, 161 to automatically arrange an order of multiple containers by reversing a current order of the multiple containers.

Table L shows example container arrangements based on various positions of the USC 119, 123 in accordance with at least some implementations. If none of the parameters have been determined to be out of range or an unexpected value, then an arrangement of PID topics based on out of range parameters or unexpected values can be identical to the default arrangement, and the reverse arrangement based on out of range parameters or unexpected values can be identical to the reverse default arrangement.

TABLE L

| USC 119 Position | USC 123 Position | Container arrangement |
|---|---|---|
| Off | Off | Default arrangement |
| On | Off | Arrangement based on single, non-default automatic arrangement style or automatic arrangement style selected from among multiple automatic arrangements styles |
| Off | On | Reverse default arrangement |
| On | On | Reverse arrangement based on single, non-default automatic arrangement style or automatic arrangement style selected from among multiple automatic arrangements styles |

As discussed above, the PIDs of some containers, such as the PID topic container 318, do not correspond to a parameter range or to an expected value defined for the PID topic. In at least some implementations, arranging containers based on the position of the USC 119, 123 includes leaving a container that includes only PIDs that do not correspond to a parameter range or to an expected value defined in its default position.

For the GUI 296, a default order of the PID topic container 316, 317, 318 in a direction from the side 379 to the side 380 can be the PID topic container 316, 317, 318. In at least some implementations, a reverse default order of the PID topic container 316, 317, 318 in a direction from the side 379 to the side 380 is the PID topic container 318, 317, 316. In at least some other implementations, a reverse default order of the PID topic container 316, 317, 318 in a direction from the side 379 to the side 380 is the PID topic container 317, 316, 318. In those latter implementations, the PID topic container 318 is not rearranged because the PIDs of the PID topic container 318 do not correspond to a parameter range or to an expected value defined for the PID topic.

The USC 121 is operable to cause the processor 102, 161 to automatically arrange an order of sub-containers corresponding to PIDs. In response to the USC 121 being set to the on position, the processor 102, 161 can determine whether any parameters corresponding to PIDs for each container in the GUI have been or are out of range and whether any of the parameters have been or are unexpected values. In response to the USC 121 being set to the off position, the processor 102, 161 can arrange an order of multiple sub-containers corresponding to PIDs based on a default order of the multiple sub-containers. The USC 125 is operable to cause the processor 102, 161 to automatically arrange an order of multiple sub-containers corresponding to PIDs by reversing a current order of the multiple sub-containers corresponding to PIDs.

Table M shows example sub-container arrangements based on various positions of the USC 121, 125. If none of the parameters have been determined to be out of range or an unexpected value, then the arrangement of the multiple sub-containers based on out of range parameters or unexpected value can be identical to the default arrangement, and the reverse arrangement of the multiple sub-containers based on out of range parameters or unexpected value and be identical to the reverse default arrangement.

TABLE M

| USC 121 Position | USC 125 Position | Sub-container arrangement |
|---|---|---|
| Off | Off | Default arrangement |
| On | Off | Arrangement based on single, non-default automatic arrangement style or automatic arrangement style selected from among multiple automatic arrangements styles |
| Off | On | Reverse default arrangement |
| On | On | Reverse arrangement based on single, non-default automatic arrangement style or automatic arrangement style selected from among multiple automatic arrangements styles |

As discussed above, the PIDs of some containers, such as the PID topic container 318, do not correspond to a parameter range or to an expected value defined for the PID topic. In at least some implementations, arranging sub-containers based on the position of the USC 121, 125 includes leaving a sub-container that includes only PIDs that do not correspond to a parameter range or to an expected value defined in its default position.

Figure 53:
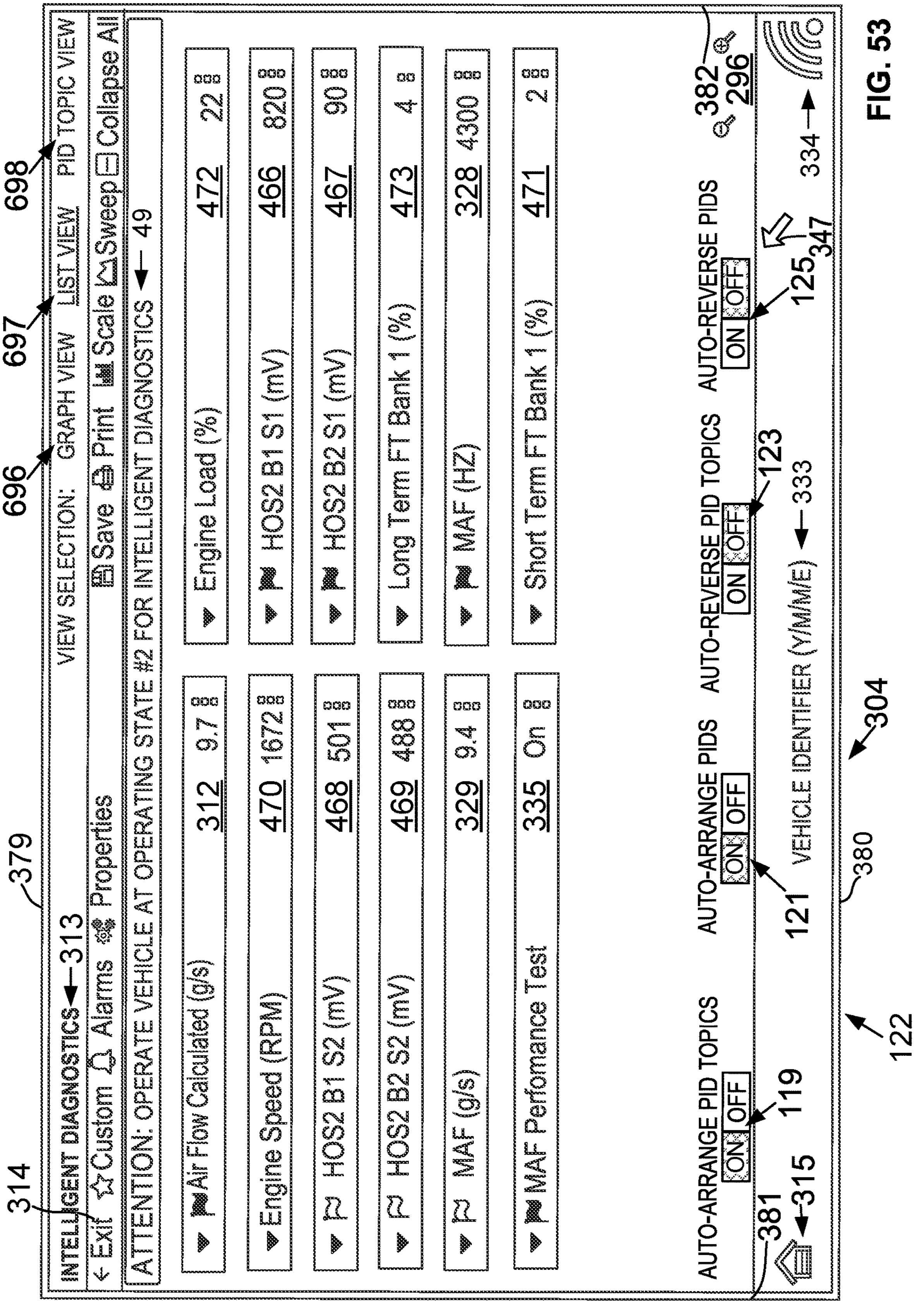
FIG. 53 and FIG. 54 show a graphical user interface in accordance with the example implementations.

The GUI 296 includes a USC 696, 697, 698 to operable to make a view selection. In response to a selection of the USC 696, the processor 102, 161 is operable to output, on the display 122, a GUI arranged to show PIDs of a PID topic in a graph view. In response to a selection of the USC 697, the processor 102, 161 is operable to output, on the display 122, a GUI arranged to show PIDs of a PID topic in a list view. In other implementations, a USC for selecting a different type of view can also be included within a GUI, such as the GUI 296. FIG. 53 shows another view of the GUI 296. In FIG. 53, the PIDs of the PID topic container 316, 317, 318 are displayed in a list view. In response to a selection of the USC 698, the processor 102, 161 is operable to output, on the display 122, a GUI arranged to show PIDs of a PID topic in a PID topic view. In the GUIs including the USC 696, 697, 698, text of one of the USC 696, 697, 698 is underlined to show that a PID view corresponding to the underlined USC is the currently-selected view. FIG. 26 to FIG. 34 show views of the GUI 296 with the PID topic view currently-selected.

Figure 27:
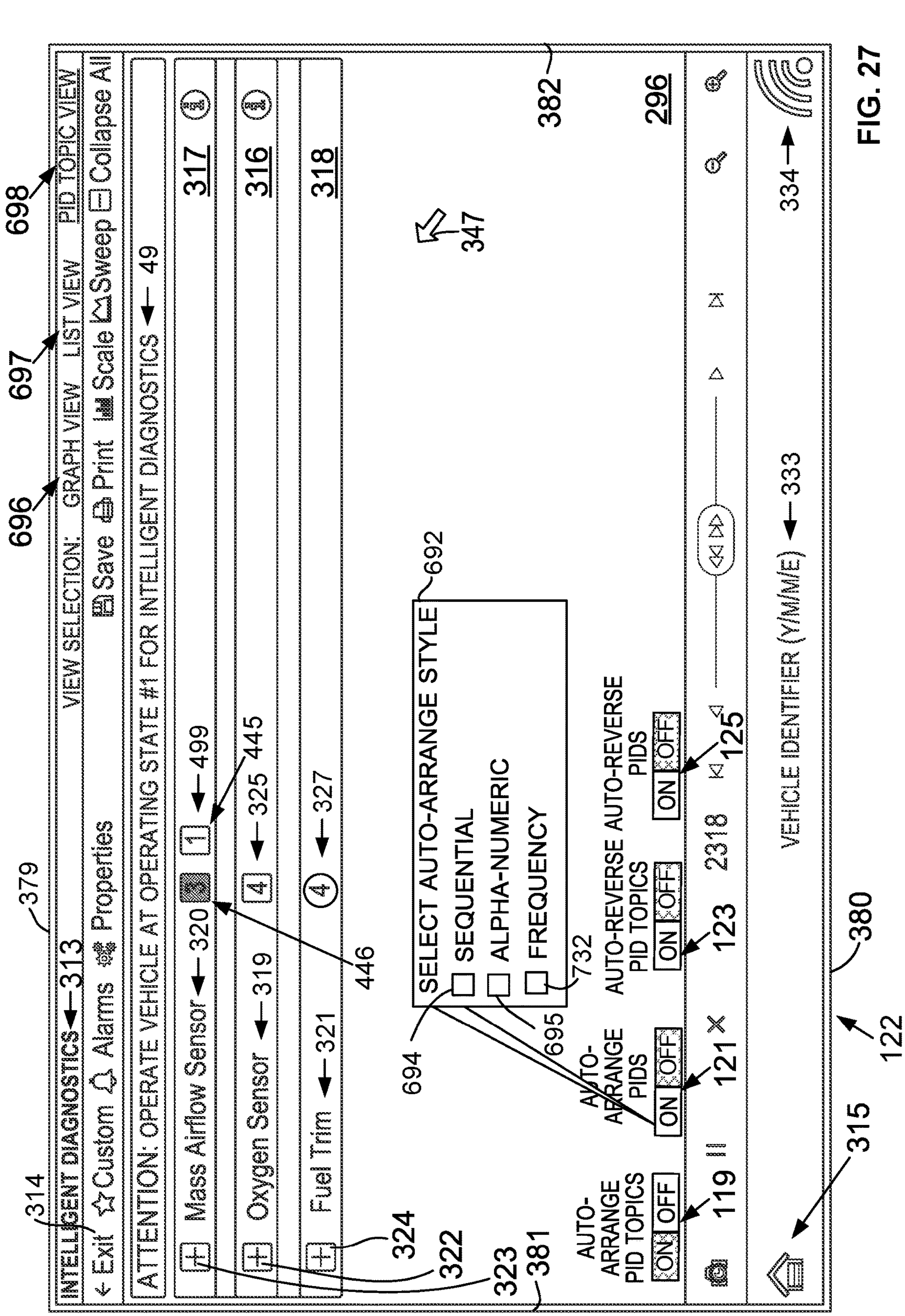

Next, FIG. 27 shows another view of the GUI 296. Compared to FIG. 26, the view of the GUI 296 in FIG. 27 shows a different order of the PID topic container 316, the PID topic container 317, and the PID topic container 318. A comparison of the PID topic descriptor columns in Table J and Table N represent the different order of containers based on the PID topic descriptor 319, the PID topic descriptor 320, and the PID topic descriptor 321.

Additionally, the condition icon 499 includes an unshaded geometric shape 445 and a shaded geometric shape 446. The shaded geometric shape 446 includes a numeral indicating that out-of-range parameters or a parameter with an unexpected value have been received for three PIDs corresponding to the PID topic container 317 and the unshaded geometric shape 445 includes a numeral indicating that no out-of-range parameters and no parameters with an unexpected value have been received for one PID corresponding to the PID topic container 317. The example data in Table N reflects the circumstances indicated by the unshaded geometric shape 445 and the shaded geometric shape 446.

TABLE N

| Order | PID Topic Descriptor | No. of PIDs | PIDs w/ Range or expected value | Out of range parameter values or unexpected value | Position (pixel coordinates) | Size (pixel columns × pixel rows) | Container resizing USC |
|---|---|---|---|---|---|---|---|
| 1 | 320 | 4 | 4 | 3 | 50/250 | 1900 × 100 | + |
| 2 | 319 | 4 | 4 | 0 | 50/350 | 1900 × 100 | + |
| 3 | 321 | 4 | 0 | 0 | 50/450 | 1900 × 100 | + |

FIG. 27 also shows a USC 694, 695, 732. In at least some implementations, the USC 694, 695, 732 can be contained within a container 692 that is displayed anytime the GUI including the USC 694, 695, 732 is displayed or in response to a selection of the USC 121. The USC 694 is operable to select a sequential automatic arrangement style based on occurrence of the sub-containers within the GUI having a PID that is associated with a received PID parameter value being out-of-range or an unexpected value. The USC 695 is operable to select an automatic arrangement style based on an alpha-numeric order of the sub-containers within the GUI.

The USC 732 is operable to select an automatic arrangement style based on a frequency of the computing system 100 receiving PID parameter values that are outside of a predefined range or an unexpected value for a PID within a container as compared to a frequency of the computing system 100 receiving PID parameter values that are outside of a predefined range or an unexpected value for a PID within the same container.

In at least some implementations, the different order of PID topics within a GUI can result from manual inputs to the computing system 100. As an example, the order of the PID topic container 316, the PID topic container 317, and the PID topic container 318 shown in FIG. 28 can result from a drag-and-drop operation performed while the GUI 296 appears as shown in FIG. 27. As an example, the drag-and-drop operation can include selecting the PID topic container 316 with the cursor 347 and dragging the PID topic container 316 onto the PID topic container 317. In response to determining that operation has occurred, the processor 102, 161 can the positions of the PID topic container 316, 317 within the GUI 296. As another example, the drag-and-drop operation can include selecting the PID topic container 317 with the cursor 347 and dragging the PID topic container 317 onto the PID topic container 316. In response to determining that operation has occurred, the processor 102, 161 can the positions of the PID topic container 316, 317 within the GUI 296.

Figure 28:
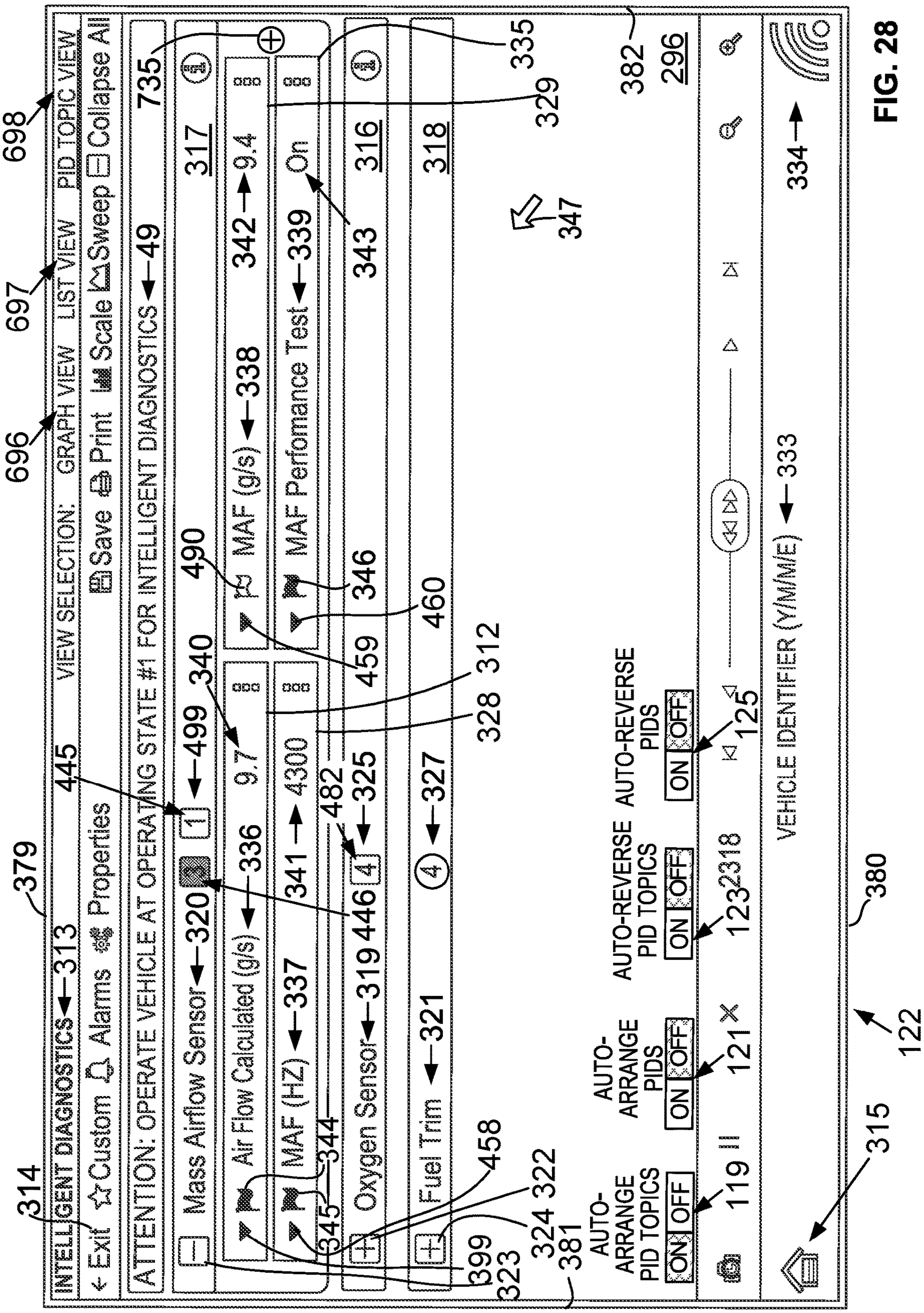

Next, FIG. 28 shows another view of the GUI 296. Table O and Table P correspond to the GUI 296 as shown in FIG. 28. Compared to the GUI 296 as shown in FIG. 27, the GUI 296 shown in FIG. 28 and the Table O show that the container resizing USC 324 for the PID topic container 317 that includes the PID topic descriptor 320 includes the "–" symbol rather than the "+" symbol. Additionally, the GUI 296 in FIG. 28 includes the PID topic container 317 in an expanded state as compared to the PID topic container 317 being displayed in a contracted state in the GUI 296 as shown in FIG. 27.

In at least some implementations, a PID topic container that is in an expanded state can include a container resizing USC 735 or a container resizing USC 736. FIG. 28 shows the container resizing USC 735 in the PID topic container 317 in the expanded state. In response to selection of the container resizing USC 735, the PID topic container containing the container resizing USC 735 can further expand in size to permit displaying the container resizing USC 736 and supplemental information and/or further USC pertaining to the PID topic or one or more PIDs corresponding to the PID topic container containing the container resizing USC 735. To guide a user of the computing system 100, text such as "show more" or the like can be located within or in proximity to the container resizing USC 735.

FIG. 34 shows the container resizing USC 736 in the PID topic container 317 in the expanded state and while expanded and displaying the container resizing USC 736 and supplemental information and/or further USC pertaining to the PID topic or one or more PIDs corresponding to the PID topic container containing the container resizing USC 736. To guide a user of the computing system 100, text such as "show less" or the like can be located within or in proximity to the container resizing USC 736.

Returning to FIG. 28, the order of the containers corresponding to the PID topic descriptor 319, 320, 321 in the GUI 296 shown in FIG. 28 is the same as the order used for the GUI 296 as shown in FIG. 27. In contrast, however, the order of the containers corresponding to the PID topic descriptor 319, 320, 321 in the GUI 296, as shown in FIG. 27 and FIG. 28, is different than the order of the containers corresponding to the PID topic descriptor 319, 320, 321 in the GUI 296 shown in FIG. 26. This is because the containers shown in the GUI 296 in FIG. 26 are arranged in a default order, as discussed above with respect to FIG. 26.

TABLE O

| Order | PID Topic Descriptor | No. of PIDs | PIDs w/ Range or expected value | Out of range parameter values or unexpected value | Position (pixel coordinates) | Size (pixel columns × pixel rows) | Container resizing USC |
|---|---|---|---|---|---|---|---|
| 1 | 320 | 4 | 4 | 3 | 50/250 | 1900 × 100 | – |
| 2 | 319 | 4 | 4 | 0 | 50/550 | 1900 × 100 | + |
| 3 | 321 | 4 | 0 | 0 | 50/650 | 1900 × 100 | + |

The processor 102 can output the GUI 296, as shown in FIG. 28, onto the display 122 in response to the container resizing USC 323 being selected while the GUI 296, as shown in FIG. 27, is displayed on the display 122. In a related manner, the processor 102 can output the GUI 296, as shown in FIG. 27, onto the display 122 in response to the container resizing USC 323 being selected while the GUI 296, as shown in FIG. 28, is displayed on the display 122.

Expansion of a container provides for displaying within the expanded container one or more sub-containers corresponding to a PID that corresponds to the PID topic of the container.

As shown in FIG. 28, the PID topic container 317 includes a sub-container 312, 328, 329, 335. The sub-container 312 includes a parameter value 340 corresponding to a PID identified by a PID descriptor 336, a flag 344, and a sub-container resizing USC 399. The sub-container 328 includes a parameter value 341 corresponding to a PID identified by a PID descriptor 337, a flag 345, and a sub-container resizing USC 458. The sub-container 329 includes a parameter value 342 corresponding to a PID identified by a PID descriptor 338, a flag 490, and a sub-container resizing USC 459. The sub-container 335 includes a parameter value 343 corresponding to a PID identified by a PID descriptor 339, a flag 346, and a sub-container resizing USC 460. A count of the flag(s) in a black state (e.g., the flag 344, 345, 346) and a count of the flag(s) in a white state (e.g., the flag 490) in the sub-container 312, 328, 329, 335 equal the numeral in the unshaded geometric shape 445 and the shaded geometric shape 446, respectively, within the condition icon 499.

Table P shows data corresponding to the sub-containers in the PID topic container 317. Table P includes a parameter value corresponding to each sub-container 312, 328, 329, 335 and a corresponding range or expected value to compare to the parameter values in Table P. Table P includes data indicative of a status of a flag 344, 345, 346, 490, and a status of the sub-container resizing USC 399, 458, 459, 460. Table P also includes data indicative of a position and a size of the sub-containers including the PID descriptor 336, 337, 338, 339. Table P includes data indicative of an order of the sub-containers including the PID descriptor 336, 337, 338, 339. The order data in Table P, as well as in Table R, Table T, Table U, and Table V includes a number indicative of a row and a letter indicative of a position in a row, wherein "1" indicates a first row, "2" indicates a second row, "3" indicates a third row, "4" indicates a fourth row, "5" indicates a fifth row, "6" indicates a sixth row, and "L" indicates a left position and "R" indicates a right position.

TABLE P

| Order | PID Descriptor | PID parameter value | PIDs w/ range or expected value | Flag | Position (pixel coordinates) | Size (pixel columns × pixel rows) | USC |
|---|---|---|---|---|---|---|---|
| 1L | 336 | 9.7 | 18-475 | Black | 100/350 | 800 × 100 | ▼ |
| 1R | 338 | 9.4 | 5-27 | White | 1000/350 | 800 × 100 | ▼ |
| 2L | 337 | 4300 | 500-3700 | Black | 100/450 | 800 × 100 | ▼ |
| 2R | 339 | On | Off | Black | 1000/450 | 800 × 100 | ▼ |

Next, FIG. 29 shows another view of the GUI 296. In this view of the GUI 296, as compared to the view of the GUI 296 shown in FIG. 28, the USC 123 is set to the on position rather than the off position. In accordance with at least some implementations, rearrangement of the containers in a GUI in response to selection of the USC 123 does not include rearranging any container that does not include any PID and corresponding range of parameter values or expected value. In accordance with at least some other implementations, rearrangement of the containers in a GUI in response to selection of the USC 123 includes rearranging all of the containers in the GUI.

As a result of the USC 123 being set to the on position as shown in FIG. 29 as compared to the USC 123 being set to the off position as shown in the GUI 296 in FIG. 28, the processor 102, 161 has rearranged the PID topic containers 316, 317 by reversing those containers.

Figure 30:
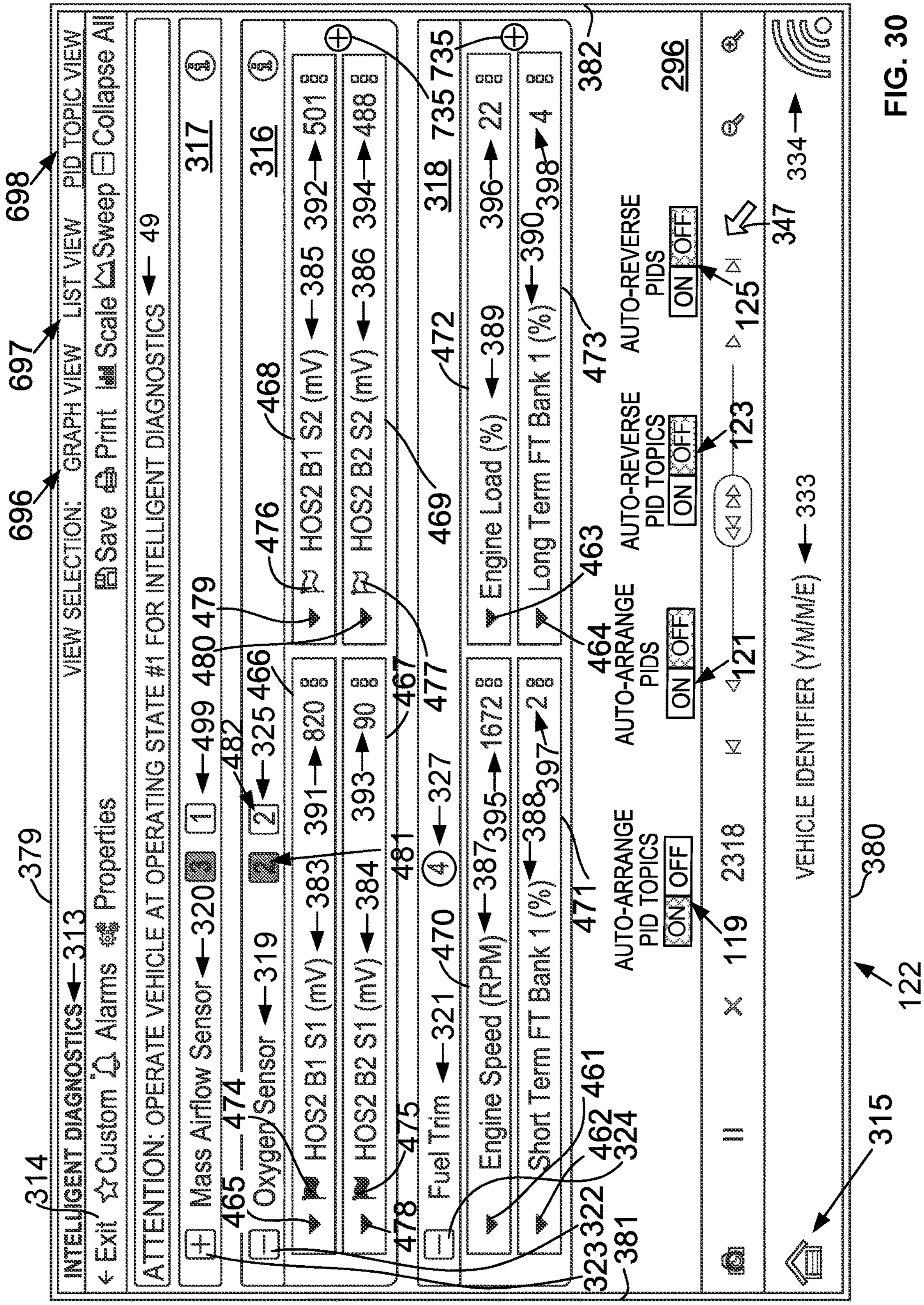

Next, FIG. 30 shows another view of the GUI 296. Table Q and Table R correspond to the GUI 296 as shown in FIG. 30. Compared to the GUI 296 as shown in FIG. 28, the GUI 296 as shown in FIG. 30 and the Table Q show that the container resizing USC 324 for the PID topic container 317 that includes the PID topic descriptor 320 includes the "+" symbol rather than the "–" symbol, the container resizing USC 322 for the PID topic container 316 that includes the PID topic descriptor 319 includes the "–" symbol rather than the "+" symbol, and the container resizing USC 323 for the PID topic container 318 that includes the PID topic descriptor 321 includes the "–" symbol rather than the "+" symbol. Additionally, the GUI 296 as shown in FIG. 30 includes the PID topic container 317 in a contracted state as compared to the PID topic container 317 being displayed in an expanded state in the GUI 296 as shown in FIG. 28. The order of the containers corresponding to the PID topic descriptor 319, 320, 321 in the GUI 296 as shown in FIG. 30 is the same as the order used for the GUI 296 as shown in FIG. 28. In FIG. 30, the condition icon 325 further includes a shaded geometric shape 481 with a numeral corresponding to a number of flags in a black state for the PID topic container 316.

TABLE Q

| Order | PID Topic Descriptor | No. of PIDs | PIDs w/ Range or expected value | Out of range parameter values or unexpected value | Position (pixel coordinates) | Size (pixel columns × pixel rows) | Container resizing USC |
|---|---|---|---|---|---|---|---|
| 1 | 320 | 4 | 4 | 3 | 50/250 | 1900 × 100 | + |
| 2 | 319 | 4 | 4 | 2 | 50/350 | 1900 × 300 | – |
| 3 | 321 | 4 | 0 | 0 | 50/650 | 1900 × 300 | – |

As shown in FIG. 30, the PID topic container 316 includes a sub-container 466, 467, 468, 469. The sub-container 466 includes a parameter value 391 corresponding to a PID identified by a PID descriptor 383, a flag 474, and a sub-container resizing USC 465. The sub-container 467 includes a parameter value 393 corresponding to a PID identified by a PID descriptor 384, a flag 475, and a sub-container resizing USC 478. The sub-container 468 includes a parameter value 392 corresponding to a PID identified by a PID descriptor 385, a flag 476, and a sub-container resizing USC 479. The sub-container 469 includes a parameter value 394 corresponding to a PID identified by a PID descriptor 386, a flag 477, and a sub-container resizing USC 480. A count of the flag(s) in a black state (e.g., the flag 474, 475) and a count of the flag(s) in a white state (e.g., the flag 476, 477) in the sub-container 466, 467, 468, 469 equal the numeral in the shaded geometric shape 481 and the unshaded geometric shape 482, respectively, within the condition icon 325.

The PID topic container 318 includes a sub-container 470, 471, 472, 473. The sub-container 470 includes a parameter value 395 corresponding to a PID identified by a PID descriptor 387, and a sub-container resizing USC 461. The sub-container 471 includes a parameter value 397 corresponding to a PID identified by a PID descriptor 388, and a sub-container resizing USC 462. The sub-container 472 includes a parameter value 396 corresponding to a PID identified by a PID descriptor 389 and a sub-container resizing USC 463. The sub-container 473 includes a parameter value 398 corresponding to a PID identified by a PID descriptor 390, and a sub-container resizing USC 464.

Table R shows data corresponding to the sub-containers in the PID topic container 316, 318 in GUI 296 as shown in FIG. 30. Table R includes a parameter value corresponding to each sub-container 466, 467, 468, 469, 470, 471, 472, 473 and a corresponding range or expected value for the sub-container 466, 467, 468, 469 to compare to the parameter values in Table R. Table R uses the word "None" to indicate that there is no range or expected value for the sub-containers 470, 471, 472, 473. Table R includes data indicative of a status of a flag 474, 475, 476, 477, and a status of the sub-container resizing USC 461, 462, 463, 464, 465, 478, 479, 480. Table R also includes data indicative of a position and a size of the sub-containers including the PID descriptor 383, 384, 385, 386, 387, 388, 389, 390. Table R includes data indicative of an order of the sub-containers including the PID descriptor 383, 384, 385, 386 in the PID topic container 316, and an order of the sub-containers including the PID descriptor 387, 388, 389, 390 in the PID topic container 318.

TABLE R

| Order | PID Descriptor/ Sub-container | PID parameter value | PIDs w/ range or expected value | Flag | Position (pixel coordinates) | Size (pixel columns × pixel rows) | USC |
|---|---|---|---|---|---|---|---|
| 3L | 383/466 | 820 | 100-600 | Black | 100/450 | 800 × 100 | ▼ |
| 3R | 385/468 | 501 | 100-600 | White | 1000/450 | 800 × 100 | ▼ |
| 4L | 384/467 | 90 | 100-600 | Black | 100/550 | 800 × 100 | ▼ |
| 4R | 386/469 | 488 | 100-600 | White | 1000/550 | 800 × 100 | ▼ |
| 5L | 387/470 | 1672 | None | None | 100/750 | 800 × 100 | ▼ |
| 5R | 389/472 | 22 | None | None | 1000/750 | 800 × 100 | ▼ |
| 6L | 388/471 | 2 | None | None | 100/850 | 800 × 100 | ▼ |
| 6R | 390/473 | 4 | None | None | 1000/850 | 800 × 100 | ▼ |

Figure 31:
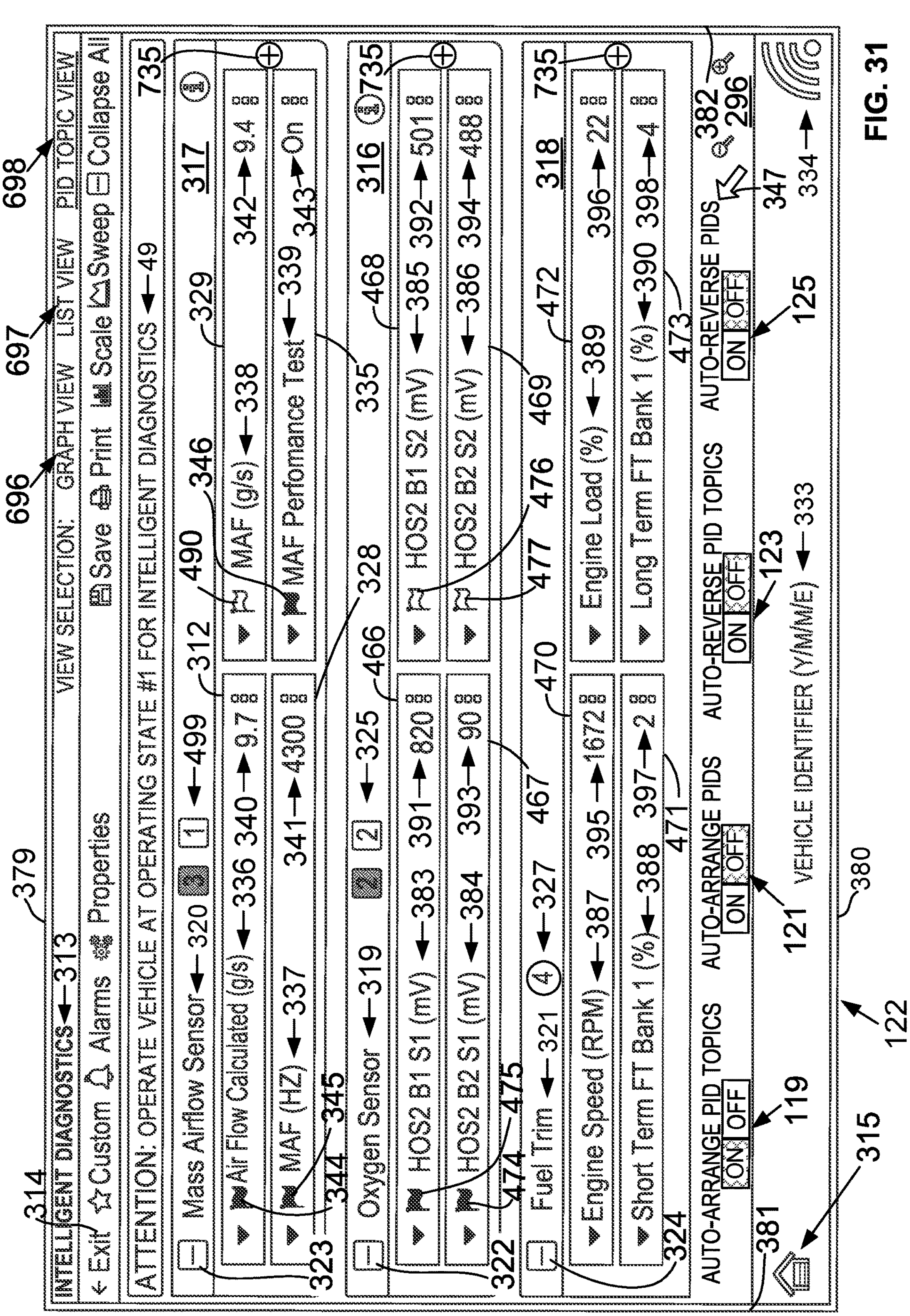

Next, FIG. 31 shows another view of the GUI 296. Table S and Table T correspond to the GUI 296 as shown in FIG. 31. Compared to the GUI 296 as shown in FIG. 30, the GUI 296 shown in FIG. 31 and the Table S show that the container resizing USC 324 for the PID topic container 317 that includes the PID topic descriptor 320 includes the "–" symbol rather than the "+" symbol. Additionally, the GUI 296 shown in FIG. 31 includes the PID topic container 317 in the expanded state as compared to the PID topic container 317 being displayed in the contracted state in the view of the GUI 296 in FIG. 30. These differences can occur in response to a selection of the container resizing USC 323 in the GUI 296 as shown in FIG. 30. The order of the containers corresponding to the PID topic descriptor 319, 320, 321 in the GUI 296 shown in FIG. 31 is the same as the order used for the GUI 296 as shown in FIG. 30.

TABLE S

| Order | PID Topic Descriptor | No. of PIDs | PIDs w/ Range or expected value | Out of range parameter values or unexpected value | Position (pixel coordinates) | Size (pixel columns × pixel rows) | Container resizing USC |
|---|---|---|---|---|---|---|---|
| 1 | 320 | 4 | 4 | 3 | 50/250 | 1900 × 300 | – |
| 2 | 319 | 4 | 4 | 2 | 50/550 | 1900 × 300 | – |
| 3 | 321 | 4 | 0 | 0 | 50/850 | 1900 × 300 | – |

Table T shows data corresponding to the sub-containers in the PID topic container 316, 317, 318. Table T includes a parameter value corresponding to each sub-container 312, 328, 329, 335, 466, 467, 468, 469, 470, 471, 472, 473 and a corresponding range or expected value for the sub-container 312, 328, 329, 335, 466, 467, 468, 469 to compare to the parameter values in Table T. Table T includes data indicative of a status of a flag 344, 345, 346, 490, 474, 475, 476, 477 within the sub-container including the sub-containers including the PID descriptor 336, 337, 339, 338, 383, 384, 385, 386, respectively. Table T further includes data indicative of a status of the sub-container resizing USC 399, 458, 459, 460, 461, 462, 463, 464, 465, 478, 479, 480 (all identified in FIG. 29 or FIG. 30) corresponding to the sub-container including the PID descriptor 336, 337, 338, 339, 383, 384, 385, 386, 387, 388, 389, 390. Table T also includes data indicative of a position and a size of the sub-containers including the PID descriptor 336, 337, 338, 339, 383, 384, 385, 386, 387, 388, 389, 390. Table T includes data indicative of an order of the sub-containers including the PID descriptor 383, 384, 385, 386 in the PID topic container 316, the PID descriptor 336, 337, 338, 339 in the PID topic container 317, and an order of the sub-containers including the PID descriptor 387, 388, 389, 390 in the PID topic container 318.

TABLE T

| Order | PID Descriptor/ Sub-container | PID parameter value | PIDs w/ range or expected value | Flag | Position (pixel coordinates) | Size (pixel columns × pixel rows) | USC |
|---|---|---|---|---|---|---|---|
| 1L | 336/312 | 9.7 | 18-475 | Black | 100/350 | 800 × 100 | ▼ |
| 1R | 338/329 | 9.4 | 5-27 | White | 1000/350 | 800 × 100 | ▼ |
| 2L | 337/328 | 4300 | 500-3700 | Black | 100/450 | 800 × 100 | ▼ |
| 2R | 339/335 | On | Off | Black | 1000/450 | 800 × 100 | ▼ |
| 3L | 383/466 | 820 | 100-600 | Black | 100/650 | 800 × 100 | ▼ |
| 3R | 385/468 | 501 | 100-600 | White | 1000/650 | 800 × 100 | ▼ |
| 4L | 384/467 | 90 | 100-600 | Black | 100/750 | 800 × 100 | ▼ |
| 4R | 386/469 | 488 | 100-600 | White | 1000/750 | 800 × 100 | ▼ |
| 5L | 387/470 | 1672 | None | None | 100/950 | 800 × 100 | ▼ |
| 5R | 389/472 | 22 | None | None | 1000/950 | 800 × 100 | ▼ |
| 6L | 388/471 | 2 | None | None | 100/1050 | 800 × 100 | ▼ |
| 6R | 390/473 | 4 | None | None | 1000/1050 | 800 × 100 | ▼ |

Figure 32:
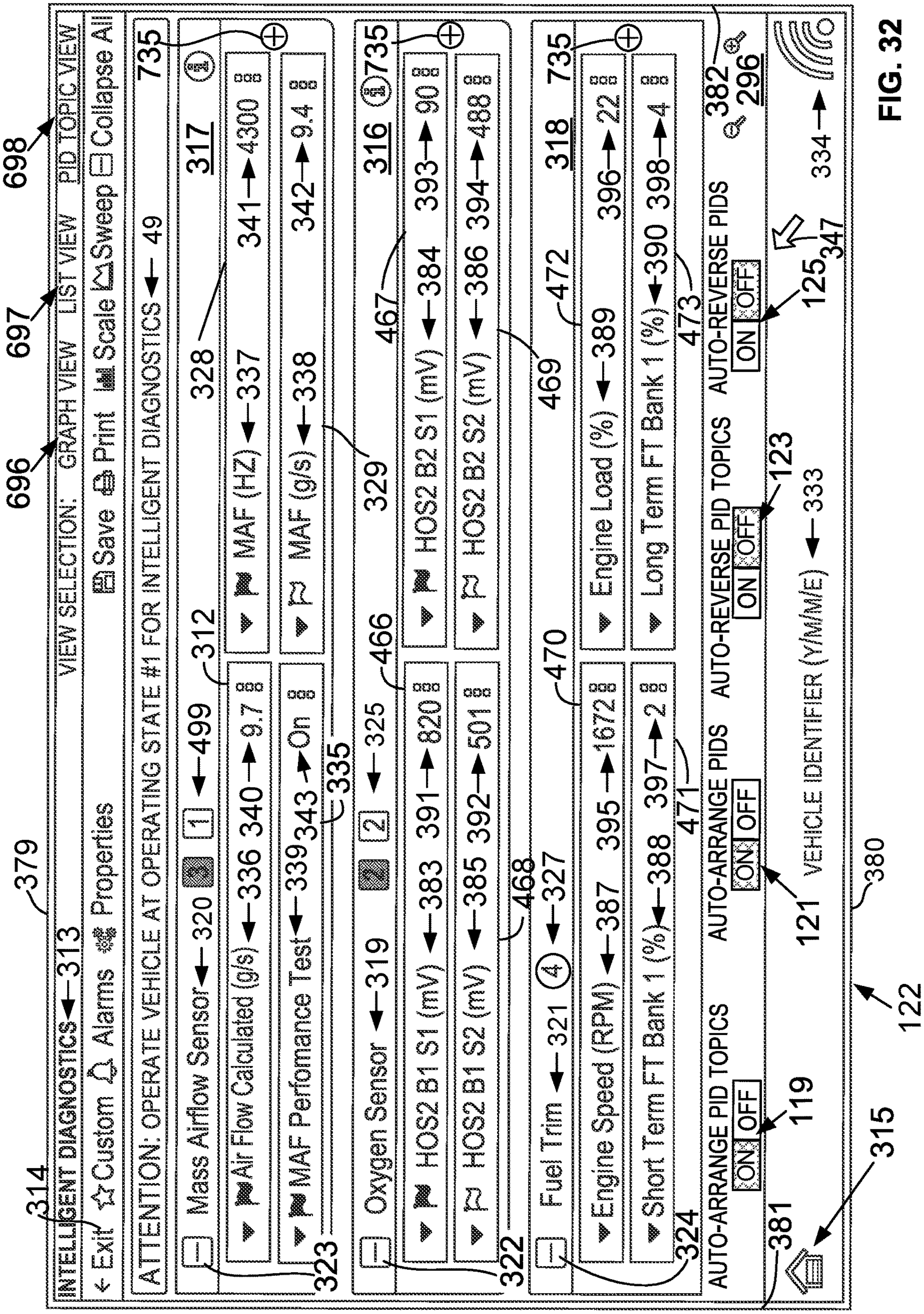

Next, FIG. 32 shows another view of the GUI 296. Compared to the GUI 296 as shown in FIG. 31, the view of the GUI 296 in FIG. 32 shows that the USC 121 is in the on position rather than the off position as shown in the GUI 296 in FIG. 31. Table U corresponds to the GUI 296 as shown in FIG. 32. A comparison of the sub-containers listed with Table T and Table U and the PID topic container 316, 317 in the view of the GUI 296 in FIG. 31 and FIG. 32 show that the PIDs within those sub-containers having a flag have been rearranged. The rearrangement results in the sub-containers corresponding to PIDs associated with parameter values that have breached a threshold range or an unexpected value (e.g., a sub-container within a black flag) being listed first from left to right then top to bottom, followed by the sub-containers corresponding to PIDs associated with no parameter value that breaches a threshold range or is an unexpected value (e.g., a sub-container within a white flag).

TABLE U

| Order | PID Descriptor/ Sub-container | PID parameter value | PIDs w/ range or expected value | Flag | Position (pixel coordinates) | Size (pixel columns × pixel rows) | USC |
|---|---|---|---|---|---|---|---|
| 1L | 336/312 | 9.7 | 18-475 | Black | 100/350 | 800 × 100 | ▼ |
| 1R | 337/328 | 4300 | 500-3700 | Black | 100/450 | 800 × 100 | ▼ |
| 2L | 339/335 | On | Off | Black | 1000/450 | 800 × 100 | ▼ |

TABLE U-continued

| Order | PID Descriptor/ Sub-container | PID parameter value | PIDs w/ range or expected value | Flag | Position (pixel coordinates) | Size (pixel columns × pixel rows) | USC |
|---|---|---|---|---|---|---|---|
| 2R | 338/329 | 9.4 | 5-27 | White | 1000/350 | 800 × 100 | ▼ |
| 3L | 383/466 | 820 | 100-600 | Black | 100/650 | 800 × 100 | ▼ |
| 3R | 384/467 | 90 | 100-600 | Black | 100/750 | 800 × 100 | ▼ |
| 4L | 385/468 | 501 | 100-600 | White | 1000/650 | 800 × 100 | ▼ |
| 4R | 386/469 | 488 | 100-600 | White | 1000/750 | 800 × 100 | ▼ |
| 5L | 387/470 | 1672 | None | None | 100/950 | 800 × 100 | ▼ |
| 5R | 389/472 | 22 | None | None | 1000/950 | 800 × 100 | ▼ |
| 6L | 388/471 | 2 | None | None | 100/1050 | 800 × 100 | ▼ |
| 6R | 390/473 | 4 | None | None | 1000/1050 | 800 × 100 | ▼ |

Figure 33:
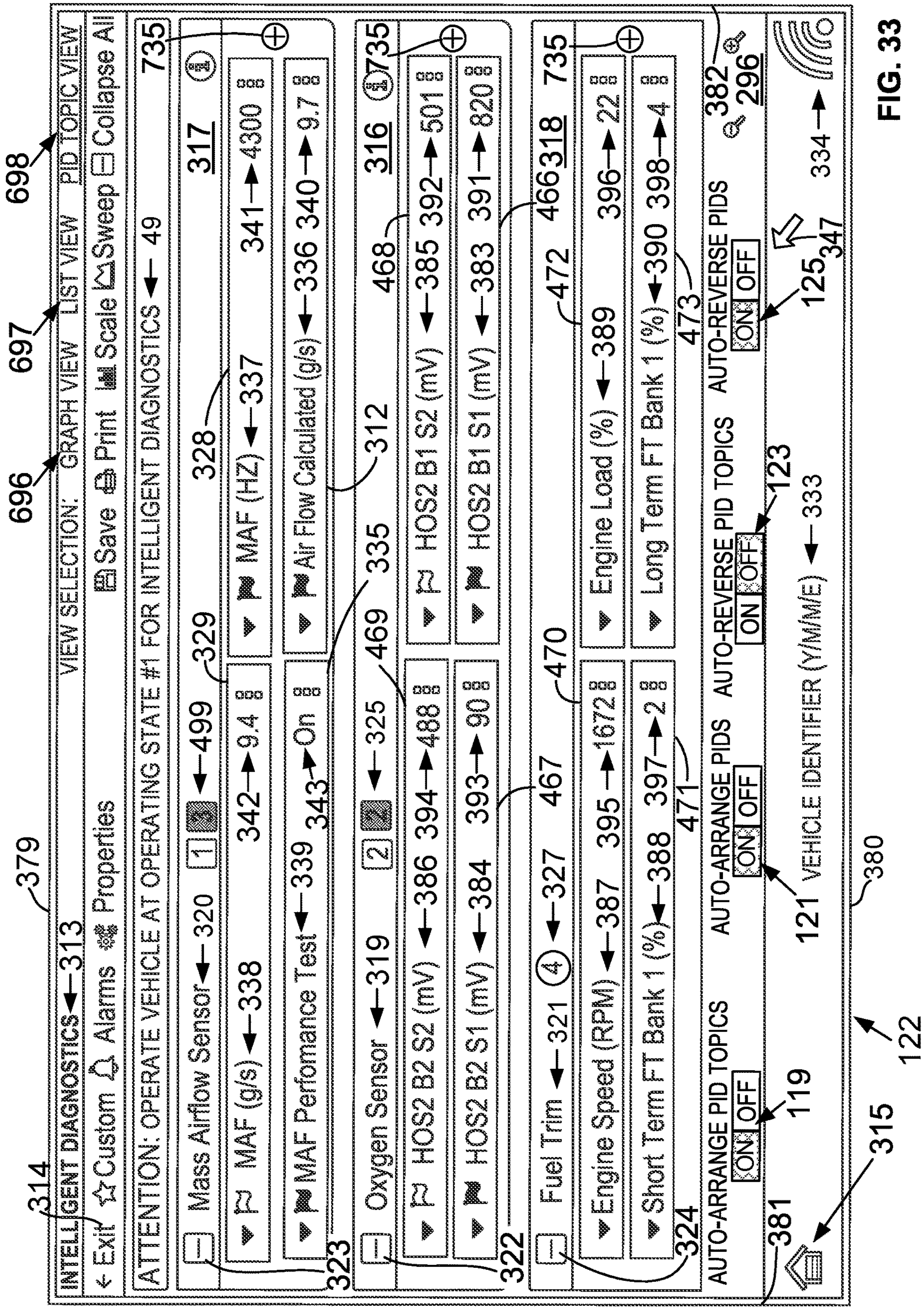

Next, FIG. 33 shows another view of the GUI 296. Compared to the GUI 296 as shown in FIG. 32, the GUI 296 in FIG. 33 shows that the USC 125 is in the on position rather than the off position as shown in the GUI 296 as shown in FIG. 32. Table V corresponds to the GUI 296 as shown in FIG. 33. A comparison of the sub-containers listed with Table U and Table V and the PID topic container 316, 317 in the views of the GUI 296 shown in FIG. 32 and FIG. 33 shows that the PIDs within those sub-containers having a flag have been reversed. The reversal results in the sub-containers corresponding to PIDs associated with no parameter value that breaches a threshold range or is an unexpected value (e.g., a sub-container within a white flag) being listed first from left to right then top to bottom, followed by the sub-containers corresponding to PIDs associated with parameter values that have breached a threshold range or an unexpected value (e.g., a sub-container within a black flag).

TABLE V

| Order | PID Descriptor/ Sub-container | PID parameter value | PIDs w/ range or expected value | Flag | Position (pixel coordinates) | Size (pixel columns × pixel rows) | USC |
|---|---|---|---|---|---|---|---|
| 1L | 338/329 | 9.4 | 5-27 | White | 1000/350 | 800 × 100 | ▼ |
| 1R | 337/328 | 4300 | 500-3700 | Black | 100/450 | 800 × 100 | ▼ |
| 2L | 339/335 | On | Off | Black | 1000/450 | 800 × 100 | ▼ |
| 2R | 336/312 | 9.7 | 18-475 | Black | 100/350 | 800 × 100 | ▼ |
| 3L | 386/469 | 488 | 100-600 | White | 1000/750 | 800 × 100 | ▼ |
| 3R | 385/468 | 501 | 100-600 | White | 1000/650 | 800 × 100 | ▼ |
| 4L | 384/467 | 90 | 100-600 | Black | 100/750 | 800 × 100 | ▼ |
| 4R | 383/466 | 820 | 100-600 | Black | 100/650 | 800 × 100 | ▼ |
| 5L | 387/470 | 1672 | None | None | 100/950 | 800 × 100 | ▼ |
| 5R | 389/472 | 22 | None | None | 1000/950 | 800 × 100 | ▼ |
| 6L | 388/471 | 2 | None | None | 100/1050 | 800 × 100 | ▼ |
| 6R | 390/473 | 4 | None | None | 1000/1050 | 800 × 100 | ▼ |

In at least some implementations, selection of the USC 125 to the on position includes reversing the sub-containers without any flags, such as the sub-containers in the PID topic container 318. Additionally or alternatively, in at least some implementations, selection of the USC 125 results in reversal of the geometric shapes with numerals in the condition icon 325, 499.

Next, FIG. 34 shows another view of the GUI 296. Table W, Table X, and Table Y correspond to the GUI 296 as shown in FIG. 34. Compared to the GUI 296 as shown in FIG. 29, the GUI 296 shown in FIG. 34 includes an alternative view of the PID topic container 317 in the expanded state and with the container resizing USC 324 showing the "–" symbol. A comparison of Table Q and Table W show that a size of the PID topic container 317 (including PID topic descriptor 320) is larger in the GUI 296 (as shown in FIG. 34) as compared to the GUI 296 as shown in FIG. 29, and the position of the PID topic container 316, 318 (including PID topic descriptor 319, 321, respectively) is shown as none in Table W, because the PID topic container 316, 318 is not shown in the GUI 296 in FIG. 34.

TABLE W

| Order | PID Topic Descriptor | No. of PIDs | PIDs w/ Range or expected value | Out of range parameter values or unexpected value | Position (pixel coordinates) | Size (pixel columns × pixel rows) | Container resizing USC |
|---|---|---|---|---|---|---|---|
| 1 | 320 | 4 | 4 | 3 | 50/250 | 1900 × 1100 | – |
| 2 | 319 | 4 | 4 | 0 | None | 1900 × 100 | + |
| 3 | 321 | 4 | 0 | 0 | None | 1900 × 100 | + |

Table V shows data corresponding to the sub-containers in the PID topic container 317. Table X includes a parameter value corresponding to each sub-container 312, 328, 329, 335 and a corresponding range or expected value to compare to the parameter values in Table X. Table X includes data indicative of a status of a flag 344, 345, 346, 490, and a status of the sub-container resizing USC 399, 458, 459, 460. Table X also includes data indicative of a position and a size of the sub-containers including the PID descriptor 336, 337, 338, 339. Table X includes data indicative of an order of the sub-containers including the PID descriptor 336, 337, 338, 339.

least some implementations, the sub-container includes a quantity identifier indicative of how many technical service bulletins correspond to the vehicle. In at least some of those implementations, the quantity identifier is within the USC 483, as shown in FIG. 34. The sub-container 402 includes supplemental information regarding a connector. The sub-container 403 includes supplemental information regarding the mass air flow sensor component of a vehicle. The sub-container 404 includes a USC 405, 406, 737, 738.

The GUI content 140 shown in FIG. 21 can include connector descriptions of connectors within a vehicle. The connectors are removably connectable to other connectors.

TABLE X

| Order | PID Descriptor/ Sub-container | PID parameter value | PIDs w/ range or expected value | Flag | Position (pixel coordinates) | Size (pixel columns × pixel rows) | USC |
|---|---|---|---|---|---|---|---|
| 1L | 336/312 | 9.7 | 18-475 | Black | 100/350 | 800 × 100 | ▼ |
| 1R | 338/329 | 9.4 | 5-27 | White | 1000/350 | 800 × 100 | ▼ |
| 2L | 337/328 | 4300 | 500-3700 | Black | 100/450 | 800 × 100 | ▼ |
| 2R | 339/335 | On | Off | Black | 1000/450 | 800 × 100 | ▼ |

Table Y shows data corresponding to additional sub-containers in the PID topic container 317. The additional sub-containers include a sub-container 400, 401, 402, 403, 404. Table Y includes data corresponding to an order of the sub-container 400, 401, 402, 403, 404, a supplemental information descriptor corresponding to the sub-container 400, 401, 402, 403, 404, position data corresponding to a position of the sub-container 400, 401, 402, 403, 404 on the display 122, and size data corresponding to sub-container 400, 401, 402, 403, 404.

TABLE Y

| Order | Supplemental Information Descriptor | Position (pixels) | Size (pixels) |
|---|---|---|---|
| 1AL | Top Repairs | 100/550 | 1100 × 400 |
| 1AR | TSBs | 1300/550 | 500 × 250 |
| 1BL | Connector View | 100/950 | 500 × 400 |
| 1BC | Overview | 700/950 | 500 × 400 |
| 1BR | Scanner Functions | 1300/800 | 500 × 550 |

The sub-container 400 includes supplemental information regarding top repairs for a vehicle corresponding to the vehicle identifier 333. The sub-container 401 includes supplemental information regarding technical service bulletins that pertain to a vehicle corresponding to the vehicle identifier 333. The sub-container 401 also includes a USC 483. In response to a selection of the USC 483, the processor 102 can request, receive, and responsively output onto the display 122 one or more technical service bulletins or portions of the one or more technical service bulletins. In at The connectors can include pins connected to circuits, such as electrical or optical circuits. The connector descriptions can include textual descriptions and/or drawings or images of a connector. FIG. 16 shows a connector description 1070 in accordance with the example implementations. The connector description 1070 includes a connector diagram 1071 and a signal function description 1072. The connector descriptions can include the connector description 1070. The processor 102 can output on the display 122 at least a portion of the connector description. The connector description shown on the display can guide a user how to connect the meter 151 or the oscilloscope 155 for determining a measurement of a signal on a circuit connected to the connector described by the connector description. As an example, the connector description shown on the display 122 can indicate the circuit connector to Pin B to make a measurement of a signal indicative of a crankshaft position.

Populating the sub-container 404 with the USC 405 can be based on the scanner function element 884 (shown in FIG. 25C). In response to a selection of the USC 405, the processor 102 can transmit to the vehicle 12 a vehicle data message indicative of the functional test corresponding to the USC 405. The processor 102 can determine the vehicle data message that corresponds to the functional test indicated by the scanner function element 884 and/or the USC 405 by searching the scanner functions 762 based on the indicated functional test. Additionally or alternatively, the scanner function element 884 can include data needed to generate the vehicle data message to the vehicle 12 to request performance of the functional test that corresponds to the functional test indicated by the scanner function element 884 without having to refer to the scanner functions 762.

Figure 55:
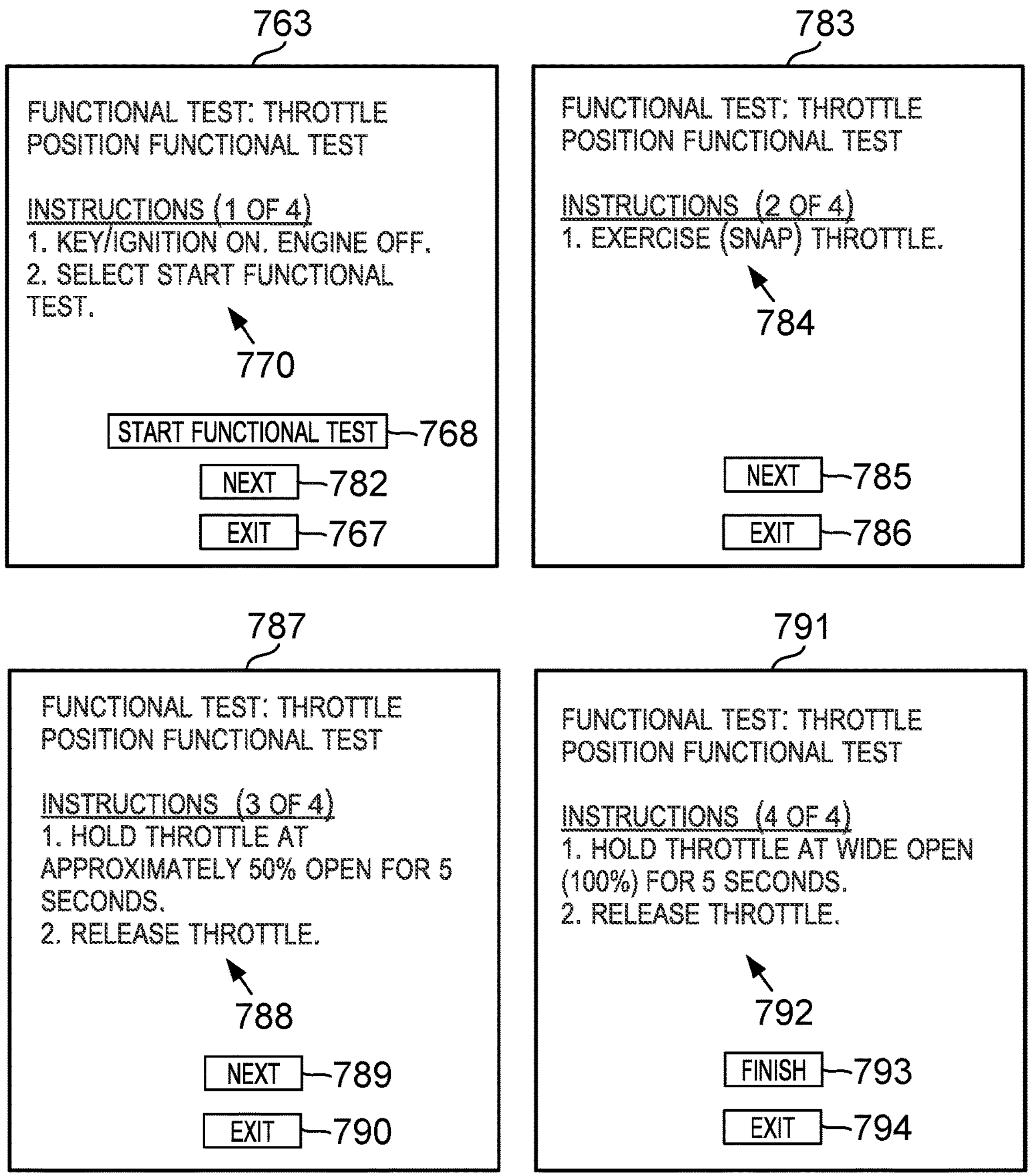
FIG. 55 and FIG. 56 show a graphical user interface aspects in accordance with the example implementations.

In at least some implementations, in response to a selection of the USC 405, the processor 102 can cause the display 122 to display a GUI, such as a GUI 763 shown in FIG. 55. As an example, the GUI 763 includes a USC 767, 768 and an instruction 770 to guide a user of the computing system 100 in requesting performance of a functional test. In response to a selection of the USC 768, the processor 102 transmits a vehicle data message to request performance of the functional test. In response to a selection of the USC 767, the processor 102 ceases displaying the GUI 763. The processor 102 can then return to displaying the GUI 296. As an example, the GUI 763 can be overlaid upon the GUI 296. As another example, the GUI 763 can be arranged as a GUI that is displayed in place of the GUI 296.

In at least some implementations, performing a scanner function of the scanner functions 762 includes performing multiple steps. In at least some of those implementations, multiple GUIs or changes to a GUI can be displayed to guide a user of the computing system 100 to carry out the scanner function. The GUI 763 includes a USC 782 to trigger the processor 102 to display a next GUI or a modified GUI.

In response to selection of the USC 782, the display 122 can display a GUI, such as a GUI 783 shown in FIG. 55. The GUI 783 includes an instruction 784 to guide a user of the computing system 100 in performing a functional test. The GUI 783 includes a USC 785 to trigger the processor 102 to display a next GUI or a modified GUI. The GUI 783 includes a USC 786. In response to a selection of the USC 786, the processor 102 ceases displaying the GUI 783. The processor 102 can then return to displaying the GUI 296.

In response to selection of the USC 785, the display 122 can display a GUI, such as a GUI 787 shown in FIG. 55. The GUI 787 includes an instruction 788 to guide a user of the computing system 100 in performing a functional test. The GUI 787 includes a USC 789 to trigger the processor 102 to display a next GUI or a modified GUI. The GUI 787 includes a USC 790. In response to a selection of the USC 790, the processor 102 ceases displaying the GUI 787. The processor 102 can then return to displaying the GUI 296.

In response to selection of the USC 789, the display 122 can display a GUI, such as a GUI 791 shown in FIG. 55. The GUI 791 includes an instruction 792 to guide a user of the computing system 100 in performing a functional test. The GUI 791 includes a USC 793, 794. In response to a selection of the USC 793, 794, the processor 102 ceases displaying the GUI 791. The processor 102 can then return to displaying the GUI 296.

Returning to FIG. 34, populating the sub-container 404 with the USC 406 can be based on the scanner function element 885 (shown in FIG. 25C). In response to a selection of the USC 406, the processor 102 can transmit to the vehicle 12 a vehicle data message indicative of the reset function corresponding to the USC 406. The processor 102 can determine the vehicle data message that corresponds to the reset function indicated by the scanner function element 885 and/or the USC 406 by searching the scanner functions 762 based on the indicated reset function. Additionally or alternatively, the scanner function element 885 can include data needed to generate the vehicle data message to the vehicle 12 to request performance of the reset function that corresponds to the reset function indicated by the scanner function element 885 without having to refer to the scanner functions 762.

Figure 56:
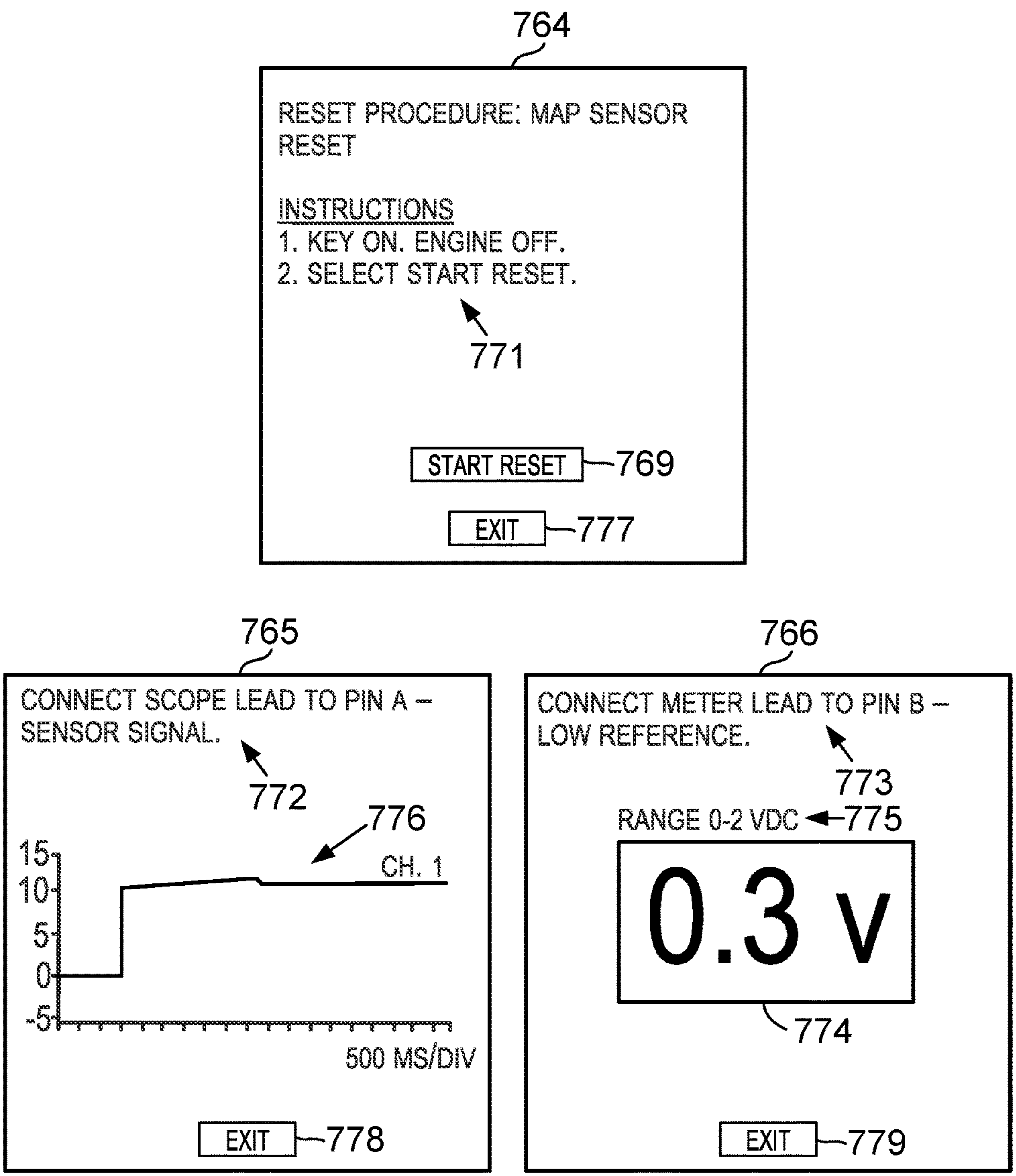

In at least some implementations, the processor 102 can cause the display 122 to display a GUI 764 shown in FIG. 56 in response to a selection of the USC 406. The GUI 764 includes a USC 769, 777 and an instruction 771 to guide a user of the computing system 100 in requesting performance of a reset function. In response to a selection of the USC 769, the processor 102 transmits the vehicle data message to request performance of the reset function. In response to a selection of the USC 777, the processor 102 ceases displaying the GUI 764. The processor 102 can then return to displaying the GUI 296. As an example, the GUI 764 can be overlaid upon the GUI 296. As another example, the GUI 764 can be arranged as a GUI that is displayed in place of the GUI 296.

Returning to FIG. 34, populating the sub-container 404 with the USC 737 can be based on the scanner function element 886 (shown in FIG. 25C). In response to a selection of the USC 737, the processor 102 configures the meter 151 and/or the oscilloscope 155 for performing a guided component test corresponding to the USC 737. The processor 102 can determine the particular signal detector and/or data needed to configure the particular signal detector for the component indicated by the scanner function element 886 and/or the USC 737 by searching the scanner functions 762 based on the indicated component test, which in some implementations, pertains to a particular signal detector (e.g., the meter 151 or the oscilloscope 155). Additionally or alternatively, the scanner function element 886 can include data needed to select the particular signal detector and/or data needed to configure the particular signal detector for the component indicated by the scanner function element 886 without having to refer to the scanner functions 762.

In at least some implementations, the processor 102 can cause the display 122 to display a GUI 765 shown in FIG. 56 in response to a selection of the USC 737. The GUI 765 includes a waveform graph 776 output based on measurements obtained by the oscilloscope 155, a USC 778, and an instruction 772 to guide a user of the computing system 100 in requesting performance of a component test. In response to a selection of the USC 778, the processor 102 ceases displaying the GUI 765 and/or ceases performing a measurement of the component test. The processor 102 can then return to displaying the GUI 296. As an example, the GUI 765 can be overlaid upon the GUI 296. As another example, the GUI 765 can be arranged as a GUI that is displayed in place of the GUI 296.

Returning to FIG. 34, populating the sub-container 404 with the USC 738 can be based on the scanner function element 887 (shown in FIG. 25C). In response to a selection of the USC 738, the processor 102 configures the meter 151 and/or the oscilloscope 155 for performing a guided component test corresponding to the USC 738. The processor 102 can determine the particular signal detector and/or data needed to configure the particular signal detector for the component indicated by the scanner function element 887 and/or the USC 738 by searching the scanner functions 762 based on the indicated component test, which in some implementations, pertains to a particular signal detector (e.g., the meter 151 or the oscilloscope 155). Additionally or alternatively, the scanner function element 887 can include data needed to select the particular signal detector and/or data needed to configure the particular signal detector for the component indicated by the scanner function element 887 without having to refer to the scanner functions 762.

In at least some implementations, the processor 102 causes the display 122 to display a GUI 766 shown in FIG. 56 in response to a selection of the USC 738. The GUI 766 includes a measurement display 774 indicative of an output based on a measurement made by the meter 151, a USC 779, and an instruction 773 to guide a user of the computing system 100 in requesting performance of a component test.

The GUI 766 also includes a configuration identifier 775 indicative of a setting the processor 102 selected to configure the meter 151. In response to a selection of the USC 779, the processor 102 ceases displaying the GUI 766 and/or performing a measurement of the component test. The processor 102 can then return to displaying the GUI 296. As an example, the GUI 766 can be overlaid upon the GUI 296. As another example, the GUI 766 can be arranged as a GUI that is displayed in place of the GUI 296.

In at least some implementations, configuring the meter 151 can include configuring the meter 151 to be in a particular operating state, such as an operating state to make a particular type of electrical measurement (e.g., a voltage measurement, a current measurement, or a resistance measurement). In at least some implementations, configuring the meter 151 can include configuring the meter 151 to operate within a particular range, such as a range of 0.0 volts to 2.0 volts, or a range of 0.0 volts to 20.0 volts.

In at least some implementations, configuring the oscilloscope 155 can include configuring the oscilloscope 155 to use one or more of the following: a particular sample rate from among multiple sample rates, a particular vertical scale setting from among multiple vertical scale settings, a particular horizontal scale setting from among multiple horizontal scale settings, a particular trigger mode from among multiple trigger modes, or a particular trigger source from among multiple trigger sources.

Other examples of supplemental information and/or a USC that can be contained within a sub-container of a container are also possible. Furthermore, in an alternative implementation, the container resizing USC 735 in the PID topic container 317 or another USC (not shown), when selected, can trigger the processor 102 to display the sub-container 400, 401, 402, 403, 404 in a separate GUI other than the GUI 296.

Next, FIG. 35 shows a GUI 183. In FIG. 35, the GUI description 313 indicates that a theme of the GUI pertains to selecting a mode for identifying a vehicle. The GUI 183 includes a USC 348, 349, 350. Selection of the USC 348 causes the processor 102 to enter a mode to automatically identify the vehicle operatively connected to the computing system 100. During that automatic identification mode, the processor 102 can execute program instructions to cause the transceiver 106 to transmit one or more VDM to the vehicle to solicit a response from the vehicle including data indicative of the vehicle being a particular type of vehicle or a particular, individual vehicle. The processor 102 can execute the program instructions to identify the operatively connected vehicle based on the response from the vehicle.

Selection of the USC 349 causes the processor 102 to enter a mode to manually identify a vehicle, such as a vehicle operatively connected to the computing system 100. During that manual identification mode, the processor 102 can execute program instructions to cause the display to display a GUI for selecting a vehicle identifier corresponding to a particular vehicle, such as the GUI 185 shown in FIG. 37. Execution of those program instructions can cause the processor 102 to retrieve the GUI 185 shown in FIG. 37 from the GUI 131 and/or to request the GUI 185 from the server 160.

Selection of the USC 350 can cause the processor 102 to exit the automatic identification mode initiated in response to selection of the USC 348. In those or in other implementations, selection of the USC 350 can cause the processor 102 to output to the display 122 a GUI that was displayed just prior to the GUI 183 being displayed.

Next, FIG. 37 shows a GUI 185. In FIG. 37, the GUI description 313 indicates that a theme of the GUI pertains to selecting a vehicle identifier or a particular vehicle. The GUI 185 shows a year selection menu 351 in which a year selector 357 representing the year 2014 has been selected. The GUI 185 includes a make selection menu 352 in which a make selector 358 representing the make Chevrolet has been selected. The GUI 185 includes a model selection menu 353 in which a model selector 359 representing the model Tahoe has been selected. The year selection menu 351 includes a scroll bar 354 to cause the year selection menu 351 to display year(s) not currently shown in the year selection menu 351. Similarly, the make selection menu 352 includes a scroll bar 355 to cause the make selection menu 352 to display make(s) not currently shown in the make selection menu 352. Likewise, the model selection menu 353 includes a scroll bar 356 to cause the model selection menu 353 to display model(s) not currently shown in the model selection menu 353.

In at least some implementations, the make selection menu 352 is populated with vehicle makes after a year is selected from the year selection menu 351. Similarly, in at least some implementations, the model selection menu 353 is populated with vehicle models after a year is selected from the year selection menu 351 and after a make is selected from the make selection menu 352. In alternative embodiments, the year selection menu 351 is in a GUI without the make selection menu 352 and without the model selection menu 353, and the make selection menu 352 is in a GUI without the year selection menu 351 and without the model selection menu 353, and the model selection menu 353 is in a GUI without the year selection menu 351 and without the make selection menu 352.

In at least some implementations, the GUI shown in the GUI 185 or a separate GUI includes feature selection menus to select other characteristics of a vehicle identifier or a particular vehicle being selected. As an example, the other characteristics of the vehicle identifier can include a drive type (e.g., 2-wheel drive (2WD), 4-wheel drive (4WD) or all-wheel drive (AWD)), an engine displacement (e.g., 3.8 liters (L) or 5.7 L), or a transmission type (e.g., automatic, automatic with overdrive, 3-speed manual, or 4-speed manual).

In still other implementations, the other characteristics of the vehicle identifier can be selected using a previous USC 360, a Yes USC 361, and a next USC 362. After selecting a set of characteristics, such as a year, make, and model, the GUI 185 can display a vehicle identifier 363, such as 2014 Chevrolet Tahoe (4WD), where "4WD" is a supplemental characteristic that can be selected by use of the Yes USC 361. The previous USC 360 can be used to cause the GUI 185 to display a different vehicle identifier, such as 2014 Chevrolet Tahoe (2WD) and the next USC 362 can be used to cause the GUI shown in the GUI 185 to display yet a different vehicle identifier such as 2014 Chevrolet Tahoe (AWD). Selecting the previous USC 360 or the next USC 362 can cause the vehicle identifier 363 to change to the different vehicle identifier. In at least some implementations, a supplemental characteristic that can be selected by use of Yes USC 361 is indicative of an engine and/or engine displacement.

The GUI 185 also includes a VIN USC 364 for entering an identifier of a particular vehicle. As an example, the VIN USC 364 can be used to type or key-in a vehicle identification number (VIN) associated with the particular vehicle. As another example, the VIN USC 364 can be used to cause the vehicle communications transceiver 118 to request a VIN from an ECU in a vehicle, such as the vehicle 12, 40, 51, 1060. The processor 102 can receive the requested VIN and determine at least a year, make, model, engine, and a serial number of the particular vehicle from the VIN.

The GUI 185 also includes a vehicle selector USC 365 for capturing a visual indication of a particular vehicle. As an example, in response to selection of the vehicle selector USC 365, the processor 102 can cause the camera within the input device 120 to capture an image, such as an image of a code 367 representing a VIN, and to cause a GUI, such as the GUI shown in the GUI 185 or a different GUI, to display a window 366 showing the image of code 367 and to display a representation of the alpha-numeric representation of the VIN 368 as determined by the processor 102 decoding the code 367. As yet another example, in response to selection of the vehicle selector USC 365, the processor 102 can cause a scanner of the input device 120 to generate an image, such as an image of the code 367, and to cause a GUI, such as the GUI shown in the GUI 185 or a different GUI, to display the window 366 showing the image of the code 367 and to display a representation of the alpha-numeric representation of the VIN 368 as determined by the processor 102 decoding the code 367. In at least some implementations, the processor 102 can display the window 366 on a different GUI.

Figure 38:
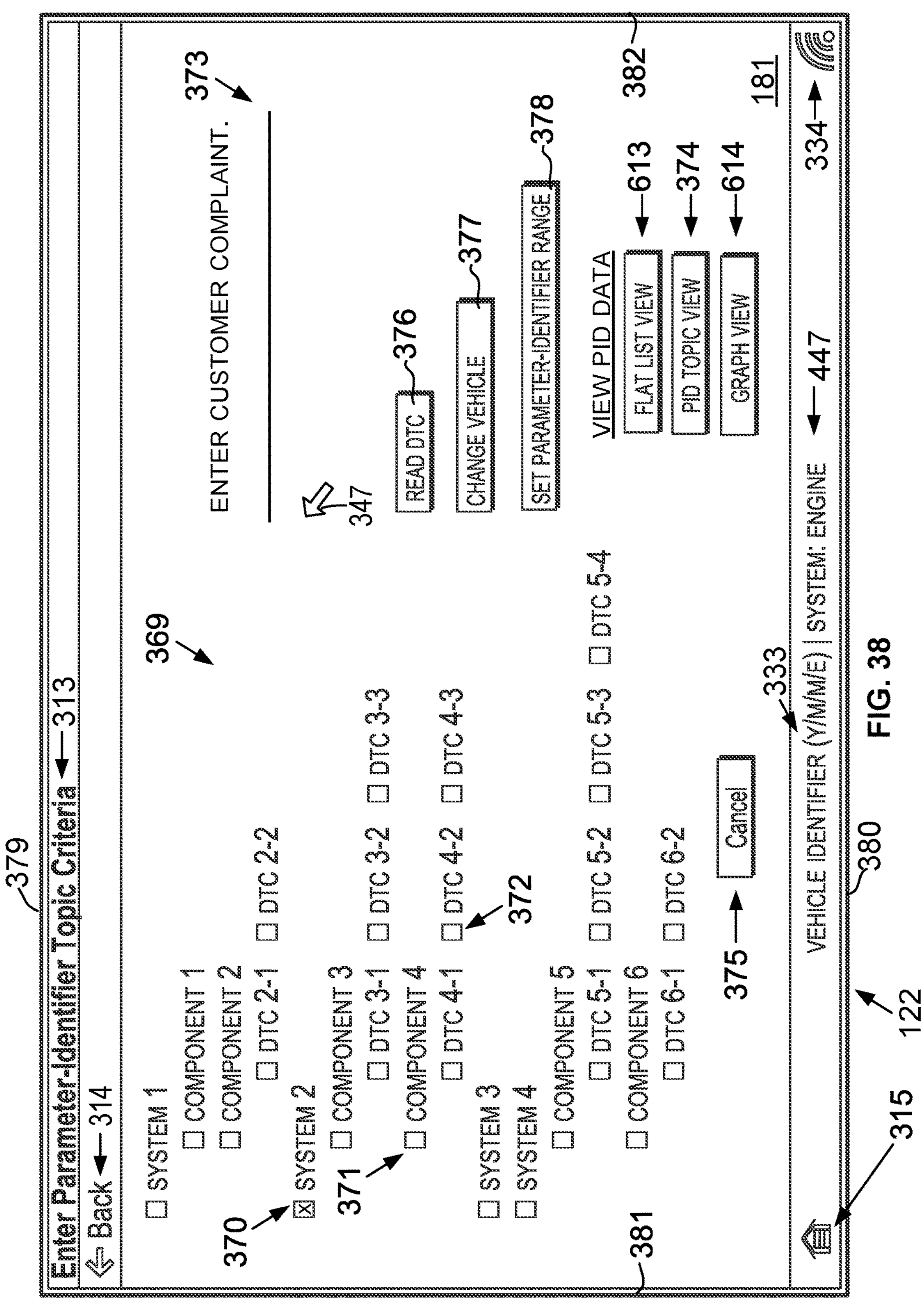

Next, FIG. 38 shows a GUI 181. In FIG. 38, the GUI description 313 indicates that a theme of the GUI 181 pertains to entering PID topic criteria. The PID topic criteria can be used by a processor to locate a PID topic file and/or information to populate into a PID topic displayed on a display.

The GUI 181 includes a symptom selection menu 369. In at least some implementations, the symptom selection menu 369 includes one or more vehicle system selectors, such as the vehicle system selector 370. As an example, the vehicle system selector 370 can represent an engine system. In at least some implementations, upon selecting the vehicle system selector 370, a system identifier 447 is added to the GUI 181. The GUI 181 also includes one or more component selectors, such as the component selector 371. As an example, the component selector 371 can represent a component of the engine system such as an oxygen sensor. The GUI 181 also includes one or more DTC selectors, such as the DTC selector 372. As an example, the DTC selector 372 can represent a P0171 DTC representative of an engine system fault in which an exhaust bank is emitting exhaust that indicates the engine is running lean.

The GUI 181 includes a complaint USC 373 for entering a customer complaint regarding a vehicle identifier corresponding to a vehicle or a particular vehicle. As an example, the complaint USC 373 can be used to type or key-in a customer complaint regarding the particular vehicle. As an example, a customer complaint entered via the complaint USC 373 can indicate "vehicle failed emissions testing."

A GUI can include a USC operable to select a view style for displaying PIDs and PID parameter values. In some instances, the GUI including a USC operable to select a view style is already displaying a PID condition. For example, the GUI 296 shown in FIG. 26 includes the USC 696, 697, 698 operable to select a graph view, a list view, and a PID topic view, respectively. In other instances, the GUI including a USC operable to select a view style is not displaying a PID condition. For example, the GUI 181, which is not displaying a PID condition, includes a USC 374, 613, 614. The USC 374 is operable to select a view style in which a displayed GUI includes a PID topic and/or some aspects of a PID topic file described in this description. The USC 613 is operable to select a view style in which a displayed GUI includes a flat list view of PIDs of a PID topic file. The USC 614 is operable to select a view style in which a displayed GUI a displayed includes a graph view of PIDs of a PID topic file.

The GUI 181 can include a USC 376, 377, 378. Selection of the USC 376 causes the processor 102 to enter a mode to automatically identify a DTC set in the vehicle operatively connected to the computing system 100. During that automatic identification mode, the processor 102 can execute program instructions to cause the transceiver 106 to transmit one or more VDM to the vehicle to solicit a response from the vehicle including data indicative of a DTC being set in the vehicle. The processor 102 can execute the program instructions to identify the DTC (e.g., one or more DTC) set in the vehicle based on the response from the vehicle. Selection of the USC 377 causes the processor 102 to output a GUI for selecting a different vehicle, such as the GUI 183 shown in FIG. 35 or the GUI 185 shown in FIG. 37. Selection of the USC 378 can causes the processor 102 to output a GUI for setting a range for a PID, such as a GUI 187 shown in FIG. 39.

The GUI 181 includes a Cancel USC 375. The Cancel USC 375 can be used to clear out any selections previously made via the GUI 181.

Figure 39:
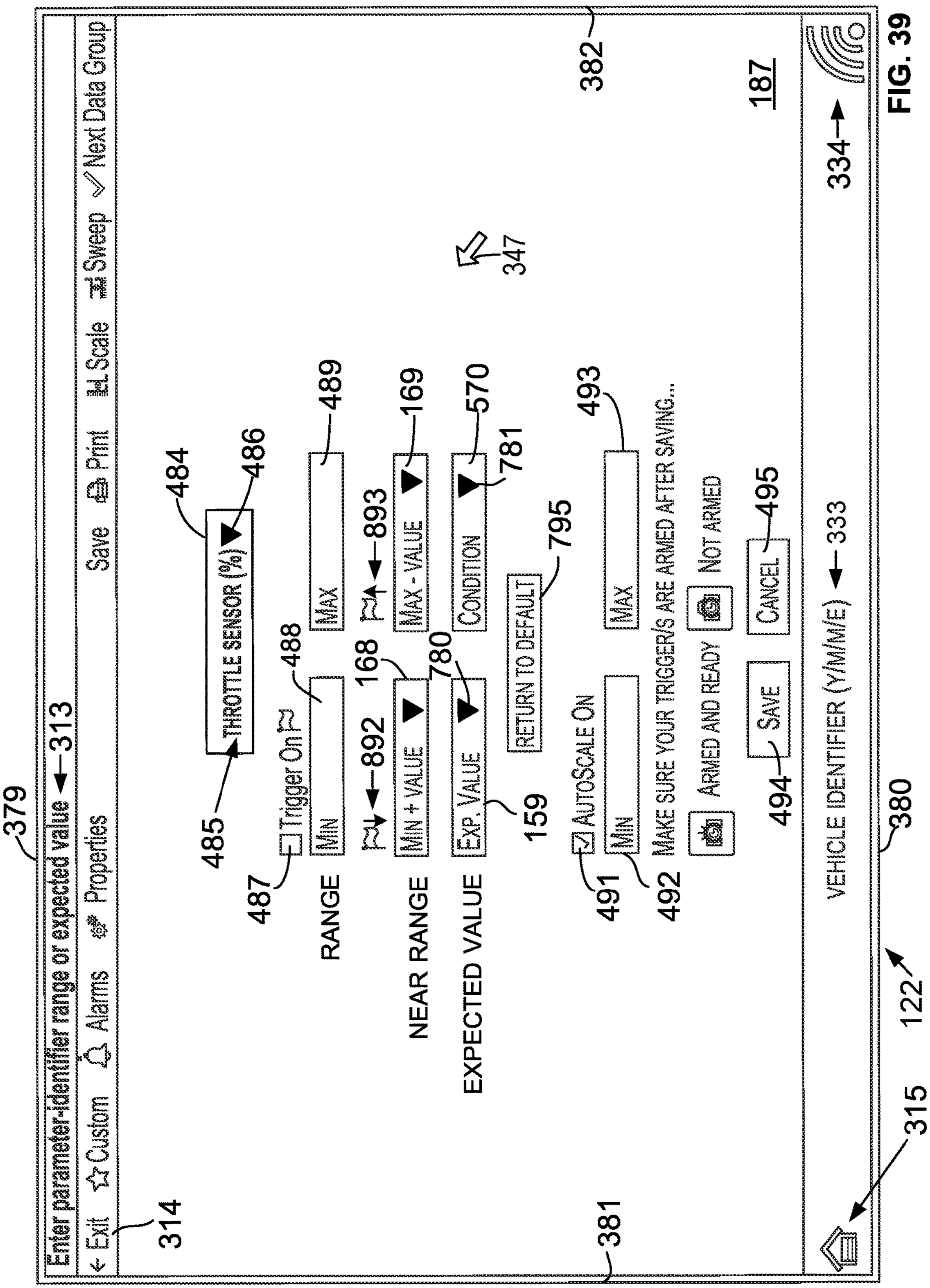

Next, FIG. 39 shows a GUI 187. In FIG. 39, the GUI description 313 indicates that a theme of the GUI 187 pertains to entering a PID range or expected value. The GUI 187 includes a PID selection USC 484. In at least some implementations, the PID selection USC 484 includes a descriptor 485 of the PID and a USC 486 selectable to cause the processor 102 to display a respective descriptor of one or more other PIDs for displaying within the PID selection USC 484 after being selected. Other examples of means to select a PID whose range or expected value is to be selected are also possible.

The GUI 187 includes a USC 487, 488, 489. Selection of the USC 487 causes a trigger for the selected PID to be turned on if currently turned off or to be turned off if currently turned on. The USC 488 is configured for entering a minimum value of a range corresponding to the selected PID. The USC 489 is configured for entering a maximum value of a range corresponding to the selected PID. In at least some implementations, the processor 102 populates the USC 488 with a default minimum value for the PID range and the USC 489 with a default maximum value for the PID range. In at least some implementations, the PID range entered via the GUI 187 can be stored as part of the PID topic file 139 that includes the selected PID.

The GUI 187 includes a USC 168, 169. The USC 168 is configured for entering a minimum value of a near range value proximate to the minimum range selectable using the USC 488. The USC 489 is configured for entering a maximum value of a near range value proximate to the maximum range selectable using the USC 489. As an example, the near range values selectable using the USC 168, 169 can be specified as a percentage of the value of a range selectable using the USC 488, 489, respectively. As another example, the near range value selectable using the USC 168 can be specified as a number greater than a number selectable by the USC 488, and the near range value selectable using the USC 169 can be specified as a number less than a number selectable by the USC 489.

The processor 102 can determine that a parameter value has reached the selected near range minimum+value, but has not yet reached the minimum value. In response to making that determination, the processor 102 can output (within a sub-container pertaining to a PID corresponding to the parameter value) an icon, such as an icon 892, to indicate that the near range minimum+value has been reached. Similarly, the processor 102 can determine that a parameter value has reached the selected near range maximum – value, but has not yet reached the maximum value. In response to making that determination, the processor 102 can output (within a sub-container pertaining to a PID corresponding to the parameter value) an icon, such as an icon 893, to indicate that the near range maximum – value has been reached.

The GUI 187 includes a USC 159, 570. The USC 159 is configured for entering an expected value corresponding to the selected PID, when the PID is a status PID. A status PID is a PID that corresponds to non-numeric PID parameter values, such as okay, good, bad, high, or low. The USC 570 is configured for entering a condition corresponding to the selected PID and one or more of the minimum value of the range selectable via the USC 488, the maximum value of the range selectable via the USC 489, the minimum value of a near range value selectable via the USC 168, the maximum value of a near range value selectable via the USC 169, or the expected value selectable via the USC 159. The USC 159 includes a USC 780 selectable to cause the processor 102 to display a respective descriptor of one or more other predetermined expected values for displaying within the USC 159 after being selected. The USC 570 includes a USC 781 selectable to cause the processor 102 to display a respective descriptor of one or more other predetermined condition values for displaying within the USC 570 after being selected.

The GUI includes a USC 795. The USC 795 is selectable to trigger the processor 102, 161 to reset one or more of the minimum value of the range selectable via the USC 488, the maximum value of the range selectable via the USC 489, the minimum value of a near range value selectable via the USC 168, the maximum value of a near range value selectable via the USC 169, or the expected value selectable via the USC 159 to a default value. In at least some implementations, the USC 795 can include a respective USC for each of the minimum value of the range selectable via the USC 488, the maximum value of the range selectable via the USC 489, the minimum value of a near range value selectable via the USC 168, the maximum value of a near range value selectable via the USC 169, or the expected value selectable via the USC 159. In at least some implementations, a drop down menu for of the minimum value of the range selectable via the USC 488, the maximum value of the range selectable via the USC 489, the minimum value of a near range value selectable via the USC 168, the maximum value of a near range value selectable via the USC 169, or the expected value selectable via the USC 159 can include a selectable default value.

The GUI 187 includes a USC 491, 492, 493. The USC 491 is selectable to enable or disable an auto scaling function for a graph that corresponds to a PID contained with the PID selection USC 484. With the auto scaling function enabled, the processor 102, 161 can scale a graph of the PID using the scale values entered using the USC 492, 493. As an example, the USC 492 can be used to select a minimum value on a y-axis of the graph and the USC 493 can be used to select a maximum value on that y-axis. As another example, the USC 492 can be used to select a value/division for the y-axis and the USC 493 can be used to select a value/division for the x-axis of the graph.

The GUI 187 includes a save USC 494 and a cancel USC 495. In response to selection of the save USC 494, the processor 102 saves any changes made to a PID range or expected value using the GUI 187. In response to selection of the cancel USC 495, the processor 102 does not save any changes entered into the USC 159, 168, 169, 487, 488, 489, 570.

Figure 40:
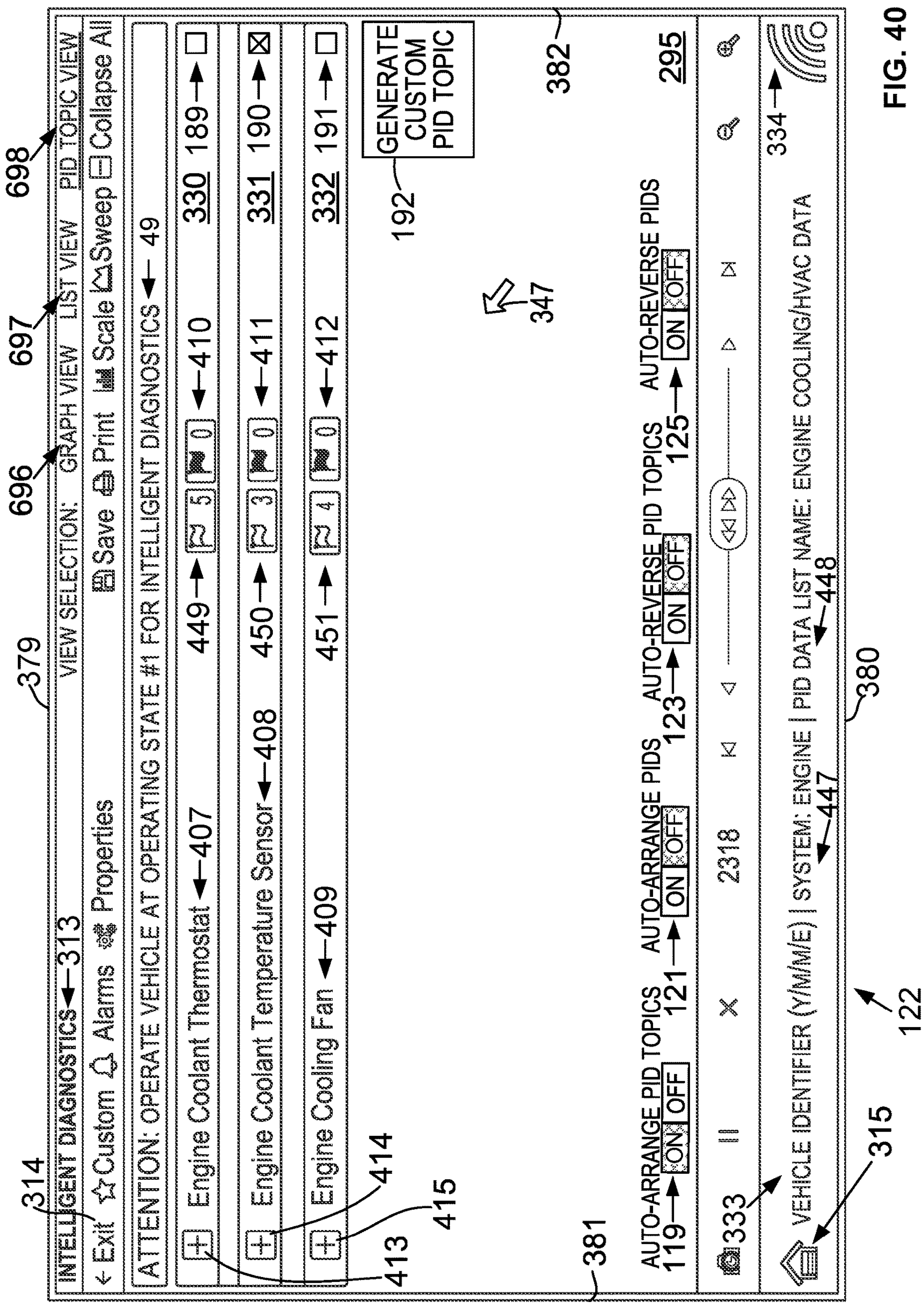

Next, FIG. 40 shows a GUI 295. The view of the GUI 295 in FIG. 40 is an alternative view of the GUI 295 shown in FIG. 41 after and/or before use of the container resizing USC 413, 414, 415. The GUI 295 corresponds to the PID topic file 200 shown in FIG. 23A to FIG. 23C.

Figure 41:
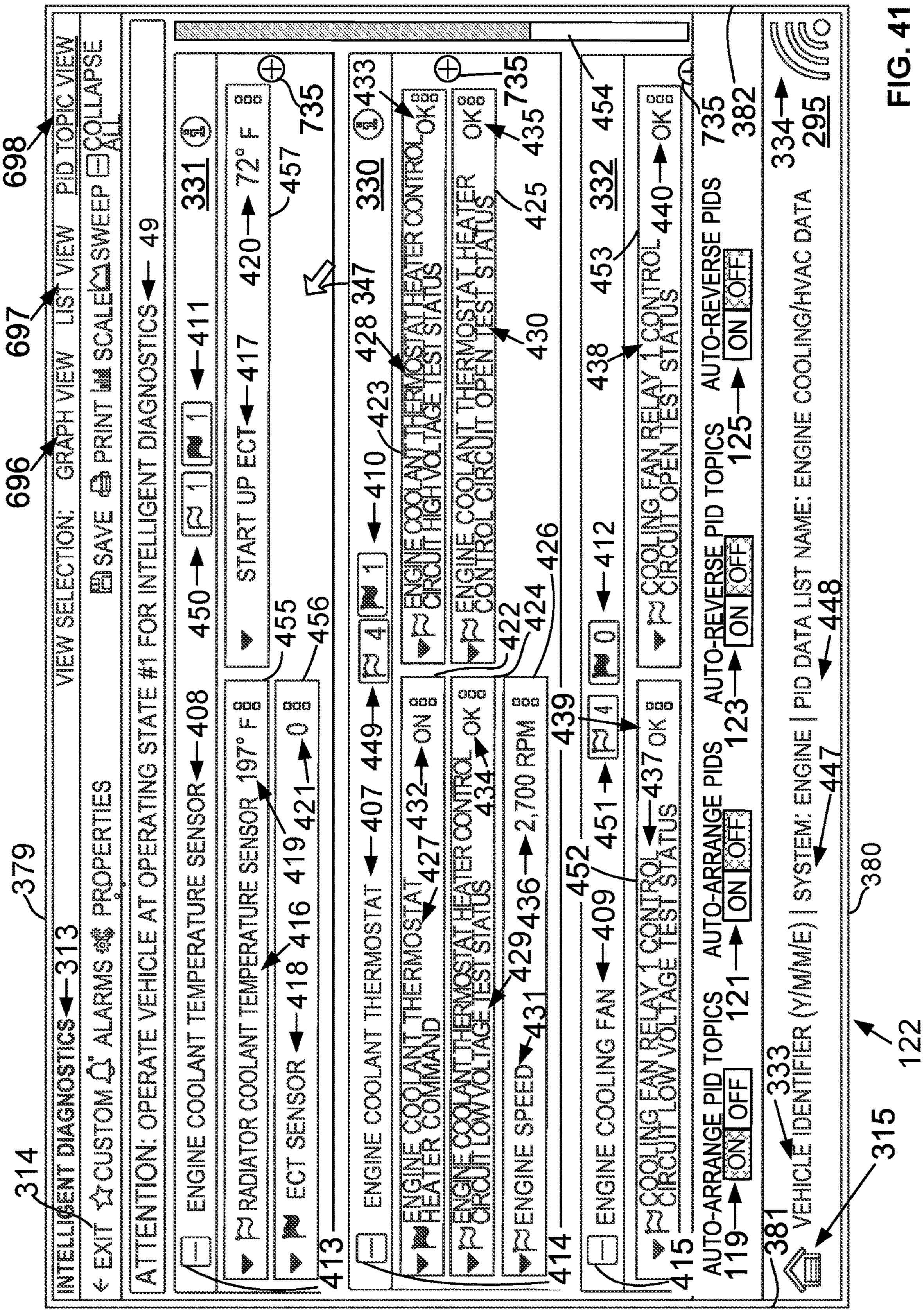

In FIG. 40 and FIG. 41, the GUI description 313 indicates that a theme of the GUI 295 is intelligent diagnostics data. The vehicle identifier 333 in the GUI 295 is in the form Y/M/M/E. The GUI 295 includes a system identifier 447 indicative of a system in the vehicle identified by the vehicle identifier 333, and a PID data list identifier 448 used to populate containers displayed in the GUI 295. In FIG. 40, as well as FIG. 41, the PID data list identifier 448 corresponds to the PID list name element 203 shown in FIG. 23A.

The GUI 295 includes a PID topic container 330, 331, 332. The PID topic container 330 includes a PID topic descriptor 407, a container resizing USC 413, a condition icon 410, 449, and a container selector USC 189. The PID topic container 331 includes a PID topic descriptor 408, a container resizing USC 414, a condition icon 411, 450, and a container selector USC 190. The PID topic container 332 includes a PID topic descriptor 409, a container resizing USC 415, a condition icon 412, 451, and a container selector USC 191.

The condition icon 410, 411, 412 includes a black flag and a numeral indicating a quantity of PIDs, and the condition icon 449, 450, 451 includes a white flag and a numeral indicating a quantity of PIDs.

In at least some implementations, a black flag within the condition icon 410, 411, 412 indicates that the numeral within that condition icon represents a quantity of PIDs for which at least one of the received parameters corresponding to the PIDs are outside a predefined range or does not match an expected value for the PID corresponding to the parameters, and a white flag with the condition icon 449, 450, 451 indicates that the numeral within that condition icon represents a quantity of PIDs for which all of the received parameters corresponding to the PIDs are within a predefined range or match an expected value for the PID corresponding to the parameters. Examples of the predefined ranges and/or expected ranges for these implementations are shown in the PID topic file 200 shown in FIG. 23A to FIG. 23C.

In at least some other implementations, a black flag within the condition icon 410, 411, 412 indicates that the numeral within that condition icon represents a quantity of PIDs for which all of the received parameters corresponding to the PIDs are within a predefined range or match an expected value for the PID corresponding to the parameters, and a white flag with the condition icon 449, 450, 451 indicates that the numeral within that condition icon represents a quantity of PIDs for which at least one of the received parameters corresponding to the PIDs are outside a predefined range or does not match an expected value for the PID corresponding to the parameters. Examples of the predefined ranges for these implementations are shown in the PID topic file 200 shown in FIG. 23A to FIG. 23C.

The GUI 295 includes the USC 119, 121, 123, 125. With the USC 119 in the on position in the GUI 295, the processor 102 can automatically arrange the PID topic container 330, 331, 332 based on the numerals in the condition icon 410, 411, 412 (e.g., greatest to lowest). With the USC 121 in the on position in the GUI 295 (not set to the on position in FIG. 40), the processor 102 can automatically arrange containers corresponding to PIDs within the PID topic container 330, 331, 332 (see FIG. 41) based on a condition of the PIDs. With the USC 123 in the on position in the GUI 295 (not set to the on position in FIG. 40), the processor 102 can automatically reverse an order of the PID topic container 330, 331, 332. With the USC 125 in the on position in the GUI 295 (not set to the on position in FIG. 40), the processor 102 can automatically reverse an order of container corresponding to PIDs in the PID topic container 330, 331, 332.

The GUI 295 in FIG. 40 shows the container resizing USC 413, 414, 415 with a setting represented by a "+" symbol. A description of the "+" above is applicable to the container resizing USC 413, 414, 415.

In GUI 295 shown in FIG. 40, the PID topic container 330, the PID topic container 331, and the PID topic container 332 are arranged in a first particular order in a direction from the side 379 towards the side 380. In at least some implementations, the first particular order of the PID topic container 330, 331, 332 is used when the numeral in all of the condition icon 410, 411, 412 is zero.

The processor 102 can output the GUI 295 as shown in FIG. 40 and, while that GUI 295 is displayed, the processor 102 and/or the vehicle communication transceiver 118 can transmit VDM to request parameter values for PIDs corresponding to the PID topic container 330, 331, 332. After receiving the parameter values, the processor 102 can compare the parameter value to a corresponding predefined range or an expected value for a corresponding PID and then count the PIDs corresponding to PID topic container 330, 331, 332 to determine whether any change to the numeral in the condition icon 410, 411, 412, 449, 450, 451 based on whether the parameter value is within or outside the predefined range or not an expected value.

Figure 43:
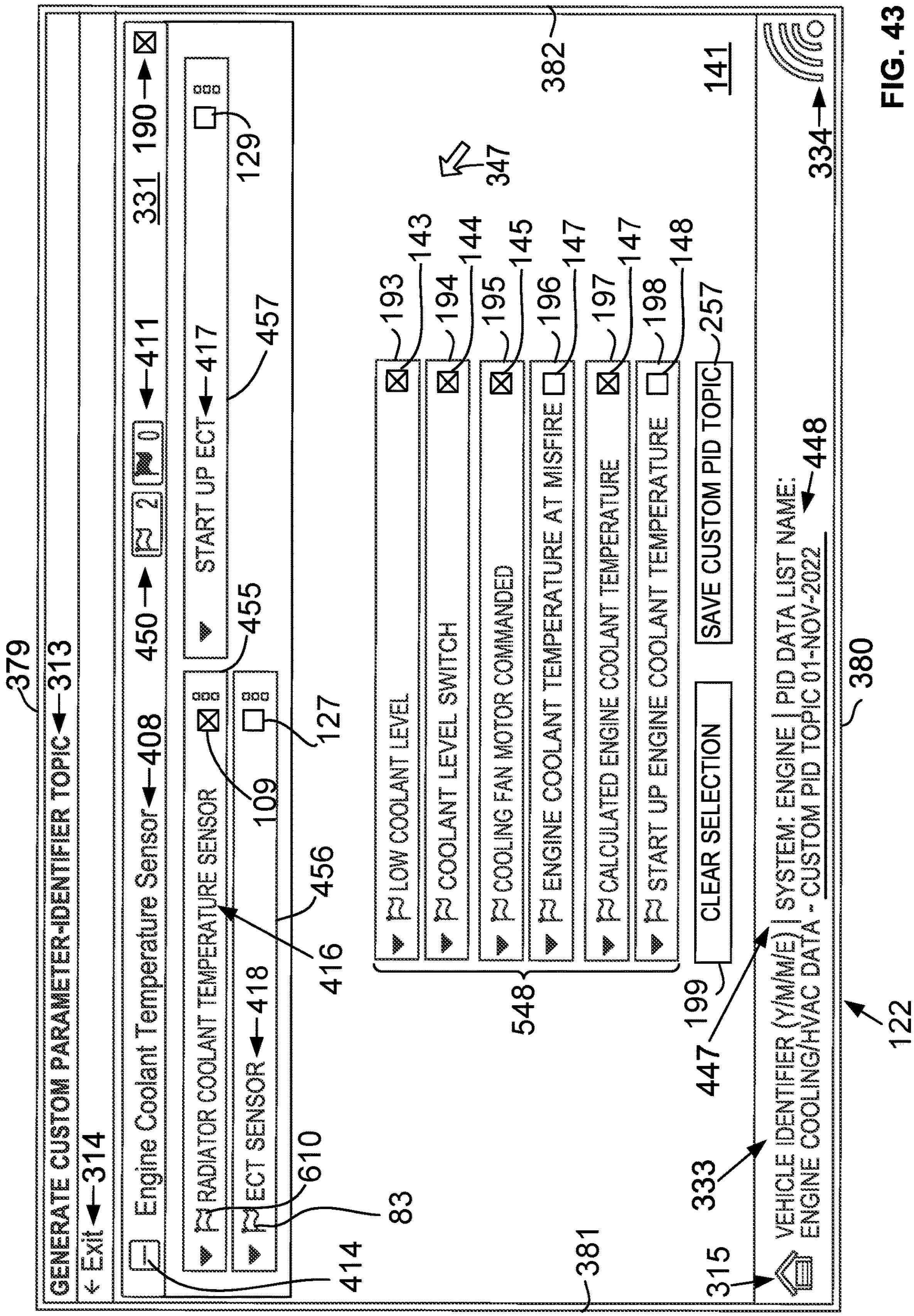

The container selector USC 189, 190, 191 is operable to select the PID topic container 330, 331, 332, respectively, if currently unselected or to unselect the PID topic container 330, 331, 332, respectively, if currently selected. The GUI 295 includes a modify container USC 192. In response to determining the modify container USC 192 has been selected, the processor 102 can modify the GUI 295 or output another GUI on the display 122 to allow a selected container to be modified. FIG. 43, discussed below, shows an example of that other GUI.

Next, FIG. 41 shows the GUI 295. The view of the GUI 295 in FIG. 41 is an alternative view of the GUI 295 shown in FIG. 40 after and/or before use of the container resizing USC 413, 414, 415. Similar to FIG. 40, the GUI 295 shown in FIG. 41 includes the PID topic container 330, 331, 332. However, unlike the GUI 295 shown in FIG. 40, the view of the GUI 295 shown in FIG. 41 shows the container resizing USC 413, 414, 415 with a setting represented by a "–" symbol. A description of the "–" above is applicable to the container resizing USC 413, 414, 415.

With the PID topic container 331 expanded, the view of the GUI 295 in FIG. 41 shows that the PID topic container 331 include a sub-container 455, 456, 457. The sub-container 455 includes a parameter value 419 corresponding to a PID identified by a PID descriptor 416. The sub-container 456 includes a parameter value 421 corresponding to a PID identified by a PID descriptor 418. The sub-container 457 includes a parameter value 420 corresponding to a PID identified by a PID descriptor 417. A count of the white flag(s) and a count of the black flag(s) in the sub-container 455, 456, 457 equal the numeral within the condition icon 450, 411, respectively. The black flag(s) and white flag(s) in the sub-containers shown in FIG. 41 represent the same aspects that the black flag and white flag in the condition icon 410, 411, 412, 449, 450, 451 represent.

With the PID topic container 330 expanded, the view of the GUI 295 in FIG. 41 shows that the PID topic container 330 includes a sub-container 422, 423, 424, 425, 426. The sub-container 422 includes and a parameter value 432 corresponding to a PID identified by a PID descriptor 427. The sub-container 423 includes a parameter value 433 corresponding to a PID identified by a PID descriptor 428. The sub-container 424 includes a parameter value 434 corresponding to a PID identified by a PID descriptor 429. The sub-container 425 includes a parameter value 435 corresponding to a PID identified by a PID descriptor 430. The sub-container 426 includes a parameter value 436 corresponding to a PID identified by a PID descriptor 431. A count of the white flag(s) and a count of the black flag(s) in the sub-container 422, 423, 424, 425, 426 equal the numeral within the condition icon 449, 410, respectively.

With the PID topic container 332 expanded, the GUI 295 in FIG. 41 shows that the PID topic container 332 include a sub-container 452, 453. The PID topic container 332 includes two other sub-containers. As shown in FIG. 41, the GUI 295 includes a scroll bar 454 that can be used to cause those other two sub-containers to be displayed on the display 122. The sub-container 452 includes and a parameter value 439 corresponding to a PID identified by a PID descriptor 437. The sub-container 453 includes and a parameter value 440 corresponding to a PID identified by a PID descriptor 438. The other two sub-containers can include parameter values corresponding to a PID corresponding to the PID key element 237, 239 shown in FIG. 23C, and a flag representing whether the parameter values equal an expected value corresponding to the expected value element 238, 240.

Figure 42:
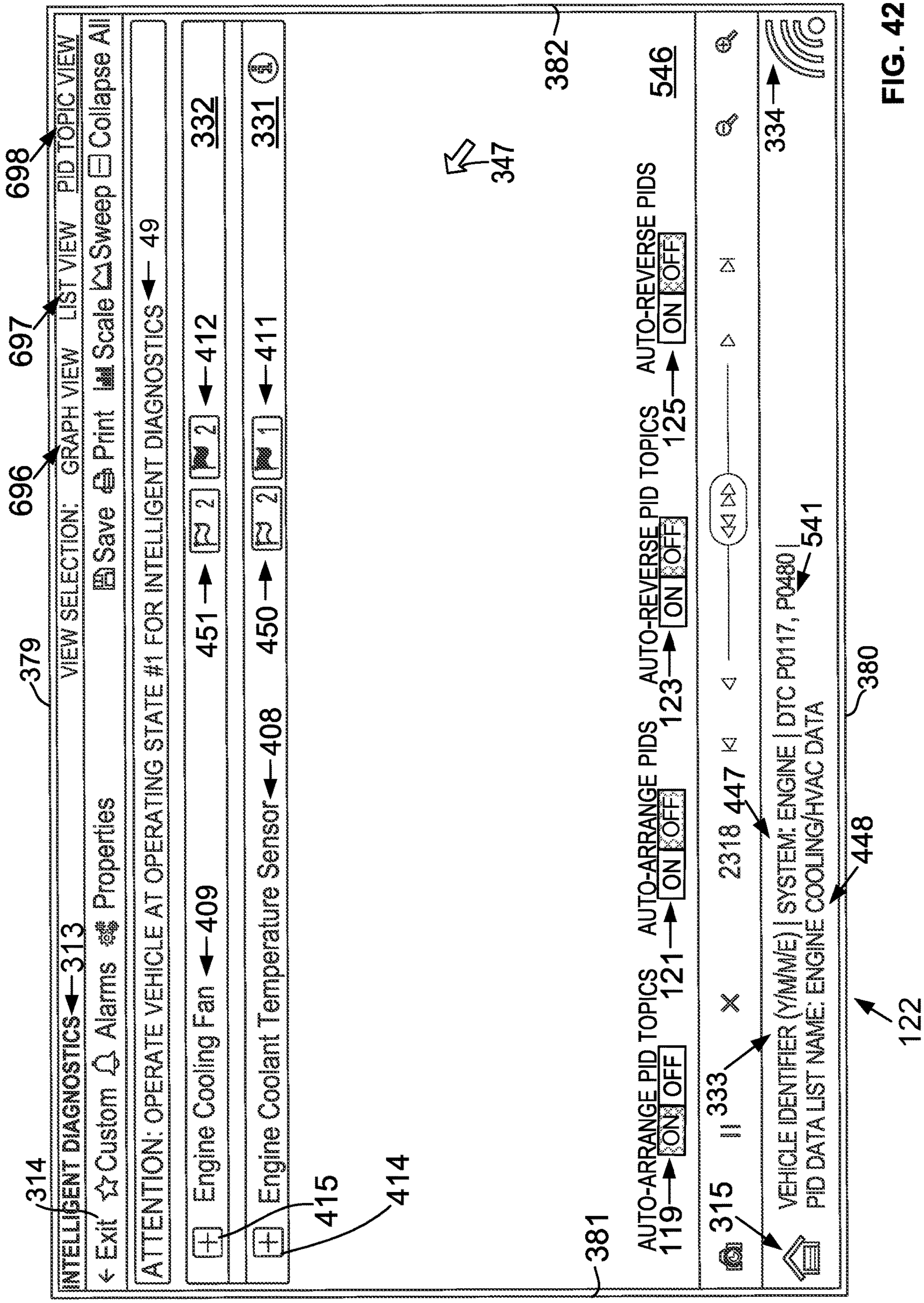

Next, FIG. 42 shows a GUI 546. Compared to the view of the GUI 295 shown in FIG. 40, the GUI 546 includes a DTC identifier 541 in addition to the vehicle identifier 333, the system identifier 447, and the PID data list identifier 448. In at least some implementations, the DTC within the DTC identifier 541 can be determined in response to a selection of the USC 376 shown in FIG. 38, manually selected using a DTC selector (similar to the DTC selector 372 shown in FIG. 38), or by some other means.

Another difference between the GUI 295 and the GUI 546 is that the PID topic container 330 is not shown in the GUI 546. In at least some implementations, this is a result of the PID topic element 211 in the PID topic file 200 not being associated with the DTC listed in the DTC identifier 541. On the other hand, the GUI 546 shows the PID topic container 331, 332 because the DTCs listed in the DTC identifier 541 are associated with the PID topic element 212, 213 in the PID topic file 200.

Yet another difference between the GUI 295 and the GUI 546 is that the PID topic container 331, 332 have been arranged automatically in an order based on a quantity of PIDs corresponding to the PID topic container 331, 332 that are associated with a parameter value that has breached a threshold or is an unexpected value. In other words, the PID topic container 331, 332 are arranged based on a numeral in the condition icons with black flags from a greatest numeral to a lowest numeral and in a direction from the side 379 towards the side 380. This automatic arrangement occurs because the USC 119 is set to the on position.

Although the DTC identifier 541 shown in FIG. 42 lists two different DTC, a DTC identifier on a different GUI including one or more sub-containers of a PID topic can include only one DTC or can include three or more DTC. In some implementations, a PID topic may not include any DTC (e.g., includes zero DTC).

Next, FIG. 43 shows a GUI 141. The GUI description 313 indicates that the GUI 141 pertains to generating a custom container. In at least some implementations, the processor 102 outputs a GUI to modify a PID topic container in response to selection of a modify container USC, such as the modify container USC 192 shown in FIG. 40. As shown in FIG. 40, the container selector USC 190 includes an "X" to represent that the container 331 has been selected. The GUI 141 includes the PID topic container 331. The GUI 141 shows the PID topic container 331 in an expanded state with the container resizing USC 414 with a setting represented by a "–" symbol. In at least some other implementations, the GUI 141 can be used to generate a PID topic including one or more containers having one or more sub-containers without having first selected a container to modify.

The GUI 141 includes a list of textual PIDs 548. The list of textual PIDs 548 includes a sub-container 193, 194, 195, 196, 197, 198 showing respective textual PIDs and a sub-container selector 143, 144, 145, 146, 147, 148 operable to select a sub-container. An "X" within the sub-container selector 143, 144, 145, 146, 147, 148 represents that the corresponding sub-container and/or a textual PID within the corresponding sub-container has been selected for adding to the PID topic container 331.

The GUI 141 includes a sub-container selector 109, 127, 129 within the sub-container 455, 456, 457, respectively. An "X" within the sub-container selector 109, 127, 129 can represent that the corresponding sub-container has been selected for removal from the PID topic container 331. The sub-container selector 109, 127, can be left empty to indicate that the corresponding sub-container is to remain in the PID topic container 331. In other implementations, the sub-container selector 109, 127, 129 is selected to indicate that the corresponding sub-container is to remain in the PID topic container 331. In at least some implementations, removal of a sub-container and/or a PID of a default container are not removable by a user.

The GUI 141 shows a GUI without the parameter value 419, 420, 421, but with a flag 610, 83 in a white state. In at least some other implementations, the GUI 141 can include the parameter value 419, 420, 421 and/or with one or more of the flag 610, 83 in a black state if a received parameter value for a corresponding PID has breached a range of parameter values or is not an expected value.

The GUI 141 includes a USC 199 operable to indicate to the processor 102, 161 to clear a selection of any sub-container using the sub-container selector 109, 127, 129, 143, 144, 145, 146, 147, 148. The GUI 141 includes a USC 257 operable to indicate to the processor 102, 161 save the PID topic container 331 that has been modified based on the sub-container selector 109, 127, 129, 143, 144, 145, 146, 147, 148 showing whether a corresponding sub-container has been selected. A PID topic including a modified container can be saved in the PID topic file 139 and/or the PID topic file 179.

The GUI 141 includes the vehicle identifier 333, the system identifier 447, and the PID data list identifier 448. A first portion of the PID data list identifier 448 that is not underlined is identical to the PID data list identifier 448 shown in FIG. 40. A second, underlined portion of the PID data list identifier 448 is appended to the first portion. In some implementations, the second portion of the PID data list identifier 448 is selected by the processor 102, 161. In other implementations, a user can select the second portion of the PID data list identifier 448. In at least some implementations, an entirety of the PID data list identifier 448 for a user-modified container can be selected by a user of the computing system 100.

In at least some implementations, selecting a sub-container to include in a PID topic being generated using the GUI 141 can include dragging a sub-container from the list of textual PIDs 548 and dropped within the PID topic container 331. In those or in other implementations, selecting a sub-container to include in a PID topic being generated using the GUI 141 can include selecting the sub-container audibly with or without audibly selecting the container that is to include the sub-container selected audibly.

Next, FIG. 46 shows a PID topic file portion 578. The PID topic file portion 578 is an example of a portion of a PID topic file that can result from modifying a portion of the PID topic file 200 shown in FIG. 23A, FIG. 23B, FIG. 23C by using the GUI 141 (shown in FIG. 43). A PID topic file including the PID topic file portion 578 can also include the portions of the PID topic file 200 shown in FIG. 23B and FIG. 23C. The PID topic file portion 578 includes the start tag 201, PID topic name element 215, the declaration 241, and the PID topic element 211 that starts with the start tag 204 and ends with the end tag 205.

A comparison of FIG. 46 and FIG. 23A shows that the PID topic element 211 for the PID topic file portion 578 is different than the PID topic element 211 within the PID topic file 200. One difference is that the PID topic element 211 for the PID topic file portion 578 does not include the PID element 244. Another difference is that the PID topic element 211 for the PID topic file portion 578 includes the PID element 586, 587, 588, 589.

Additionally, the PID topic element 211 in the PID topic file portion 578 includes, within the PID element 586, a PID key element 599 that includes the textual data "Low Coolant Level" between a start tag 580 and an end tag 585. The PID element 586 includes an expected value element 600.

Similarly, the PID topic element 211 in the PID topic file portion 578 includes, within the PID element 587, a PID key element 601 that includes the textual data "Coolant Level Switch" between a start tag and an end tag. The PID element 587 includes an expected value element 602.

Likewise, the PID topic element 211 in the PID topic file portion 578 includes, within the PID element 588, a PID key element 603 that includes the textual data "Cooling Fan Motor Commanded" between a start tag and an end tag. The PID element 588 includes an expected value element 604.

Moreover, the PID topic element 211 in the PID topic file portion 578 includes, within the PID element 589, a PID key element 605 that includes the textual data "Calculated Engine Coolant Temperature" between a start tag and an end tag. The PID element 589 includes a range top element 606 and a range bottom element 607.

Finally, another difference between the PID topic file portion 578 and the PID topic file 200 is that the PID topic file portion 578 includes a PID list name element 579, whereas the PID topic file 200 includes the PID list name element 203. The PID list name element 579 matches the PID data list identifier 448 within the GUI 141 shown in FIG. 43.

In at least some implementations, a PID topic file including the PID topic file portion 578 is stored locally on the computing system 100 (e.g., a computing device used to the generate that PID topic file). For example, the PID topic file including the PID topic file portion 578 can be stored within the PID topic file 139. Additionally or alternatively, the PID topic file including the PID topic file portion 578 can be stored in a memory accessible by server 160. For example, the PID topic file including the PID topic file portion 578 can be stored in the PID topic file 179 in the memory 162. Still further, the PID topic file including the PID topic file portion 578 can be stored locally in the memory of a computing device that receives the PID topic file including the PID topic file portion 578 from the server 160. The aforementioned computing device can be arranged like the computing system 100.

Figure 44:
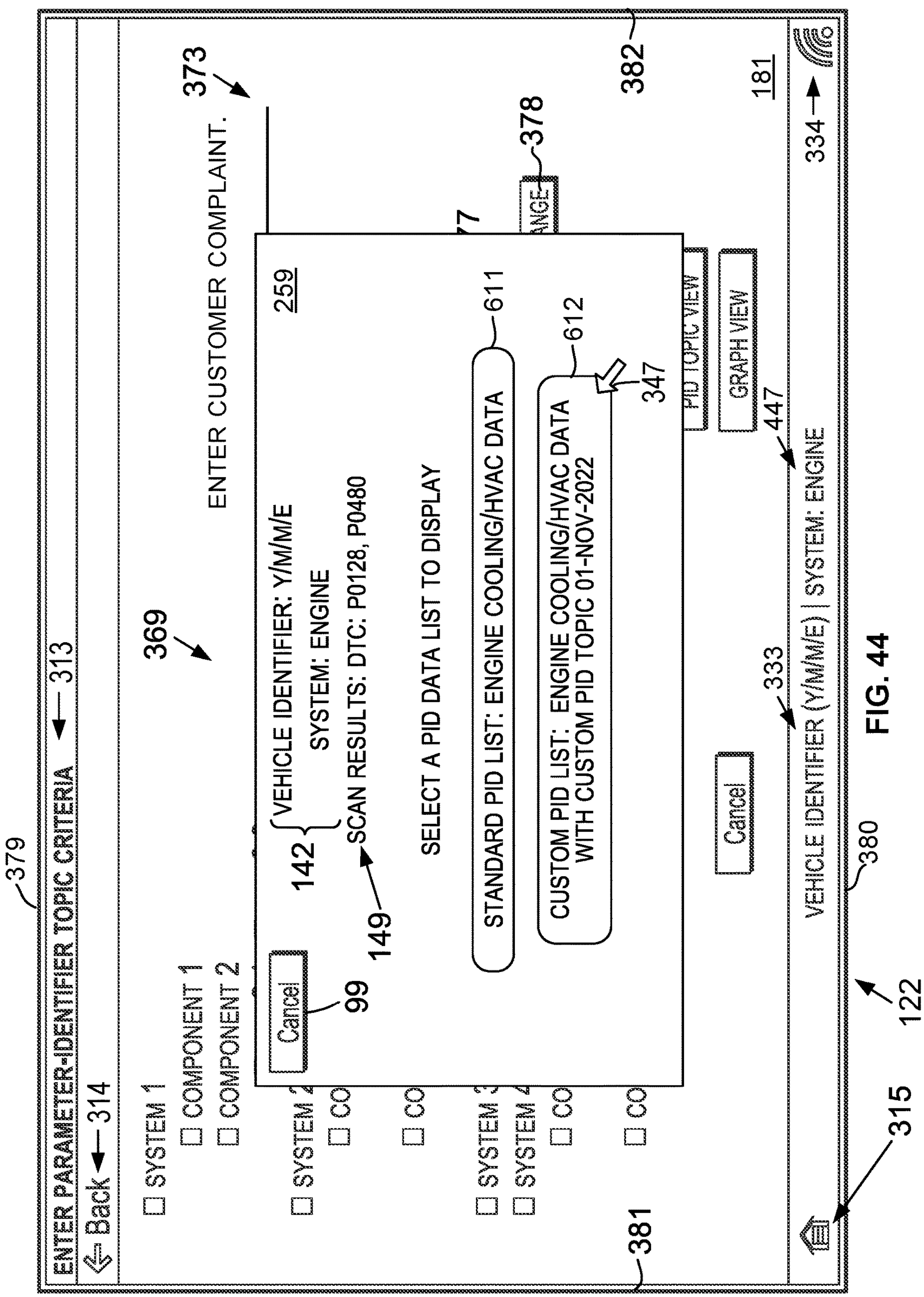

Next, FIG. 44 shows the GUI 181. Compared to the GUI 295 shown in FIG. 40, the GUI 181 shown in FIG. 44 includes a selection container 259. In at least some implementations, the selection container 259 overlays a portion of the GUI 181. In alternative implementations, the selection container 259 can be within a separate GUI other than the GUI 181.

As an example, the processor 102, 161 can output the selection container 259 in response to a selection of the USC 376 (shown in FIG. 38) and the processor 102, 161 determining the results of scanning the vehicle 12 for DTC and PID topic(s) corresponding to a selected vehicle and system and/or corresponding to a selected vehicle and system and scan results. In at least some implementations, the selection container 259 includes data 142 identifying the selected vehicle and system and scan results 149 from use of the USC 376.

The selection container 259 includes a USC 611, 612 operable for a user to select a respective PID list that the processor 102, 161 determined based on the selected vehicle and system, and scan results. As shown in FIG. 44, the selection container 259 can include a USC for selecting a PID list that was generated by modifying a different PID list. In response to a selection of the USC 611, the processor 102, 161 can output the GUI 295. In response to a selection of the USC 612, the processor 102, 161 can output a GUI 547 (shown in FIG. 45).

The selection container 259 includes a USC 99 operable to cause removal of the selection container 259. Upon selecting the USC 99, the GUI 181 can appear as shown in FIG. 40.

Figure 45:
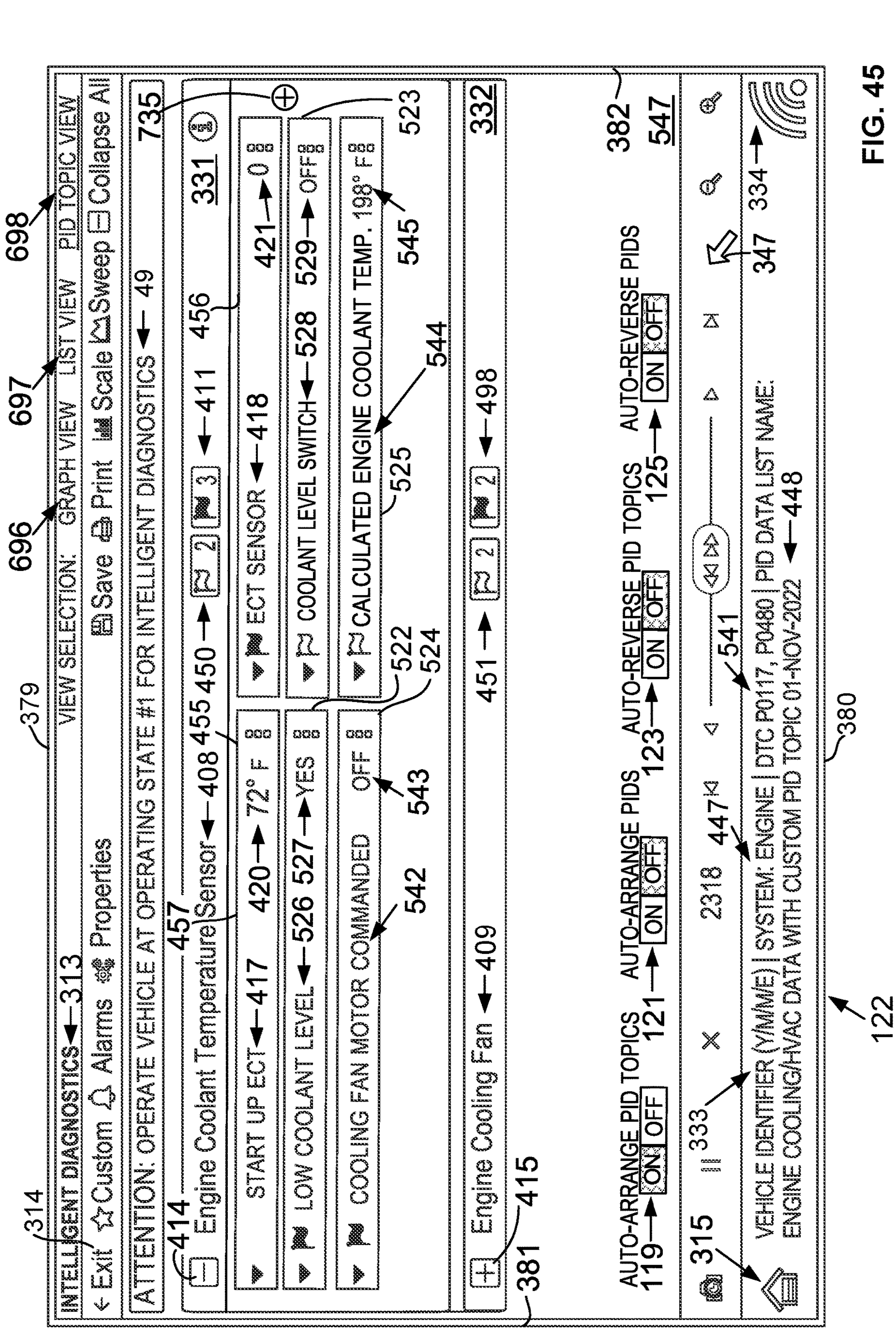

In at least some implementations, a modified PID topic is presented for selection only to a user that used the computing system 100 to modify a PID list and/or to the computing system 100 that was used to modify a PID list. In at least some other implementations, a modified PID list is presentable to other users of the computing system 100 or on another computing system configured to operate like the computing system 100. In accordance with the aforementioned implementations, the server 22 can operate as a cloud file sharing site that is operable to serve (e.g., transmit) a modified PID list to the computing system 100 or a like computing system. As an example, the cloud file sharing site can be configured to operate like the ALTUS™ cloud file sharing site managed by and/or on behalf of Snap-on Incorporated®, a corporation having an office in Kenosha, Wisconsin Next, FIG. 45 shows a GUI 547. The GUI description 313 indicates that a theme of the GUI 547 is intelligent diagnostics data. The GUI 547 includes the vehicle identifier 333, the system identifier 447, and the DTC identifier 541 similar to the GUI 546 shown in FIG. 42. The PID data list identifier 448 in the GUI 547, however, is different than the PID data list identifier 448 shown in FIG. 42. As shown in FIG. 45, the PID data list identifier 448 lists a name of a custom PID topic generated using the GUI 141 shown in FIG. 43.

The GUI 547 shows an example result of modifying the PID topic container 331 in that the PID topic container 331 includes six sub-containers instead of three sub-containers as shown in FIG. 43. Additionally, the condition icon 411, 450 shown in the GUI 547 show a total of six flags as compared to the three flags represented by the condition icon 411, 450 in FIG. 42 and FIG. 43. The GUI 547 also shows that the PID topic container 331 still includes the sub-container 456, 457 and now includes a sub-container 522, 523, 524, 525, but no longer includes the sub-container 455 (as shown in FIG. 43). Modifying the PID topic container 331 can include and/or result from modifying a PID list that corresponds to the PID topic container 331.

The sub-container 522 includes a parameter value 527 corresponding to a PID identified by a PID descriptor 526. The sub-container 523 includes a parameter value 529 corresponding to a PID identified by a PID descriptor 528. The sub-container 524 includes a parameter value 543 corresponding to a PID identified by a PID descriptor 542. The sub-container 525 includes a parameter value 545 corresponding to a PID identified by a PID descriptor 544.

In at least some implementations, the processor 102, 161 writes PID values and corresponding PIDs into the memory 104, 162 for storage therein. In at least some of those implementations, other data, such as a time corresponding to each PID parameter value, and/or one or more from among the vehicle identifier 333, the system identifier 447, and the DTC identifier 541 is stored with the corresponding PIDs. In at least some implementations, a GUI includes a container corresponding to PID parameter value storage configuration.

Figure 47:
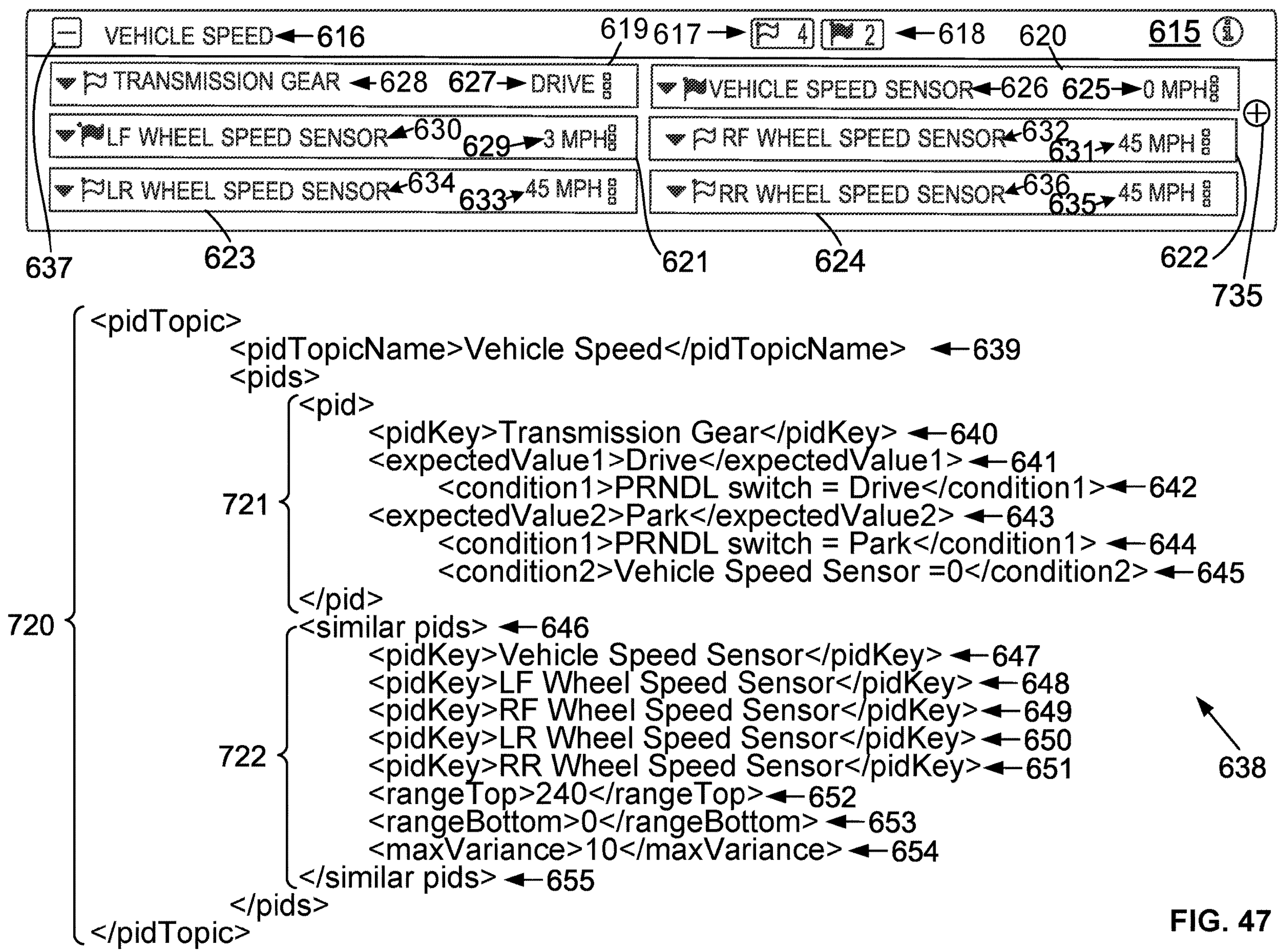
FIG. 47 shows a container and a portion of a corresponding parameter-identifier topic file in accordance with the example implementations.

Next, FIG. 47 shows a container 615 and a PID topic file portion 638 that corresponds to the container 615. The container 615 is populated with a PID topic descriptor 616 that matches a PID topic name element 639 within the PID topic file portion 638. The container 615 also includes a container resizing USC 637, and a condition icon 617, 618 that include numerals that, in combination, add up to a quantity of sub-containers in the container 615 that include a flag indicative of a PID condition.

The container 615 includes a sub-container 619, 620, 621, 622, 623, 624. Similar to other sub-containers described above, each of the sub-container 619, 620, 621, 622, 623, 624 includes a flag and a sub-container resizing USC. The sub-container 619 includes a parameter value 627 corresponding to a PID identified by a PID descriptor 628. The sub-container 620 includes a parameter value 625 corresponding to a PID identified by a PID descriptor 626. The sub-container 621 includes a parameter value 629 corresponding to a PID identified by a PID descriptor 630. The sub-container 622 includes a parameter value 631 corresponding to a PID identified by a PID descriptor 632. The sub-container 623 includes a parameter value 633 corresponding to a PID identified by a PID descriptor 634. The sub-container 624 includes a parameter value 635 corresponding to a PID identified by a PID descriptor 636.

The portion of the PID topic file portion 638 is arranged as elements of an XML file. A PID topic file that includes the portion of the PID topic file portion 638 can include a PID list name element, a system element indicative of a system within a vehicle, and/or a declaration, similar to the arrangement of the PID topic file 200.

The portion of the PID topic file portion 638 includes a PID topic element 720 including a PID element 721 and a set of similar PID elements 722. A PID topic file that includes the portion of the PID topic file portion 638 can further include one or more other PID topic elements, each with one or more PID elements.

The PID element 721 includes a PID key element 640 that includes the textual data "Transmission Gear" between a start tag (e.g., <pidKey>) and an end tag (e.g., </pidKey>). The PID element 721 includes an expected value element 641, 643. The expected value element 641 corresponds to a condition element 642. The expected value element 643 corresponds to a condition element 644, 645.

The processor 102, 161 compares received PID parameter values for a PID identified by PID key element 640 to an expected value indicated by the expected value element 641 when a condition of the vehicle 12 matches a condition indicated by the condition element 642. The processor 102, 161 can determine the condition indicated by the condition element 642 based on a received PID parameter value for a PID corresponding to the condition element 642.

Likewise, the processor 102, 161 compares received PID parameter values for a PID identified by PID key element 640 to an expected value indicated by the expected value element 643 when a condition of the vehicle 12 matches a condition indicated by the condition element 644 and a condition indicated by the condition element 645. The processor 102, 161 can determine the condition indicated by the condition element 644, 645 based on a received PID parameter value for a PID corresponding to the condition element 644, 645, respectively.

A set of similar PID elements, such as the set of similar PID elements 722, includes multiple PID elements. In at least some implementations, a set of similar PID elements includes a range top element, a range bottom element, and a variance element that corresponds to the multiple PID elements of the set of similar PID elements. Additionally or alternatively, a set of similar PID elements includes an expected value element that corresponds to the multiple PID elements of the set of similar PID elements.

As shown in FIG. 47, the set of similar PID elements 722 includes a PID key element 647, 648, 649, 650, 651, a range top element 652, a range bottom element 653, and a variance element 654 between a start tag 646 and an end tag 655. In this example, the PID corresponding to the PID key element 647, 648, 649, 650, 651 identify PID parameter values corresponding to a speed. While the speed of various wheels on the vehicle 12 can vary, especially while the vehicle 12 is turning a corner, the wheel speeds will vary at most by a threshold amount. The threshold amount is identified in the variance element 654. As an example, the variance element 654 can be associated with units such as miles per hour or kilometers per hour. PID parameter values associated with PIDs corresponding to the PID key element 647, 648, 649, 650, 651 can indicate a speed in the units associated with the variance element 654.

As shown in FIG. 47, the parameter value 625, 629 are zero (0) and three (3) miles per hour (MPH) whereas the parameter value 631, 633, 635 are forty-five (45) MPH. In this case, since the majority of the parameter value 625, 629, 631, 633, 635 are forty-five (45) MPH, the flags for the parameter value 625, 629 are black flags to indicate that the parameter value 625, 629 are suspect, and the flags for the parameter value 631, 633, 635 are white flags to indicate that the parameter value 631, 633, 635 appear to be proper.

In some cases, the processor 102 can compare a number of parameter values for a set of similar PID elements and determine that parameter values for half of the PID elements in the set of similar PID elements are suspect and that parameter values for the other half of the PID elements in the set of similar PID elements appear to be proper. In this case, for some implementations, the processor 102 can output black flags in the containers corresponding to the PID parameter values that are suspect and white flags in the container corresponding to the PID parameter values that appear to be proper. Alternatively, in some implementations, the processor 102 can output black flags in the containers corresponding to the PID parameter values that are suspect and flags other than black or white flags in the containers corresponding to the PID parameter values that appear to be proper.

Figure 48:
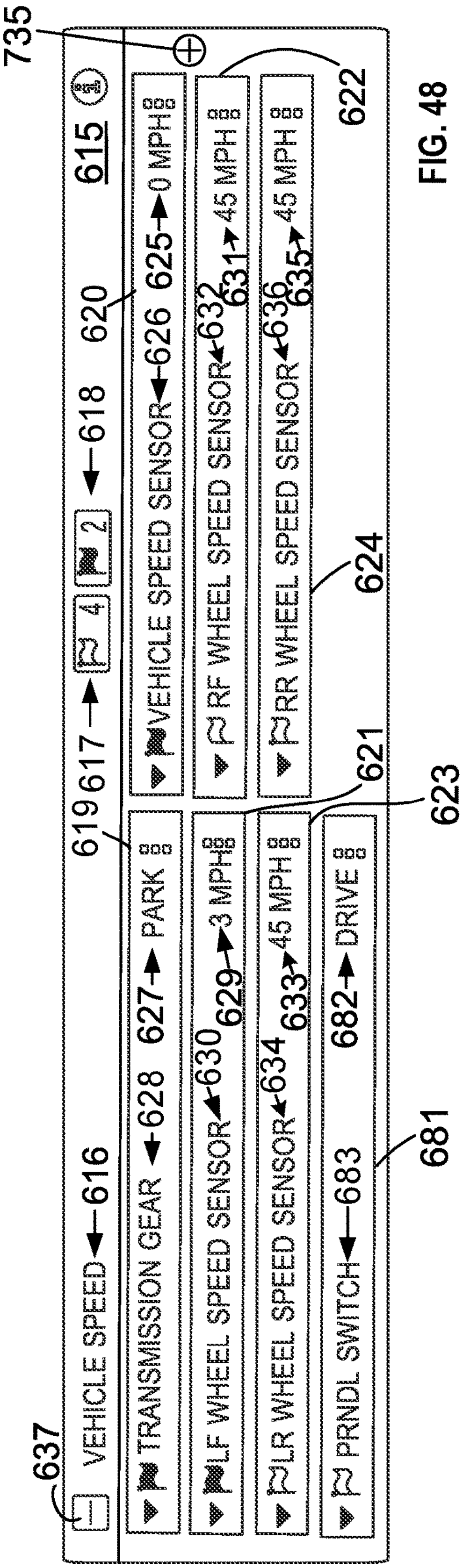
FIG. 48, FIG. 49, FIG. 50, and FIG. 51 show container(s) in accordance with the example implementations.

Next, FIG. 48 shows another view of the container 615. As compared to FIG. 47, the container 615 shown in FIG. 48 includes a sub-container 681 that is not shown in FIG. 47. The processor 102, 161 can modify the container 615 to include the sub-container 681 upon determining that the PID element 721 specified in the PID topic element 720 is associated with PID parameter values that do not match an expected value.

In FIG. 47, the sub-container 619 shows that the parameter value 627 corresponding to the PID descriptor 628 is "DRIVE," which matches the condition element "DRIVE" specified by the condition element 642. Since the PID parameter value matches the condition, the flag in the sub-container 619 shown in FIG. 47 is a white flag. Under these circumstances, displaying the sub-container 681 may be of minimal interest to a user of the computing system 100 since there is no black flag condition needing to be diagnosed.

In FIG. 48, however, the sub-container 619 shows that the parameter value 627 corresponding to the PID descriptor 628 is "PARK," which does not match the condition element "PARK" specified by the expected value element 643. The flag in the sub-container 619 shown in FIG. 48 is a black flag. Under these circumstances, displaying the sub-container 681 can be of increased interest to a user of the computing system 100 since the user may want to diagnose the black flag condition specified by the sub-container 619.

Figure 49:
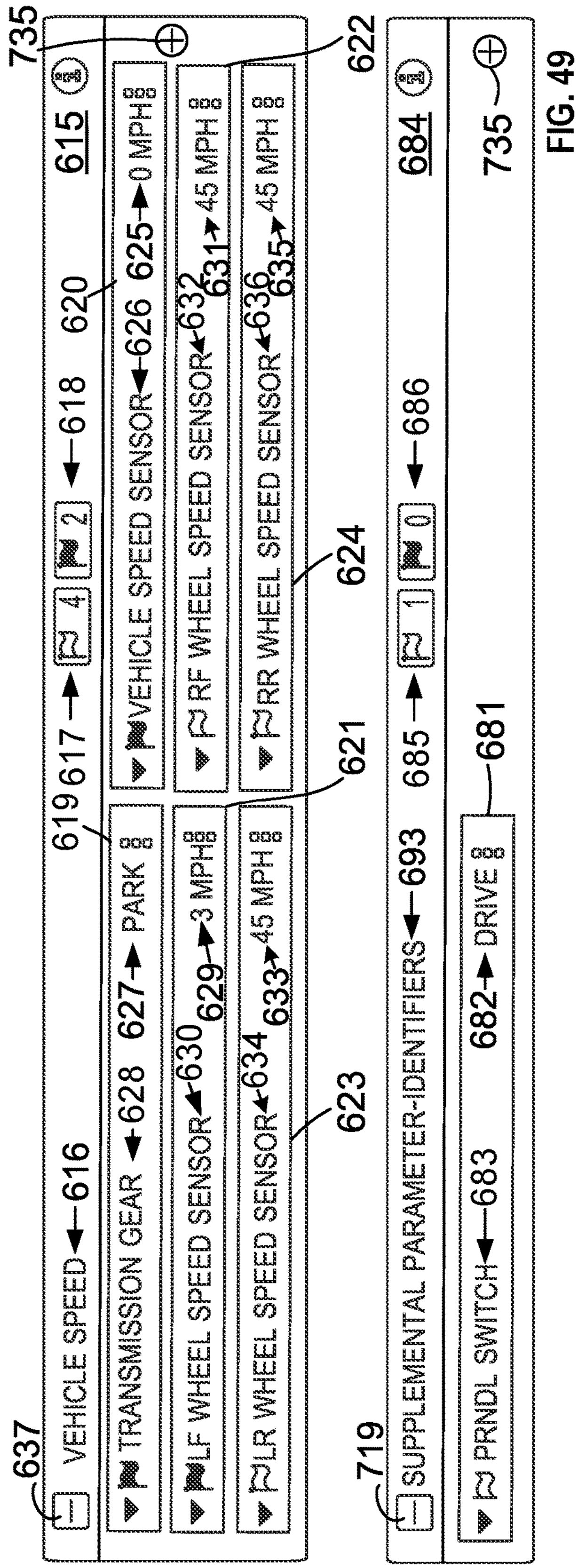

Next, FIG. 49 shows an alternative implementation of displaying the sub-container 681. In this implementation, the container 615 includes the same quantity of sub-containers as shown in FIG. 47. The sub-container 681 is displayed in a container 684. The container 684 is populated with a PID topic descriptor 693 indicating that the container 684 pertains to supplemental PID elements. The container 684 also includes a container resizing USC 719, and a condition icon 685, 686 that, in combination include numerals that add up to a quantity of sub-containers in container 684 that include a flag indicative of a PID condition. The container 684 can include a sub-container for each PID that relates to a PID within a PID topic that is associated with a black flag to indicate a PID condition that a user of the computing system 100 may want to diagnose.

Next, FIG. 50 shows an alternative view of the container 615. In this view, the sub-container 620 provides an indication that PID parameter values are unavailable from the vehicle 12 for the PID corresponding to the PID descriptor 626. As an example, the parameter value 625 can explicitly indicate "Not Available" or using an abbreviation, such as "Not Avail." As another example, the indication that PID parameter values are unavailable can include a non-textual indication, such as highlighting the sub-container 620. In FIG. 50, this highlighting is represented by cross-hatching within the sub-container 620. As still yet another example, a sub-container for a PID for which the computing device 100 has not received parameter values may not include a sub-container resizing USC and/or may not include a flag.

Next, FIG. 51 shows another alternative view of the container 615. In this view, the sub-container 620 has been omitted from the container 615. The processor 102, 161 can omit the sub-container in response to determining that the vehicle 12 is not providing a PID parameter value in response to one or more requests for the PID corresponding to the PID descriptor 626.

Figure 52:
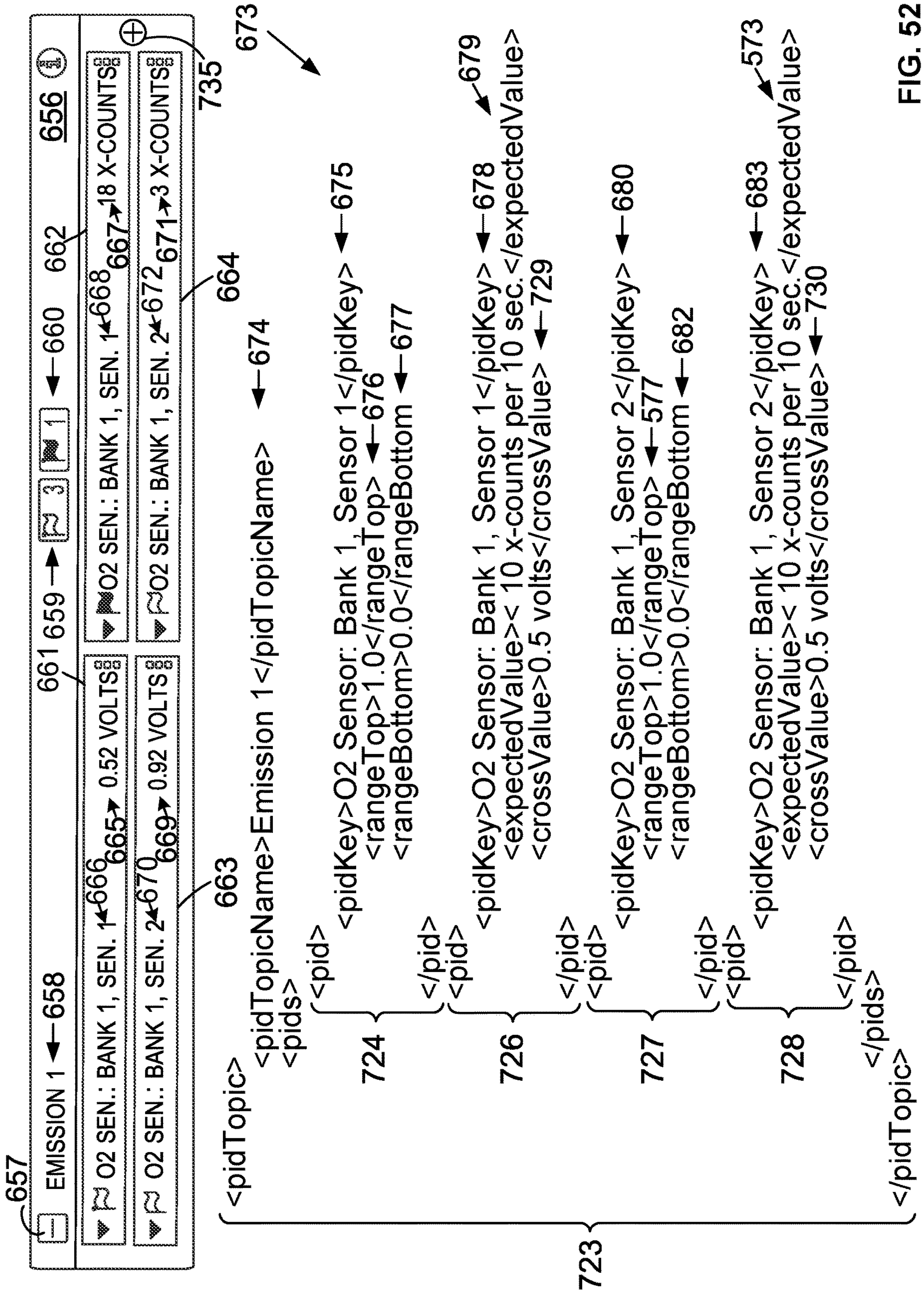
FIG. 52 shows a container and a portion of a corresponding parameter-identifier topic file in accordance with the example implementations.

Next, FIG. 52 shows a container 656 and a PID topic file portion 673 that corresponds to the container 656. The container 656 includes sub-containers that correspond to PIDs values that are compared to expected value elements including a specified quantity of cross counts (e.g., "x-counts") per unit of time. The processor 102, 161 can count instances of a PID parameter values for a particular PID crossing a particular value.

The container 656 is populated with a PID topic descriptor 658 that matches a PID topic name element 674 within the PID topic file portion 673. The container 656 also includes a container resizing USC 657, and a condition icon 659, 660 that, in combination include numerals that add up to a quantity of sub-containers in container 656 that include a flag indicative of a PID condition.

The container 656 includes a sub-container 661, 662, 663, 664. Similar to other sub-containers described above, each of the sub-container 661, 662, 663, 664 includes a flag and a sub-container resizing USC. The sub-container 661 includes a parameter value 665 corresponding to a PID identified by a PID descriptor 666. The sub-container 662 includes a parameter value 667 corresponding to a PID identified by a PID descriptor 668. The sub-container 663 includes a parameter value 669 corresponding to a PID identified by a PID descriptor 670. The sub-container 664 includes a parameter value 671 corresponding to a PID identified by a PID descriptor 672.

The PID topic file portion 673 is arranged as elements of an XML file. The PID topic file portion 638 can include one or more other PID topic elements, a PID list name element, a system element indicative of a system within a vehicle, and/or a declaration, similar to the arrangement of the PID topic file 200.

The PID topic file portion 673 includes a PID topic element 723 including a PID element 724, 726, 727, 728.

The PID element 724 includes a PID key element 675 that includes the textual data "02 Sensor: Bank 1, Sensor 1" between a start tag (e.g., <pidKey>) and an end tag (e.g., </pidKey>). The PID element 724 includes a range top element 676 with data indicative of a maximum threshold value, and a range bottom element 677 with data indicative of a minimum threshold value.

The PID element 726 includes a PID key element 678 that includes the textual data "O2 Sensor: Bank 1, Sensor 1" between a start tag (e.g., <pidKey>) and an end tag (e.g., </pidKey>). The PID element 726 includes an expected value element 679 having data indicative of a number of cross counts (e.g., 10) per a unit of time (e.g., ten seconds). The PID element 726 includes a cross value element 729 for comparing to received PID parameter values corresponding to a PID identified by the PID key element 678. In at least some implementations, a flag within a sub-container indicative of a quantity of cross counts is displayed as a black flag if the received PID parameter values cross the specified cross value element per specified unit of time more than the specified number of cross counts. Otherwise, the flag is displayed as a white flag if the received PID parameter values do not cross the specified cross value element per specified unit of time more than the specified number of cross counts.

The PID element 727 includes a PID key element 680 that includes the textual data "O2 Sensor: Bank 1, Sensor 2" between a start tag (e.g., <pidKey>) and an end tag (e.g., </pidKey>). The PID element 727 includes a range top element 577 with data indicative of a maximum threshold value, and a range bottom element 682 with data indicative of a minimum threshold value.

The PID element 728 includes a PID key element 683 that includes the textual data "O2 Sensor: Bank 1, Sensor 2" between a start tag (e.g., <pidKey>) and an end tag (e.g., </pidKey>). The PID element 728 includes an expected value element 573 having data indicative of a number of cross counts per a unit of time. The PID element 728 includes a cross value element 730 for comparing to received PID parameter values corresponding to a PID identified by the PID key element 683.

Next, FIG. 53 shows another view of the GUI 296. Other views of the GUI 296 are shown in FIG. 26 to FIG. 34. Those other views of the GUI 296 show the GUI 296 with the PID topic view selected. In FIG. 53, however, the GUI 296 is shown with a list view selected via the USC 697. The underlined text in the USC 697 represents that the list view is the currently selected view. As shown in FIG. 53, the GUI 296 includes the sub-container 312, 328, 329. 335, 466, 467, 468, 469, 470, 471, 472, 473. The USC 121 is in the on position and the sub-containers in the GUI 296 are arranged alpha-numerically based on the PID in each sub-container.

Figure 54:
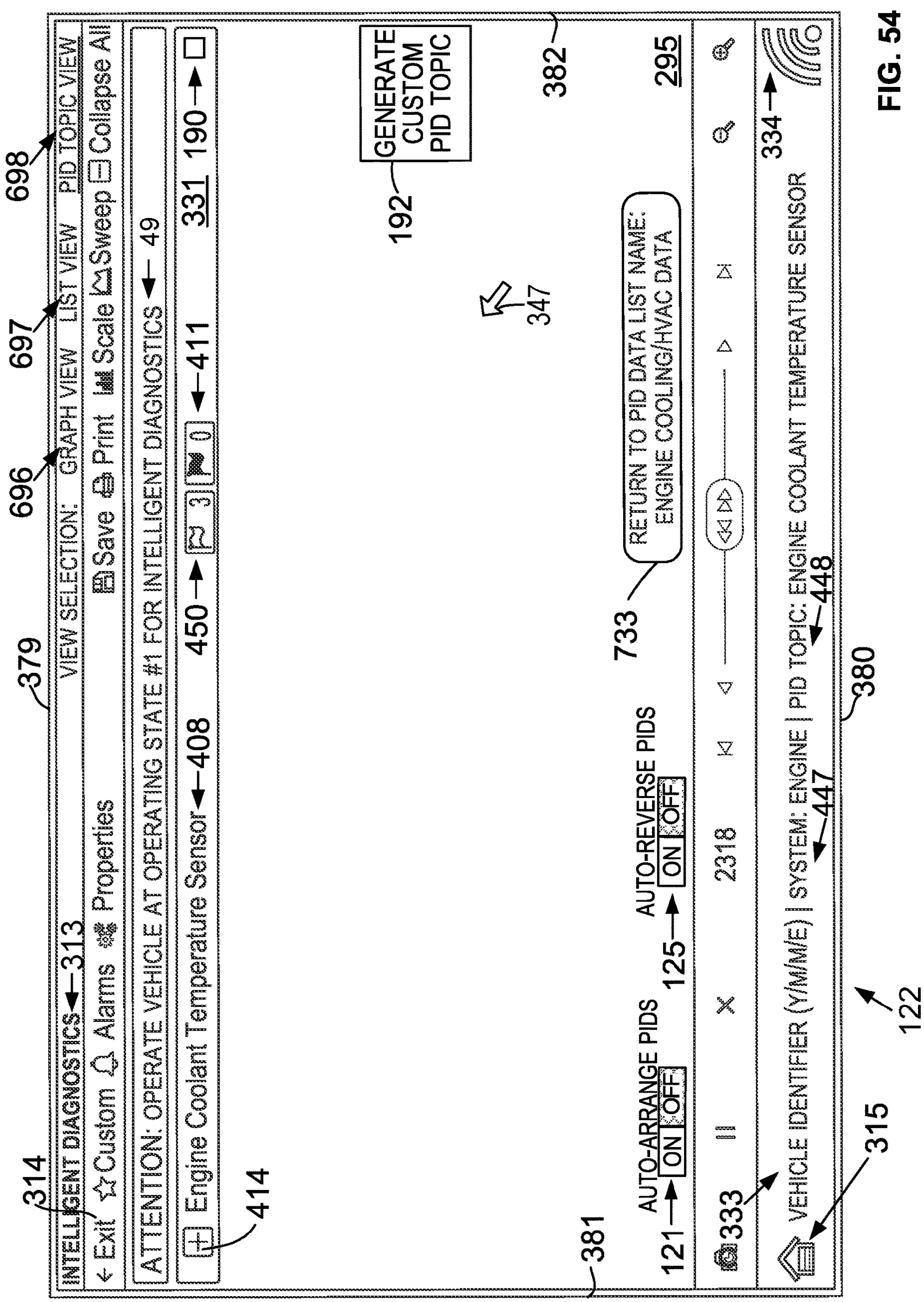

Next, FIG. 54 shows the GUI 295. In FIG. 54, the GUI 295 shows that a GUI displayed on the display 122 can include a single PID topic container (e.g., the PID topic container 331). As an example, the GUI 295, as shown in FIG. 54, can be displayed in response to a selection of the PID topic container 331. In at least some implementations, the PID topic descriptor 408 can be arranged as a USC. In accordance with those implementations, in response to a selection of the PID topic descriptor 408 from the GUI 295, as shown in FIG. 40, can cause the processor 102, 161 to display the GUI 295 as shown in FIG. 54. In other implementations, some other USC included within a GUI including multiple PID topic containers can be selected to cause only one of the multiple PID topic containers to be displayed within the GUI.

The GUI 295, as shown in FIG. 54, includes a USC 733. The processor 102, 161 can revert to showing the GUI 295 with the PID topic container 330, 331, 332, for example as shown in FIG. 40.

Figure 57:
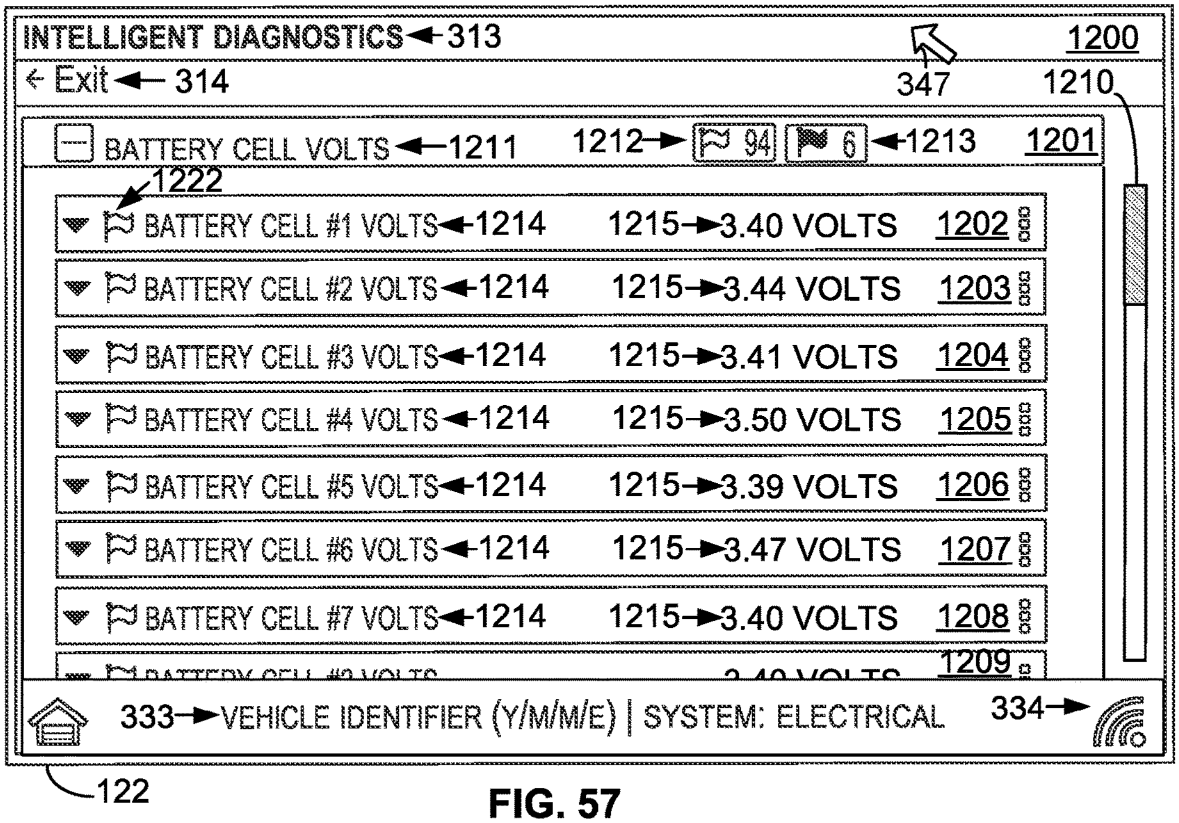
FIG. 57 and FIG. 58 show a graphical user interface in accordance with the example implementations.

Next, FIG. 57 shows a GUI 1200 displayed on the display 122. The processor 102 can output the GUI 1200 from the GUI 131 stored in the memory 104. Additionally or alternatively, the GUI 1200 can be based on a PID topic file within the PID topic file 139. The computing device 100 can receive the GUI 1200 and/or a PID topic file to generate the GUI 1200 from the server 22. The GUI 1200 includes a PID topic container 1201. The GUI 1200 and the PID topic container 1201 include a PID topic descriptor 1211 and a USC 1212, 1213. The USC 1212 includes a condition icon and a numeral indicating that no out-of-range parameters and no parameters with an unexpected value have been received for ninety-four PIDs corresponding to the PID topic container 1201. The USC 1213 includes a condition icon and a numeral indicating that out-of-range parameters or a parameter with an unexpected value have been received for six PIDs corresponding to the PID topic container 1201. In FIG. 57, the USC 1212, 1213 is unshaded. For purposes of this description, the USC 1212, 1213 being unshaded represents that a filtering function corresponding to the USC 1212, 1213 is disabled. Alternatively, the USC 1212, 1213 being shaded represents that a filtering function corresponding to the USC 1212, 1213 is enabled.

Based on the example numerals discussed in the preceding paragraph, the PID topic container 1201 can correspond to one hundred different PIDs and can include one hundred sub-containers, one for each of the one hundred PIDs. FIG. 57 shows sub-container 1202, 1203, 1204, 1205, 1206, 1207, 1208 in a contracted state and a portion of a sub-container 1209. Each of the sub-containers in the PID topic container 1201 includes a PID descriptor 1214 and a parameter value 1215. The sub-container 1202, 1203, 1204, 1205, 1206, 1207, 1208, 1209 are ordered sequentially based on a battery cell number. The other ninety-two sub-containers can include PID descriptors for a different battery cell number and a parameter value for that that respective battery cell. The sub-containers shown in FIG. 57 have a flag 1222 that is unfilled to represent the PID condition in which none of the received parameter values corresponding to the PID for that sub-container has breached any respective PID threshold for that PID.

The GUI 1200 includes a scroll bar 1210 that is selectable to cause different sub-containers corresponding to different PIDs to be shown on the display 122. A scroll bar in a PID topic container, such as the scroll bar 1210, is a convenient means for displaying different parts of the PID topic container, but can be cumbersome when the PID topic container has a large number of sub-containers (e.g., fifty or more sub-containers) and/or when more than a couple sub-containers are in an expanded state and a user is interested in seeing sub-containers that are associated with the USC 1213, for example.

Figure 58:
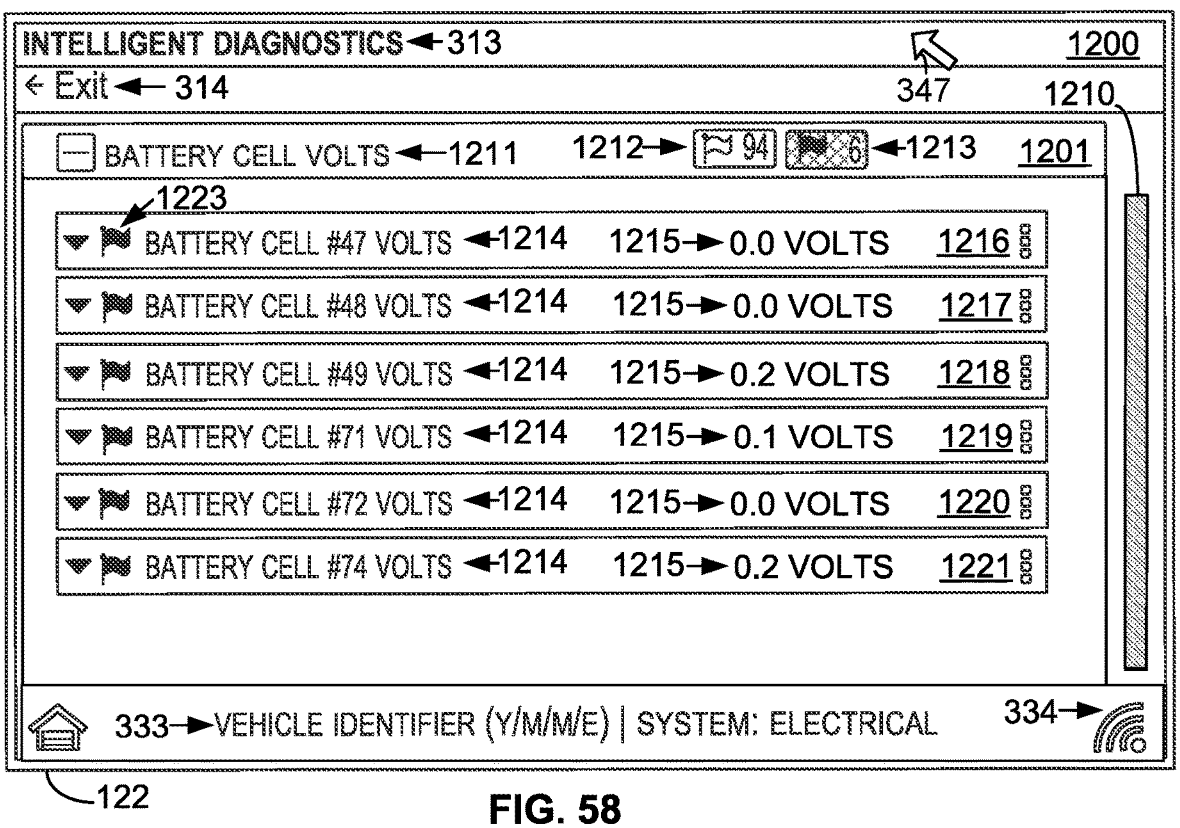

Next, FIG. 58 shows an alternative view of the GUI 1200 on the display 122. In this view, the USC 1213 is shaded to indicate the filtering function corresponding to the USC 1213 is enabled. That filtering function includes removing from the PID topic container 1201 the sub-containers corresponding to the USC 1212 and populating the PID topic container 1201 with sub-containers corresponding to the USC 1213 such that the only sub-containers shown in the PID topic container 1201 include the sub-containers corresponding to the USC 1213. As an example, the PID topic container 1201 includes a sub-container 1216, 1217, 1218, 1219, 1220, 1221, each of which includes a flag 1223 that corresponds to the PID condition in which at least one of the received parameter values corresponding to the PID for that sub-container has breached a respective PID threshold for that PID.

In at least some implementations, selecting the USC 1212 with the filtering function for the USC 1213 enabled, the processor can disable the filtering function for the USC 1213 and enabling the filtering function for the USC 1212. That filtering function includes removing from the PID topic container 1201 the sub-containers corresponding to the USC 1213 and populating the PID topic container 1201 with sub-containers corresponding to the USC 1212 such that the only sub-containers shown in the PID topic container 1201 include the sub-containers corresponding to the USC 1213.

In at least some implementations, a PID topic container can include additional sub-container(s) that are not associated with the PID conditions described as being associated with the flag 1222, 1223, as well as USC like the USC 1212, 1213. In at least some of those implementations, enabling the filtering function for the USC 1212 or the filtering function 1213 results in removing and/or not presenting the additional sub-containers described above. In at least some other implementations, enabling the filtering function for the USC 1212 or the filtering function for the USC 1213 results in the additional sub-containers described above being available within the PID topic container corresponding to the additional sub-containers. A scroll bar, like the scroll bar 1210, may need to be used to present some or all of the additional sub-containers.

VI. Example Vehicle

A vehicle is a mobile machine that can be used to transport a person, people, and/or cargo. Accordingly, a vehicle can be driven and/or otherwise guided along a path (e.g., a paved road or otherwise) on land, in water, in the air, and/or outer space. A vehicle can be wheeled, tracked, railed, and/or skied. A vehicle can include an automobile, a motorcycle (e.g., a two or three wheel motorcycle), an all-terrain vehicle (ATV) defined by ANSI/SVIA-1-2007, a snowmobile, a watercraft (e.g., a JET SKI® personal watercraft), a light-duty truck, a medium-duty truck, a heavy-duty truck, a semi-tractor, a drone, and/or a farm machine. A vehicle can include and/or use any appropriate voltage and/or current source, such as a battery, an alternator, a fuel cell, and the like, providing any appropriate current and/or voltage, such as about 12 volts, about 42 volts, 400 volts, 800 volts, or some other voltage level. A vehicle can include and/or use any system and/or engine to provide its mobility. Those systems and/or engines can include vehicle components that use fossil fuels, such as gasoline, natural gas, propane, and the like, electricity, such as that generated by a battery, magneto, fuel cell, solar cell and the like, wind and hybrids and/or combinations thereof. A vehicle can include an electronic control unit (ECU), an OBDC, and a vehicle network that connects the OBDC to the ECU. A vehicle can be operable to operate as an autonomous vehicle.

Some vehicles and types of vehicles can be identified by characteristics of the vehicle such as characteristics indicative of when the vehicle was built (e.g., a vehicle year), who built the vehicle (e.g., a vehicle make), marketing names associated with vehicle (e.g., a vehicle model name, or more simply "model"), and features of the vehicle (e.g., an engine type). This description uses an abbreviation YMME and/or Y/M/M/E, where each letter in the order shown represents a model year, vehicle make, vehicle model name, and engine type, respectively. This description uses an abbreviation YMM and/or Y/M/M, where each letter in the order shown represents a model year, vehicle make, and vehicle model name, respectively. An example Y/M/M/E is 2020/Toyota/Camry/4Cyl, in which "2020" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (e.g., a four cylinder internal combustion engine) within the vehicle. A person skilled in the art will understand that other features in addition to or as an alternative to "engine type" can be used to identify a vehicle. These other features can be identified in various manners, such as a regular production option (RPO) code, such as the RPO codes defined by the General Motors Company LLC, Detroit Michigan Some vehicles, such as automobiles, are associated with a unique vehicle identification number (VIN). Some VINs include seventeen alpha-numeric characters. For at least some seventeen character VINs, the last six characters represent a unique serial number associated with a particular type of vehicle represented by the first eleven alpha-numeric characters of those VINs. The first eleven alpha-numeric characters typically represent at least a YMME or a YMM. In some instances, a vehicle includes a one dimensional bar code indicative of a VIN associated with that vehicle.

A vehicle network, such as the vehicle communication network 32 can include one or more conductors (e.g., copper wire conductors) and/or can be wireless. As an example, a vehicle network can include one or two conductors for carrying vehicle data messages in accordance with a vehicle data message (VDM) protocol, such as a bi-directional VDM protocol. A bi-directional VDM protocol can include a SAE® J1850 (PWM or VPW) VDM protocol, an SAE® J1939 VDM protocol based on the SAE® J1939_201808 serial control and communications heavy duty vehicle network—top level document, and/or any other core J1939 standard, an ISO® 15764-4 controller area network (CAN) VDM protocol, an ISO® 9141-2 K-Line VDM protocol, an ISO® 14230-4 KWP2000 K-Line VDM protocol, an ISO® 17458 (e.g., parts 1-5) FlexRay VDM protocol, an ISO® 17987 local interconnect network (LIN) VDM protocol, a CAN 2.0 VDM protocol, standardized in part using an ISO® 11898-1:2015 road vehicle—CAN—Part I: data link layer and physical signaling protocol, a CAN FD VDM protocol (e.g., CAN with flexible data rate VDM protocol), a MOST® Cooperation VDM protocol (such as the MOST Specification Rev. 3.0 E2, or the MOST® Dynamic Specification, Rev. 3.0.2), an Ethernet VDM protocol (e.g., an Ethernet 802.3 protocol using a BROADR-REACH® physical layer transceiver specification for Automotive Applications by Broadcom Inc., San Jose, California), or some other VDM protocol defined for performing communications with or within the vehicle 12, 40, 51, 1060. Each and every VDM discussed in this description is arranged according to a VDM protocol.

Instead of being bidirectional, a VDM protocol can be a unidirectional. For example, a SENT VDM protocol (e.g., a single-edge nibble transmission VDM protocol) is a unidirectional VDM protocol. The SENT VDM protocol has been standardized as the SAE J2716 VDM protocol. A sensor in a vehicle can include a transmitter operable to communicate using the SENT VDM protocol (e.g., a SENT VDM transmitter). A vehicle communication bus can operatively connect the SENT VDM transmitter and an ECU within the vehicle. The transceiver 106 (e.g., the vehicle communications transceiver 118) can include a SENT VDM receiver connectable to the vehicle communication bus operatively connected to the SENT VDM transmitter. The SENT VDM receiver can receive SENT VDM protocol messages representing sensor values output by the sensor with the SENT VDM transmitter.

An OBDC, such as the OBDC 27, 50, 56 can include an on-board diagnostic (OBD) connector, such as an OBD II connector. An OBD II connector can include slots for retaining up to sixteen connector terminals, but can include a different number of slots or no slots at all. As an example, an OBDC can include an OBD II connector that meets the SAE J1962 specification such as a connector 16M, part number 12110252, available from Aptiv LLC of Dublin, Ireland. An OBDC can include conductor terminals that connect to a conductor in a vehicle. For instance, an OBDC can include connector terminals that connect to conductors that respectively connect to positive and negative terminals of a battery or battery pack. An OBDC can include one or more conductor terminals that connect to a conductor of a vehicle communication bus such that the OBDC is operatively connected to one or more ECUs. A computing system, such as the computing system 14, 100 can operatively connect to an OBDC in order to receive VDM from the vehicle including that OBDC. A VDM can carry VDM data. The VDM data can include a PID and parameter values associated with the PID. The VDM data can include a DTC. The operative connection between the OBDC and the computing system 14, 100 can occur via the arrangement 80, 82, 84 shown in FIG. 20 or via some other arrangement.

A PID can be associated with one or more thresholds. A threshold corresponding to a PID can be dependent upon an operating condition of the vehicle 12. FIG. 61 shows a set of PID thresholds 983 for a set of PIDs 984. At least some of the PID thresholds 983 depend on an operating condition 985. The PID thresholds 983 can include a threshold range top 986 and a threshold range bottom 987. The threshold range top 986 and threshold range bottom 987 can be specified in some units 988. Alternatively, the PID thresholds 983 can include an expected value 989. In FIG. 61, the term "Null" indicates that a range top, range bottom, unit, or expected value does not correspond to a particular PID.

As an example, the operating condition 985 for a PID can be a "key-on, engine off" condition or a "key-on, engine on" condition. Other examples of an operating condition corresponding to a PID threshold for a PID include an engine, an engine coolant temperature, an engine load condition, a selected transmission gear condition, an ambient air temperature, an elevation condition, among others. Based on those additional examples, there may be more than two different operating conditions corresponding to PID thresholds for a PID. For instance, the engine coolant temperature operating conditions may include a distinct operating condition for each whole degree between the range between −40° C. and 130° C., and the PID thresholds can include a threshold range top and bottom for each of those operating condition degrees.

PID threshold data for a particular PID can be included in a PID topic file. A processor can determine an operating condition of a vehicle being tested, select the PID threshold(s) corresponding to the operating condition for a particular PID, and display parameter data and the selected PID thresholds for the particular PID within a GUI (e.g., within a PID topic shown in a GUI).

An ECU can control various aspects of vehicle operation and/or components within a vehicle system. For example, an ECU can include a powertrain (PT) system ECU, an engine control module (ECM) ECU, a supplemental inflatable restraint (SIR) system (e.g., an air bag system) ECU, an entertainment system ECU, or some other ECU. An ECU can receive an electrical or optical input from an ECU-connected input device (e.g., a sensor input), control an ECU-connected output device (e.g., a solenoid) via an electrical or optical signal output by the ECU, generate a vehicle data message (VDM) (such as a VDM based on a received input or a controlled output), and set a diagnostic trouble code (DTC) to a state (such as active or history). An ECU can perform a functional test in response to receiving a VDM requesting performance of the functional test. The functional test can be used to test an ECU-connected output device. In at least some implementations, the ECU is operable to perform the functional test and/or provide the diagnostic trouble code in accordance with an industry standard, such as the SAE J1979_201202 and/or ISO 15031-5 standards for E/E diagnostic test modes.

VII. Example Computing System Configuration

Figure 62:
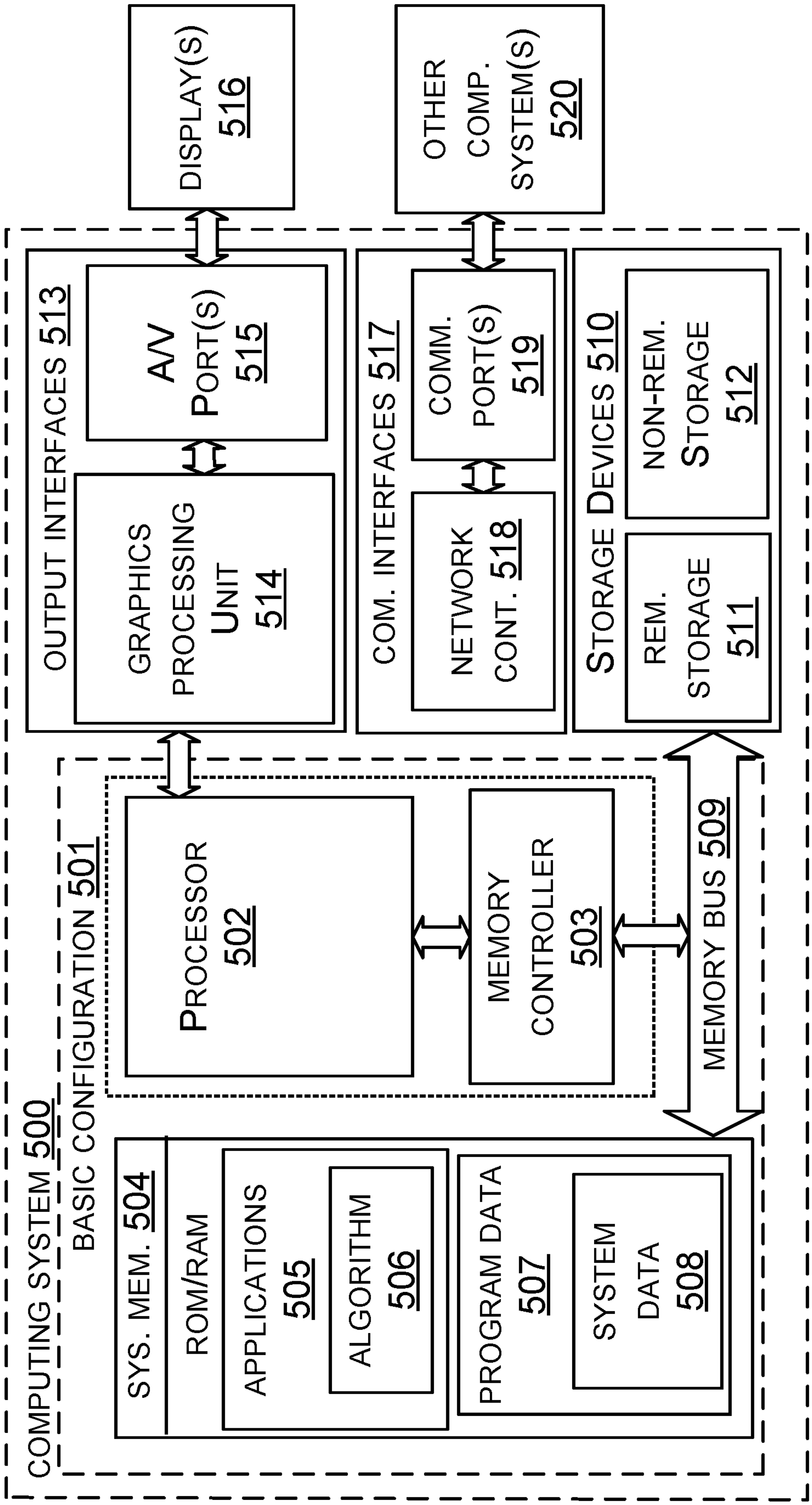
FIG. 62 is a block diagram illustrating a computing system that is arranged in accordance with accordance with the example implementations.

Next, FIG. 62 is a simple block diagram of a computing system 500 in accordance with the example implementations. In a basic configuration 501, the computing system 500 can include a processor 502 and a system memory 504. A memory bus 509 can be used for communicating between the processor 502 and the system memory 504. Depending on the desired configuration, the processor 502 can be of any type including but not limited to a microprocessor (μP), a microcontroller (μC), a digital signal processor (DSP), or any combination thereof. A memory controller 503 can also be used with the processor 502, or in some implementations, the memory controller 503 can be an internal part of the processor 502.

Depending on the desired configuration, the system memory 504 can be of any type including but not limited to volatile memory (such as RAM), non-volatile memory (such as ROM, flash memory, etc.) or any combination thereof. The system memory 504 can include one or more applications 505, and program data 507. The application 505 can include an algorithm 506 that is arranged to perform the functions described as being performed by the computing system 14, 100 or the server 22, 160. The program data 507 can include system data 508 that could be directed to any number of types of data, such as the computer-readable data stored in the memory 104, 162. In some example implementations, the applications 505 can be arranged to operate with the program data 507 on an operating system executable by the processor 502.

The computing system 500 can have additional features or functionality, and additional interfaces to facilitate communications between the basic configuration 501 and any devices and interfaces. For example, storage devices 510 can be provided including removable storage devices 511, non-removable storage devices 512, or a combination thereof. Examples of removable storage and non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Computer storage media can include volatile and non-volatile, non-transitory, removable and non-removable media implemented in any method or technology for storage of information, such as computer-readable program instructions, data structures, program modules, or other data such as the data stored in a computer-readable memory, such at the memory 104, 162.

The system memory 504 and the storage devices 510 are examples of computer-readable memory, such as the memory 104, 162. The system memory 504 and the storage devices 510 can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing system 500.

The computing system 500 can include or be implemented as a portion of a small-form factor portable (e.g., mobile) electronic device such as a smartphone (e.g., an IPHONE® smartphone from Apple Inc. of Cupertino, California, or a GALAXY S® smartphone from Samsung Electronics Co., Ltd. of Maetan-Dong, Yeongtong-Gu Suwon-Si, Gyeonggi-Do, Republic of Korea), a tablet device (e.g., an IPAD® tablet device from Apple Inc., or a SAMSUNG GALAXY TAB tablet device from Samsung Electronics Co., Ltd.), or a wearable computing device (e.g., a wireless web-watch device or a personal headset device). The application 505, or the program data 507 can include an application downloaded to the communication interfaces 517 from the APP STORE® online retail store, from the GOOGLE PLAY® online retail store, or another source of the applications. A component of the computing system 14, 100, such as the display 122 and/or the transceiver 106, can be embodied in the small-form factor electronic device.

The computing system 500 can include or be implemented as part of a personal computing system (including both laptop computer and non-laptop computer configurations), or a server. The computing system 500 can be configured as an embedded system in which the processor 502 includes an embedded processor and the system memory 504 includes an embedded memory.

The computing system 500 can also include output interfaces 513 that can include a graphics processing unit 514, which can be configured to communicate to various external devices such as displays 516 or speakers via one or more AN ports 515 or a communication interface 517. The communication interface 517 can include a network controller 518, which can be arranged to facilitate communications with the other computing systems 520 over a network communication via one or more communication ports 519. The communication connection is one example of a communication media. Communication media can be embodied by computer-readable program instructions, data structures, program modules, GUIs, PID topics, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

For the computing system 14, 100, the communication interface 517 can include the network transceiver 116 and/or the vehicle communications transceiver 118, and the communication port 519 can include a communication port connectable to a printer for printing a paper copy of GUI content.

Turning back to FIG. 36, a schematic illustrating a conceptual partial view of a computer program product 530 is shown. The computer program product 530 includes a computer program for executing a computer process on a computing system, arranged according to at least some implementations presented herein. That computer program can be encoded on a non-transitory computer-readable storage medium in a machine-readable format, or on another non-transitory medium or article of manufacture.

In at least some implementations, the computer program product 530 is provided using a signal bearing medium 531. The signal bearing medium 531 can include one or more programming instructions 532 that, when executed by a processor can provide functionality or portions of the functionality described above with respect to FIG. 1 to FIG. 60. In some examples, the signal bearing medium 531 can encompass a computer-readable memory 533, such as, but not limited to, a hard disk drive, a Compact Disc (CD), a Digital Video Disk (DVD), a digital tape, or any other memory described herein. In some implementations, the signal bearing medium 531 can encompass a computer recordable medium 534, such as, but not limited to, memory, read/write (R/W) CDs, R/W DVDs, etc. In some implementations, the signal bearing medium 531 can encompass a communications medium 535, such as, but not limited to, a digital and/or an analog communication medium (e.g., a fiber optic cable, a waveguide, a wired communications link, a wireless communication link, etc.). Thus, for example, the signal bearing medium 531 can be conveyed by a wireless form of the communications medium 535 (e.g., a wireless communications medium conforming to the IEEE 802.11 standard or another transmission protocol).

The one or more programming instructions 532 can be, for example, computer executable and/or logic implemented instructions. In some examples, a computing system such as the computing system 500 of FIG. 62 can be configured to provide various operations, functions, or actions in response to the programming instructions 532 conveyed to the computing system 500 by one or more of the following; the computer-readable memory 533, the computer recordable medium 534, or the communications medium 535.

The computing system 14, 100 can include any of the components of the computing system 500. The processor 102 can be configured like the processor 502. The memory 104 can be configured as part of or all of the system memory 504 or the storage devices 510. The transceiver 106 can be configured as part of or all of the communication interfaces 517.

In at least some implementations, the computing system 14, 100, the server 22, 160 and/or the computing system 500 includes a power source. The power source can include a connection to an external power source and circuitry to allow current to flow to other elements connected to the power source. As an example, the external power source can include a wall outlet at which a connection to an alternating current can be made. As another example, the external power source can include an energy storage device (e.g., a battery) or an electric generator.

Additionally or alternatively, a power source can include a connection to an internal power source and power transfer circuitry to allow current to flow to other elements connected to the power source. As an example, the internal power source can include an energy storage device, such as a battery. Furthermore, any power source described herein can include various circuit protectors and signal conditioners. The power sources described herein can provide a way to transfer electrical currents to other elements that operate electrically.

VIII. Conclusion

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether. Furthermore, various functions described and/or shown in the drawings as being performed by one or more elements can be carried out by a processor executing computer-readable program instructions or by a combination of hardware, firmware, and/or software. For purposes of this description, execution of CRPI contained in a computer-readable memory to perform some function can include executing all of the program instructions of those CRPI or only a portion of those CRPI.

While various aspects and implementations are described herein, other aspects and implementations will be apparent to those skilled in the art. The various aspects and implementations disclosed herein are for purposes of illustration and are not intended to be limiting, with the true scope being indicated by the claims, along with the full scope of equivalents to which such claims are entitled. It is also to be understood that the terminology used herein for the purpose of describing implementations only, and is not intended to be limiting.

In this description, the articles "a," "an," and "the" are used to introduce elements and/or functions of the example implementations. The intent of using those articles is that there is one or more of the introduced elements and/or functions.

In this description, the intent of using the term "and/or" within a list of at least two elements or functions and the intent of using the terms "at least one of," "at least one of the following," "one or more of," "one or more from among," and "one or more of the following" immediately preceding a list of at least two components or functions is to cover each implementation including a listed component or function independently and each implementation including a combination of the listed components or functions. For example, an implementation described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible implementations: (i) an implementation including A, but not B and not C, (ii) an implementation including B, but not A and not C, (iii) an implementation including C, but not A and not B, (iv) an implementation including A and B, but not C, (v) an implementation including A and C, but not B, (v) an implementation including B and C, but not A, and/or (vi) an implementation including A, B, and C. For the implementations including component or function A, the implementations can include one A or multiple A. For the implementations including component or function B, the implementations can include one B or multiple B. For the implementations including component or function C, the implementations can include one C or multiple C. In accordance with the aforementioned example and at least some of the example implementations, "A" can represent a component, "B" can represent a system, and "C" can represent a symptom.

The use of ordinal numbers such as "first," "second," "third" and so on is to distinguish respective elements rather than to denote an order of those elements unless the context of using those terms explicitly indicates otherwise. The use of the symbol "$" as prefix to a number indicates the number is a hexadecimal number.

U.S. patent application Ser. No. 15/236,060 was filed on Aug. 12, 2016 and published on Feb. 15, 2018 as United States Patent Application Publication No. 2018/004722 A1. U.S. patent application Ser. No. 15/236,060 and United States Patent Application Publication No. 2018/004722 A1 are incorporated herein by reference.

Implementations of the present disclosure can thus relate to one of the enumerated example embodiments (EEEs) listed below.

EEE 1 is a method comprising: determining, by a processor while a computing system operates in a first state, a vehicle identifier corresponding to a vehicle operatively connected to the computing system. The computing system includes the processor and a display. The display is powered on, but does not display any parameter-identifier (PID) condition indicator while the computing system operates in the first state. A component identifier corresponds to a component of the vehicle. A system identifier corresponds to a system of the vehicle. A symptom identifier corresponds to a symptom the vehicle can exhibit. The method also includes determining, by the processor while the computing system operates in the first state, the component identifier, the system identifier, and/or the symptom identifier. The method further includes determining, by the processor, a first PID topic corresponding to the component identifier, the system identifier, and/or the symptom identifier. One or more parameter-identifiers (PIDs) correspond to the first PID topic. The method further includes switching, by the processor, operation of the computing system from the first state to a second state, the computing system is operable to display a PID condition indicator on the display while operating in the second state. The method also includes receiving, by the processor while the computing system operates in the second state, parameter values automatically requested from the vehicle for the one or more PIDs corresponding to the first PID topic. Furthermore, the method includes determining, by the processor while the computing system operates in the second state, a PID condition associated with each respective PID corresponding to the first PID topic, the PID condition associated with each respective PID corresponding to the first PID topic indicates whether at least one of the received parameter values corresponding to the respective PID has breached a respective PID threshold or whether none of the received parameter values corresponding to the respective PID has breached any respective PID threshold. Furthermore still, the method includes displaying, on the display while the computing system operates in the second state, a descriptor of the first PID topic and a first particular PID condition indicator corresponding to the first PID topic, the first particular PID condition indicator corresponding to the first PID topic indicates a first quantity of PIDs, the first quantity of PIDs indicates how many PIDs corresponding to the first PID topic are associated with the PID condition in which at least one of the received parameter values corresponding to the respective PID has breached a respective PID threshold or how many PIDs corresponding to the first PID topic are associated with the PID condition in which none of the received parameter values corresponding to the respective PID has breached any respective PID threshold.

EEE 2 is a method according to EEE 1, further comprising displaying, on the display while the computing system operates in the first state and after determining the vehicle identifier and the component identifier, the system identifier, and/or the symptom identifier, a first user-selectable control. Switching operation of the computing system from the first state to the second state occurs in response to a selection of the first user-selectable control.

EEE 3 is a method according to any one of EEE 1 to 2, wherein switching operation of the computing system from the first state to the second state occurs in response to determining the first PID topic.

EEE 4 is a method according to any one of EEE 1 to 3, further comprising receiving, by the processor, vehicle data transmitted by the vehicle. The vehicle data is indicative of a diagnostic trouble code set active within the vehicle. Determining the component identifier, the system identifier, and/or the symptom identifier is based on the diagnostic trouble code. The diagnostic trouble code set active within the vehicle includes: a diagnostic trouble code set active by the component, or a diagnostic trouble code set active by an electronic control unit that is within the vehicle and that is: (i) operatively connected to the component, (ii) part of the system, and/or (iii) operatively connected to the component and part of the system.

EEE 5 is a method according to any one of EEE 1 to 4, wherein determining the component identifier, the system identifier, and/or the symptom identifier includes determining at least a first identifier and a second identifier. Additionally, determining the first PID topic includes aggregating a PID topic corresponding to the first identifier and a PID topic corresponding to the second identifier. The method further comprises determining the one or more PIDs corresponding to the first PID topic by aggregating PIDs corresponding to the PID topic corresponding to the first identifier, and PIDs corresponding to the PID topic corresponding to the second identifier. Furthermore, (i) the first identifier includes a first component identifier and the second identifier includes a second component identifier, a first system identifier, or a first symptom identifier, (ii) the first identifier includes the first system identifier and the second identifier includes the first component identifier, a second system identifier, and/or the first symptom identifier, or (iii) the first identifier includes the first symptom identifier and the second identifier includes the first component identifier, the first system identifier, or a second symptom identifier.

EEE 6 is a method according to EEE 5, wherein aggregating the PIDs corresponding to the PID topic corresponding to the first identifier and the PIDs corresponding to the PID topic corresponding to the second identifier includes omitting a particular PID corresponding to the PID topic corresponding to the second identifier because the particular PID is duplicative of a PID corresponding to the PID topic corresponding to the first identifier.

EEE 7 is a method according to any one of EEE 1 to 6, further comprising determining, by the processor, a second PID topic corresponding to the component identifier, the system identifier, and/or the symptom identifier. One or more PIDs correspond to the second PID topic. The method also includes receiving, by the processor while the computing system operates in the second state, parameter values automatically requested from the vehicle for the one or more PIDs corresponding to the second PID topic. Furthermore, the method includes determining, by the processor while the computing system operates in the second state, a PID condition associated with each respective PID corresponding to the second PID topic, the PID condition associated with each respective PID corresponding to the second PID topic indicates whether at least one of the received parameter values corresponding to the respective PID has breached a respective PID threshold or whether none of the received parameter values corresponding to the respective PID has breached any respective PID threshold. Furthermore still, the method includes displaying, on the display while the computing system operates in the second state, a descriptor of the second PID topic and a second particular PID condition indicator corresponding to the second PID topic, the second particular PID condition indicator corresponding to the second PID topic indicates a second quantity of PIDs, the second quantity of PIDs indicates how many PIDs corresponding to the second PID topic are associated with the PID condition in which at least one of the received parameter values corresponding to the respective PID has breached a respective PID threshold or how many PIDs corresponding to the second PID topic are associated with the PID condition in which none of the received parameter values corresponding to the respective PID has breached any respective PID threshold.

EEE 8 is a method according to EEE 7, wherein the descriptor of the first PID topic and the first particular PID condition indicator corresponding to the first PID topic are displayed together within a first container. Additionally, the descriptor of the second PID topic and the second particular PID condition indicator corresponding to the second PID topic are displayed together within a second container separate from the first container. The first container and the second container are initially displayed in a first order. Moreover, the method includes determining a user-selection to change an order or a change in the PID condition for each of the one or more PIDs corresponding to the first PID topic and the PID condition for each of the one or more PIDs corresponding to the second PID topic. Furthermore, the method includes displaying the first container and the second container in a second order different than the first order based on the user-selection to change the order or the change in the PID condition for each of the one or more PIDs corresponding to the first PID topic and the PID condition for each of the one or more PIDs corresponding to the second PID topic.

EEE 9 is a method according to EEE 8, wherein the first order is: (i) an alpha-numeric order, (ii) a reverse-alpha-numeric order, (iii) an order based on quantities of PIDs for which the computing system has received out-of-range parameter values and/or unexpected parameter values, from a greatest quantity to a least quantity, (iv) an order based on quantities of PIDs for which the computing system has received out-of-range parameter values and/or unexpected parameter values, from the least quantity to the greatest quantity, (v) an order based on quantities of PIDs for which the computing system has received out-of-range parameter values and/or unexpected parameter values, from a greatest percentage to a lowest percentage, (vi) an order based on quantities of PIDs for which the computing system has received out-of-range parameter values and/or unexpected parameter values, from the lowest percentage to the greatest percentage, or (vii) a user-selected order. The second order is a different one of: (viii) the alpha-numeric order, (ix) the reverse-alpha-numeric order, (x) the order based on quantities of PIDs for which the computing system has received out-of-range parameter values and/or unexpected parameter values, from the greatest quantity to the least quantity, (xi) the order based on quantities of PIDs for which the computing system has received out-of-range parameter values and/or unexpected parameter values, from the least quantity to the greatest quantity, (xii) the order based on quantities of PIDs for which the computing system has received out-of-range parameter values and/or unexpected parameter values, from the greatest percentage to the lowest percentage, (xiii) the order based on quantities of PIDs for which the computing system has received out-of-range parameter values and/or unexpected parameter values, from the lowest percentage to the greatest percentage, or (xiv) the user-selected order.

EEE 10 is a method according to any one of EEE 1 to 9, wherein displaying the descriptor of the first PID topic and the first particular PID condition indicator corresponding to the first PID topic includes displaying a container including: (i) the descriptor of the first PID topic, (ii) the first particular PID condition indicator corresponding to the first PID topic, and (iii) one or more sub-containers. Additionally, each of the one or more sub-containers includes an alpha-numeric indicator of a particular PID and a parameter value descriptor associated with the particular PID.

EEE 11 is a method according to EEE 10, wherein the one or more sub-containers includes multiple sub-containers, and the multiple sub-containers are initially arranged in a first order of sub-containers within the container. Additionally, the method includes displaying the multiple sub-containers in a second order of sub-containers different than the first order of sub-containers. Furthermore, the method includes the second order is based on a PID condition for at least one of the one or more PIDs corresponding to the first PID topic changing.

EEE 12 is a method according to EEE 10, wherein the one or more sub-containers includes multiple sub-containers, and the multiple sub-containers are initially arranged in a first order of sub-containers within the container. Furthermore, the method includes displaying, on the display while the computing system operates in the second state, a second user-selectable control. The method also includes displaying the multiple sub-containers in a second order of sub-containers in response to a selection of the second user-selectable control. Displaying the multiple sub-containers in the second order includes displaying two or more sub-containers initially arranged in the first order in a reverse order.

EEE 13 is a method according to EEE 10, wherein an additional PID corresponds to the first PID topic. The method also includes determining, by the processor, that no PID parameter value is received in response to requesting parameter values from the vehicle for the additional PID. The method further includes displaying, on the display within the container, a sub-container for the additional PID. The sub-container for the additional PID includes an alpha-numeric indicator of the additional PID and an indication that PID parameter values are unavailable from the vehicle for the additional PID, or displaying, on the display, the container without displaying within the container a sub-container for the additional PID.

EEE 14 is a method according to EEE 10, wherein: the one or more sub-containers include multiple sub-containers, and the multiple sub-containers are initially arranged in a first order of sub-containers within the container. The method further comprises determining a user-selection to change an order of sub-containers or a change in a PID condition for one or more PIDs corresponding to each sub-container of the multiple sub-containers. Additionally, the method includes displaying the multiple sub-containers in a second order of sub-containers different than the first order of sub-containers based on the user-selection to change the order of sub-containers or the change in the PID condition for one or more PIDs corresponding to each sub-container of the multiple sub-containers.

EEE 15 is a method according to EEE 14, wherein the first order is: (i) an alpha-numeric order, (ii) a reverse-alpha-numeric order, (iii) an order based on quantities of PIDs for which the computing system has received out-of-range parameter values and/or unexpected parameter values, from a greatest quantity to a least quantity, (iv) an order based on quantities of PIDs for which the computing system has received out-of-range parameter values and/or unexpected parameter values, from the least quantity to the greatest quantity, (v) an order based on quantities of PIDs for which the computing system has received out-of-range parameter values and/or unexpected parameter values, from a greatest percentage to a lowest percentage, (vi) an order based on quantities of PIDs for which the computing system has received out-of-range parameter values and/or unexpected parameter values, from the lowest percentage to the greatest percentage, or (vii) a user-selected order. Additionally, the second order is a different one of: (viii) the alpha-numeric order, (ix) the reverse-alpha-numeric order, (x) the order based on quantities of PIDs for which the computing system has received out-of-range parameter values and/or unexpected parameter values, from the greatest quantity to the least quantity, (xi) the order based on quantities of PIDs for which the computing system has received out-of-range parameter values and/or unexpected parameter values, from the least quantity to the greatest quantity, (xii) the order based on quantities of PIDs for which the computing system has received out-of-range parameter values and/or unexpected parameter values, from the greatest percentage to the lowest percentage, (xiii) the order based on quantities of PIDs for which the computing system has received out-of-range parameter values and/or unexpected parameter values, from the lowest percentage to the greatest percentage, or (xiv) the user-selected order.

EEE 16 is a method according to any one of EEE 1 to 7, further comprising displaying, on the display, a second user-selectable control while the computing system operates in the second state. The method also includes in response to determining the second user-selectable control is selected, (i) changing the display from displaying a container using a first display mode to displaying the container using a second display mode or (ii) changing the display from displaying the container using the second display mode to displaying container using the first display mode. Additionally, displaying the container using the first display mode includes displaying both the descriptor of the first PID topic and the first particular condition indicator corresponding to the first PID topic without displaying in the container a sub-container including an alpha-numeric indicator of a particular PID and a parameter value descriptor associated with the particular PID. Moreover, displaying the container using the second display mode includes displaying: (i) the descriptor of the first PID topic, (ii) the first particular condition indicator corresponding to the first PID topic, and (iii) the sub-container including the alpha-numeric indicator of the particular PID and the parameter value descriptor associated with the particular PID.

EEE 17 is a method according to EEE 16, wherein displaying the container using the second display mode includes generating the container and the sub-container based on position data and size data defined for the container and the sub-container. Additionally, the position data and size data defined for the container and the sub-container is specified using pixel coordinates or display percentages.

EEE 18 is a method according to any one of EEE 1 to 17, wherein the first quantity of PIDs indicates how many PIDs corresponding to the first PID topic are associated with the PID condition in which at least one of the received parameter values corresponding to the respective PID has breached a respective PID threshold. Additionally, the method further includes displaying, on the display while the computing system operates in the second state, a second particular PID condition indicator corresponding to the first PID topic, the second particular PID condition indicator corresponding to the first PID topic indicates a second quantity of PIDs, the second quantity of PIDs indicates how many PIDs corresponding to the first PID topic are associated with the PID condition in which none of the received parameter values corresponding to the respective PID has breached any respective PID threshold.

EEE 19 is a method according to EEE 18, wherein the processor determines a specific parameter value for a specific PID corresponding to the first PID topic that breaches a PID threshold corresponding to the specific PID if the specific parameter value does not match an expected value corresponding to the specific parameter value.

EEE 20 is a method according to any one of EEE 1 to 19, further comprising: determining, by the processor, the vehicle is operating in a first operating condition. The method also includes determining, by the processor, the vehicle changing from operating in the first operating condition to operating in a second operating condition. The one or more PIDs corresponding to the first PID topic includes a particular PID. Additionally, a respective PID threshold associated with the particular PID includes a first PID threshold and a second PID threshold different than the first PID threshold. Furthermore, determining a PID condition for the particular PID while the vehicle operates in the first operating condition includes comparing parameter values received while the vehicle operates in the first operating condition and corresponding to the particular PID to the first PID threshold. Furthermore still, determining a PID condition for the particular PID while the vehicle operates in the second operating condition includes comparing parameter values received while the vehicle operates in the second operating condition and corresponding to the particular PID to the second PID threshold.

EEE 21 is a method according to EEE 20, wherein the first operating condition includes a first temperature and the second operating condition includes a second temperature different than the first temperature.

EEE 22 is a method according to any one of EEE 1 to 21, wherein one or more additional PIDs correspond to the first PID topic. The method also includes receiving, by the processor, parameter values automatically requested from the vehicle for the one or more additional PIDs. Additionally, the method includes displaying, on the display, at least some of the parameter values automatically requested from the vehicle for the one or more additional PIDs without displaying any indicator of a PID condition corresponding to the one or more additional PIDs.

EEE 23 is a method according to any one of EEE 1 to 22, further comprising receiving, by the processor, a request to generate a custom PID topic based on the first PID topic. The method also includes displaying, on the display in response to the request, a graphical user interface including one or more sub-container selectors, wherein at least one sub-container selector of the one or more sub-container selectors corresponds to a sub-container that is not contained within the first PID topic. Furthermore, the method includes determining, by the processor, a selection of one or more sub-container selectors. Furthermore still, the method includes generating the custom PID topic based on the selection of one or more sub-container selectors. Generating the first PID topic includes generating a custom PID topic different than the first PID topic.

EEE 24 is a method according to EEE 23, wherein at least one additional sub-container selector of the one or more sub-container selectors corresponds to a respective sub-container that is contained within the first PID topic. Additionally, generating the custom PID topic based, at least in part on a selection of the at least one additional sub-container selector, includes excluding from the custom PID topic the respective sub-container that is contained within the first PID topic.

EEE 25 is a method according to any one of EEE 1 to 24, further comprising determining, by the processor, one or more additional PID topics corresponding to the component identifier, the system identifier, and/or the symptom identifier. One or more PIDs correspond to the one or more additional PID topics. The method also includes displaying, on the display while the computing system operates in the second state, multiple containers in a first order. The multiple containers include a respective container for the first PID topic and the one or more additional PID topics. Furthermore, the method includes displaying, on the display while the computing system operates in the second state, a user-selectable control. Furthermore still, the method includes displaying, on the display while the computing system operates in the second state, the multiple containers in a second order in response to a selection of the user-selectable control. Displaying the multiple containers in the second order includes displaying two or more containers displayed according to the first order in a reverse order.

EEE 26 is a method according to any one of EEE 1 to 25, further comprising determining, by the processor, a second PID topic mapped to the component identifier, the system identifier, and/or the symptom identifier. Multiple similar PIDs correspond to the second PID topic and each similar PID of the multiple similar PIDs corresponds to a respective common vehicle component on the vehicle. The method also includes receiving, by the processor while the computing system operates in the second state, parameter values automatically requested from the vehicle for each of the multiple similar PIDs corresponding to the second PID topic. Furthermore, the method includes determining, by the processor while the computing system operates in the second state, a PID condition for each of the multiple PIDs corresponding to the second PID topic, at least in part, by determining whether a difference between a respective parameter value for each the one or more PIDs corresponding to the second PID topic exceeds a variance threshold value. Furthermore still, the method includes displaying, on the display while the computing system operates in the second state, a descriptor of the second PID topic and an indicator of the PID condition for each of the multiple similar PIDs corresponding to the second PID topic.

EEE 27 is a method according to any one of EEE 1 to 26, further comprising transmitting, by the processor to a server, a request including the vehicle identifier and the component identifier, the system identifier, and/or the symptom identifier. The method also includes receiving, in response to the transmitting the request, a response including a PID topic file corresponding to the first PID topic.

EEE 28 is a method according EEE 27, wherein the PID topic file includes a list identifier that corresponds to a PID list stored within a non-transitory computer-readable memory readable by the processor. Additionally, the PID list includes data the processor uses to generate a vehicle data message for requesting parameter values for a PID corresponding to the first PID topic.

EEE 29 is a method according EEE 28, wherein the PID topic file and the PID list include a common reference that the processor uses to determine the data the processor uses to generate the vehicle data message for requesting parameter values for the PID corresponding to the first PID topic.

EEE 30 is a method according to any one of EEE 1 to 29, wherein the descriptor of the first PID topic and the first particular PID condition indicator corresponding to the first PID topic are displayed together on the display within a first container of a first graphical user interface. The method also includes displaying a first user-selectable control corresponding to the first container. Additionally, the method includes displaying, in response to a selection of the first user-selectable control, a user interface element including supplemental information and/or a second user-selectable control. The user interface element includes an expanded portion of the first container or a second graphical user interface displayed in place of the first graphical user interface.

EEE 31 is a method according EEE 30, wherein the second user-selectable control corresponds to a component test that the computing system is programmed to perform, a functional test that the computing system is programmed to request performance of by sending a first particular vehicle data message to the vehicle, or a reset function that the computing system is programmed to request performance of by sending a second particular vehicle data message to the vehicle.

EEE 32 is a method according to any one of EEE 1 to 31, further comprising transmitting, by the processor to the vehicle, a request for parameter values from the vehicle, the request including a set of PIDs, the set of PIDs including multiple PIDs corresponding to a particular electronic control unit in the vehicle. The method also includes determining, by the processor, a subset of PIDs, the subset of PIDs including some, but not all PIDs of the set of PIDs. Determining each particular PID to include in the subset of PIDs includes determining that one or more parameter values for the particular PID, received from the vehicle in response to transmitting the request, has breached a threshold corresponding to the particular PID. Additionally, determining the component identifier, the system identifier, and/or the symptom identifier includes determining the symptom identifier. Furthermore, the symptom identifier includes each determined particular PID to include in the subset of PIDs. Furthermore still, determining the first PID topic includes generating a PID topic including the subset of PIDs.

EEE 33 is a method according to EEE 32, wherein the set of PIDs includes all PIDs corresponding to the particular electronic control unit.

EEE 34 is a computing system comprising a processor, a display, and a non-transitory computer-readable memory. The non-transitory computer-readable memory contains executable instructions. Execution of the executable instructions by the processor causes the computing system to perform functions. The functions include determining, by a processor while a computing system operates in a first state, a vehicle identifier corresponding to a vehicle operatively connected to the computing system. The computing system includes the processor and a display. The display is powered on, but does not display any PID condition indicator while the computing system operates in the first state. A component identifier corresponds to a component of the vehicle. A system identifier corresponds to a system of the vehicle. A symptom identifier corresponds to a symptom the vehicle can exhibit. The functions also include determining, by the processor while the computing system operates in the first state, the component identifier, the system identifier, and/or the symptom identifier. Additionally, the functions include determining, by the processor, a first PID topic corresponding to the component identifier, the system identifier, and/or the symptom identifier. One or more PIDs correspond to the first PID topic. Moreover, the functions include switching, by the processor, operation of the computing system from the first state to a second state, the computing system is operable to display a PID condition indicator on the display while operating in the second state. The functions also include receiving, by the processor while the computing system operates in the second state, parameter values automatically requested from the vehicle for the one or more PIDs corresponding to the first PID topic. Furthermore, the functions include determining, by the processor while the computing system operates in the second state, a PID condition associated with each respective PID corresponding to the first PID topic, the PID condition associated with each respective PID corresponding to the first PID topic indicates whether at least one of the received parameter values corresponding to the respective PID has breached a respective PID threshold or whether none of the received parameter values corresponding to the respective PID has breached any respective PID threshold. Furthermore still, the functions include displaying, on the display while the computing system operates in the second state, a descriptor of the first PID topic and a first particular PID condition indicator corresponding to the first PID topic, the first particular PID condition indicator corresponding to the first PID topic indicates a first quantity of PIDs, the first quantity of PIDs indicates how many PIDs corresponding to the first PID topic are associated with the PID condition in which at least one of the received parameter values corresponding to the respective PID has breached a respective PID threshold or how many PIDs corresponding to the first PID topic are associated with the PID condition in which none of the received parameter values corresponding to the respective PID has breached any respective PID threshold.

EEE 35 is a non-transitory computer-readable memory having stored therein instructions executable by a processor to cause a computing system having a display and the processor to perform functions. The functions include determining, by a processor while a computing system operates in a first state, a vehicle identifier corresponding to a vehicle operatively connected to the computing system. The display is powered on, but does not display any PID condition indicator while the computing system operates in the first state. A component identifier corresponds to a component of the vehicle. A system identifier corresponds to a system of the vehicle. A symptom identifier corresponds to a symptom the vehicle can exhibit. The functions also include determining, by the processor while the computing system operates in the first state, the component identifier, the system identifier, and/or the symptom identifier. The functions further include determining, by the processor, a first PID topic corresponding to the component identifier, the system identifier, and/or the symptom identifier. One or more PIDs correspond to the first PID topic. Still further, the functions include switching, by the processor, operation of the computing system from the first state to a second state, the computing system is operable to display a PID condition indicator on the display while operating in the second state. Additionally, the functions include receiving, by the processor while the computing system operates in the second state, parameter values automatically requested from the vehicle for the one or more PIDs corresponding to the first PID topic. Furthermore, the functions include determining, by the processor while the computing system operates in the second state, a PID condition associated with each respective PID corresponding to the first PID topic, the PID condition associated with each respective PID corresponding to the first PID topic indicates whether at least one of the received parameter values corresponding to the respective PID has breached a respective PID threshold or whether none of the received parameter values corresponding to the respective PID has breached any respective PID threshold. Furthermore still, the functions include displaying, on the display while the computing system operates in the second state, a descriptor of the first PID topic and a first particular PID condition indicator corresponding to the first PID topic, the first particular PID condition indicator corresponding to the first PID topic indicates a first quantity of PIDs, the first quantity of PIDs indicates how many PIDs corresponding to the first PID topic are associated with the PID condition in which at least one of the received parameter values corresponding to the respective PID has breached a respective PID threshold or how many PIDs corresponding to the first PID topic are associated with the PID condition in which none of the received parameter values corresponding to the respective PID has breached any respective PID threshold.

EEE 36 is a computing system comprising: a display; a processor; and a non-transitory computer-readable memory having stored thereon instructions executable by the processor to perform functions, the set of functions comprising a method in accordance with any one of EEE 1 to 35.

EEE 37 is a non-transitory computer-readable medium storing program instructions, that when executed by a computing device, cause a set of functions to be performed, the set of functions comprising a method in accordance with any one of EEE 1 to 35.

EEE 38 is a method comprising determining, by a computing system, a vehicle identifier corresponding to a vehicle operatively coupled to the computing system. The method also includes determining, by the computing system, at least one other identifier. The method further includes transmitting, by the computing system over a communication network to a remote server, a request for a PID list. The request includes the vehicle identifier and the at least one other identifier. Additionally, the method includes receiving, by the computing system from the remote server, a response to the request over the communication network. The response includes the PID list and metadata regarding each PID contained in the PID list. Furthermore, the method includes transmitting, by the computing system to the vehicle for each PID contained in the PID list, a request for a parameter value corresponding to the PID contained in the PID list. Furthermore still, the method includes displaying, by the computing system on a display, a graphical user interface. The graphical user interface includes one or more PID topic descriptors based on the metadata and a representation of one or more PIDs contained in the PID list.

EEE 39 is a method according to EEE 38, wherein the at least one other identifier includes one or more of a component identifier, a system identifier, or a symptom identifier. Additionally, the component identifier corresponds to a component of the vehicle. Furthermore, the system identifier corresponds to a system of the vehicle. Furthermore still, the symptom identifier corresponds to a symptom the vehicle can exhibit.

EEE 40 is a method according to EEE 38, wherein the at least one other identifier includes two or more component identifiers corresponding to respective components of the vehicle.

EEE 41 is a method according to EEE 38, wherein the at least one other identifier includes two or more system identifiers corresponding to respective systems of the vehicle.

EEE 42 is a method according to EEE 38, wherein the at least one other identifier includes two or more symptom identifiers corresponding to respective symptoms of the vehicle.

EEE 43 is a method according to EEE 38, wherein the symptom identifier includes a diagnostic trouble code.

EEE 44 is a method according to any one of EEE 38 to 43, wherein the request for the corresponding PID value includes a vehicle data message including a particular PID that corresponds to the PID value.

EEE 45 is a method according to any one of EEE 38 to 44, wherein the computing system includes a dongle operatively coupled to the vehicle. Additionally, transmitting the request for the corresponding PID value includes transmitting, from the computing system to the dongle, data for the dongle to generate the vehicle data message.

EEE 46 is a method according to any one of EEE 38 to 44, wherein the computing system includes a computer-readable memory storing an ordered list of PIDs. Additionally, the PID list includes at least one index value into the ordered list of PIDs.

EEE 47 is a method according to any one of EEE 38 to 46, wherein the one or more PID topic descriptors include a particular PID topic descriptor for a first PID topic. Additionally, the response further includes a respective parameter range or expected value for at least some PIDs contained in the PID list. Moreover, the representation of one or more PIDs includes a condition icon including a first numeral. Furthermore, the first numeral indicates: (i) a quantity of PIDs of the first PID topic for which all parameter values received for a corresponding PID within the first PID topic are within a predefined range or match an expected value for the corresponding PID, or (ii) a quantity of PIDs of the first PID topic for which at least one received parameter value corresponding to a PID within the first PID topic is outside of a predefined range or not matching an expected value for the corresponding PID.

EEE 48 is a method according to any one of EEE 38 to 47, wherein the one or more PID topics include a first PID topic and a second PID topic. Moreover, displaying the graphical user interface includes displaying a first container and a second container. Furthermore, the first container includes a first PID topic descriptor corresponding to the first PID topic. Additionally, the first container includes one or more first sub-containers, each first sub-container corresponds to a respective first PID that the metadata indicates is associated with the first PID topic, and each first sub-container includes a representation of the respective first PID corresponding to the first sub-container. Furthermore, the second container includes a second PID topic descriptor corresponding to the second PID topic. Furthermore still, the second container includes one or more second sub-containers, each second sub-container corresponds to a respective second PID that the metadata indicates is associated with the second PID topic, and each second sub-container includes a representation of the respective PID corresponding to the second sub-container.

EEE 49 is a method according to any one of EEE 38 to 48, wherein the response includes a PID topic file.

EEE 50 is a method according to EEE 49, wherein the PID topic file includes a file arranged as a hyper-text transfer protocol (HTTP) file, an extensible mark-up language (XML) file, or a java script object notation (JSON) file.

EEE 51 is a method according to any one of EEE 38 to 50, wherein the at least one other identifier corresponds to an internal combustion engine within the vehicle, a component of the internal combustion engine, or a symptom of the internal combustion engine or that the component of the internal combustion engine can exhibit. Additionally, the one or more PID topic descriptors includes a first PID topic descriptor. Furthermore, the first PID topic descriptor is based on metadata corresponding to a group of PIDs associated with a speed and/or load of the internal combustion engine.

EEE 52 is a method according to EEE 51, wherein the group of PIDs include one or more from among: a PID corresponding to engine revolutions per minute, a PID corresponding to a crankshaft position sensor, a PID corresponding to a camshaft position sensor, or a PID corresponding to an amount of load applied to the internal combustion engine.

EEE 53 is a method according to any one of EEE 38 to 52, wherein the computing system includes a computer-readable memory storing an ordered list of PID topic descriptors. Additionally, the metadata includes at least one index value into the ordered list of PID topic descriptors.

EEE 54 is a method according to any one of EEE 38 to 53, wherein the PID list is part of an index list and the index list includes one or more index values to a scan tool function an metadata regarding each scan tool function contained in the index list.

EEE 54 is a method according to EEE 54, wherein the scan tool function includes a functional test.

EEE 56 is a method according to any one of EEE 54 to 55, wherein the scan tool function includes a reset procedure.

EEE 57 is a method according to any one of EEE 54 to 56, wherein the scan tool function includes a component test.

EEE 58 is a method according to any one of EEE 38 to 57, wherein the metadata regarding each PID contained in the PID list indicates one or more PID topics corresponding to the PID contained in the PID list.

EEE 59 is a method according to EEE 58, wherein the metadata regarding a particular PID contained in the PID lists indicates multiple PID topics corresponding to the particular PID.

EEE 60 is a method according to EEE 59, wherein the one or more PID topic descriptors include a PID topic descriptor for a general PID topic.

EEE 61 is a method according to EEE 60, wherein the general PID topic corresponds to a component concept associated with multiple components and/or multiple systems of the vehicle.

EEE 62 is a method according to EEE 60, wherein the general PID topic corresponds to a component concept associated with multiple symptoms that the vehicle can exhibit.

EEE 63 is a method according to EEE 38 to 47, wherein displaying the graphical user interface includes displaying a container, and wherein displaying the container includes displaying a PID topic descriptor corresponding to the first PID topic, and multiple sub-containers. Each sub-container corresponds to a respective PID.

EEE 64 is a method according to EEE 63, wherein displaying the graphical user interface includes displaying a user-selectable control corresponding to a first condition and a user-selectable control corresponding to a second condition. The first condition includes a PID condition in which none of the received parameter values corresponding to a PID for a particular sub-container has breached any respective PID threshold for that PID. The second condition includes a PID condition in which at least one of the received parameter values corresponding to a PID for the particular sub-container has breached a respective PID threshold for that PID.

EEE 65 is a method according to EEE 64, further comprising determining the user-selectable control corresponding to the first condition is selected and responsively removing from the container each sub-container corresponding to the second condition.

EEE 66 is a method according to EEE 64, further comprising determining the user-selectable control corresponding to the second condition is selected and responsively removing from the container each sub-container corresponding to the first condition.

EEE 67 is a method according to any one of EEE 63 to 66, wherein the multiple sub-containers include two or more sub-containers that correspond to a respective PID for matched components in the vehicle.

EEE 68 is a method according to EEE 67, wherein each of the two or more sub-containers includes an icon representing a condition of a respective one of the matched components.

EEE 69 is a method according to EEE 68, wherein the condition of a particular one of the matched components is based on a comparison of parameter values corresponding to a particular PID associated with the particular one of the matched components to a threshold associated with the particular PID.

EEE 70 is a method according to EEE 68, wherein the condition of a particular one of the matched components is based on a variance between parameter values corresponding to a particular PID associated with the particular one of the matched components and parameter values corresponding to PIDs for the other matched components.

EEE 71 is a computing system comprising a processor, a display, and a non-transitory computer-readable memory. The non-transitory computer-readable memory contains executable instructions. Execution of the executable instructions by the processor causes the computing system to perform functions. The functions include determining, by a computing system, a functions further include transmitting, by the computing system over a communication network to a remote server, a request for a PID list. The request includes the vehicle identifier and the at least one other identifier. Additionally, the functions include receiving, by the computing system from the remote server, a response to the request over the communication network. The response includes the PID list and metadata regarding each PID contained in the PID list. Furthermore, the functions include transmitting, by the computing system to the vehicle for each PID contained in the PID list, a request for a parameter value corresponding to the PID contained in the PID list. Furthermore still, the functions include displaying, by the computing system on a display, a graphical user interface. The graphical user interface includes one or more PID topic descriptors based on the metadata and a representation of one or more PIDs contained in the PID list.

EEE 72 is a non-transitory computer-readable memory having stored therein instructions executable by a processor to cause a computing system having a display and the processor to perform functions. The functions include determining, by a computing system, a functions further include transmitting, by the computing system over a communication network to a remote server, a request for a PID list. The request includes the vehicle identifier and the at least one other identifier. Additionally, the functions include receiving, by the computing system from the remote server, a response to the request over the communication network. The response includes the PID list and metadata regarding each PID contained in the PID list. Furthermore, the functions include transmitting, by the computing system to the vehicle for each PID contained in the PID list, a request for a parameter value corresponding to the PID contained in the PID list. Furthermore still, the functions include displaying, by the computing system on a display, a graphical user interface. The graphical user interface includes one or more PID topic descriptors based on the metadata and a representation of one or more PIDs contained in the PID list.

EEE 73 is a computing system comprising: a display; a processor; and a non-transitory computer-readable memory having stored thereon instructions executable by the processor to perform functions, the set of functions comprising a method in accordance with any one of EEE 38 to 70.

EEE 74 is a non-transitory computer-readable medium storing program instructions, that when executed by a computing device, cause a set of functions to be performed, the set of functions comprising a method in accordance with any one of EEE 38 to 70.

What is claimed is:

1. A method comprising:

determining, by a processor while a computing system operates in a first state, a vehicle identifier corresponding to a vehicle operatively connected to the computing system, wherein:

the computing system includes the processor and a display, the display is powered on, but does not display any parameter-identifier (PID) condition indicator while the computing system operates in the first state, a component identifier corresponds to a component of the vehicle, a system identifier corresponds to a system of the vehicle, and a symptom identifier corresponds to a symptom the vehicle can exhibit;

determining, by the processor while the computing system operates in the first state, the component identifier, the system identifier, and/or the symptom identifier;

determining, by the processor, a first PID topic corresponding to the component identifier, the system identifier, and/or the symptom identifier, wherein multiple parameter-identifiers (PIDs) correspond to the first PID topic;

switching, by the processor, operation of the computing system from the first state to a second state, the computing system is operable to display a PID condition indicator on the display while operating in the second state;

receiving, by the processor while the computing system operates in the second state, parameter values automatically requested from the vehicle for the multiple PIDs corresponding to the first PID topic;

determining, by the processor while the computing system operates in the second state, a PID condition associated with each respective PID corresponding to the first PID topic, the PID condition associated with each respective PID corresponding to the first PID topic indicates whether at least one of the received parameter values corresponding to the respective PID has breached a respective PID threshold or whether none of the received parameter values corresponding to the respective PID has breached any respective PID threshold; and displaying, on the display while the computing system operates in the second state, a descriptor of the first PID topic and a first particular PID condition indicator corresponding to the first PID topic, the first particular PID condition indicator corresponding to the first PID topic indicates a first quantity of PIDs, the first quantity of PIDs indicates how many PIDs of the multiple PIDs corresponding to the first PID topic are associated with the PID condition in which at least one of the received parameter values corresponding to the respective PID has breached a respective PID threshold or how many PIDs of the multiple PIDs corresponding to the first PID topic are associated with the PID condition in which none of the received parameter values corresponding to the respective PID has breached any respective PID threshold.

2. A method according to claim 1, further comprising:

displaying, on the display while the computing system operates in the first state and after determining the vehicle identifier and the component identifier, the system identifier, and/or the symptom identifier, a first user-selectable control, wherein switching operation of the computing system from the first state to the second state occurs in response to a selection of the first user-selectable control.

3. A method according to claim 1, wherein switching operation of the computing system from the first state to the second state occurs in response to determining the first PID topic.

4. A method according to claim 1, further comprising: receiving, by the processor, vehicle data transmitted by the vehicle, wherein:
the vehicle data is indicative of a diagnostic trouble code set active within the vehicle,
determining the component identifier, the system identifier, and/or the symptom identifier is based on the diagnostic trouble code, and
the diagnostic trouble code set active within the vehicle includes:
a diagnostic trouble code set active by the component, or
a diagnostic trouble code set active by an electronic control unit that is within the vehicle and that is: (i) operatively connected to the component, (ii) part of the system, and/or (iii) operatively connected to the component and part of the system.

5. A method according to claim 1, wherein:
determining the component identifier, the system identifier, and/or the symptom identifier includes determining at least a first identifier and a second identifier,
determining the first PID topic includes aggregating a PID topic corresponding to the first identifier and a PID topic corresponding to the second identifier,
the method further comprises determining the multiple PIDs corresponding to the first PID topic by aggregating PIDs corresponding to the PID topic corresponding to the first identifier, and PIDs corresponding to the PID topic corresponding to the second identifier, and
(i) the first identifier includes a first component identifier and the second identifier includes a second component identifier, a first system identifier, or a first symptom identifier, (ii) the first identifier includes the first system identifier and the second identifier includes the first component identifier, a second system identifier, and/or the first symptom identifier, or (iii) the first identifier includes the first symptom identifier and the second identifier includes the first component identifier, the first system identifier, or a second symptom identifier.

6. A method according to claim 5, wherein aggregating the PIDs corresponding to the PID topic corresponding to the first identifier and the PIDs corresponding to the PID topic corresponding to the second identifier includes omitting a particular PID corresponding to the PID topic corresponding to the second identifier because the particular PID is duplicative of a PID corresponding to the PID topic corresponding to the first identifier.

7. A method according to claim 1, further comprising:
determining, by the processor, a second PID topic corresponding to the component identifier, the system identifier, and/or the symptom identifier, wherein one or more PIDs correspond to the second PID topic;
receiving, by the processor while the computing system operates in the second state, parameter values automatically requested from the vehicle for the one or more PIDs corresponding to the second PID topic;
determining, by the processor while the computing system operates in the second state, a PID condition associated with each respective PID corresponding to the second PID topic, the PID condition associated with each respective PID corresponding to the second PID topic indicates whether at least one of the received parameter values corresponding to the respective PID has breached a respective PID threshold or whether none of the received parameter values corresponding to the respective PID has breached any respective PID threshold; and
displaying, on the display while the computing system operates in the second state, a descriptor of the second PID topic and a second particular PID condition indicator corresponding to the second PID topic, the second particular PID condition indicator corresponding to the second PID topic indicates a second quantity of PIDs, the second quantity of PIDs indicates how many PIDs corresponding to the second PID topic are associated with the PID condition in which at least one of the received parameter values corresponding to the respective PID has breached a respective PID threshold or how many PIDs corresponding to the second PID topic are associated with the PID condition in which none of the received parameter values corresponding to the respective PID has breached any respective PID threshold.

8. A method according to claim 7, wherein:
the descriptor of the first PID topic and the first particular PID condition indicator corresponding to the first PID topic are displayed together within a first container,
the descriptor of the second PID topic and the second particular PID condition indicator corresponding to the second PID topic are displayed together within a second container separate from the first container,
the first container and the second container are initially displayed in a first order, and the method further comprises:
determining a user-selection to change an order or a change in the PID condition for each of the multiple PIDs corresponding to the first PID topic and the PID condition for each of the one or more PIDs corresponding to the second PID topic; and
displaying the first container and the second container in a second order different than the first order based on the user-selection to change the order or the change in the PID condition for each of the multiple PIDs corresponding to the first PID topic and the PID condition for each of the one or more PIDs corresponding to the second PID topic.

9. A method according to claim 8, wherein:
the first order is:
an alpha-numeric order,
a reverse-alpha-numeric order,
an order based on quantities of PIDs for which the computing system has received out-of-range parameter values and/or unexpected parameter values, from a greatest quantity to a least quantity,
an order based on quantities of PIDs for which the computing system has received out-of-range parameter values and/or unexpected parameter values, from the least quantity to the greatest quantity,
an order based on quantities of PIDs for which the computing system has received out-of-range parameter values and/or unexpected parameter values, from a greatest percentage to a lowest percentage,
an order based on quantities of PIDs for which the computing system has received out-of-range parameter values and/or unexpected parameter values, from the lowest percentage to the greatest percentage, or
a user-selected order, and
the second order is a different one of:
the alpha-numeric order,
the reverse-alpha-numeric order,
the order based on quantities of PIDs for which the computing system has received out-of-range parameter values and/or unexpected parameter values, from the greatest quantity to the least quantity, the order based on quantities of PIDs for which the computing system has received out-of-range parameter values and/or unexpected parameter values, from the least quantity to the greatest quantity, the order based on quantities of PIDs for which the computing system has received out-of-range parameter values and/or unexpected parameter values, from the greatest percentage to the lowest percentage, the order based on quantities of PIDs for which the computing system has received out-of-range parameter values and/or unexpected parameter values, from the lowest percentage to the greatest percentage, or the user-selected order.

10. A method according to claim 1, wherein:

displaying the descriptor of the first PID topic and the first particular PID condition indicator corresponding to the first PID topic includes displaying a container including: (i) the descriptor of the first PID topic, (ii) the first particular PID condition indicator corresponding to the first PID topic, and (iii) one or more sub-containers, and each of the one or more sub-containers includes an alpha-numeric indicator of a particular PID and a parameter value descriptor associated with the particular PID.

11. A method according to 10, wherein:

the one or more sub-containers include multiple sub-containers;

the multiple sub-containers are initially arranged in a first order of sub-containers within the container, the method further comprises displaying the multiple sub-containers in a second order of sub-containers different than the first order of sub-containers, and the second order is based on a PID condition for at least one of the multiple PIDs corresponding to the first PID topic changing.

12. A method according to claim 10, wherein:

the one or more sub-containers include multiple sub-containers;

the multiple sub-containers are initially arranged in a first order of sub-containers within the container;

the method further comprises:

displaying, on the display while the computing system operates in the second state, a second user-selectable control, and displaying the multiple sub-containers in a second order of sub-containers in response to a selection of the second user-selectable control; and displaying the multiple sub-containers in the second order includes displaying two or more sub-containers initially arranged in the first order in a reverse order.

13. A method according to claim 10, wherein:

an additional PID corresponds to the first PID topic, and the method further comprises:

determining, by the processor, that no PID parameter value is received in response to requesting parameter values from the vehicle for the additional PID; and displaying, on the display within the container, a sub-container for the additional PID, wherein the sub-container for the additional PID includes an alphanumeric indicator of the additional PID and an indication that PID parameter values are unavailable from the vehicle for the additional PID, or displaying, on the display, the container without displaying within the container a sub-container for the additional PID.

14. A method according to claim 10, wherein:

the one or more sub-containers include multiple sub-containers, and the multiple sub-containers are initially arranged in a first order of sub-containers within the container, and the method further comprises:

determining a user-selection to change an order of sub-containers or a change in a PID condition for one or more PIDs corresponding to each sub-container of the multiple sub-containers; and displaying the multiple sub-containers in a second order of sub-containers different than the first order of sub-containers based on the user-selection to change the order of sub-containers or the change in the PID condition for one or more PIDs corresponding to each sub-container of the multiple sub-containers.

15. A method according to claim 14, wherein:

the first order is:

an alpha-numeric order, a reverse-alpha-numeric order, an order based on quantities of PIDs for which the computing system has received out-of-range parameter values and/or unexpected parameter values, from a greatest quantity to a least quantity, an order based on quantities of PIDs for which the computing system has received out-of-range parameter values and/or unexpected parameter values, from the least quantity to the greatest quantity, an order based on quantities of PIDs for which the computing system has received out-of-range parameter values and/or unexpected parameter values, from a greatest percentage to a lowest percentage, an order based on quantities of PIDs for which the computing system has received out-of-range parameter values and/or unexpected parameter values, from the lowest percentage to the greatest percentage, or a user-selected order, and the second order is a different one of:

the alpha-numeric order, the reverse-alpha-numeric order, the order based on quantities of PIDs for which the computing system has received out-of-range parameter values and/or unexpected parameter values, from the greatest quantity to the least quantity, the order based on quantities of PIDs for which the computing system has received out-of-range parameter values and/or unexpected parameter values, from the least quantity to the greatest quantity, the order based on quantities of PIDs for which the computing system has received out-of-range parameter values and/or unexpected parameter values, from the greatest percentage to the lowest percentage, the order based on quantities of PIDs for which the computing system has received out-of-range parameter values and/or unexpected parameter values, from the lowest percentage to the greatest percentage, or the user-selected order.

16. A method according to claim 1, further comprising: displaying, on the display, a second user-selectable control while the computing system operates in the second state;

in response to determining the second user-selectable control is selected, (i) changing the display from displaying a container using a first display mode to displaying the container using a second display mode or (ii) changing the display from displaying the container using the second display mode to displaying container using the first display mode, wherein displaying the container using the first display mode includes displaying both the descriptor of the first PID topic and the first particular PID condition indicator corresponding to the first PID topic without displaying in the container a sub-container including an alpha-numeric indicator of a particular PID and a parameter value descriptor associated with the particular PID, and wherein displaying the container using the second display mode includes displaying: (i) the descriptor of the first PID topic, (ii) the first particular PID condition indicator corresponding to the first PID topic, and (iii) the sub-container including the alpha-numeric indicator of the particular PID and the parameter value descriptor associated with the particular PID.

17. A method according to claim 16, wherein:

displaying the container using the second display mode includes generating the container and the sub-container based on position data and size data defined for the container and the sub-container, and the position data and size data defined for the container and the sub-container is specified using pixel coordinates or display percentages.

18. A method according to claim 1, wherein:

the first quantity of PIDs indicates how many PIDs of the multiple PIDs corresponding to the first PID topic are associated with the PID condition in which at least one of the received parameter values corresponding to the respective PID has breached the respective PID threshold, and the method further comprises:

displaying, on the display while the computing system operates in the second state, a second particular PID condition indicator corresponding to the first PID topic, the second particular PID condition indicator corresponding to the first PID topic indicates a second quantity of PIDs, the second quantity of PIDs indicates how many PIDs corresponding to the first PID topic are associated with the PID condition in which none of the received parameter values corresponding to the respective PID has breached any respective PID threshold.

19. A method according to claim 18, wherein the processor determines a specific parameter value for a specific PID corresponding to the first PID topic that breaches a PID threshold corresponding to the specific PID if the specific parameter value does not match an expected value corresponding to the specific parameter value.

20. A method according to claim 1, further comprising:

determining, by the processor, the vehicle is operating in a first operating condition; and determining, by the processor, the vehicle changing from operating in the first operating condition to operating in a second operating condition, wherein:

the multiple PIDs corresponding to the first PID topic includes a particular PID, a respective PID threshold associated with the particular PID includes a first PID threshold and a second PID threshold different than the first PID threshold, determining a PID condition for the particular PID while the vehicle operates in the first operating condition includes comparing parameter values received while the vehicle operates in the first operating condition and corresponding to the particular PID to the first PID threshold, and determining a PID condition for the particular PID while the vehicle operates in the second operating condition includes comparing parameter values received while the vehicle operates in the second operating condition and corresponding to the particular PID to the second PID threshold.

21. A method according to claim 20, wherein the first operating condition includes a first temperature and the second operating condition includes a second temperature different than the first temperature.

22. A method according to claim 1, wherein:

one or more additional PIDs correspond to the first PID topic, and the method further comprises:

receiving, by the processor, parameter values automatically requested from the vehicle for the one or more additional PIDs; and displaying, on the display, at least some of the parameter values automatically requested from the vehicle for the one or more additional PIDs without displaying any indicator of a PID condition corresponding to the one or more additional PIDs.

23. A method according to claim 1, further comprising:

receiving, by the processor, a request to generate a custom PID topic based on the first PID topic;

displaying, on the display in response to the request, a graphical user interface including one or more sub-container selectors, wherein at least one sub-container selector of the one or more sub-container selectors corresponds to a sub-container that is not contained within the first PID topic;

determining, by the processor, a selection of one or more sub-container selectors; and generating the custom PID topic based on the selection of one or more sub-container selectors, wherein generating the first PID topic includes generating a custom PID topic different than the first PID topic.

24. A method according to claim 23, wherein:

at least one additional sub-container selector of the one or more sub-container selectors corresponds to a respective sub-container that is contained within the first PID topic, and generating the custom PID topic based, at least in part on a selection of the at least one additional sub-container selector, includes excluding from the custom PID topic the respective sub-container that is contained within the first PID topic.

25. A method according to claim 1, further comprising:

determining, by the processor, one or more additional PID topics corresponding to the component identifier, the system identifier, and/or the symptom identifier, wherein one or more PIDs correspond to the one or more additional PID topics;

displaying, on the display while the computing system operates in the second state, multiple containers in a first order, wherein the multiple containers include a respective container for the first PID topic and the one or more additional PID topics;

displaying, on the display while the computing system operates in the second state, a user-selectable control; and displaying, on the display while the computing system operates in the second state, the multiple containers in a second order in response to a selection of the user-selectable control, wherein displaying the multiple containers in the second order includes displaying two or more containers displayed according to the first order in a reverse order.

26. A method according to claim 1, further comprising:

determining, by the processor, a second PID topic mapped to the component identifier, the system identifier, and/or the symptom identifier, wherein multiple similar PIDs correspond to the second PID topic and each similar PID of the multiple similar PIDs corresponds to a respective common vehicle component on the vehicle;

receiving, by the processor while the computing system operates in the second state, parameter values automatically requested from the vehicle for each of the multiple similar PIDs corresponding to the second PID topic;

determining, by the processor while the computing system operates in the second state, a PID condition for each of the multiple PIDs corresponding to the second PID topic, at least in part, by determining whether a difference between a respective parameter value for each the one or more PIDs corresponding to the second PID topic exceeds a variance threshold value; and displaying, on the display while the computing system operates in the second state, a descriptor of the second PID topic and an indicator of the PID condition for each of the multiple similar PIDs corresponding to the second PID topic.

27. A method according to claim 1, further comprising:

transmitting, by the processor to a server, a request including the vehicle identifier and the component identifier, the system identifier, and/or the symptom identifier; and receiving, in response to the transmitting the request, a response including a PID topic file corresponding to the first PID topic.

28. A method according claim 27, wherein:

the PID topic file includes a list identifier that corresponds to a PID list stored within a non-transitory computer-readable memory readable by the processor, and the PID list includes data the processor uses to generate a vehicle data message for requesting parameter values for a PID corresponding to the first PID topic.

29. A method according to claim 28, wherein:

the PID topic file and the PID list include a common reference that the processor uses to determine the data the processor uses to generate the vehicle data message for requesting parameter values for the PID corresponding to the first PID topic.

30. A method according to claim 1, wherein:

the descriptor of the first PID topic and the first particular PID condition indicator corresponding to the first PID topic are displayed together on the display within a first container of a first graphical user interface, the method further comprises:

displaying a first user-selectable control corresponding to the first container; and displaying, in response to a selection of the first user-selectable control, a user interface element including supplemental information and/or a second user-selectable control; and the user interface element includes an expanded portion of the first container or a second graphical user interface displayed in place of the first graphical user interface.

31. A method according to claim 30, wherein the second user-selectable control corresponds to a component test that the computing system is programmed to perform, a functional test that the computing system is programmed to request performance of by sending a first particular vehicle data message to the vehicle, or a reset function that the computing system is programmed to request performance of by sending a second particular vehicle data message to the vehicle.

32. A method according to claim 1, further comprising:

transmitting, by the processor to the vehicle, a request for parameter values from the vehicle, the request including a set of PIDs, the set of PIDs including multiple PIDs corresponding to a particular electronic control unit in the vehicle, and determining, by the processor, a subset of PIDs, the subset of PIDs including some, but not all PIDs of the set of PIDs, wherein:

determining each particular PID to include in the subset of PIDs includes determining that one or more parameter values for the particular PID, received from the vehicle in response to transmitting the request, has breached a threshold corresponding to the particular PID, determining the component identifier, the system identifier, and/or the symptom identifier includes determining the symptom identifier, the symptom identifier includes each determined particular PID to include in the subset of PIDs, and determining the first PID topic includes generating a PID topic including the subset of PIDs.

33. A method according to claim 32, wherein the set of PIDs includes all PIDs corresponding to the particular electronic control unit.

34. A computing system comprising:

a processor;

a display, and a non-transitory computer-readable memory, wherein the non-transitory computer-readable memory contains executable instructions, and wherein execution of the executable instructions by the processor causes the computing system to perform functions comprising:

determining, by a processor while a computing system operates in a first state, a vehicle identifier corresponding to a vehicle operatively connected to the computing system, wherein:

the computing system includes the processor and a display, the display is powered on, but does not display any parameter-identifier (PID) condition indicator while the computing system operates in the first state, a component identifier corresponds to a component of the vehicle, a system identifier corresponds to a system of the vehicle, and a symptom identifier corresponds to a symptom the vehicle can exhibit;

determining, by the processor while the computing system operates in the first state, the component identifier, the system identifier, and/or the symptom identifier;

determining, by the processor, a first PID topic corresponding to the component identifier, the system identifier, and/or the symptom identifier, wherein multiple parameter-identifiers (PIDs) correspond to the first PID topic;

switching, by the processor, operation of the computing system from the first state to a second state, the computing system is operable to display a PID condition indicator on the display while operating in the second state;

receiving, by the processor while the computing system operates in the second state, parameter values automatically requested from the vehicle for the multiple PIDs corresponding to the first PID topic;

determining, by the processor while the computing system operates in the second state, a PID condition associated with each respective PID corresponding to the first PID topic, the PID condition associated with each respective PID corresponding to the first PID topic indicates whether at least one of the received parameter values corresponding to the respective PID has breached a respective PID threshold or whether none of the received parameter values corresponding to the respective PID has breached any respective PID threshold; and displaying, on the display while the computing system operates in the second state, a descriptor of the first PID topic and a first particular PID condition indicator corresponding to the first PID topic, the first particular PID condition indicator corresponding to the first PID topic indicates a first quantity of PIDs, the first quantity of PIDs indicates how many PIDs of the multiple PIDs corresponding to the first PID topic are associated with the PID condition in which at least one of the received parameter values corresponding to the respective PID has breached a respective PID threshold or how many PIDs of the multiple PIDs corresponding to the first PID topic are associated with the PID condition in which none of the received parameter values corresponding to the respective PID has breached any respective PID threshold.

35. A non-transitory computer-readable memory having stored therein instructions executable by a processor to cause a computing system having a display and the processor to perform functions comprising:

determining, by a processor while a computing system operates in a first state, a vehicle identifier corresponding to a vehicle operatively connected to the computing system, wherein:

the display is powered on, but does not display any parameter-identifier (PID) condition indicator while the computing system operates in the first state, a component identifier corresponds to a component of the vehicle, a system identifier corresponds to a system of the vehicle, and a symptom identifier corresponds to a symptom the vehicle can exhibit;

determining, by the processor while the computing system operates in the first state, the component identifier, the system identifier, and/or the symptom identifier;

determining, by the processor, a first PID topic corresponding to the component identifier, the system identifier, and/or the symptom identifier, wherein multiple parameter-identifiers (PIDs) correspond to the first PID topic;

switching, by the processor, operation of the computing system from the first state to a second state, the computing system is operable to display a PID condition indicator on the display while operating in the second state;

receiving, by the processor while the computing system operates in the second state, parameter values automatically requested from the vehicle for the multiple PIDs corresponding to the first PID topic;

determining, by the processor while the computing system operates in the second state, a PID condition associated with each respective PID corresponding to the first PID topic, the PID condition associated with each respective PID corresponding to the first PID topic indicates whether at least one of the received parameter values corresponding to the respective PID has breached a respective PID threshold or whether none of the received parameter values corresponding to the respective PID has breached any respective PID threshold; and displaying, on the display while the computing system operates in the second state, a descriptor of the first PID topic and a first particular PID condition indicator corresponding to the first PID topic, the first particular PID condition indicator corresponding to the first PID topic indicates a first quantity of PIDs, the first quantity of PIDs indicates how many PIDs of the multiple PIDs corresponding to the first PID topic are associated with the PID condition in which at least one of the received parameter values corresponding to the respective PID has breached a respective PID threshold or how many PIDs of the multiple PIDs corresponding to the first PID topic are associated with the PID condition in which none of the received parameter values corresponding to the respective PID has breached any respective PID threshold.

* * * * *